US012078123B2

(12) United States Patent
Kamen et al.

(10) Patent No.: US 12,078,123 B2
(45) Date of Patent: Sep. 3, 2024

(54) STIRLING CYCLE MACHINE

(71) Applicant: New Power Concepts, LLC, Manchester, NH (US)

(72) Inventors: Dean Kamen, Bedford, NH (US); Christopher C. Langenfeld, Nashua, NH (US); Prashant Bhat, Bedford, NH (US); Stanley B. Smith, III, Raymond, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 17/939,280

(22) Filed: Sep. 7, 2022

(65) Prior Publication Data

US 2023/0003174 A1    Jan. 5, 2023

Related U.S. Application Data

(63) Continuation of application No. 16/547,656, filed on Aug. 22, 2019, now Pat. No. 11,448,158, which is a
(Continued)

(51) Int. Cl.
*F02G 1/043* (2006.01)
*F01B 7/12* (2006.01)
(Continued)

(52) U.S. Cl.
CPC ............ *F02G 1/0435* (2013.01); *F01B 7/12* (2013.01); *F02G 1/043* (2013.01); *F02G 1/044* (2013.01);
(Continued)

(58) Field of Classification Search
CPC .................................. F23R 3/36; F23D 14/66
(Continued)

(56) References Cited

U.S. PATENT DOCUMENTS

| | | | |
|---|---|---|---|
| 124,805 A | * | 3/1872 | Fryer ...................... F16H 21/38 |
| | | | 74/579 R |
| 444,195 A | | 1/1891 | Monroe |

(Continued)

FOREIGN PATENT DOCUMENTS

| | | |
|---|---|---|
| CN | 105190001 A | 12/2015 |
| DE | 4127300 A1 | 2/1993 |

(Continued)

OTHER PUBLICATIONS

Office Action mailed Sep. 14, 2017 issued in Mexican Patent Application No. MX/a/2013/012822, 2 pages.
(Continued)

*Primary Examiner* — Vivek K Shirsat
(74) *Attorney, Agent, or Firm* — Michael George Norris

(57) ABSTRACT

A Stirling cycle machine with a liquid fuel/gaseous fuel burner. The burner may include a preheater to capture the thermal energy of the exhaust. The burner directs the preheated air to each burner head, where it enters a prechamber. Each burner head includes a fuel nozzle that directs liquid or gaseous fuel into the prechamber. The prechamber is fluidically connected to a combustion chamber via a prechamber nozzle that has a smaller opening than the prechamber. The burner head ignites the fuel air mixture in the prechamber with an ignitor located above or within the prechamber. The flame is initially lit as a diffusion flame in the prechamber. The flame is pushed out of the prechamber into the combustion chamber by an increased air flow rate. The liquid fuel from the nozzle now evaporates in the prechamber and forms a prevaporized flame in the combustion chamber.

19 Claims, 135 Drawing Sheets

Related U.S. Application Data continuation of application No. 15/694,343, filed on Sep. 1, 2017, now Pat. No. 11,339,743, which is a continuation of application No. 13/932,276, filed on Jul. 1, 2013, now Pat. No. 9,752,532, which is a continuation of application No. 12/105,854, filed on Apr. 18, 2008, now Pat. No. 8,474,256.

(60) Provisional application No. 60/925,818, filed on Apr. 23, 2007, provisional application No. 60/925,814, filed on Apr. 23, 2007.

(51) Int. Cl.
  *F02G 1/044* (2006.01)
  *F02G 1/053* (2006.01)
  *F16C 9/04* (2006.01)
  *F16C 11/04* (2006.01)
  *F16C 11/12* (2006.01)
  *F16J 3/06* (2006.01)
  *F16J 15/52* (2006.01)

(52) U.S. Cl.
  CPC .............. *F02G 1/0535* (2013.01); *F16C 9/04* (2013.01); *F16C 11/04* (2013.01); *F16C 11/12* (2013.01); *F16J 3/06* (2013.01); *F16J 15/52* (2013.01); *F02G 2244/08* (2013.01); *F02G 2253/03* (2013.01); *F02G 2253/08* (2013.01); *F02G 2253/80* (2013.01); *F02G 2270/45* (2013.01); *F02G 2270/50* (2013.01); *F02G 2270/85* (2013.01)

(58) Field of Classification Search
  USPC ........ 126/116 R, 116 A, 116 B; 431/11, 164, 431/167, 354–355, 6; 60/520
  See application file for complete search history.

(56) References Cited

U.S. PATENT DOCUMENTS

| | | | |
|---|---|---|---|
| 460,319 A * | 9/1891 | Courtright | F15B 15/065 123/197.1 |
| 519,943 A | 5/1894 | Devoissaud | |
| 715,150 A * | 12/1902 | Robb | F02B 3/06 123/53.5 |
| 752,434 A | 2/1904 | Baltzinger | |
| 864,249 A | 8/1907 | Morgan | |
| 931,750 A | 8/1909 | Gifford | |
| 971,583 A | 10/1910 | Bell | |
| 1,033,939 A | 7/1912 | Robb et al. | |
| 1,039,492 A | 9/1912 | Courtwright et al. | |
| 1,389,728 A | 9/1921 | Akimoff | |
| 1,419,159 A | 6/1922 | McKechnie | |
| 1,460,474 A | 7/1923 | Bronander | |
| 1,460,475 A | 7/1923 | Bronander | |
| 1,471,847 A | 10/1923 | Holliday | |
| 1,501,459 A | 7/1924 | Kline | |
| 1,614,962 A | 1/1927 | Koenig | |
| 1,736,639 A | 11/1929 | Szydlowski | |
| 1,832,562 A | 11/1931 | Kline | |
| 2,067,049 A | 1/1937 | Goldberg | |
| 2,268,532 A | 12/1941 | Goodman | |
| 2,357,031 A | 8/1944 | Stabler | |
| 2,441,277 A | 5/1948 | Lamphere | |
| 2,500,823 A | 3/1950 | Hickey | |
| 2,616,248 A | 11/1952 | Brey et al. | |
| 2,619,943 A | 12/1952 | Monleone | |
| 3,009,315 A | 11/1961 | Drumm | |
| 3,083,734 A | 4/1963 | Taplin | |
| 3,134,306 A | 5/1964 | Schmidt | |
| 3,237,847 A | 3/1966 | Forbes | |
| 3,277,795 A | 10/1966 | Rietdijk | |
| 3,537,437 A | 11/1970 | Paul et al. | |
| 3,559,398 A | 2/1971 | Meijer et al. | |
| 3,568,436 A | 3/1971 | Heffner et al. | |
| 3,620,652 A | 11/1971 | Jaspers et al. | |
| 3,650,262 A | 3/1972 | Root et al. | |
| 3,659,306 A | 5/1972 | Stoltze et al. | |
| 3,662,654 A | 5/1972 | Bax | |
| 3,667,348 A | 6/1972 | Neelen | |
| 3,667,349 A | 6/1972 | Siebert et al. | |
| 3,697,088 A | 10/1972 | Hummer | |
| 3,783,745 A * | 1/1974 | Meijer | F02G 1/0535 60/526 |
| 3,798,895 A | 3/1974 | Fokker et al. | |
| 3,822,550 A | 7/1974 | Brandenburg et al. | |
| 3,845,624 A | 11/1974 | Roos | |
| 3,869,002 A | 3/1975 | Koenig, III | |
| 3,909,184 A | 9/1975 | Earl | |
| 3,934,480 A | 1/1976 | Nederlof | |
| 3,940,932 A | 3/1976 | Ambrose et al. | |
| 3,959,971 A | 6/1976 | Mekari | |
| 4,011,842 A | 3/1977 | Davies et al. | |
| 4,082,297 A | 4/1978 | Adams | |
| 4,121,423 A | 10/1978 | Querry et al. | |
| 4,138,897 A | 2/1979 | Ross | |
| 4,215,660 A | 8/1980 | Finley | |
| 4,255,929 A | 3/1981 | Frosch | |
| 4,257,230 A | 3/1981 | Lundholm | |
| 4,305,349 A | 12/1981 | Zimmerly | |
| 4,335,884 A * | 6/1982 | Darche | F16J 3/06 277/634 |
| 4,372,116 A | 2/1983 | Dineen | |
| 4,381,648 A | 5/1983 | Balas, Jr. | |
| 4,392,168 A | 7/1983 | Maruyama et al. | |
| 4,406,463 A | 9/1983 | Fabrowsky | |
| 4,415,171 A | 11/1983 | Edwards | |
| 4,419,969 A | 12/1983 | Bundrick, Jr. | |
| 4,423,109 A | 12/1983 | Greenman et al. | |
| 4,439,169 A | 3/1984 | Meijer et al. | |
| 4,452,042 A | 6/1984 | Lindskoug | |
| 4,481,771 A | 11/1984 | Meijer et al. | |
| 4,494,760 A | 1/1985 | Spargo | |
| 4,522,030 A | 6/1985 | Corey | |
| 4,523,636 A | 6/1985 | Meijer et al. | |
| 4,532,819 A | 8/1985 | Ross | |
| 4,532,855 A | 8/1985 | Meijer et al. | |
| 4,579,046 A | 4/1986 | Meijer et al. | |
| 4,615,261 A | 10/1986 | Meijer | |
| 4,620,418 A | 11/1986 | Fujiwara | |
| 4,625,977 A | 12/1986 | Azibert et al. | |
| 4,632,179 A | 12/1986 | Meijer et al. | |
| 4,656,177 A | 4/1987 | Sunshine et al. | |
| 4,669,736 A | 6/1987 | Meijer | |
| 4,703,796 A | 11/1987 | Meijer et al. | |
| 4,707,990 A | 11/1987 | Meijer | |
| 4,712,378 A | 12/1987 | Nakayama | |
| 4,715,183 A | 12/1987 | Meijer et al. | |
| 4,738,105 A | 4/1988 | Ross et al. | |
| 4,751,813 A | 6/1988 | Clayton et al. | |
| 4,751,819 A | 6/1988 | Eder | |
| 4,769,992 A | 9/1988 | Harada et al. | |
| 4,785,633 A | 11/1988 | Meijer et al. | |
| 4,785,875 A | 11/1988 | Meijer et al. | |
| 4,824,149 A | 4/1989 | Reuchlein | |
| 4,825,814 A | 5/1989 | Meijer | |
| 4,836,094 A | 6/1989 | Meijer et al. | |
| 4,885,980 A | 12/1989 | Meijer et al. | |
| 4,897,997 A | 2/1990 | Meijer et al. | |
| 4,901,790 A | 2/1990 | Meijer | |
| 4,911,144 A | 3/1990 | Godett et al. | |
| 4,977,742 A | 12/1990 | Meijer | |
| 4,979,428 A | 12/1990 | Nelson | |
| 4,994,004 A | 2/1991 | Meijer et al. | |
| 4,996,841 A | 3/1991 | Meijer et al. | |
| 5,015,000 A | 5/1991 | Perini | |
| 5,029,562 A | 7/1991 | Kamo | |
| 5,058,487 A | 10/1991 | Faitel | |
| 5,074,114 A | 12/1991 | Meijer et al. | |
| 5,146,749 A | 9/1992 | Wood et al. | |
| 5,263,404 A | 11/1993 | Gaucher et al. | |
| 5,388,409 A | 2/1995 | Meijer | |

(56) References Cited

U.S. PATENT DOCUMENTS

| | | | |
|---|---|---|---|
| 5,394,700 A | 3/1995 | Steele | |
| 5,557,934 A | 9/1996 | Beach | |
| 5,611,201 A | 3/1997 | Houtman | |
| 5,630,351 A | 5/1997 | Clucas | |
| 5,657,632 A | 8/1997 | Foss | |
| 5,706,659 A | 1/1998 | Houtman et al. | |
| 5,722,239 A | 3/1998 | Houtman et al. | |
| 5,735,262 A | 4/1998 | Houtman | |
| 5,751,069 A | 5/1998 | Rajashekara et al. | |
| 5,758,938 A | 6/1998 | Osterwisch | |
| 5,771,694 A | 6/1998 | Houtman et al. | |
| 5,813,229 A | 9/1998 | Gaiser | |
| 5,822,964 A | 10/1998 | Kerpays, Jr. | |
| 5,836,846 A | 11/1998 | Hewko et al. | |
| 5,853,482 A | 12/1998 | Gartmann et al. | |
| 5,864,770 A | 1/1999 | Ziph et al. | |
| 5,865,091 A | 2/1999 | Domanski et al. | |
| 5,884,481 A | 3/1999 | Johansson et al. | |
| 5,921,764 A | 7/1999 | Marchionna et al. | |
| 5,938,207 A | 8/1999 | Marchionna et al. | |
| 6,155,240 A | 12/2000 | Amano et al. | |
| 6,282,895 B1 | 9/2001 | Johansson et al. | |
| 6,308,734 B1 | 10/2001 | Smith et al. | |
| 6,318,526 B1 | 11/2001 | Kruckemeyer et al. | |
| 6,381,958 B1 | 5/2002 | Kamen et al. | |
| 6,381,962 B1 | 5/2002 | Ohshita et al. | |
| 6,390,258 B1 | 5/2002 | Hofmann et al. | |
| 6,401,669 B1 | 6/2002 | MacGowan et al. | |
| 6,543,215 B2 | 4/2003 | Langenfeld et al. | |
| 6,591,609 B2 | 7/2003 | Kamen et al. | |
| 6,637,312 B1 | 10/2003 | Clucas et al. | |
| 6,694,731 B2 | 2/2004 | Kamen et al. | |
| 6,698,669 B2 | 3/2004 | Rieben | |
| 6,705,270 B1* | 3/2004 | Rau | F01M 11/0004 184/106 |
| 6,862,883 B2 | 3/2005 | Kamen et al. | |
| 6,904,888 B1 | 6/2005 | Heifets | |
| 6,922,908 B1 | 8/2005 | Raudales | |
| 6,966,182 B2 | 11/2005 | Kamen et al. | |
| 6,971,235 B2 | 12/2005 | Langenfeld et al. | |
| 7,003,964 B2 | 2/2006 | Solomon | |
| 7,051,527 B2 | 5/2006 | Schmid et al. | |
| 7,067,933 B2 | 6/2006 | Bassett | |
| 7,089,848 B2 | 8/2006 | McCrary | |
| 7,111,460 B2 | 9/2006 | Jensen et al. | |
| 7,191,596 B2 | 3/2007 | Yaguchi et al. | |
| 7,194,858 B2 | 3/2007 | Ziph et al. | |
| 7,219,647 B1 | 5/2007 | Brickley | |
| 7,279,800 B2 | 10/2007 | Bassett | |
| 7,308,787 B2 | 12/2007 | Larocque et al. | |
| 7,310,945 B2 | 12/2007 | Gurski et al. | |
| 7,325,399 B2 | 2/2008 | Strimling et al. | |
| 7,373,915 B1 | 5/2008 | Joniec | |
| 7,458,215 B2 | 12/2008 | Yaguchi et al. | |
| 7,468,765 B2 | 12/2008 | Shiota et al. | |
| 8,181,461 B2 | 5/2012 | Strimling et al. | |
| 8,474,256 B2 | 7/2013 | Kamen et al. | |
| 9,752,532 B2 | 9/2017 | Kamen et al. | |
| 11,389,728 B2 | 7/2022 | Lee | |
| 11,394,033 B2 | 7/2022 | Yang et al. | |
| 11,471,847 B2 | 10/2022 | Al-Haj et al. | |
| 11,614,962 B2 | 3/2023 | Liu et al. | |
| 11,673,280 B1 | 6/2023 | Randall et al. | |
| 2002/0035834 A1 | 3/2002 | Cammack | |
| 2002/0175502 A1 | 11/2002 | Tesch et al. | |
| 2004/0026067 A1 | 2/2004 | Mochizuki et al. | |
| 2005/0122447 A1 | 6/2005 | Shiota et al. | |
| 2005/0142005 A1 | 6/2005 | Traylor | |
| 2005/0250062 A1 | 11/2005 | Kornbluth et al. | |
| 2006/0032957 A1 | 2/2006 | Kolbet et al. | |
| 2006/0048728 A1 | 3/2006 | Scalzo | |
| 2006/0096810 A1 | 5/2006 | Eto et al. | |
| 2007/0169477 A1* | 7/2007 | Mori | F02B 61/00 60/520 |
| 2007/0193542 A1* | 8/2007 | Wood | F16D 1/12 123/90.31 |
| 2007/0227139 A1 | 10/2007 | Withrow et al. | |
| 2008/0141921 A1* | 6/2008 | Hinderks | F02B 59/00 114/274 |
| 2008/0314356 A1 | 12/2008 | Kamen et al. | |
| 2009/0005426 A1 | 1/2009 | Arkinstall et al. | |
| 2010/0199658 A1 | 8/2010 | Johansson et al. | |
| 2011/0011078 A1 | 1/2011 | Kamen et al. | |
| 2011/0146601 A1 | 6/2011 | Fisher | |
| 2012/0031383 A1 | 2/2012 | Stockhausen | |
| 2014/0000235 A1 | 1/2014 | Kamen et al. | |
| 2015/0040751 A1 | 2/2015 | Langenfeld et al. | |
| 2015/0152809 A1 | 6/2015 | Langenfeld et al. | |

FOREIGN PATENT DOCUMENTS

| | | |
|---|---|---|
| DE | 19938084 A1 | 7/2000 |
| EP | 2449244 A2 | 5/2012 |
| FR | 2459371 A1 | 1/1981 |
| FR | 2497904 A1 | 7/1982 |
| FR | 2796119 A1 | 1/2001 |
| GB | 1311058 A | 3/1973 |
| GB | 1394033 A | 5/1975 |
| GB | 2249131 A1 | 4/1992 |
| JP | 1976-048040 A2 | 4/1976 |
| JP | 1977-131241 A2 | 11/1977 |
| JP | 1982-018443 A2 | 1/1982 |
| JP | 5718443 | 1/1982 |
| JP | 1986-025901 A2 | 2/1986 |
| JP | 1986-040450 A2 | 2/1986 |
| JP | 1986-079849 A2 | 4/1986 |
| JP | 1988-109271 A2 | 5/1988 |
| JP | 1008346 | 1/1989 |
| JP | 1998-062025 A2 | 3/1998 |
| JP | 2008-101477 A2 | 5/2008 |
| WO | 1992009812 A1 | 6/1992 |
| WO | 9703283 | 1/1997 |
| WO | 2008131223 A1 | 10/2008 |
| WO | 2009005426 A1 | 1/2009 |
| WO | 2011003038 A3 | 10/2011 |

OTHER PUBLICATIONS

Office Action mailed Apr. 10, 2018 issued in Mexican Patent Application No. MX/a/2013/012822, 4 pages.
International Preliminary Report on Patentability, dated Nov. 5, 2009, received in the international patent application No. PCT/US2008/060827, 7 pgs.
International Search Report dated Aug. 10, 2011, received in international patent application No. PCT/US2010/040841, 5 pgs.
International Preliminary Report on Patentability, dated Jan. 4, 2012, received in International application No. PCT/US2010/040841 8 pgs.
Written Opinion, date Jul. 21, 2015, received in International Application No. PCT/US2015/020527, 4 pgs.
Invitation to Pay Additional Fees and Where Applicable, Protest Fee dated Apr. 27, 2011, received in International Application No. PCT/US2010/040841 8 pgs.
International Search Report with Written Opinion, dated Oct. 15, 2008, received in international patent application PCT/US2008/060827.
International Search Report, date Jul. 21, 2015, received in International Application No. PCT/US2015/020527, 4 pgs.

* cited by examiner

READY FOR START OF
COMPRESSION STROKE

END OF COMPRESSION STROKE

READY FOR START OF
EXPANSION STROKE

END OF EXPANSION STROKE

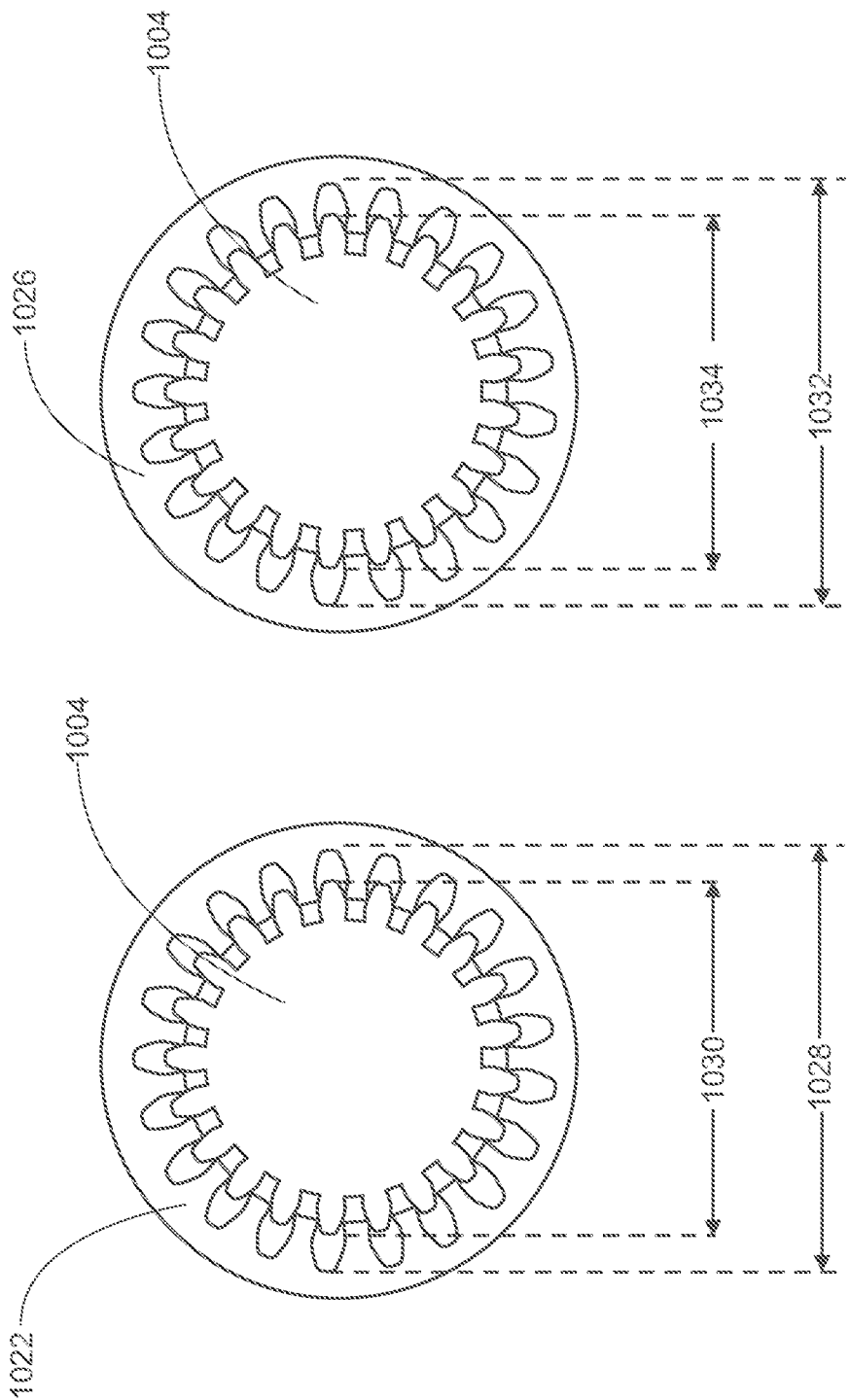

1300

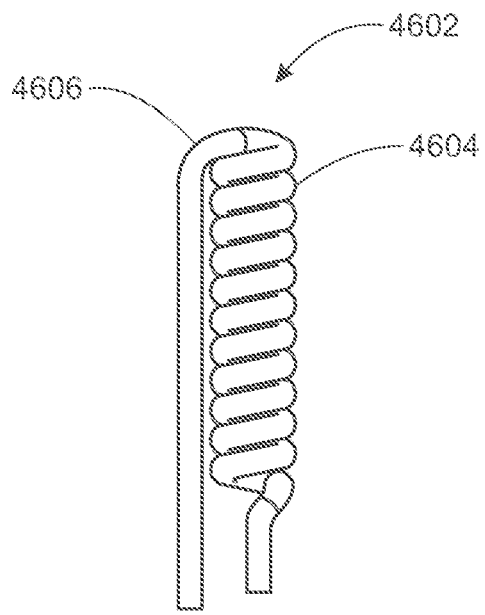
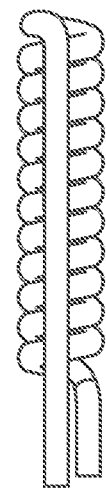
FIG. 46A  FIG. 46B
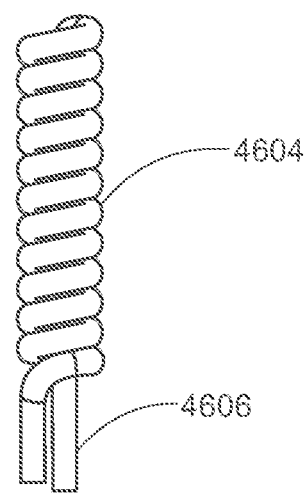
FIG. 46C  FIG. 46D

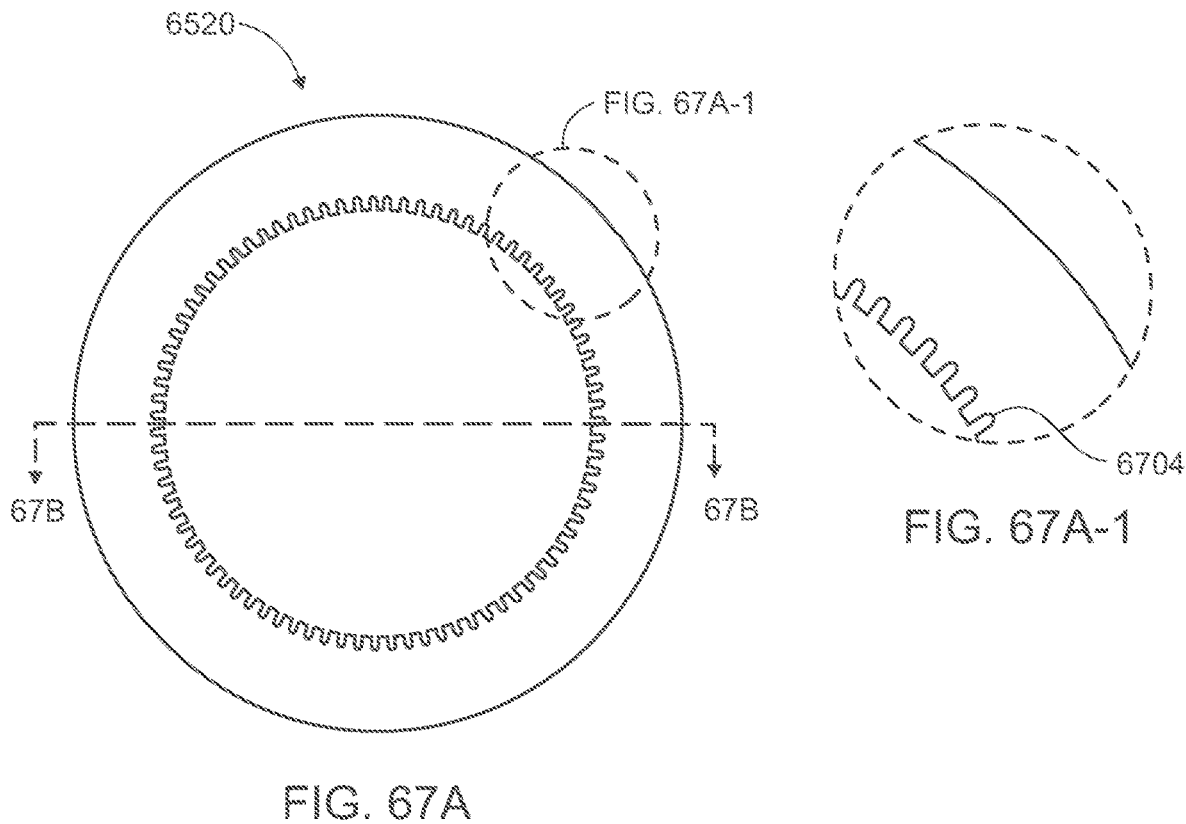
FIG. 67A
FIG. 67A-1
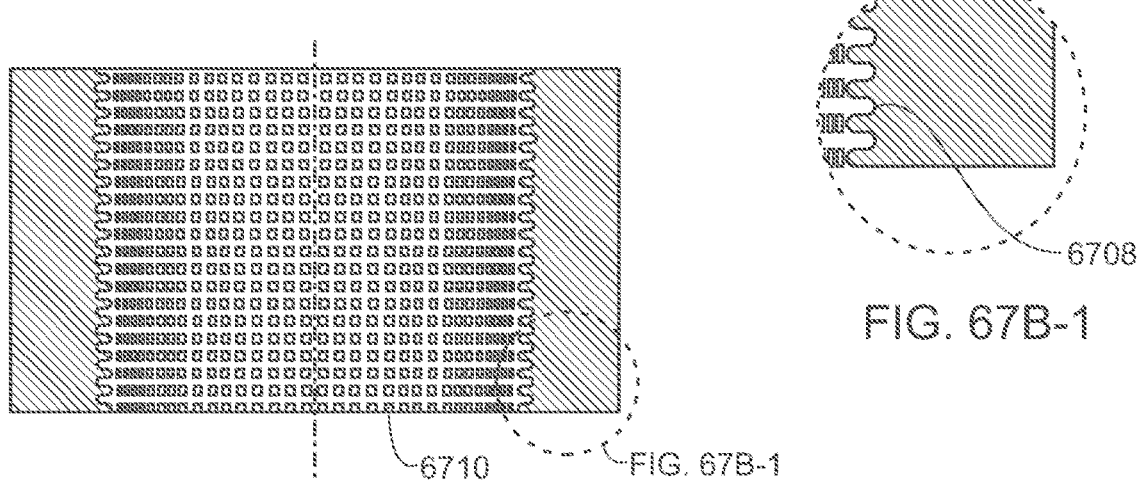
FIG. 67B
FIG. 67B-1

STIRLING CYCLE MACHINE

CROSS REFERENCE TO RELATED APPLICATIONS

The present application is a Continuation of U.S. patent application Ser. No. 16/547,656 filed Aug. 22, 2019 and entitled Stirling Cycle Machine, which will be U.S. Pat. No. 11,448,158, issuing on Sep. 20, 2022, which is a Continuation of U.S. patent application Ser. No. 15/694,343 filed Sep. 1, 2017 and entitled Stirling Cycle Machine, now U.S. Pat. No. 11,339,743, issued May 24, 2022, which is a Continuation of U.S. patent application Ser. No. 13/932,276 filed Jul. 1, 2013 and entitled Stirling Cycle Machine, now U.S. Pat. No. 9,752,532, issued Sep. 5, 2017, which is a Continuation of U.S. patent application Ser. No. 12/105,854, filed Apr. 18, 2008 and entitled Stirling Cycle Machine, now U.S. Pat. No. 8,474,256, issued Jul. 2, 2013, which claims priority from U.S. Provisional Patent Application No. 60/925,818, filed Apr. 23, 2007 and entitled Four Cylinder Stirling Engine; and U.S. Provisional Patent Application No. 60/925,814, filed Apr. 23, 2007 and entitled Rocking Beam Drive, all of which are hereby incorporated herein by reference in their entireties.

TECHNICAL FIELD

The present invention relates to machines and more particularly, to a Stirling cycle machine and components thereof.

BACKGROUND INFORMATION

Many machines, such as internal combustion engines, external combustion engines, compressors, and other reciprocating machines, employ an arrangement of pistons and drive mechanisms to convert the linear motion of a reciprocating piston to rotary motion. In most applications, the pistons are housed in a cylinder. A common problem encountered with such machines is that of friction generated by a sliding piston resulting from misalignment of the piston in the cylinder and lateral forces exerted on the piston by linkage of the piston to a rotating crankshaft. These increased side loads increase engine noise, increase piston wear, and decrease the efficiency and life of the engine. Additionally, because of the side loads, the drive requires more power to overcome these frictional forces, thus reducing the efficiency of the machine.

Improvements have been made on drive mechanisms in an attempt to reduce these side loads, however, many of the improvements have resulted in heavier and bulkier machines.

Accordingly, there is a need for practical machines with minimal side loads on pistons.

SUMMARY

In accordance with one aspect of the present invention, a rocking beam drive mechanism for a machine is disclosed. The drive mechanism includes a rocking beam having a rocker pivot, at least one cylinder and at least one piston. The piston is housed within a respective cylinder. The piston is capable of substantially linearly reciprocating within the respective cylinder. Also, the drive mechanism includes at least one coupling assembly having a proximal end and a distal end. The proximal end is connected to the piston and the distal end is connected to the rocking beam by an end pivot. The linear motion of the piston is converted to rotary motion of the rocking beam.

Some embodiments of this aspect of the present invention include one or more of the following: where the rocking beam is coupled to a crankshaft by way of a connecting rod. In this embodiment, the rotary motion of the rocking beam is transferred to the crankshaft. Also, where the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means is located beneath the linear bearing. Also, where the drive mechanism also includes a seal, where the seal is sealably connected to the piston rod. Also, where the seal is a rolling diaphragm. Also, in some embodiments, the coupling means is a flexible joint. In some embodiments, the coupling means is a roller bearing. In some embodiments, the coupling means is a hinge. In some embodiments, the coupling means is a flexure. In some embodiments, the coupling means is a journal bearing joint.

In accordance with another aspect of the present invention, a Stirling cycle machine is disclosed. The machine includes at least one rocking drive mechanism where the rocking drive mechanism includes: a rocking beam having a rocker pivot, at least one cylinder and at least one piston. The piston is housed within a respective cylinder. The piston is capable of substantially linearly reciprocating within the respective cylinder. Also, the drive mechanism includes at least one coupling assembly having a proximal end and a distal end. The proximal end is connected to the piston and the distal end is connected to the rocking beam by an end pivot. The linear motion of the piston is converted to rotary motion of the rocking beam. Also, a crankcase housing the rocking beam and housing a first portion of the coupling assembly is included. A crankshaft coupled to the rocking beam by way of a connecting rod is also included. The rotary motion of the rocking beam is transferred to the crankshaft. The machine also includes a working space housing the at least one cylinder, the at least one piston and a second portion of the coupling assembly. A seal is included for sealing the workspace from the crankcase.

Some embodiments of this aspect of the present invention include one or more of the following: where the seal is a rolling diaphragm. Also, the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means may be located beneath the linear bearing. Also, the machine may also include a lubricating fluid pump in the crankcase. In some embodiments, the lubricating fluid pump is a mechanical lubricating fluid pump driven by a pump drive assembly, the pump drive assembly being connected to and driven by the crankshaft. In some embodiments, the lubricating fluid pump is an electric lubricating fluid pump. The machine may also include a motor connected to the crankshaft. The machine may also include a generator connected to the crankshaft.

In accordance with another aspect of the present invention, a Stirling cycle machine is disclosed. The machine includes at least two rocking drive mechanisms. The rocking drive mechanisms each include a rocking beam having a rocker pivot, two cylinders, and two pistons. The pistons each housed within a respective cylinder. The pistons are capable of substantially linearly reciprocating within the respective cylinder. Also, the drive mechanisms include two coupling assemblies having a proximal end and a distal end, the proximal end being connected to the piston and the distal end being connected to the rocking beam by an end pivot. The linear motion of the piston is converted to rotary motion of the rocking beam. The machine also includes a crankcase housing the rocking beam and housing a first portion of the coupling assemblies. Also, a crankshaft coupled to the rocking beam by way of a connecting rod. The rotary motion of the rocking beam is transferred to the crankshaft. The machine also includes a lubricating fluid pump in the crankcase for pumping lubricating fluid to lubricate the crankshaft and the rocking beam and the first portion of the coupling assemblies. Also, a working space housing the cylinders, the pistons and the second portion of the coupling assemblies. A rolling diaphragm for sealing the workspace from the crankcase is also included.

Some embodiments of this aspect of the present invention include one or more of the following: where the cylinder may further include a closed end and an open end. The open end further includes a linear bearing connected to the cylinder. The linear bearing includes an opening to accommodate the coupling assembly. Also, where the coupling assembly further includes a piston rod and a link rod. The piston rod and link rod are coupled together by a coupling means. The coupling means may be located beneath the linear bearing. Also, where the coupling means is a flexible joint. In some embodiments, also disclosed is where the coupling means is a roller bearing.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein:

FIG. 10E is a cross section of the sleeve rotor and spline shaft in accordance with one embodiment;

FIG. 10F is a cross section of the crankshaft and the spline shaft in accordance with one embodiment;

FIGS. 46A-46D show various configurations of a tube heat exchanger in accordance with various embodiments;

FIG. 67A shows a view of a cooler for an engine in accordance with one embodiment;

FIG. 67A-1 shows an enlarged section view of a section of FIG. 67A;

FIG. 67B shows a view of a cooler for an engine in accordance with one embodiment;

FIG. 67B-1 shows an enlarged section view of a section of FIG. 67B;

FIG. 77 shows a schematic of another embodiment of the burner with temperature sensor and engine speed control loop;

FIG. 78 shows a schematic of yet another embodiment of the burner with temperature sensor and oxygen sensor control loop;

FIG. 79 shows an alternative embodiment of the ejector wherein the fuel is fed directly into the ejector;

FIG. 80 is a block diagram showing a system for controlling a pressurized combustion chamber of an engine according to an embodiment;

FIG. 81 shows a piston pump according to one embodiment;

FIG. 82 shows an alternating current waveform suitable for driving the piston pump of FIG. 81;

FIG. 83 shows a pulse-width-modulated direct current waveform suitable for driving the piston pump of FIG. 81, according to one embodiment;

FIG. 84 is schematic diagram of a diaphragm pump according to one embodiment;

FIG. 85 is a schematic diagram of a center-tapped coil for a diaphragm pump according to one embodiment;

FIGS. 86A and 86B shows pulse-width-modulated direct current waveforms suitable for driving the center-tapped coil of FIG. 85, according to some embodiments;

FIGS. 87A-87D show embodiments of including a filter between the fuel pump and combustion chamber;

FIG. 88 shows a view of an engine in accordance with one embodiment;

Figure 89A:
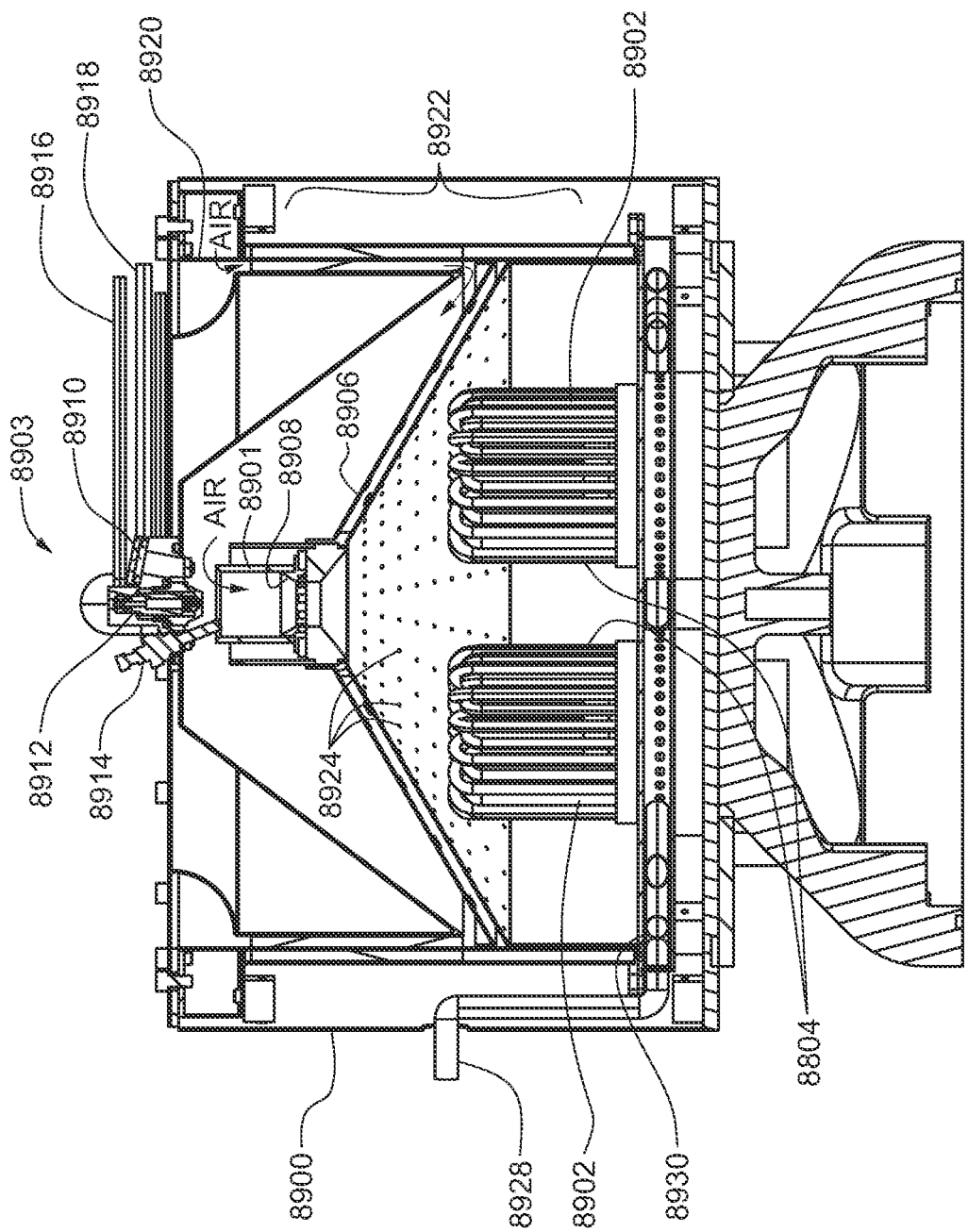
Figure 89B:
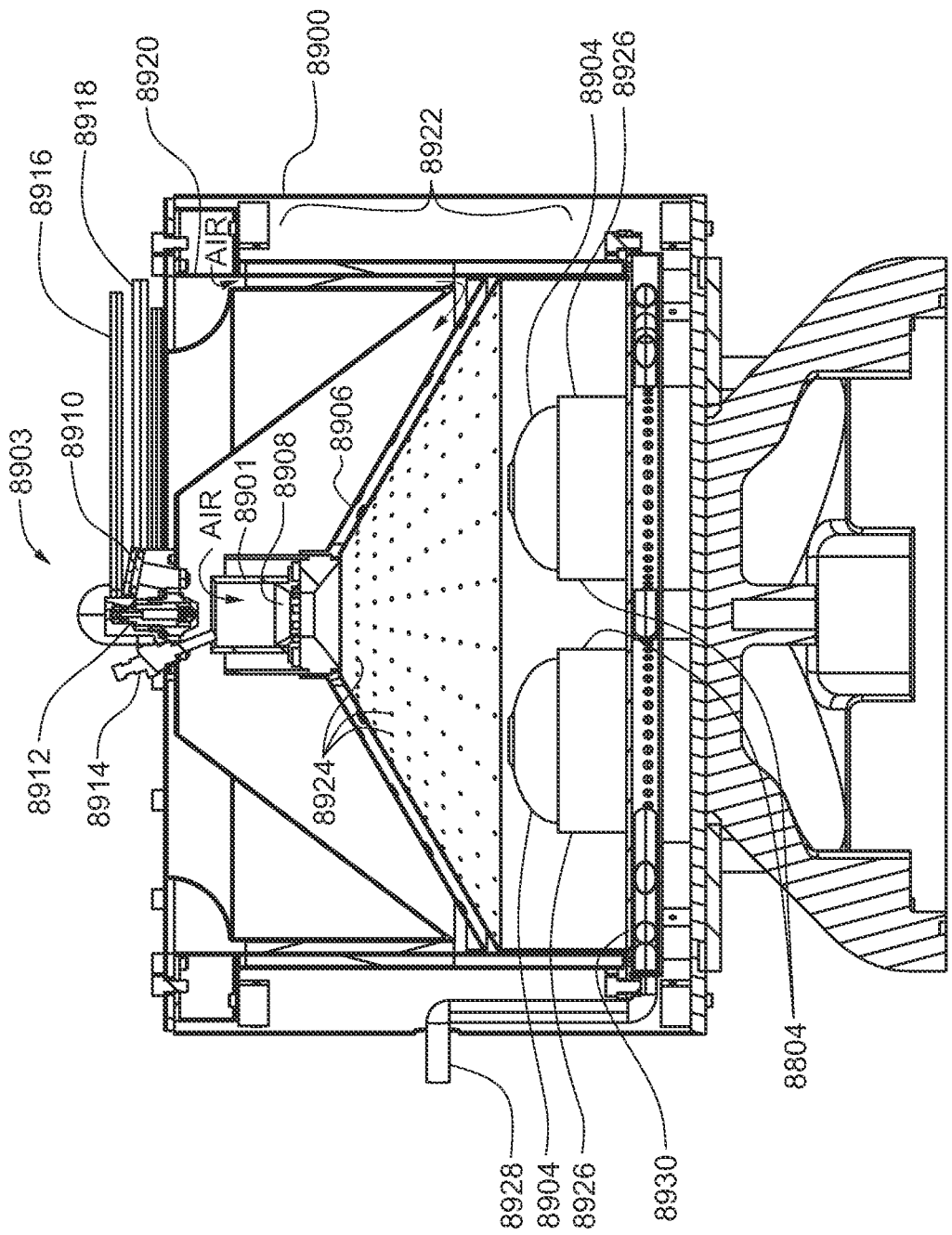
Figure 89C:
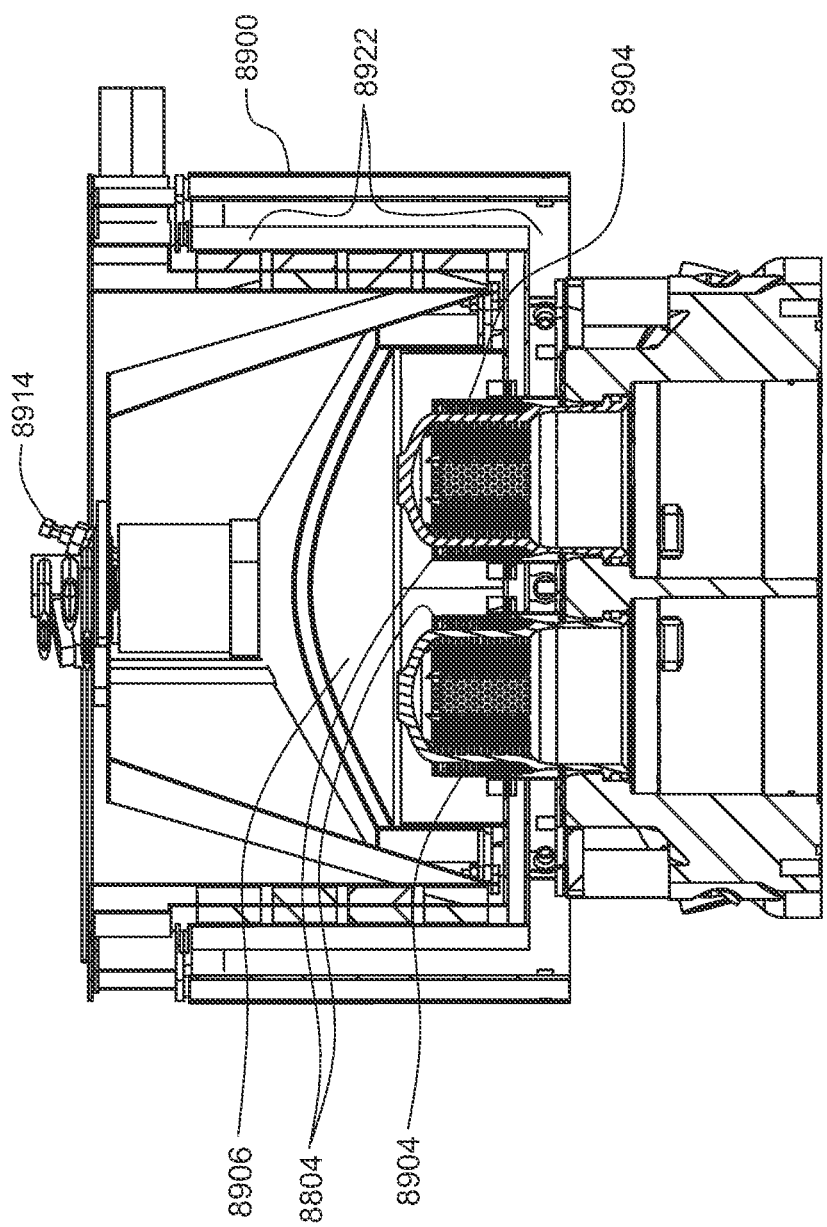
Figure 90:
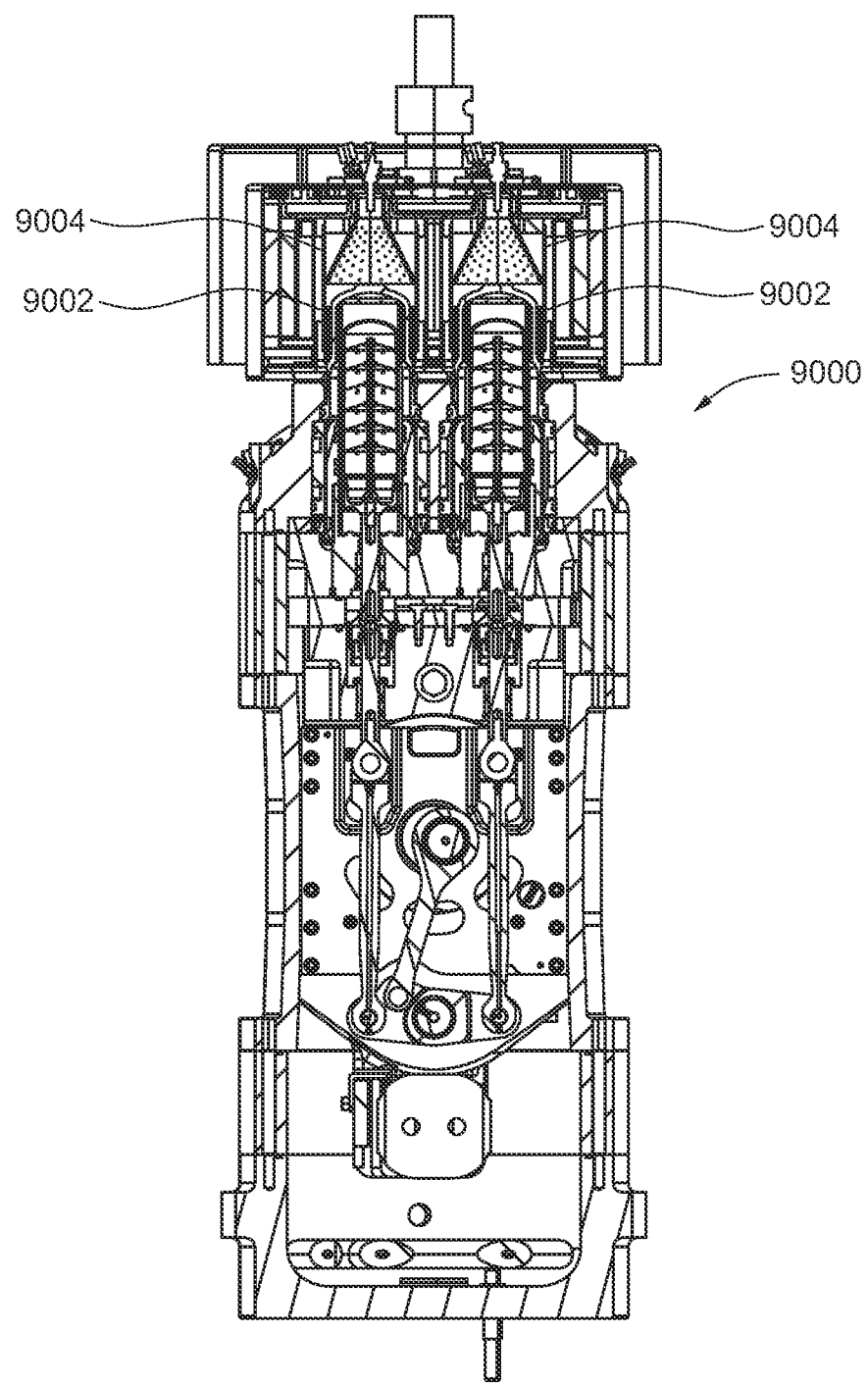
Figure 91A:
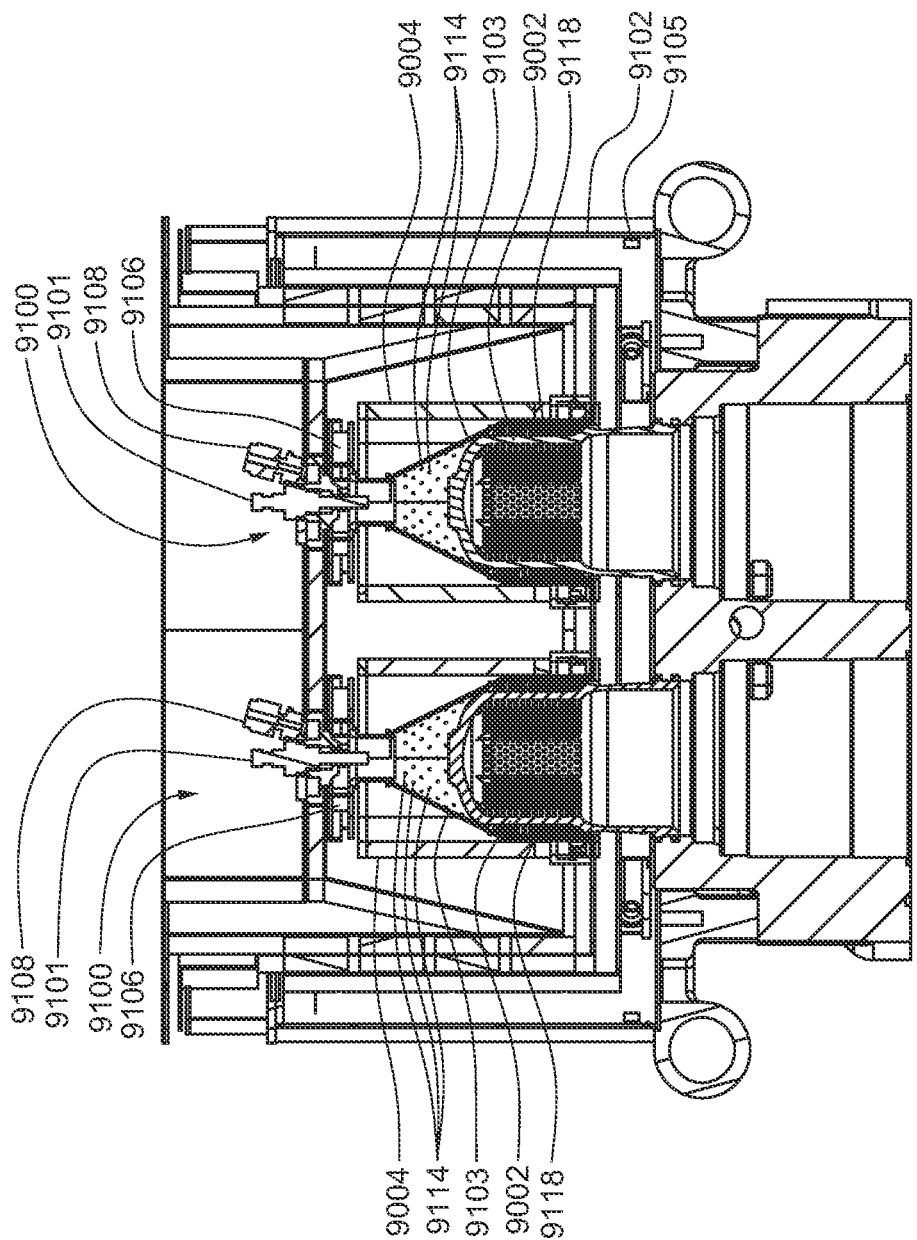
Figure 91B:
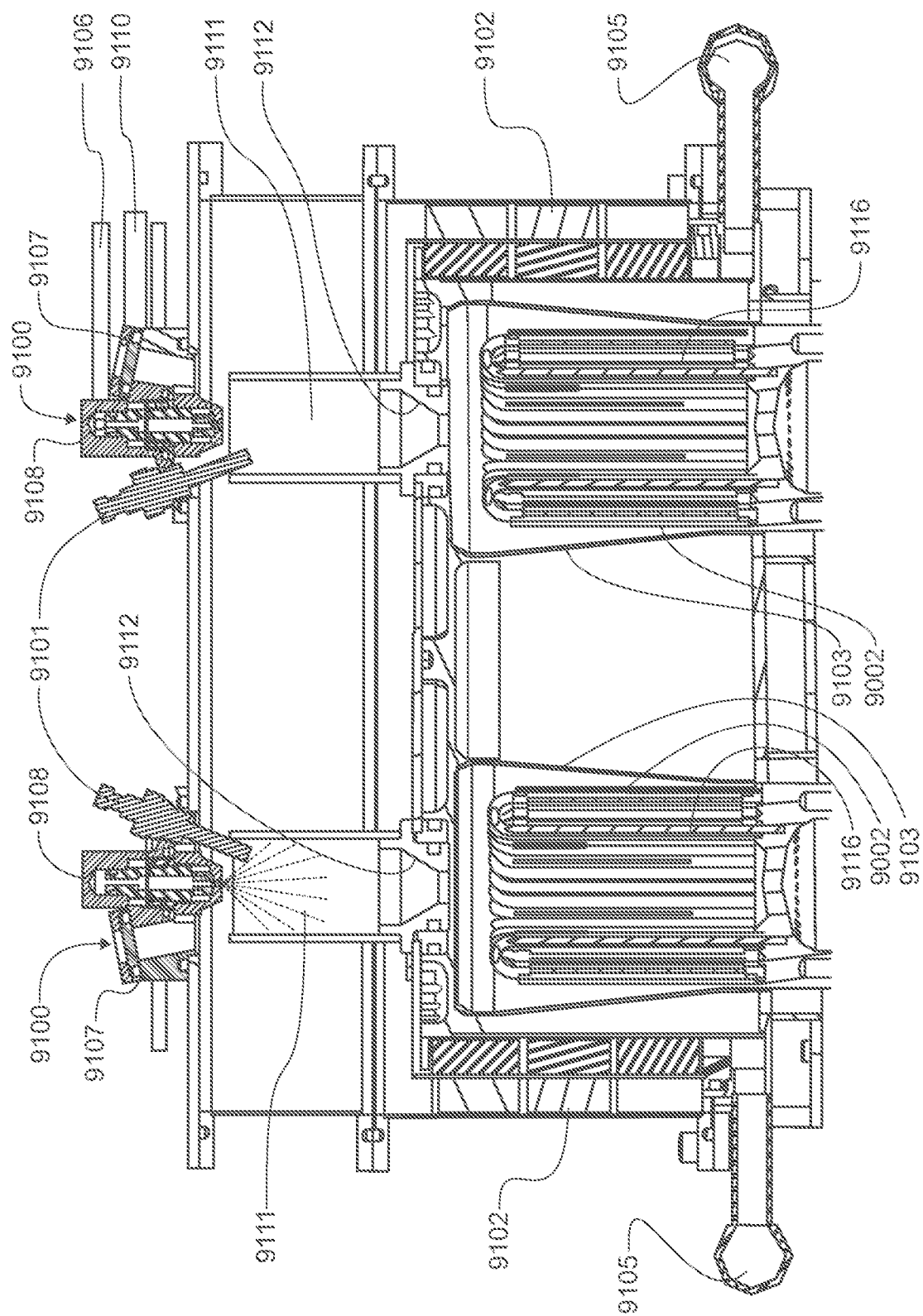
Figure 91C:
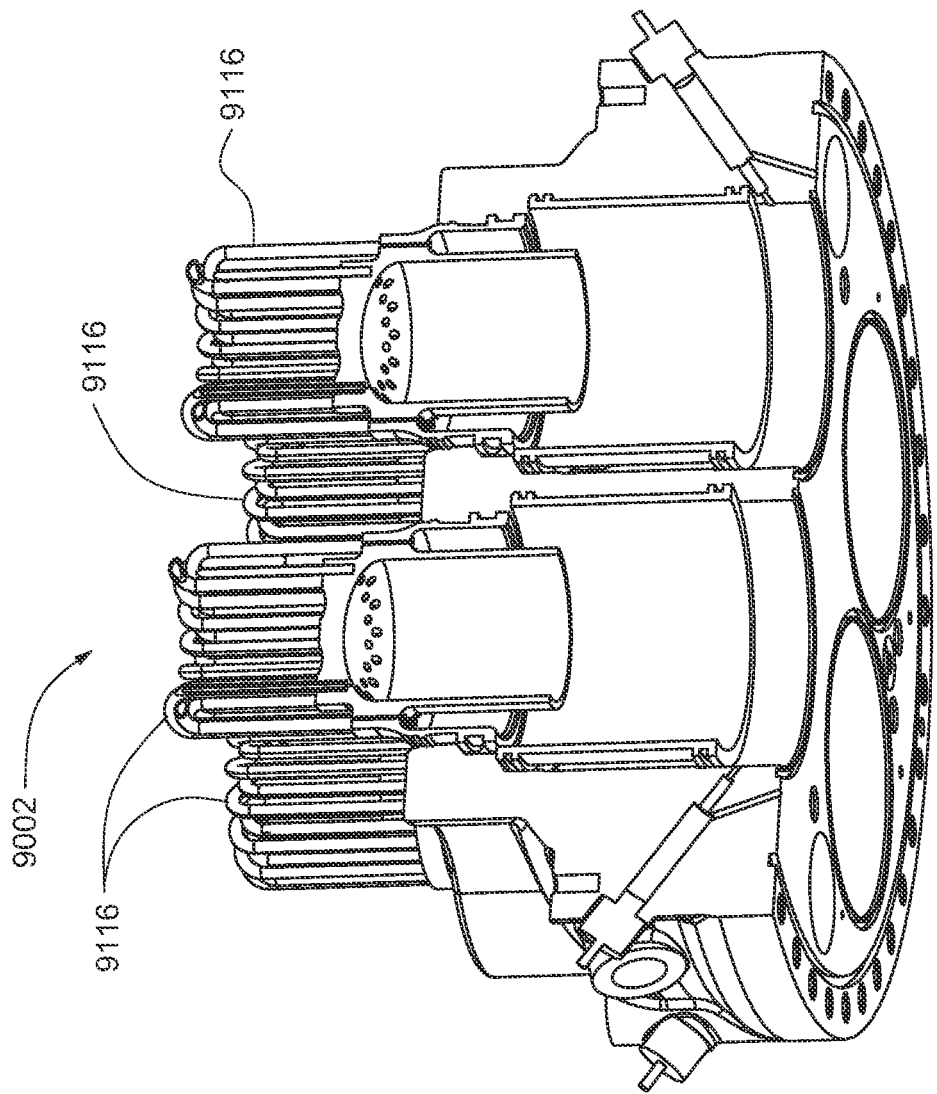
Figure 91D:
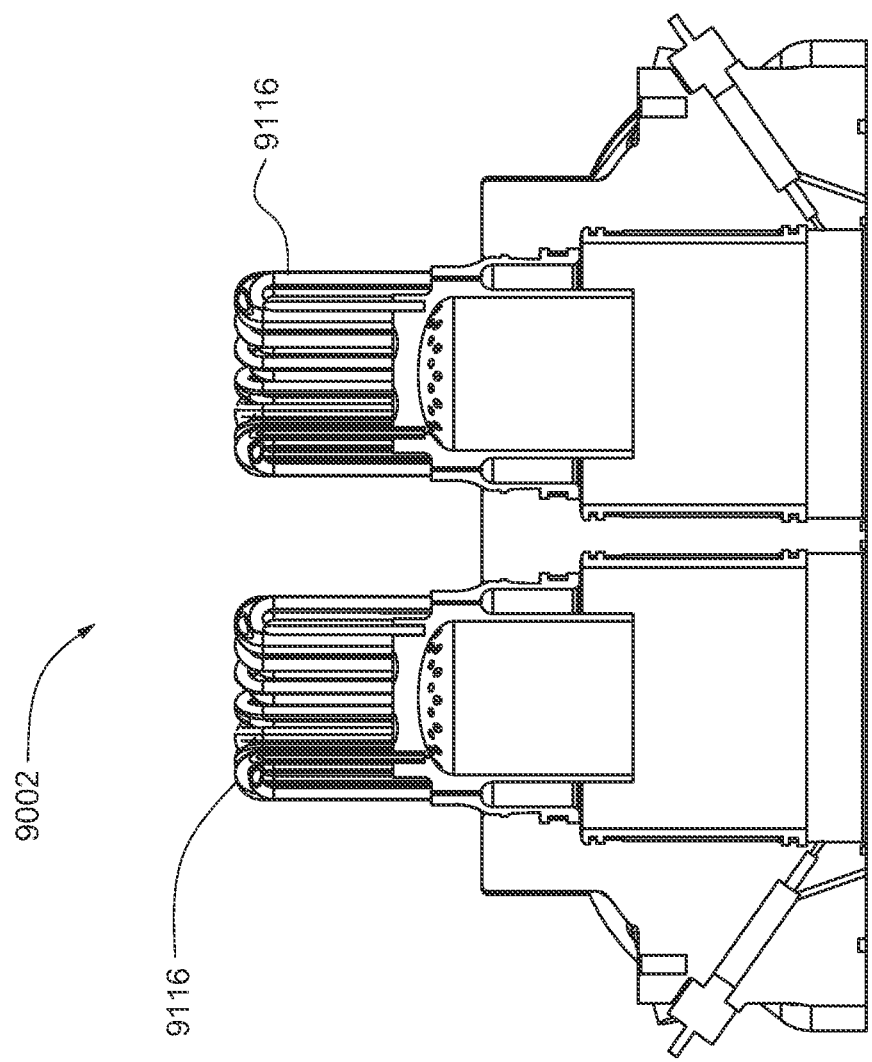

FIGS. 89A-89C show views of a burner for an engine in accordance with various embodiments;

FIG. 90 shows a view of an engine with multiple burners in accordance with yet another embodiment of the invention;

FIGS. 91A and 91B show views of multiple burners for an engine in accordance with various embodiments;

FIG. 91C shows a view of a tube heater head in accordance with one embodiment; and FIG. 91D shows a cross section of the tube heater head depicted in FIG. 91C.

DETAILED DESCRIPTION OF THE PREFERRED EMBODIMENTS

Stirling cycle machines, including engines and refrigerators, have a long technological heritage, described in detail in Walker, Stirling Engines, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. Additional background regarding aspects of Stirling cycle machines and improvements thereto is discussed in Hargreaves, The Phillips Stirling Engine (Elsevier, Amsterdam, 1991), which is herein incorporated by reference.

The principle of operation of a Stirling cycle machine is readily described with reference to FIGS. 1A-1E, wherein identical numerals are used to identify the same or similar parts. Many mechanical layouts of Stirling cycle machines are known in the art, and the particular Stirling cycle machine designated generally by numeral 10 is shown merely for illustrative purposes. In FIGS. 1A to 1D, piston 12 and a displacer 14 move in phased reciprocating motion within the cylinders 16 which, in some embodiments of the Stirling cycle machine, may be a single cylinder, but in other embodiments, may include greater than a single cylinder. A working fluid contained within cylinders 16 is constrained by seals from escaping around piston 12 and displacer 14. The working fluid is chosen for its thermodynamic properties, as discussed in the description below, and is typically helium at a pressure of several atmospheres, however, any gas, including any inert gas, may be used, including, but not limited to, hydrogen, argon, neon, nitrogen, air and any mixtures thereof. The position of the displacer 14 governs whether the working fluid is in contact with the hot interface 18 or the cold interface 20, corresponding, respectively, to the interfaces at which heat is supplied to and extracted from the working fluid. The supply and extraction of heat is discussed in further detail below. The volume of working fluid governed by the position of the piston 12 is referred to as the compression space 22.

Figure 1A:
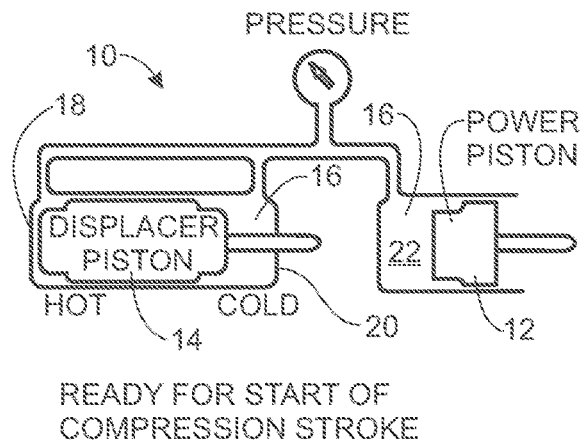
FIGS. 1A-1E depict the principle of operation of a prior art Stirling cycle machine.
Figure 1B:
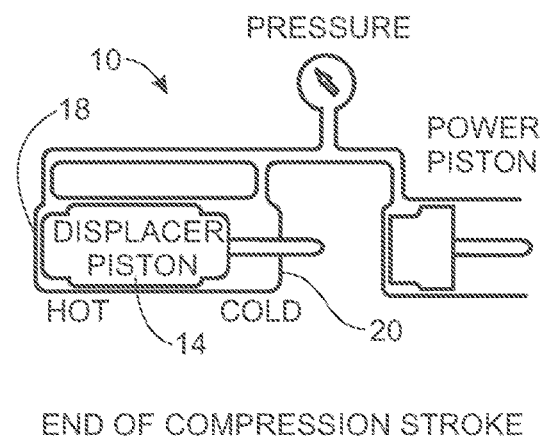
Figure 1C:
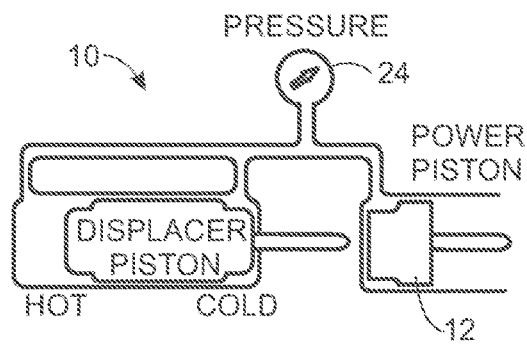

During the first phase of the Stirling cycle, the starting condition of which is depicted in FIG. 1A, the piston 12 compresses the fluid in the compression space 22. The compression occurs at a substantially constant temperature because heat is extracted from the fluid to the ambient environment. The condition of the Stirling cycle machine 10 after compression is depicted in FIG. 1B. During the second phase of the cycle, the displacer 14 moves in the direction of the cold interface 20, with the working fluid displaced from the region of the cold interface 20 to the region of the hot interface 18. This phase may be referred to as the transfer phase. At the end of the transfer phase, the fluid is at a higher pressure since the working fluid has been heated at constant volume. The increased pressure is depicted symbolically in FIG. 1C by the reading of the pressure gauge 24.

Figure 1D:
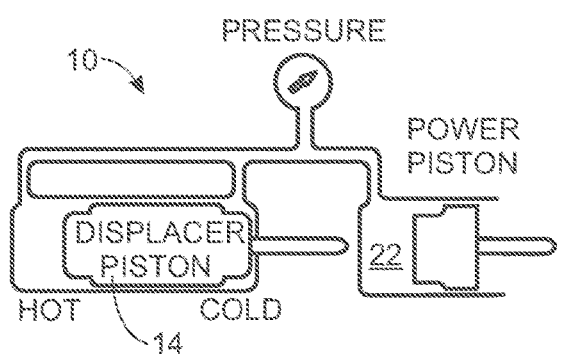
Figure 1E:
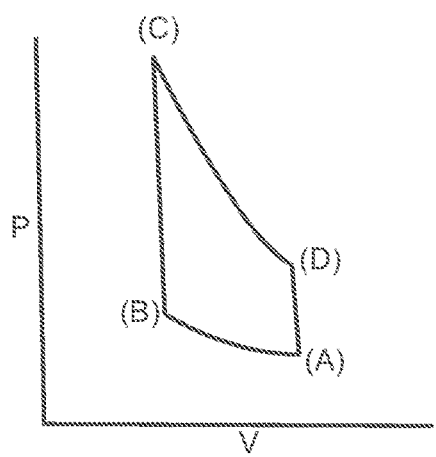

During the third phase (the expansion stroke) of the Stirling cycle machine, the volume of the compression space 22 increases as heat is drawn in from outside the Stirling cycle machine 10, thereby converting heat to work. In practice, heat is provided to the fluid by means of a heater head (not shown) which is discussed in greater detail in the description below. At the end of the expansion phase, the compression space 22 is full of cold fluid, as depicted in FIG. 1D. During the fourth phase of the Stirling cycle machine 10, fluid is transferred from the region of the hot interface 18 to the region of the cold interface 20 by motion of the displacer 14 in the opposing sense. At the end of this second transfer phase, the fluid fills the compression space 22 and cold interface 20, as depicted in FIG. 1A, and is ready for a repetition of the compression phase. The Stirling cycle is depicted in a P-V (pressure-volume) diagram as shown in FIG. 1E.

Additionally, on passing from the region of the hot interface 18 to the region of the cold interface 20. In some embodiments, the fluid may pass through a regenerator (shown as 408 in FIG. 4). A regenerator is a matrix of material having a large ratio of surface area to volume which serves to absorb heat from the fluid when it enters from the region of the hot interface 18 and to heat the fluid when it passes from the region of the cold interface 20.

Stirling cycle machines have not generally been used in practical applications due to several daunting challenges to their development. These involve practical considerations such as efficiency and lifetime. Accordingly, there is a need for more Stirling cycle machines with minimal side loads on pistons, increased efficiency and lifetime.

The principle of operation of a Stirling cycle machine or Stirling engine is further discussed in detail in U.S. Pat. No. 6,381,958, issued May 7, 2002, to Kamen et al., which is herein incorporated by reference in its entirety.

Rocking Beam Drive

Figure 2:
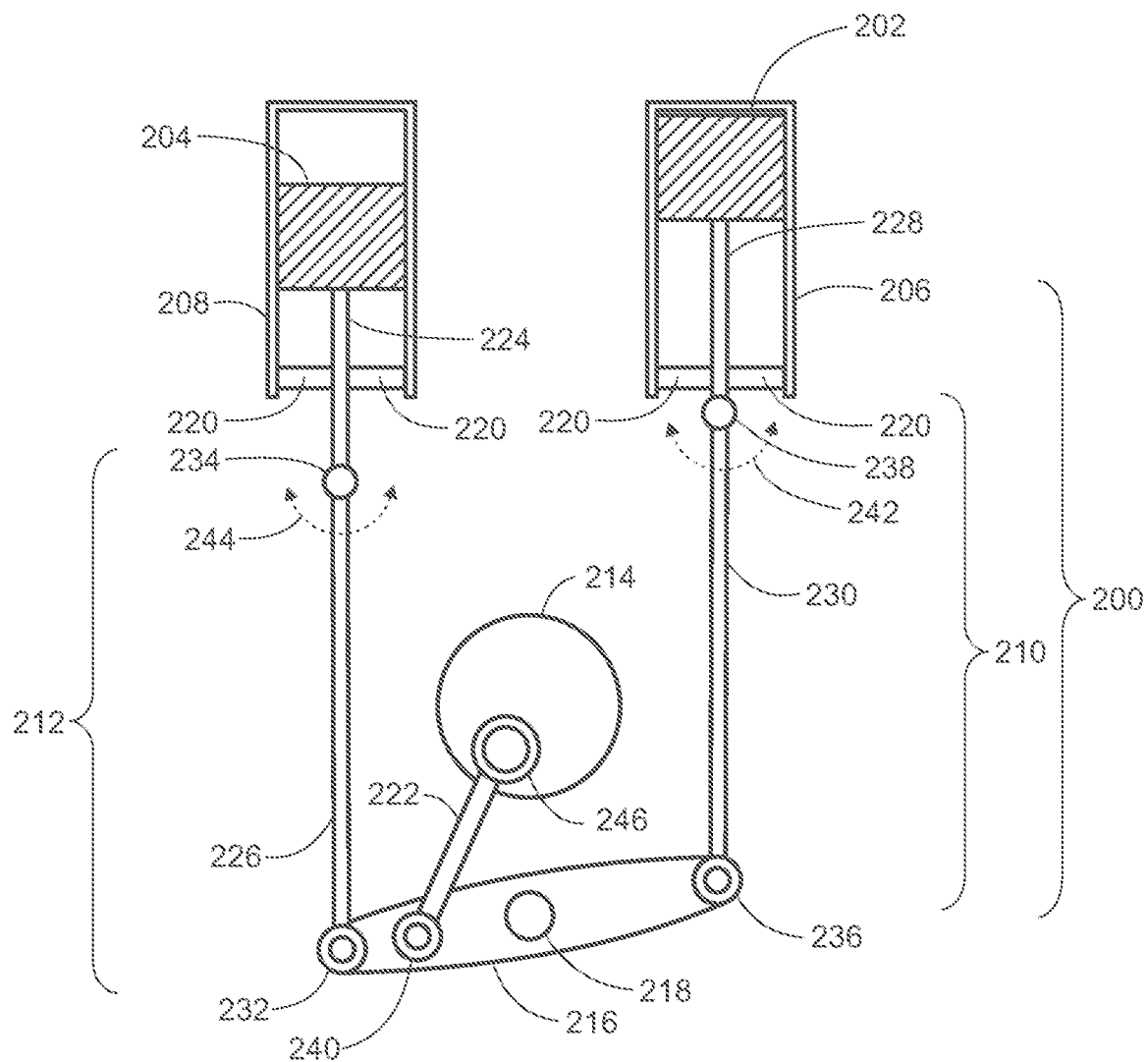
FIG. 2 shows a view of a rocking beam drive in accordance with one embodiment.
Figure 3:
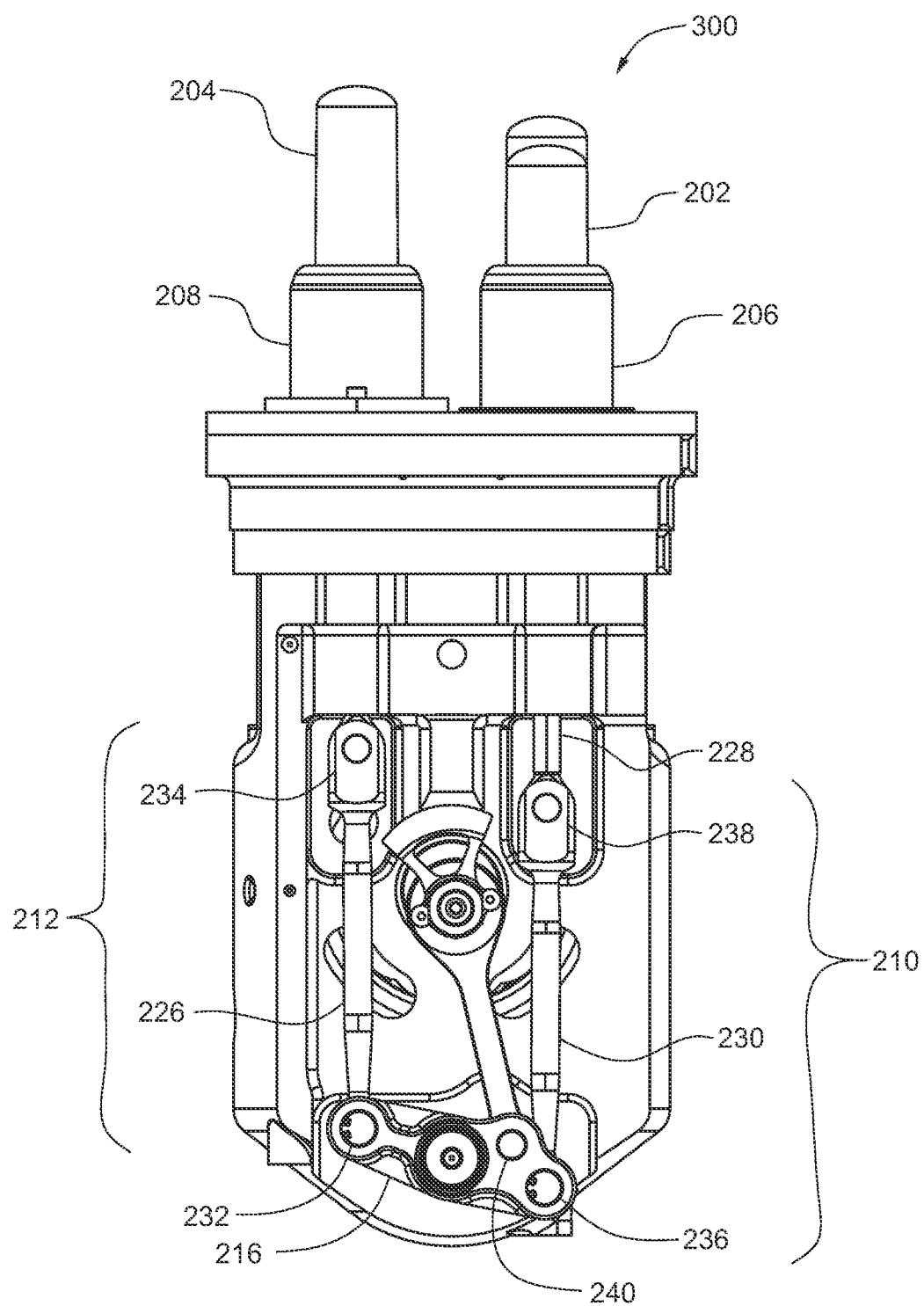
FIG. 3 shows a view of a rocking beam drive in accordance with one embodiment.
Figure 4:
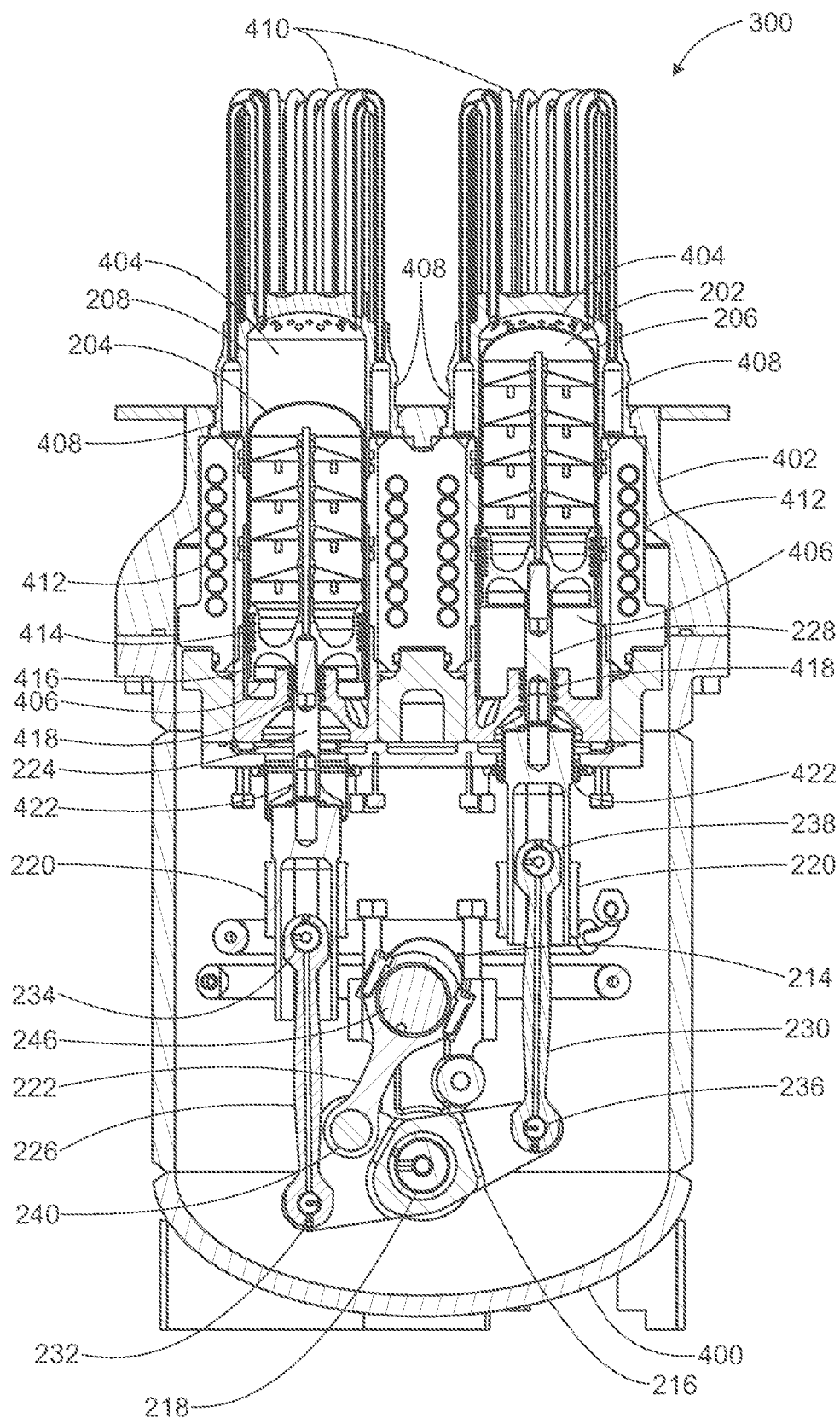
FIG. 4 shows a view of an engine in accordance with one embodiment.

Referring now to FIGS. 2-4, embodiments of a Stirling cycle machine, according to one embodiment, are shown in cross-section. The engine embodiment is designated generally by numeral 300. While the Stirling cycle machine will be described generally with reference to the Stirling engine 300 embodiments shown in FIGS. 2-4, it is to be understood that many types of machines and engines, including but not limited to refrigerators and compressors may similarly benefit from various embodiments and improvements which are described herein, including but not limited to, external combustion engines and internal combustion engines.

FIG. 2 depicts a cross-section of an embodiment of a rocking beam drive mechanism 200 (the term "rocking beam drive" is used synonymously with the term "rocking beam drive mechanism") for an engine, such as a Stirling engine, having linearly reciprocating pistons 202 and 204 housed within cylinders 206 and 208, respectively. The cylinders include linear bearings 220. Rocking beam drive 200 converts linear motions of pistons 202 and 204 into the rotary motion of a crankshaft 214. Rocking beam drive 200 has a rocking beam 216, rocker pivot 218, a first coupling assembly 210, and a second coupling assembly 212. Pistons 202 and 204 are coupled to rocking beam drive 200, respectively, via first coupling assembly 210 and second coupling assembly 212. The rocking beam drive is coupled to crankshaft 214 via a connecting rod 222.

In some embodiments, the rocking beam and a first portion of the coupling assembly may be located in a crankcase, while the cylinders, pistons and a second portion of the coupling assembly is located in a workspace.

In FIG. 4 a crankcase 400 most of the rocking beam drive 200 is positioned below the cylinder housing 402. Crankcase 400 is a space to permit operation of rocking beam drive 200 having a crankshaft 214, rocking beam 216, linear bearings 220, a connecting rod 222, and coupling assemblies 210 and 212. Crankcase 400 intersects cylinders 206 and 208 transverse to the plane of the axes of pistons 202 and 204. Pistons 202 and 204 reciprocate in respective cylinders 206 and 208, as also shown in FIG. 2. Cylinders 206 and 208 extend above crankshaft housing 400. Crankshaft 214 is mounted in crankcase 400 below cylinders 206 and 208.

Figure 6:
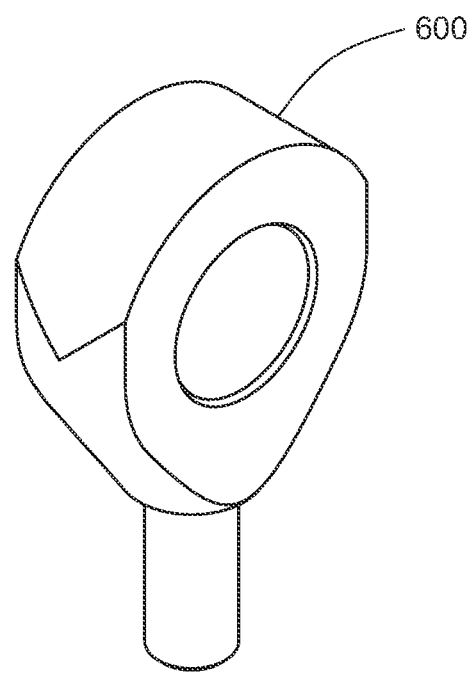
FIG. 6 shows a bearing style rod connector in accordance with one embodiment.
Figure 7A:
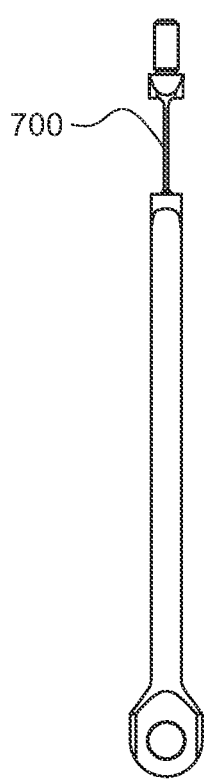
FIGS. 7A-7B show a flexure in accordance with one embodiment.
Figure 7B:
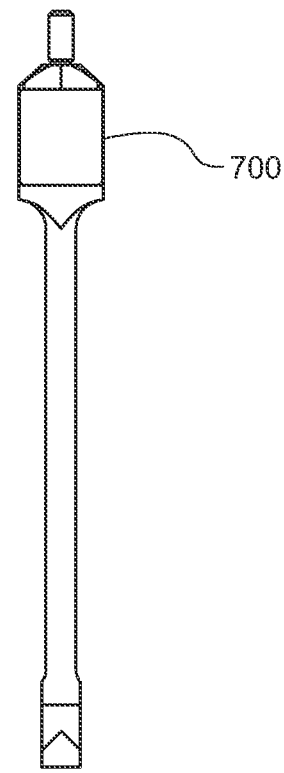

FIG. 2 shows one embodiment of rocking beam drive 200. Coupling assemblies 210 and 212 extend from pistons 202 and 204, respectively, to connect pistons 202 and 204 to rocking beam 216. Coupling assembly 212 for piston 204, in some embodiments, may comprise a piston rod 224 and a link rod 226. Coupling assembly 210 for piston 202, in some embodiments, may comprise a piston rod 228 and a link rod 230. Piston 204 operates in the cylinder 208 vertically and is connected by the coupling assembly 212 to the end pivot 232 of the rocking beam 216. The cylinder 208 provides guidance for the longitudinal motion of piston 204. The piston rod 224 of the coupling assembly 212 attached to the lower portion of piston 204 is driven axially by its link rod 226 in a substantially linear reciprocating path along the axis of the cylinder 208. The distal end of piston rod 224 and the proximate end of link rod 226, in some embodiments, may be jointly hinged via a coupling means 234. The coupling means 234, may be any coupling means known in the art, including but not limited to, a flexible joint, roller bearing element, hinge, journal bearing joint (shown as 600 in FIG. 6), and flexure (shown as 700 in FIGS. 7A and 7B). The distal end of the link rod 226 may be coupled to one end pivot 232 of rocking beam 216, which is positioned vertically and perpendicularly under the proximate end of the link rod 226. A stationary linear bearing 220 may be positioned along coupling assembly 212 to further ensure substantially linear longitudinal motion of the piston rod 224 and thus ensuring substantially linear longitudinal motion of the piston 204. In an exemplary embodiment, link rod 226 does not pass through linear bearing 220. This ensures, among other things, that piston rod 224 retains a substantially linear and longitudinal motion.

In the exemplary embodiment, the link rods may be made from aluminum, and the piston rods and connecting rod are made from D2 Tool Steel. Alternatively, the link rods, piston rods, connecting rods, and rocking beam may be made from 4340 steel. Other materials may be used for the components of the rocking beam drive, including, but not limited to, titanium, aluminum, steel or cast iron. In some embodiments, the fatigue strength of the material being used is above the actual load experienced by the components during operation.

Still referring to FIGS. 2-4, piston 202 operates vertically in the cylinder 206 and is connected by the coupling assembly 210 to the end pivot 236 of the rocking beam 216. The cylinder 206 serves, amongst other functions, to provide guidance for longitudinal motion of piston 202. The piston rod 228 of the coupling assembly 210 is attached to the lower portion of piston 202 and is driven axially by its link rod 230 in a substantially linear reciprocating path along the axis of the cylinder 206. The distal end of the piston rod 228 and the proximate end of the link rod 230, in some embodiments, is jointly hinged via a coupling means 238. The coupling means 238, in various embodiments may include, but are not limited to, a flexure (shown as 700 in FIGS. 7A and 7B, roller bearing element, hinge, journal bearing (shown as 600 in FIG. 6), or coupling means as known in the art. The distal end of the link rod 230, in some embodiments, may be coupled to one end pivot 236 of rocking beam 216, which is positioned vertically and perpendicularly under the proximate end of link rod 230. A stationary linear bearing 220 may be positioned along coupling assembly 210 to further ensure linear longitudinal motion of the piston rod 228 and thus ensuring linear longitudinal motion of the piston 202. In an exemplary embodiment, link rod 230 does not pass through linear bearing 220 to ensure that piston rod 228 retains a substantially linear and longitudinal motion.

Figure 5A:
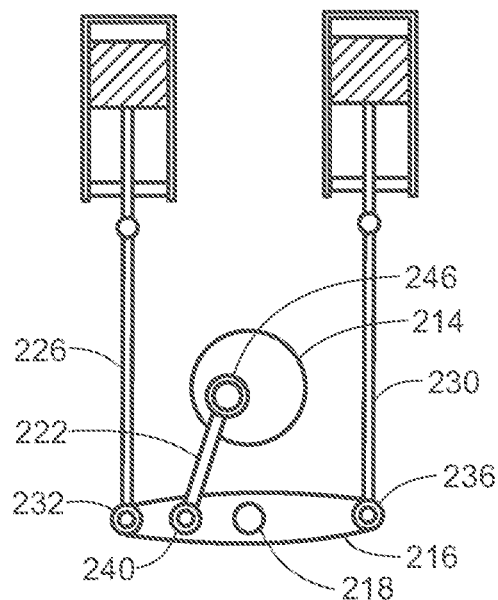
FIGS. 5A-5D depicts various views of a rocking beam drive in accordance with one embodiment.
Figure 5B:
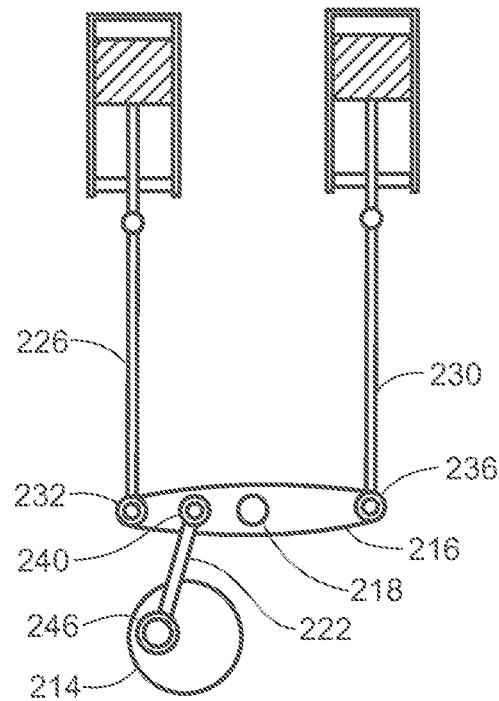

The coupling assemblies 210 and 212 change the alternating longitudinal motion of respective pistons 202 and 204 to oscillatory motion of the rocking beam 216. The delivered oscillatory motion is changed to the rotational motion of the crankshaft 214 by the connecting rod 222, wherein one end of the connecting rod 222 is rotatably coupled to a connecting pivot 240 positioned between an end pivot 232 and a rocker pivot 218 in the rocking beam 216, and another end of the connecting rod 222 is rotatably coupled to crankpin 246. The rocker pivot 218 may be positioned substantially at the midpoint between the end pivots 232 and 236 and oscillatorily support the rocking beam 216 as a fulcrum, thus guiding the respective piston rods 224 and 228 to make sufficient linear motion. In the exemplary embodiment, the crankshaft 214 is located above the rocking beam 216, but in other embodiments, the crankshaft 214 may be positioned below the rocking beam 216 (as shown in FIGS. 5B and 5D) or in some embodiments, the crankshaft 214 is positioned to the side of the rocking beam 216, such that it still has a parallel axis to the rocking beam 216.

Still referring to FIGS. 2-4, the rocking beam oscillates about the rocker pivot 218, the end pivots 232 and 236 follow an arc path. Since the distal ends of the link rods 226 and 230 are connected to the rocking beam 216 at pivots 232 and 236, the distal ends of the link rods 226 and 230 also follow this arc path, resulting in an angular deviation 242 and 244 from the longitudinal axis of motion of their respective pistons 202 and 204. The coupling means 234 and 238 are configured such that any angular deviation 244 and 242 from the link rods 226 and 230 experienced by the piston rods 224 and 228 is minimized. Essentially, the angular deviation 244 and 242 is absorbed by the coupling means 234 and 238 so that the piston rods 224 and 228 maintain substantially linear longitudinal motion to reduce side loads on the pistons 204 and 202. A stationary linear bearing 220 may also be placed inside the cylinder 208 or 206, or along coupling assemblies 212 or 210, to further absorb any angular deviation 244 or 242 thus keeping the piston push rod 224 or 228 and the piston 204 or 202 in linear motion along the longitudinal axis of the piston 204 or 202.

Therefore, in view of reciprocating motion of pistons 202 and 204, it is necessary to keep the motion of pistons 202 and 204 as close to linear as possible because the deviation 242 and 244 from longitudinal axis of reciprocating motion of pistons 202 and 204 causes noise, reduction of efficiency, increase of friction to the wall of cylinder, increase of side-load, and low durability of the parts. The alignment of the cylinders 206 and 208 and the arrangement of crankshaft 214, piston rods 224 and 228, link rods 226 and 230, and connecting rod 222, hence, may influence on, amongst other things, the efficiency and/or the volume of the device. For the purpose of increasing the linearity of the piston motion as mentioned, the pistons (shown as 202 and 204 in FIGS. 2-4) are preferably as close to the side of the respective cylinders 206 and 208 as possible.

In another embodiment reducing angular deviation of link rods, link rods 226 and 230 substantially linearly reciprocate along longitudinal axis of motion of respective pistons 204 and 202 to decrease the angular deviation and thus to decrease the side load applied to each piston 204 and 202. The angular deviation defines the deviation of the link rod 226 or 230 from the longitudinal axis of the piston 204 or 202. Numerals 244 and 242 designate the angular deviation of the link rods 226 and 230, as shown in FIG. 2. Therefore, the position of coupling assembly 212 influences the angular displacement of the link rod 226, based on the length of the distance between the end pivot 232 and the rocker pivot 218 of the rocking beam 216. Thus, the position of the coupling assemblies may be such that the angular displacement of the link rod 226 is reduced. For the link rod 230, the length of the coupling assembly 210 also may be determined and placed to reduce the angular displacement of the link rod 230, based on the length of the distance between the end pivot 236 and the rocker pivot 218 of the rocking beam 216. Therefore, the length of the link rods 226 and 230, the length of coupling assemblies 212 and 210, and the length of the rocking beam 216 are significant parameters that greatly influence and/or determine the angular deviation of the link rods 226 and 230 as shown in FIG. 2.

The exemplary embodiment has a straight rocking beam 216 having the end points 232 and 236, the rocker pivot 218, and the connecting pivot 240 along the same axis. However, in other embodiments, the rocking beam 216 may be bent, such that pistons may be placed at angles to each other, as shown in FIGS. 5C and 5D.

Referring now to FIGS. 2-4 and FIGS. 7A-7B, in some embodiments of the coupling assembly, the coupling assemblies 212 and 210, may include a flexible link rod that is axially stiff but flexible in the rocking beam 216 plane of motion between link rods 226 and 230, and pistons 204 and 202, respectively. In this embodiment, at least one portion, the flexure (shown as 700 in FIGS. 7A and 7B), of link rods 226 and 230 is elastic. The flexture 700 acts as a coupling means between the piston rod and the link rod. The flexure 700 may absorb the crank-induced side loads of the pistons more effectively, thus allowing its respective piston to maintain linear longitudinal movement inside the piston's cylinder. This flexure 700 allows small rotations in the plane of the rocking beam 216 between the link rods 226 and 230 and pistons 204 or 202, respectively. Although depicted in this embodiment as flat, which increases the elasticity of the link rods 226 and 230, the flexure 700, in some embodiments, is not flat. The flexure 700 also may be constructed near to the lower portion of the pistons or near to the distal end of the link rods 226 and 230. The flexure 700, in one embodiment, may be made of #D2 Tool Steel Hardened to 58-62 RC. In some embodiments, there may be more than one flexure (not shown) on the link rod 226 or 230 to increase the elasticity of the link rods.

Figure 5C:
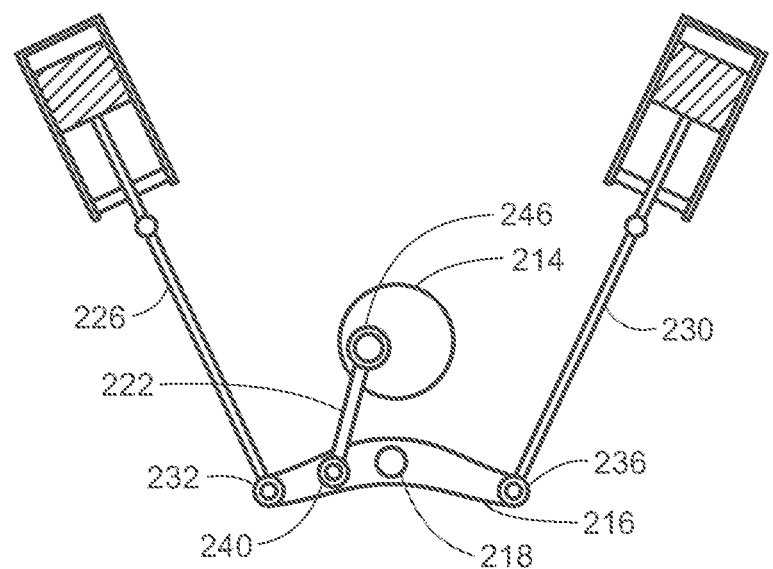
Figure 5D:
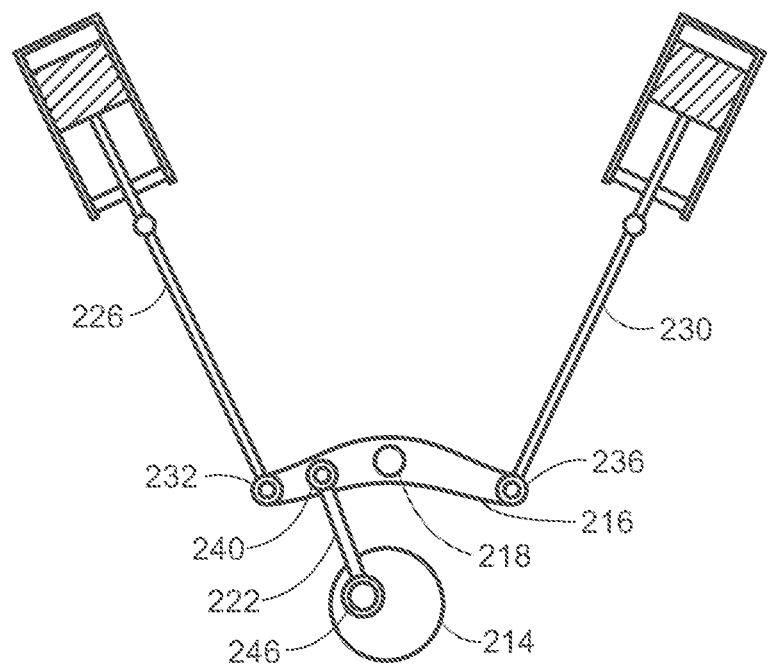

In alternate embodiment, the axes of the pistons in each cylinder housing may extend in different directions, as depicted in FIGS. 5C and 5D. In the exemplary embodiment, the axes of the pistons in each cylinder housing are substantially parallel and preferably substantially vertical, as depicted in FIGS. 2-4, and FIGS. 5A and 5B. FIGS. 5A-5D include various embodiments of the rocking beam drive mechanism including like numbers as those shown and described with respect to FIGS. 2-4. It will be understood by those skilled in that art that changing the relative position of the connecting pivot 240 along the rocking beam 216 will change the stroke of the pistons.

Accordingly, a change in the parameters of the relative position of the connecting pivot 240 in the rocking beam 216 and the length of the piston rods 224 and 228, link rods 230 and 226, rocking beam 216, and the position of rocker pivot 218 will change the angular deviation of the link rods 226 and 230, the phasing of the pistons 204 and 202, and the size of the device 300 in a variety of manner. Therefore, in various embodiments, a wide range of piston phase angles and variable sizes of the engine may be chosen based on the modification of one or more of these parameters. In practice, the link rods 224 and 228 of the exemplary embodiment have substantially lateral movement within from −0.5 degree to +0.5 degree from the longitudinal axis of the pistons 204 and 202. In various other embodiments, depending on the length of the link rod, the angle may vary anywhere from approaching 0 degrees to 0.75 degrees. However, in other embodiments, the angle may be higher including anywhere from approaching 0 to the approximately 20 degrees. As the link rod length increases, however, the crankcase/overall engine height increases as well as the weight of the engine.

One feature of the exemplary embodiment is that each piston has its link rod extending substantially to the attached piston rod so that it is formed as a coupling assembly. In one embodiment, the coupling assembly 212 for the piston 204 includes a piston rod 224, a link rod 226, and a coupling means 234 as shown in FIG. 2. More specifically, one proximal end of piston rod 224 is attached to the lower portion of piston 204 and the distal end piston rod 224 is connected to the proximate end of the link rod 226 by the coupling means 234. The distal end of the link rod 226 extends vertically to the end pivot 232 of the rocking beam 216. As described above, the coupling means 234 may be, but is not limited to, a joint, hinge, coupling, or flexure or other means known in the art. In this embodiment, the ratio of the piston rod 224 and the link rod 226 may determine the angular deviation of the link rod 226 as mentioned above.

Figure 8:
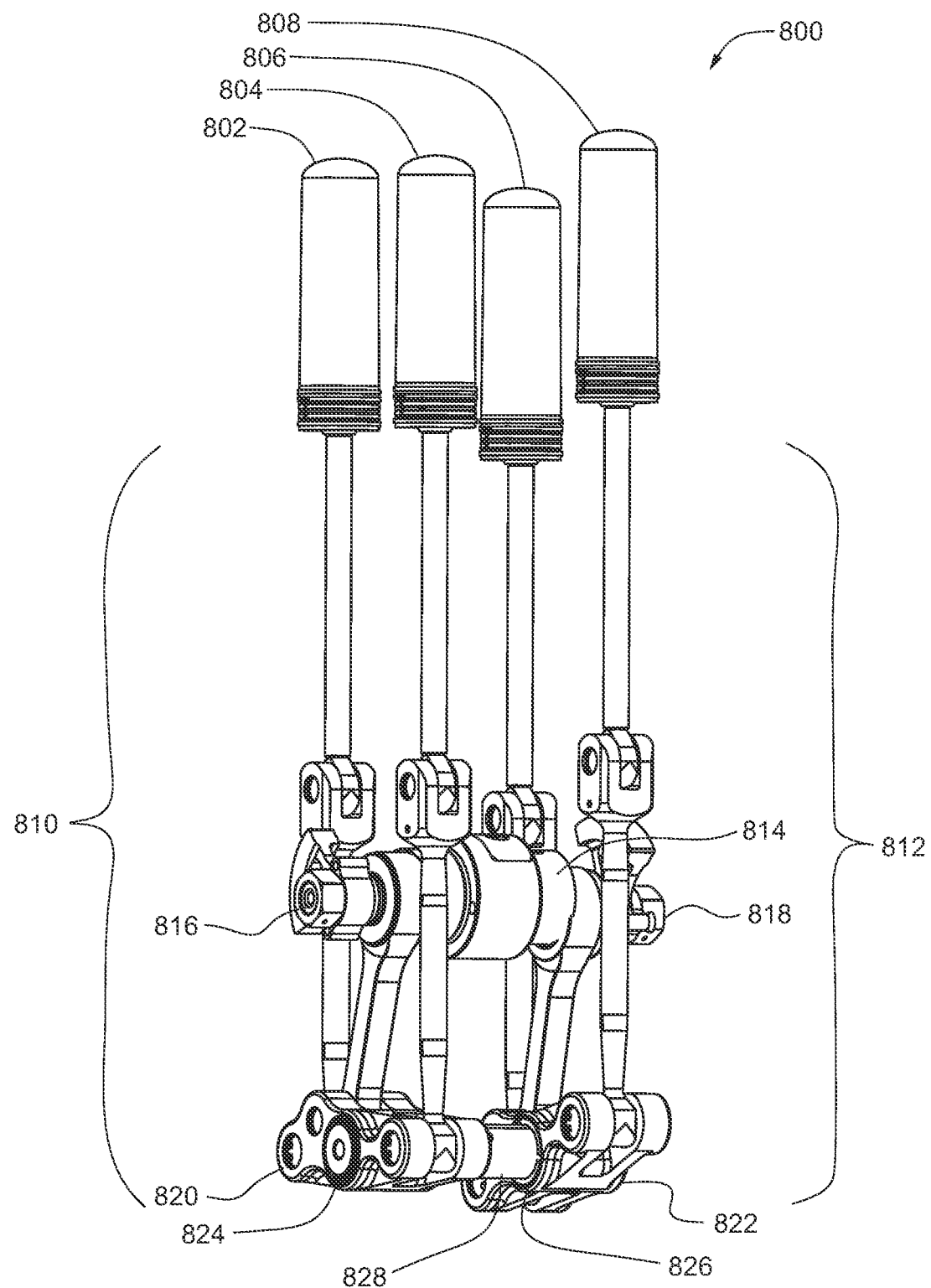
FIG. 8 shows a four cylinder double rocking beam drive arrangement in accordance with one embodiment.

In one embodiment of the machine, an engine, such as a Stirling engine, employs more than one rocking beam drive on a crankshaft. Referring now to FIG. 8, an unwrapped "four cylinder" rocking beam drive mechanism 800 is shown. In this embodiment, the rocking beam drive mechanism has four pistons 802, 804, 806, and 808 coupled to two rocking beam drives 810 and 812. In the exemplary embodiment, rocking beam drive mechanism 800 is used in a Stirling engine comprising at least four pistons 802, 804, 806, and 808, positioned in a quadrilateral arrangement coupled to a pair of rocking beam drives 810 and 812, wherein each rocking beam drive is connected to crankshaft 814. However, in other embodiments, the Stirling cycle engine includes anywhere from 1-4 pistons, and in still other embodiments, the Stirling cycle engine includes more than 4 pistons. In some embodiments, rocking beam drives 810 and 812 are substantially similar to the rocking beam drives described above with respect to FIGS. 2-4 (shown as 210 and 212 in FIGS. 2-4). Although in this embodiment, the pistons are shown outside the cylinders, in practice, the pistons would be inside cylinders.

Still referring to FIG. 8, in some embodiments, the rocking beam drive mechanism 800 has a single crankshaft 814 having a pair of longitudinally spaced, radially and oppositely directed crank pins 816 and 818 adapted for being journalled in a housing, and a pair of rocking beam drives 810 and 812. Each rocking beam 820 and 822 is pivotally connected to rocker pivots 824 and 826, respectively, and to crankpins 816 and 818, respectively. In the exemplary embodiment, rocking beams 820 and 822 are coupled to a rocking beam shaft 828.

In some embodiments, a motor/generator may be connected to the crankshaft in a working relationship. The motor may be located, in one embodiment, between the rocking beam drives. In another embodiment, the motor may be positioned outboard. The term "motor/generator" is used to mean either a motor or a generator.

Figure 9:
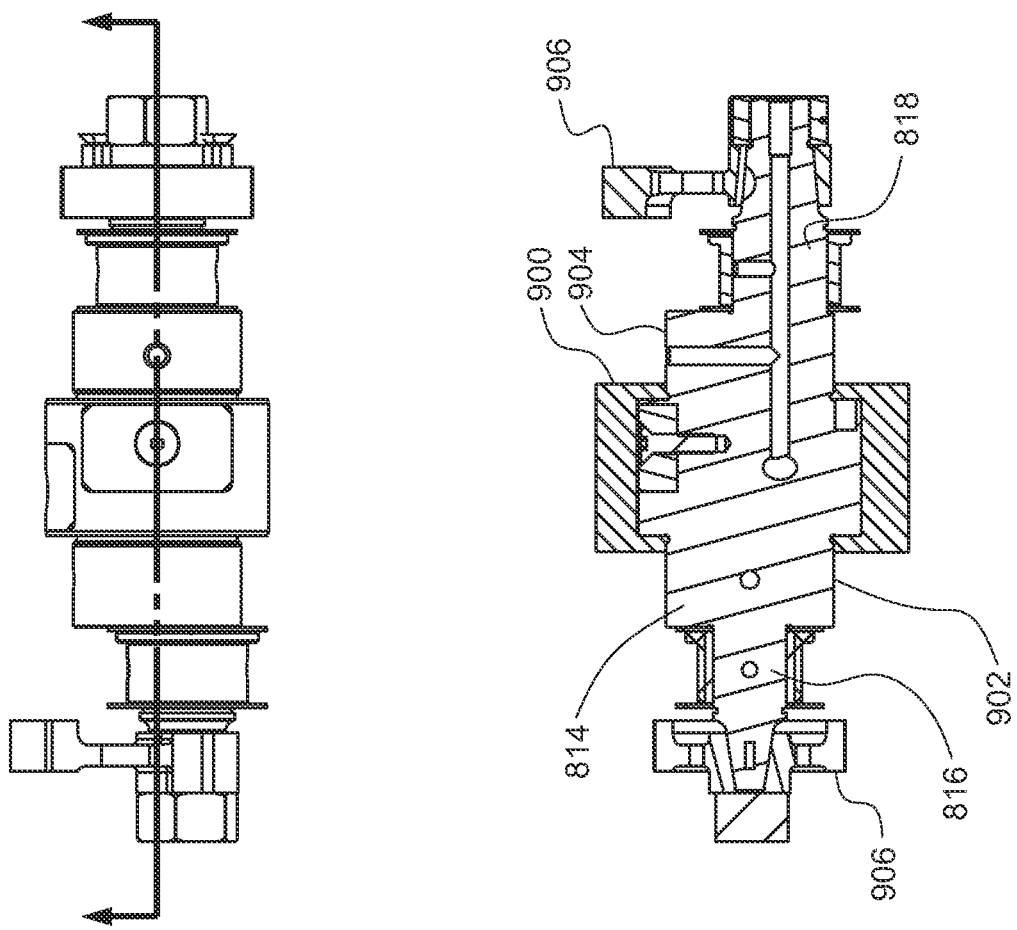
FIG. 9 shows a cross section of a crankshaft in accordance with one embodiment.

FIG. 9 shows one embodiment of crankshaft 814. Positioned on the crankshaft is a motor/generator 900, such as a Permanent Magnetic ("PM") generator. Motor/generator 900 may be positioned between, or inboard of the rocking beam drives (not shown, shown in FIG. 8 as 810 and 812), or may be positioned outside, or outboard of, rocking beam drives 810 and 812 at an end of crankshaft 814, as depicted by numeral 1000 in FIG. 10A.

When motor/generator 900 is positioned between the rocking beam drives (not shown, shown in FIG. 8 as 810 and 812), the length of motor/generator 900 is limited to the distance between the rocking beam drives. The diameter squared of motor/generator 900 is limited by the distance between the crankshaft 814 and the rocking beam shaft 828. Because the capacity of motor/generator 900 is proportional to its diameter squared and length, these dimension limitations result in a limited-capacity "pancake" motor/generator 900 having relatively short length, and a relatively large diameter squared. The use of a "pancake" motor/generator 900 may reduce the overall dimension of the engine, however, the dimension limitations imposed by the inboard configuration result in a motor/generator having limited capacity.

Placing motor/generator 900 between the rocking beam drives exposes motor/generator 900 to heat generated by the mechanical friction of the rocking beam drives. The inboard location of motor/generator 900 makes it more difficult to cool motor/generator 900, thereby increasing the effects of heat produced by motor/generator 900 as well as heat absorbed by motor/generator 900 from the rocking beam drives. This may lead to overheating, and ultimately failure of motor/generator 900.

Referring to both FIGS. 8 and 9, the inboard positioning of motor/generator 900 may also lead to an unequilateral configuration of pistons 802, 804, 806, and 808, since pistons 802, 804, 806, and 808 are coupled to rocking beam drives 810 and 812, respectively, and any increase in distance would also result in an increase in distance between pistons 802, 804, and pistons 806 and 808. An unequilateral arrangement of pistons may lead to inefficiencies in burner and heater head thermodynamic operation, which, in turn, may lead to a decrease in overall engine efficiency. Additionally, an unequilateral arrangement of pistons may lead to larger heater head and combustion chamber dimensions.

Figure 10A:
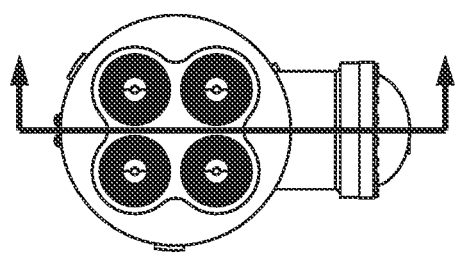
FIG. 10A shows a view of an engine in accordance with one embodiment.
Figure 10A:
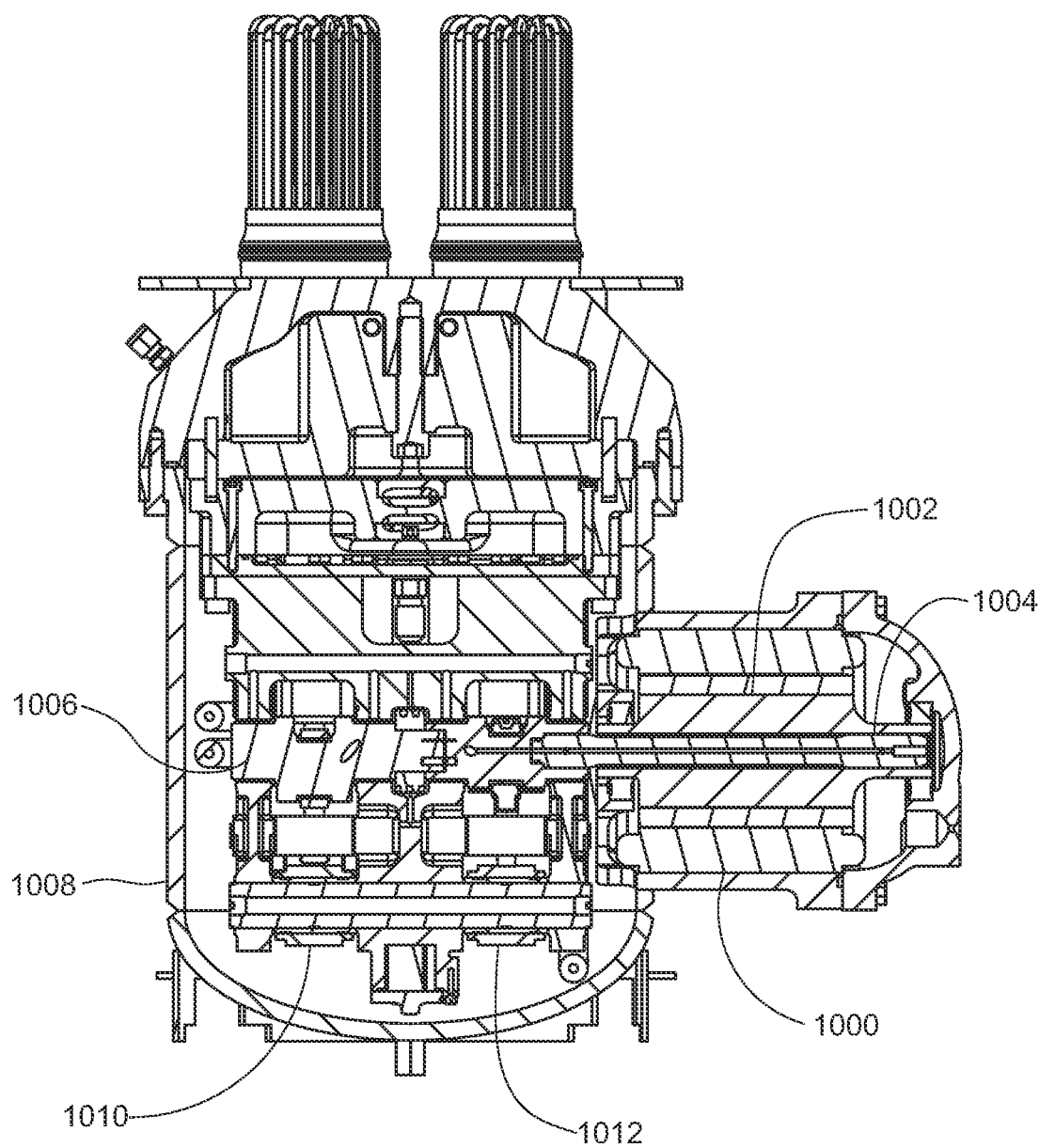
Figure 10B:
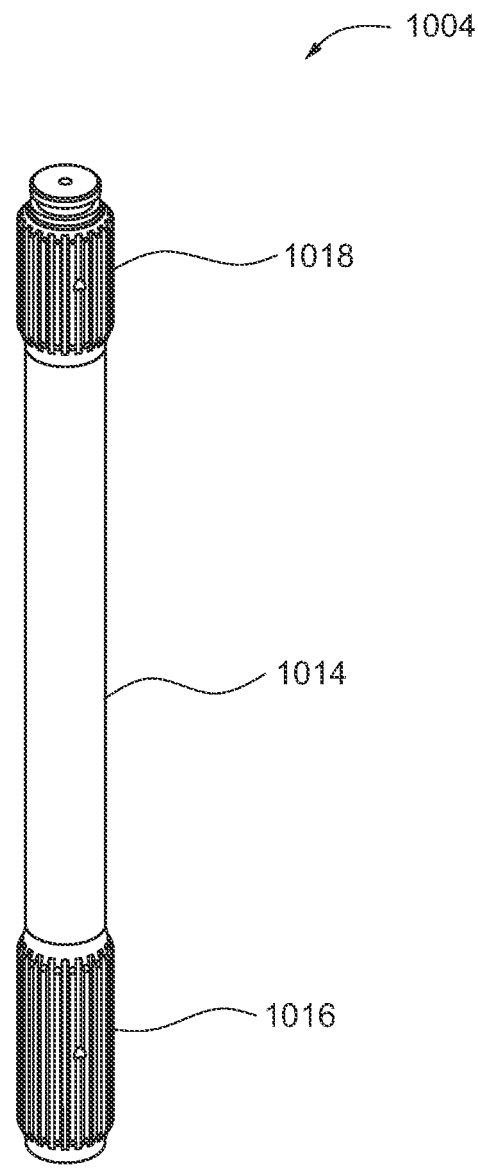
FIG. 10B shows a crankshaft coupling in accordance with one embodiment.
Figure 10C:
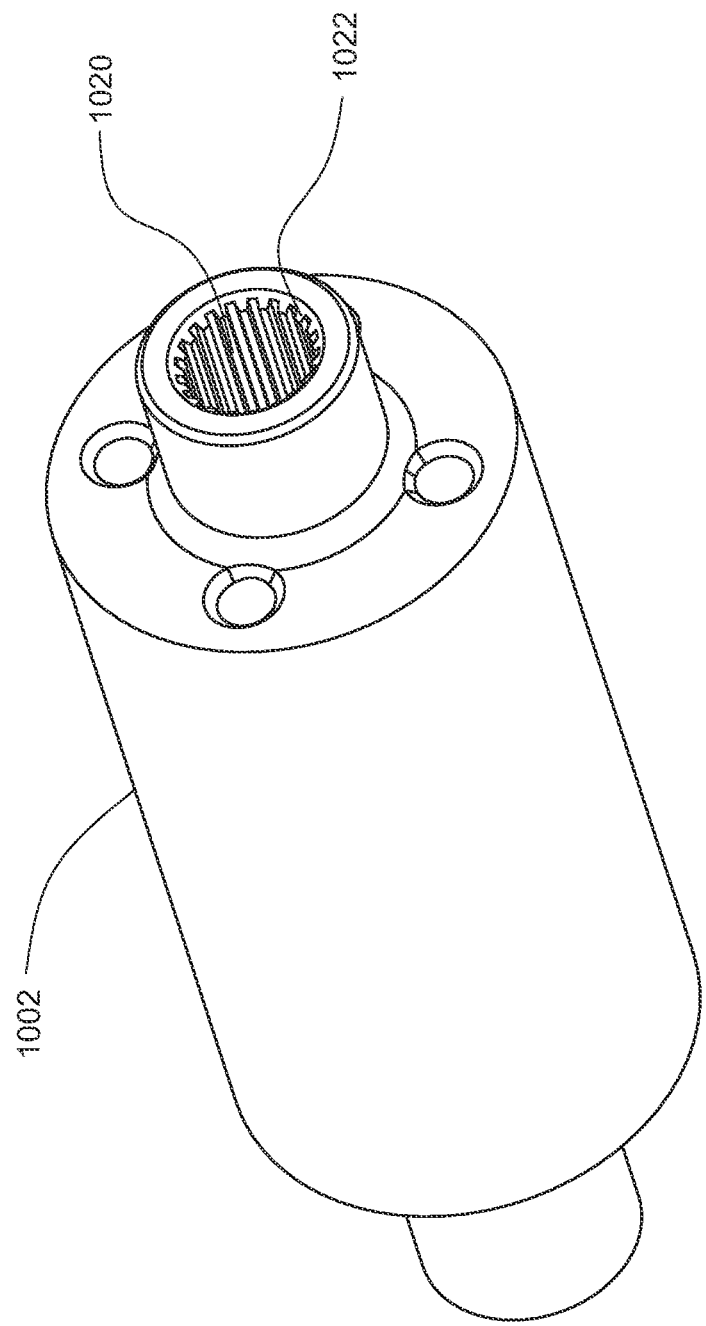
FIG. 10C shows a view of a sleeve rotor in accordance with one embodiment.
Figure 10D:
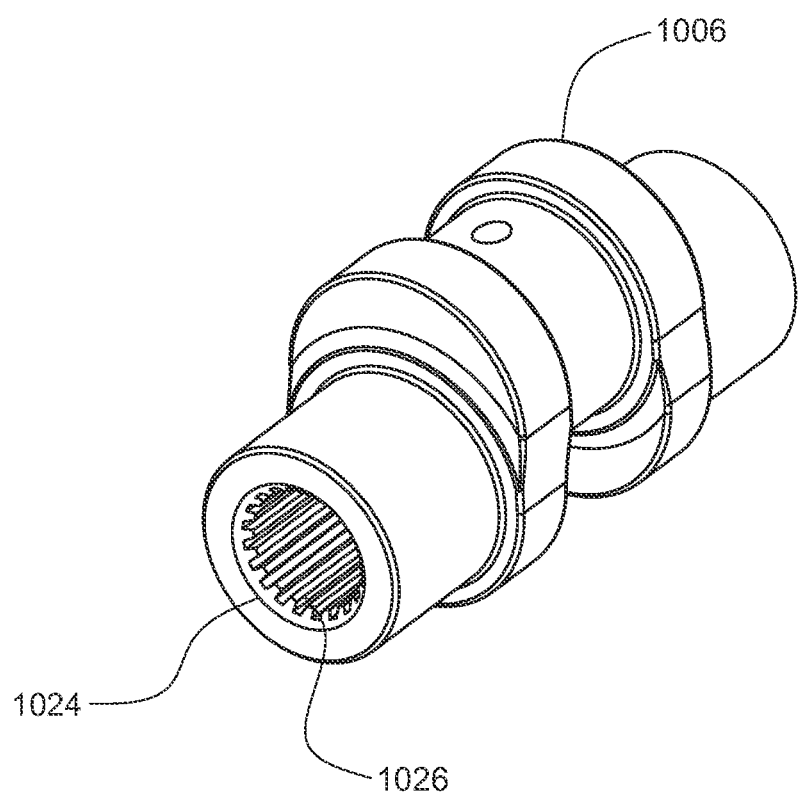
FIG. 10D shows a view of a crankshaft in accordance with one embodiment.
Figure 10G:
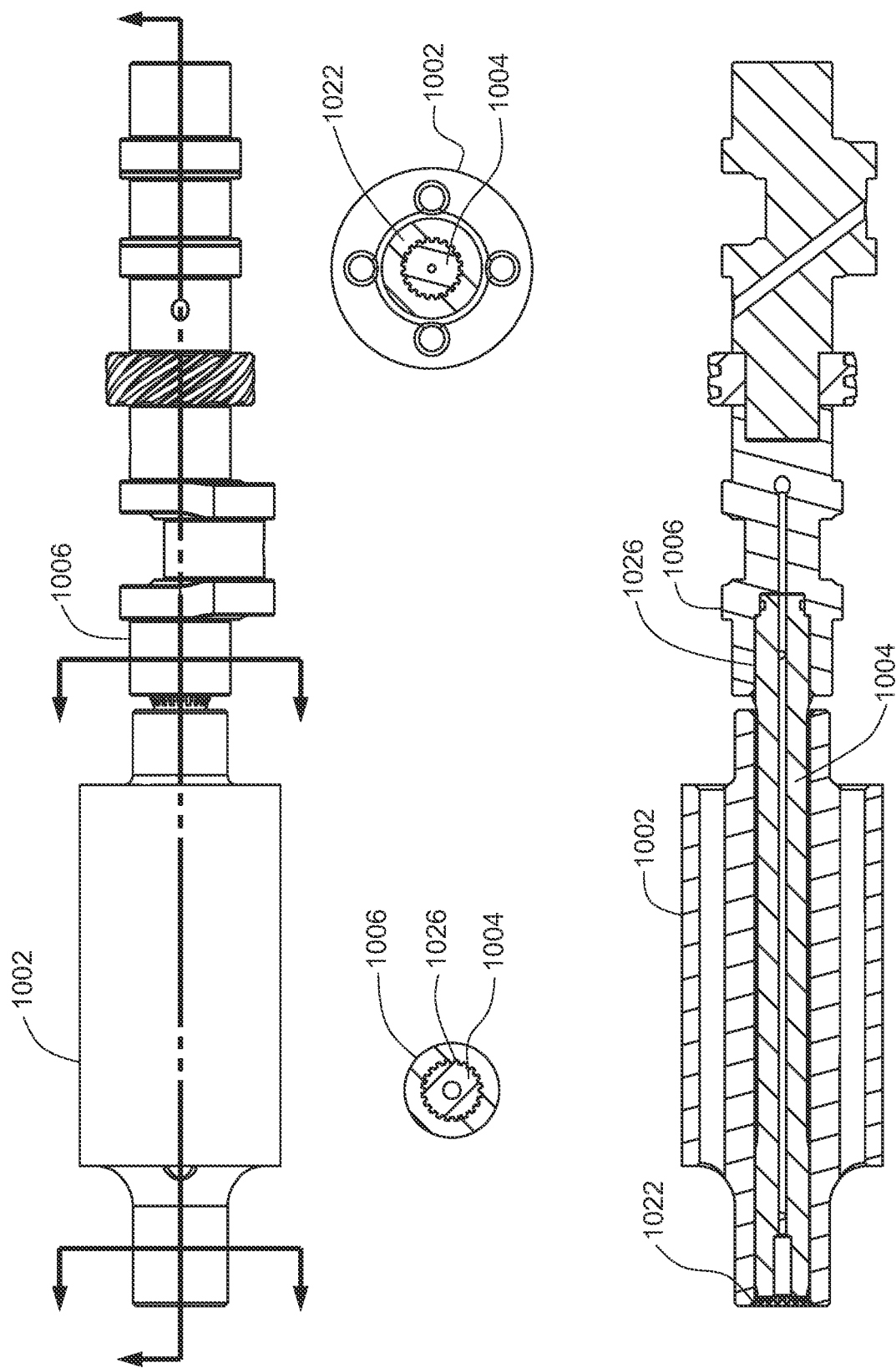
FIG. 10G are various views a sleeve rotor, crankshaft and spline shaft in accordance with one embodiment.

The exemplary embodiment of the motor/generator arrangement is shown in FIG. 10A. As shown in FIG. 10A, the motor/generator 1000 is positioned outboard from rocking beam drives 1010 and 1012 (shown as 810 and 812 in FIG. 8) and at an end of crankshaft 1006. The outboard position allows for a motor/generator 1000 with a larger length and diameter squared than the "pancake" motor/generator described above (shown as 900 in FIG. 9). As previously stated, the capacity of motor/generator 1000 is proportional to its length and diameter squared, and since outboard motor/generator 1000 may have a larger length and diameter squared, the outboard motor/generator 1000 configuration shown in FIG. 10A may allow for the use of a higher capacity motor/generator in conjunction with engine.

By placing motor/generator 1000 outboard of drives 1010 and 1012 as shown in the embodiment in FIG. 10A, motor/generator 1000 is not exposed to heat generated by the mechanical friction of drives 1010 and 1012. Also, the outboard position of motor/generator 1000 makes it easier to cool the motor/generator, thereby allowing for more mechanical engine cycles per a given amount of time, which in turn allows for higher overall engine performance.

Also, as motor/generator 1000 is positioned outside and not positioned between drives 1010 and 1012, rocking beam drives 1010 and 1012 may be placed closer together thereby allowing the pistons which are coupled to drives 1010 and 1012 to be placed in an equilateral arrangement. In some embodiments, depending on the burner type used, particularly in the case of a single burner embodiment, equilateral arrangement of pistons allows for higher efficiencies in burner and heater head thermodynamic operation, which in turn allows higher overall engine performance. Equilateral arrangement of pistons also advantageously allows for smaller heater head and combustion chamber dimensions.

Referring again to FIGS. 8 and 9, crankshaft 814 may have concentric ends 902 and 904, which in one embodiment are crank journals, and in various other embodiments, may be, but are not limited to, bearings. Each concentric end 902, 904 has a crankpin 816, 818 respectively, that may be offset from a crankshaft center axis. At least one counterweight 906 may be placed at either end of crankshaft 814 (shown as 1006 in FIG. 10A), to counterbalance any instability the crankshaft 814 may experience. This crankshaft configuration in combination with the rocking beam drive described above allows the pistons (shown as 802, 804, 806, and 808 in FIG. 8) to do work with one rotation of the crankshaft 814. This characteristic will be further explained below. In other embodiments, a flywheel (not shown) may be placed on crankshaft 814 (shown as 1006 in FIG. 10A) to decrease fluctuations of angular velocity for a more constant speed.

Still referring to FIGS. 8 and 9, in some embodiments, a cooler (not shown) may be also be positioned along the crankshaft 814 (shown as 1006 in FIG. 10A) and rocking beam drives 810 and 812 (shown as 1010 and 1012 in FIG. 10A) to cool the crankshaft 814 and rocking beam drives 810 and 812. In some embodiments, the cooler may be used to cool the working gas in a cold chamber of a cylinder and may also be configured to cool the rocking beam drive. Various embodiments of the cooler are discussed in detail below.

FIGS. 10A-10G depict some embodiments of various parts of the machine. As shown in this embodiment, crankshaft 1006 is coupled to motor/generator 1000 via a motor/generator coupling assembly. Since motor/generator 1000 is mounted to crankcase 1008, pressurization of crankcase with a charge fluid may result in crankcase deformation, which in turn may lead to misalignments between motor/generator 1000 and crankshaft 1006 and cause crankshaft 1006 to deflect. Because rocking beam drives 1010 and 1012 are coupled to crankshaft 1006, deflection of crankshaft 1006 may lead to failure of rocking beam drives 1010 and 1012. Thus, in one embodiment of the machine, a motor/generator coupling assembly is used to couple the motor/generator 1000 to crankshaft 1006. The motor/generator coupling assembly accommodates differences in alignment between motor/generator 1000 and crankshaft 1006 which may contribute to failure of rocking beam drives 1010 and 1012 during operation.

Still referring to FIGS. 10A-10G, in one embodiment, the motor/generator coupling assembly is a spline assembly that includes spline shaft 1004, sleeve rotor 1002 of motor/generator 1000, and crankshaft 1006. Spline shaft 1004 couples one end of crankshaft 1006 to sleeve rotor 1002. Sleeve rotor 1002 is attached to motor/generator 1000 by mechanical means, such as press fitting, welding, threading, or the like. In one embodiment, spline shaft 1004 includes a plurality of splines on both ends of the shaft. In other embodiments, spline shaft 1004 includes a middle splineless portion 1014, which has a diameter smaller than the outer diameter or inner diameter of splined portions 1016 and 1018. In still other embodiments, one end portion of the spline shaft 1016 has splines that extend for a longer distance along the shaft than a second end portion 1018 that also includes splines thereon.

In some embodiments, sleeve rotor 1002 includes an opening 1020 that extends along a longitudinal axis of sleeve rotor 1002. The opening 1020 is capable of receiving spline shaft 1004. In some embodiments, opening 1020 includes a plurality of inner splines 1022 capable of engaging the splines on one end of spline shaft 1004. The outer diameter 1028 of inner splines 1022 may be larger than the outer diameter 1030 of the splines on spline shaft 1004, such that the fit between inner splines 1022 and the splines on spline shaft 1004 is loose (as shown in FIG. 10E). A loose fit between inner splines 1022 and the splines on spline shaft 1004 contributes to maintain spline engagement between spline shaft 1004 and rotor sleeve 1002 during deflection of spline shaft 1004, which may be caused by crankcase pressurization. In other embodiments, longer splined portion 1016 of spline shaft 1004 may engage inner splines 1022 of rotor 1002.

Still referring to FIGS. 10A-10G, in some embodiments, crankshaft 1006 has an opening 1024 on an end thereof, which is capable of receiving one end of spline shaft 1004. Opening 1024 preferably includes a plurality of inner splines 1026 that engage the splines on spline shaft 1004. The outer diameter 1032 of inner splines 1026 may be larger than the outer diameter 1034 of the splines on spline shaft 1004, such that the fit between inner splines 1026 and the splines on spline shaft 1004 is loose (as shown in FIG. 10F). As previously discussed, a loose fit between inner splines 1026 and the splines on spline shaft 1004 contributes to maintain spline engagement between spline shaft 1004 and crankshaft 1006 during deflection of spline shaft 1004, which may be caused by crankcase pressurization. The loose fit between the inner splines 1026 and 1022 on the crankshaft 1006 and the sleeve rotor 1002 and the splines on the spline shaft 1004 may contribute to maintain deflection of spline shaft 1004. This may allow misalignments between crankshaft 1006 and sleeve rotor 1002. In some embodiments, shorter splined portion 1018 of spline shaft 1004 may engage opening 1024 of crankshaft 1006 thus preventing these potential misalignments.

In some embodiments, opening 1020 of sleeve rotor 1002 includes a plurality of inner splines that extend the length of opening 1020. This arrangement contributes to spline shaft 1004 being properly inserted into opening 1020 during assembly. This contributes to proper alignment between the splines on spline shaft 1004 and the inner splines on sleeve rotor 1002 being maintained.

Figure 56A:
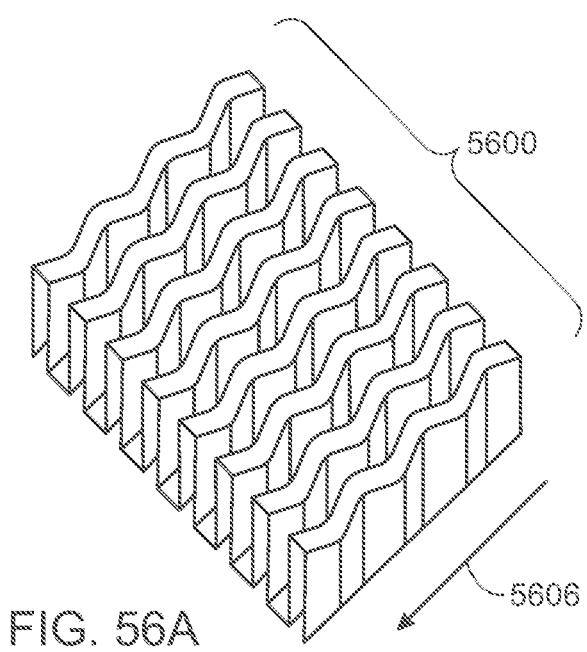
FIGS. 56A-56C show various configurations of a heat exchanger in accordance with various embodiments.
Figure 56B:
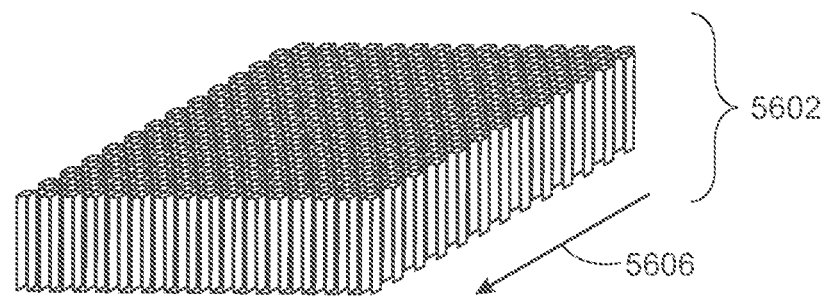
Figure 56C:
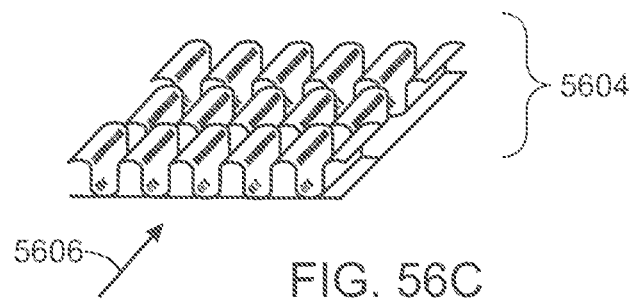

Referring now to FIG. 4, one embodiment of the engine is shown. Here the pistons 202 and 204 of engine 300 operate between a hot chamber 404 and a cold chamber 406 of cylinders 206 and 208 respectively. Between the two chambers there may be a regenerator 408. The regenerator 408 may have variable density, variable area, and, in some embodiments, is made of wire. The varying density and area of the regenerator may be adjusted such that the working gas has substantially uniform flow across the regenerator 408. Various embodiments of the regenerator 408 are discussed in detail below, and in U.S. Pat. No. 6,591,609, issued Jul. 17, 2003, to Kamen et al., and U.S. Pat. No. 6,862,883, issued Mar. 8, 2005, to Kamen et al., which are herein incorporated by reference in their entireties. When the working gas passes through the hot chamber 404, a heater head 410 may heat the gas causing the gas to expand and push pistons 202 and 204 towards the cold chamber 406, where the gas compresses. As the gas compresses in the cold chamber 406, pistons 202 and 204 may be guided back to the hot chamber to undergo the Stirling cycle again. The heater head 410 may be a pin head (as shown in FIGS. 52A through 53B), a fin head (as shown in FIGS. 56A through 56C), a folded fin head (as shown in FIGS. 56A through 56C), heater tubes as shown in FIG. 4 (also shown as 2904 in FIG. 29), or any other heater head embodiment known, including, but not limited to, those described below. Various embodiments of heater head 410 are discussed in detail below, and in U.S. Pat. No. 6,381,958, issued May 7, 2002, to Kamen et al., U.S. Pat. No. 6,543,215, issued Apr. 8, 2003, to Langenfeld et al., U.S. Pat. No. 6,966,182, issued Nov. 22, 2005, to Kamen et al, and U.S. Pat. No. 7,308,787, issued Dec. 18, 2007, to LaRocque et al., which are herein incorporated by reference in their entireties.

In some embodiments, a cooler 412 may be positioned alongside cylinders 206 and 208 to further cool the gas passing through to the cold chamber 406. Various embodiments of cooler 412 are discussed in detail in the proceeding sections, and in U.S. Pat. No. 7,325,399, issued Feb. 5, 2008, to Strimling et al, which is herein incorporated by reference in its entirety.

In some embodiments, at least one piston seal 414 may be positioned on pistons 202 and 204 to seal the hot section 404 off from the cold section 406. Additionally, at least one piston guide ring 416 may be positioned on pistons 202 and 204 to help guide the pistons' motion in their respective cylinders. Various embodiments of piston seal 414 and guide ring 416 are described in detail below, and in U.S. patent application Ser. No. 10/175,502, filed Jun. 19, 2002, published Feb. 6, 2003 (now abandoned), which is herein incorporated by reference in its entirety.

In some embodiments, at least one piston rod seal 418 may be placed against piston rods 224 and 228 to prevent working gas from escaping into the crankcase 400, or alternatively into airlock space 420. The piston rod seal 418 may be an elastomer seal, or a spring-loaded seal. Various embodiments of the piston rod seal 418 are discussed in detail below.

In some embodiments, the airlock space may be eliminated, for example, in the rolling diaphragm and/or bellows embodiments described in more detail below. In those cases, the piston rod seals 224 and 228 seal the working space from the crankcase.

In some embodiments, at least one rolling diaphragm/bellows 422 may be located along piston rods 224 and 228 to prevent airlock gas from escaping into the crankcase 400. Various embodiments of rolling diaphragm 422 are discussed in more detail below.

Although FIG. 4 shows a cross section of engine 300 depicting only two pistons and one rocking beam drive, it is to be understood that the principles of operation described herein may apply to a four cylinder, double rocking beam drive engine, as designated generally by numeral 800 in FIG. 8.

Piston Operation

Figure 11:
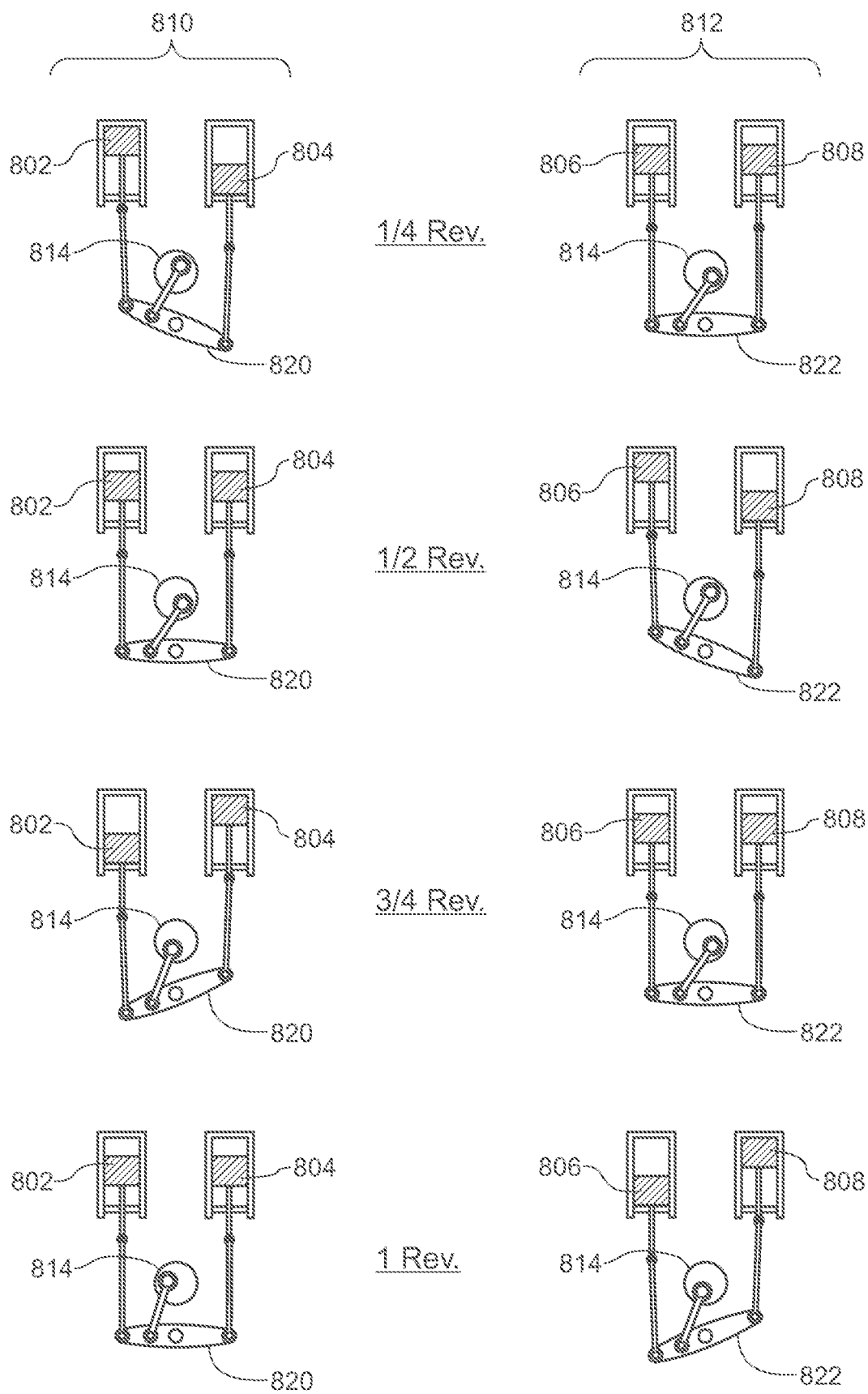
FIG. 11 shows the operation of pistons of an engine in accordance with one embodiment.
Figure 12A:
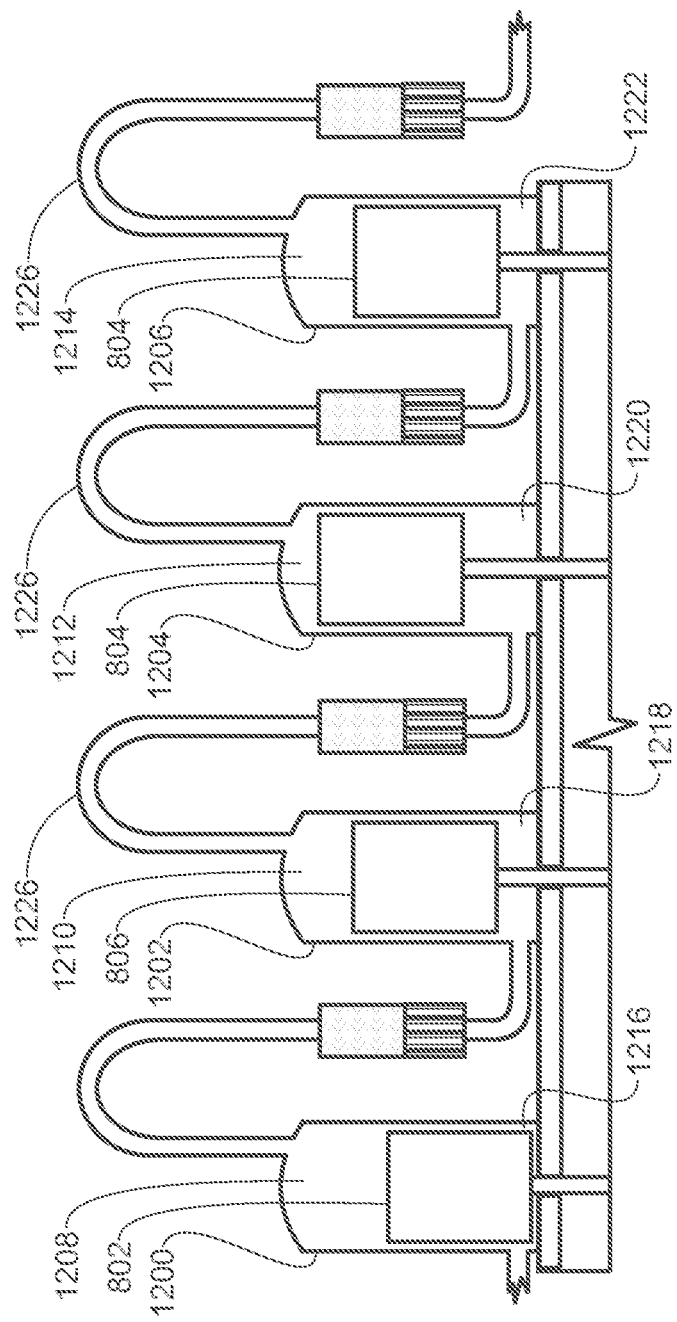
FIG. 12A shows an unwrapped schematic view of a working space and cylinders in accordance with one embodiment.

Referring now to FIGS. 8 and 11, FIG. 11 shows the operation of pistons 802, 804, 806, and 808 during one revolution of crankshaft 814. With a ¼ revolution of crankshaft 814, piston 802 is at the top of its cylinder, otherwise known as top dead center, piston 806 is in upward midstroke, piston 804 is at the bottom of its cylinder, otherwise known as bottom dead center, and piston 808 is in downward midstroke. With a ½ revolution of crankshaft 814, piston 802 is in downward midstroke, piston 806 is at top dead center, piston 804 is in upward midstroke, and piston 808 is at bottom dead center. With ¾ revolution of crankshaft 814, piston 802 is at bottom dead center, piston 806 is in downward midstroke, piston 804 is at top dead center, and piston 808 is in upward midstroke. Finally, with a full revolution of crankshaft 814, piston 802 is in upward midstroke, piston 806 is at bottom dead center, piston 804 is in downward midstroke, and piston 808 is at top dead center. During each ¼ revolution, there is a 90 degree phase difference between pistons 802 and 806, a 180 degree phase difference between pistons 802 and 804, and a 270 degree phase difference between pistons 802 and 808. FIG. 12A illustrates the relationship of the pistons being approximately 90 degrees out of phase with the preceding and succeeding piston. Additionally, FIG. 11 shows the exemplary embodiment machine means of transferring work. Thus, work is transferred from piston 802 to piston 806 to piston 804 to piston 808 so that with a full revolution of crankshaft 814, all pistons have exerted work by moving from the top to the bottom of their respective cylinders.

Figure 12B:
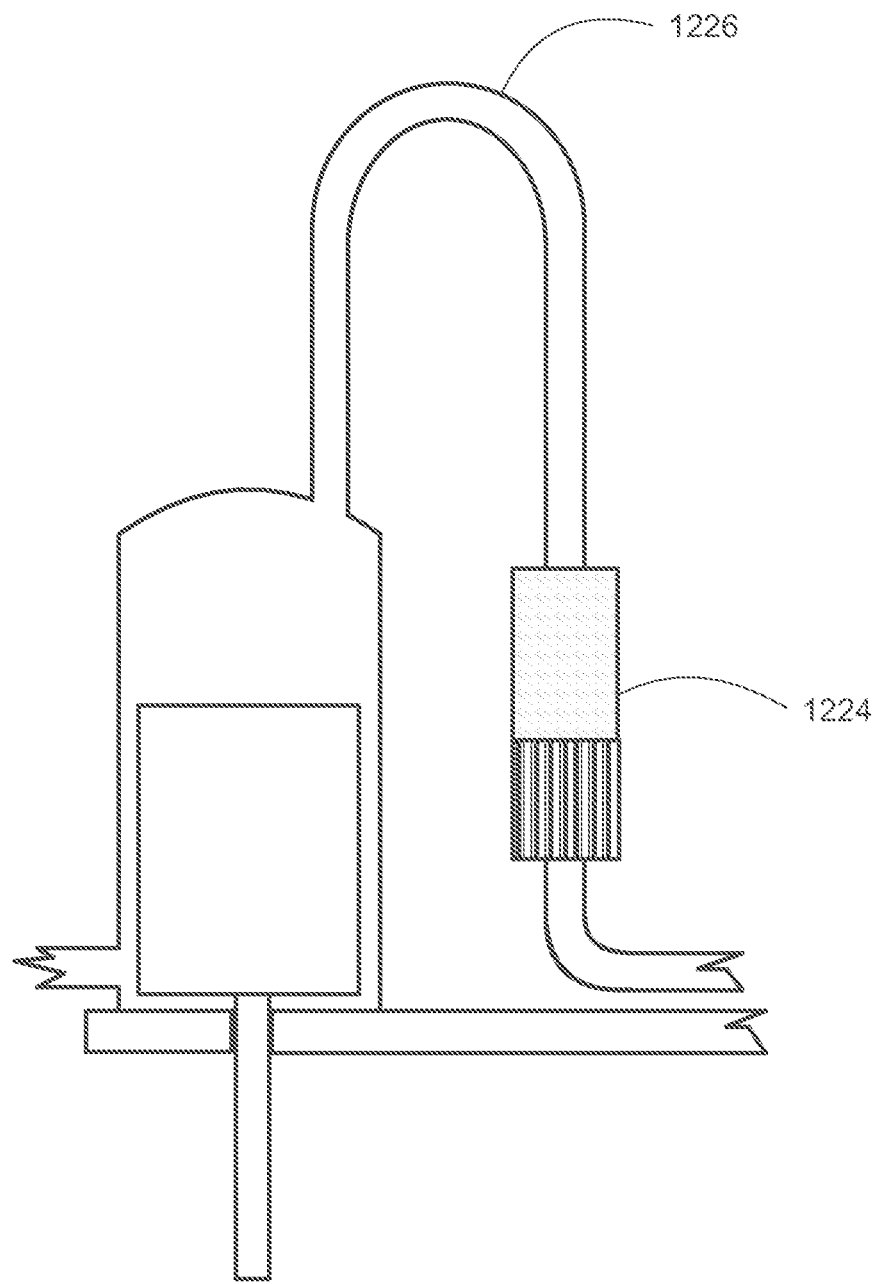
FIG. 12B shows a schematic view of a cylinder, heater head, and regenerator in accordance with one embodiment.
Figure 12C:
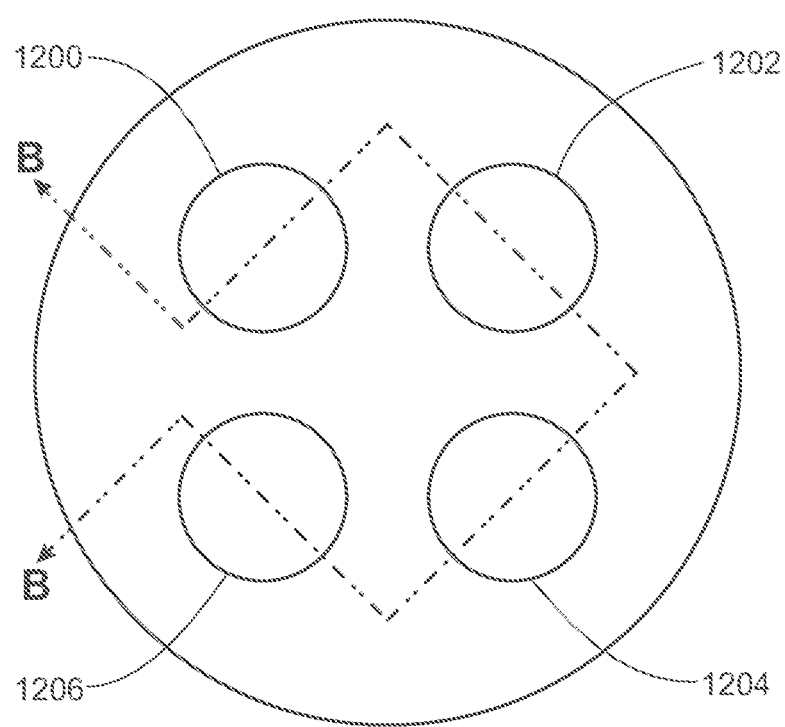
FIG. 12C shows a view of a cylinder head in accordance with one embodiment.

Referring now to FIG. 11, together with FIGS. 12A-12C, illustrate the 90 degree phase difference between the pistons in the exemplary embodiment. Referring now to FIGS. 12A, although the cylinders are shown in a linear path, this is for illustration purposes only. In the exemplary embodiment of a four cylinder Stirling cycle machine, the flow path of the working gas contained within the cylinder working space follows a figure eight pattern. Thus, the working spaces of cylinders 1200, 1202, 1204, and 1206 are connected in a figure eight pattern, for example, from cylinder 1200 to cylinder 1202 to cylinder 1204 to cylinder 1208, the fluid flow pattern follows a figure eight. Still referring to FIG. 12A, an unwrapped view of cylinders 1200, 1202, 1204, and 1206, taken along the line B-B (shown in FIG. 12C) is illustrated. The 90 degree phase difference between pistons as described above allows for the working gas in the warm section 1212 of cylinder 1204 to be delivered to the cold section 1222 of cylinder 1206. As piston 802 and 808 are 90 degrees out of phase, the working gas in the warm section 1214 of cylinder 1206 is delivered to the cold section 1216 of cylinder 1200. As piston 802 and piston 806 are also 90 degrees out of phase, the working gas in the warm section 1208 of cylinder 1200 is delivered to the cold section 1218 of cylinder 1202. And as piston 804 and piston 806 are also 90 degrees out of phase, so the working gas in the warm section 1210 of cylinder 1202 is delivered to the cold section 1220 of cylinder 1204. Once the working gas of a warm section of a first cylinder enters the cold section of a second cylinder, the working gas begins to compress, and the piston within the second cylinder, in its down stroke, thereafter forces the compressed working gas back through a regenerator 1224 and heater head 1226 (shown in FIG. 12B), and back into the warm section of the first cylinder. Once inside the warm section of the first cylinder, the gas expands and drives the piston within that cylinder downward, thus causing the working gas within the cold section of that first cylinder to be driven through the preceding regenerator and heater head, and into the cylinder. This cyclic transmigration characteristic of working gas between cylinders 1200, 1202, 1204, and 1206 is possible because pistons 802, 804, 806, and 808 are connected, via drives 810 and 812, to a common crankshaft 814 (shown in FIG. 11), in such a way that the cyclical movement of each piston is approximately 90 degrees in advance of the movement of the proceeding piston, as depicted in FIG. 12A.

Rolling Diaphragm, Metal Bellows, Airlock, and Pressure Regulator

In some embodiments of the Stirling cycle machine, lubricating fluid is used. To prevent the lubricating fluid from escaping the crankcase, a seal is used.

Figure 13A:
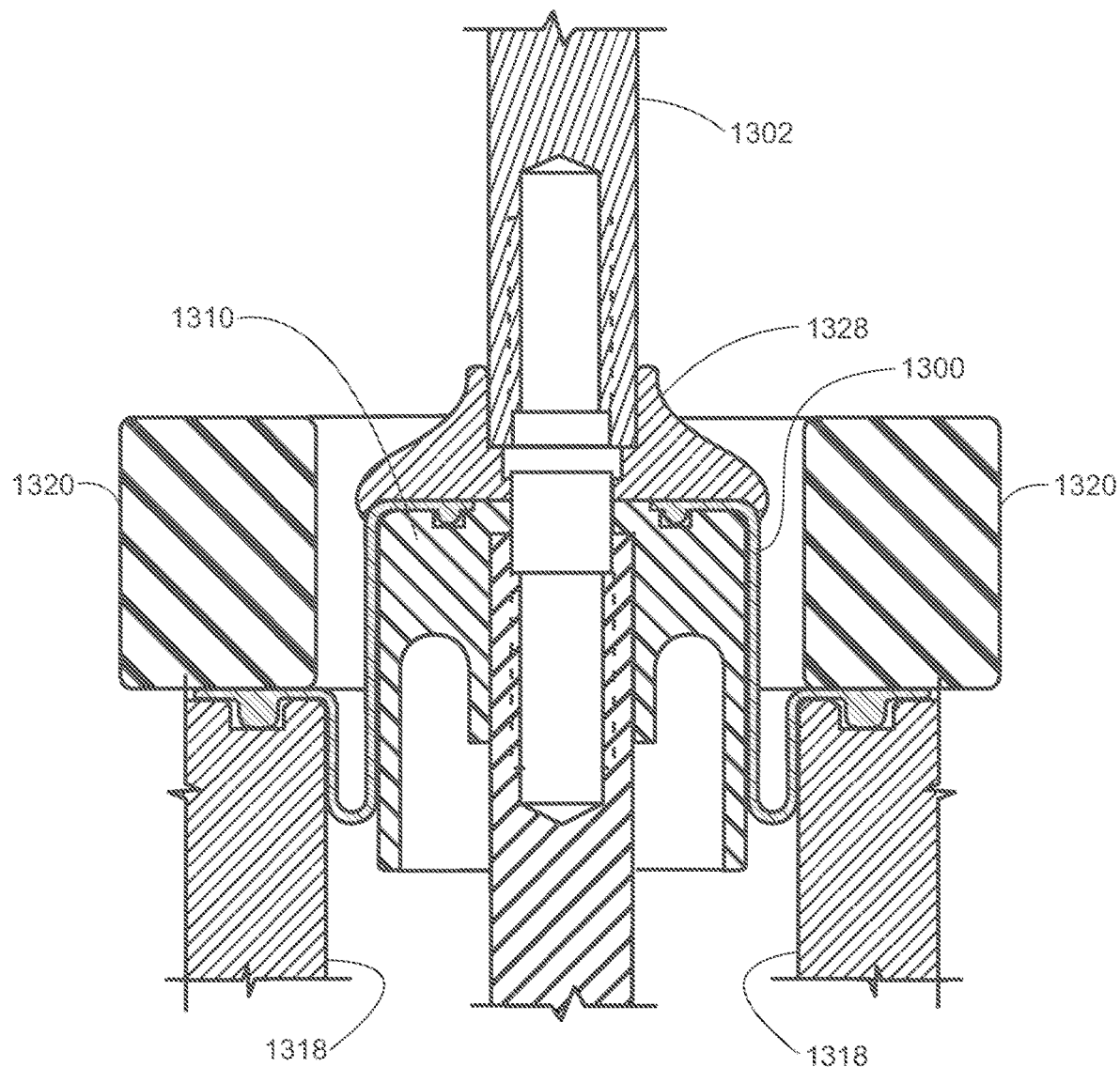
FIG. 13A shows a view of a rolling diaphragm, along with supporting top seal piston and bottom seal piston, in accordance with one embodiment.
Figure 13B:
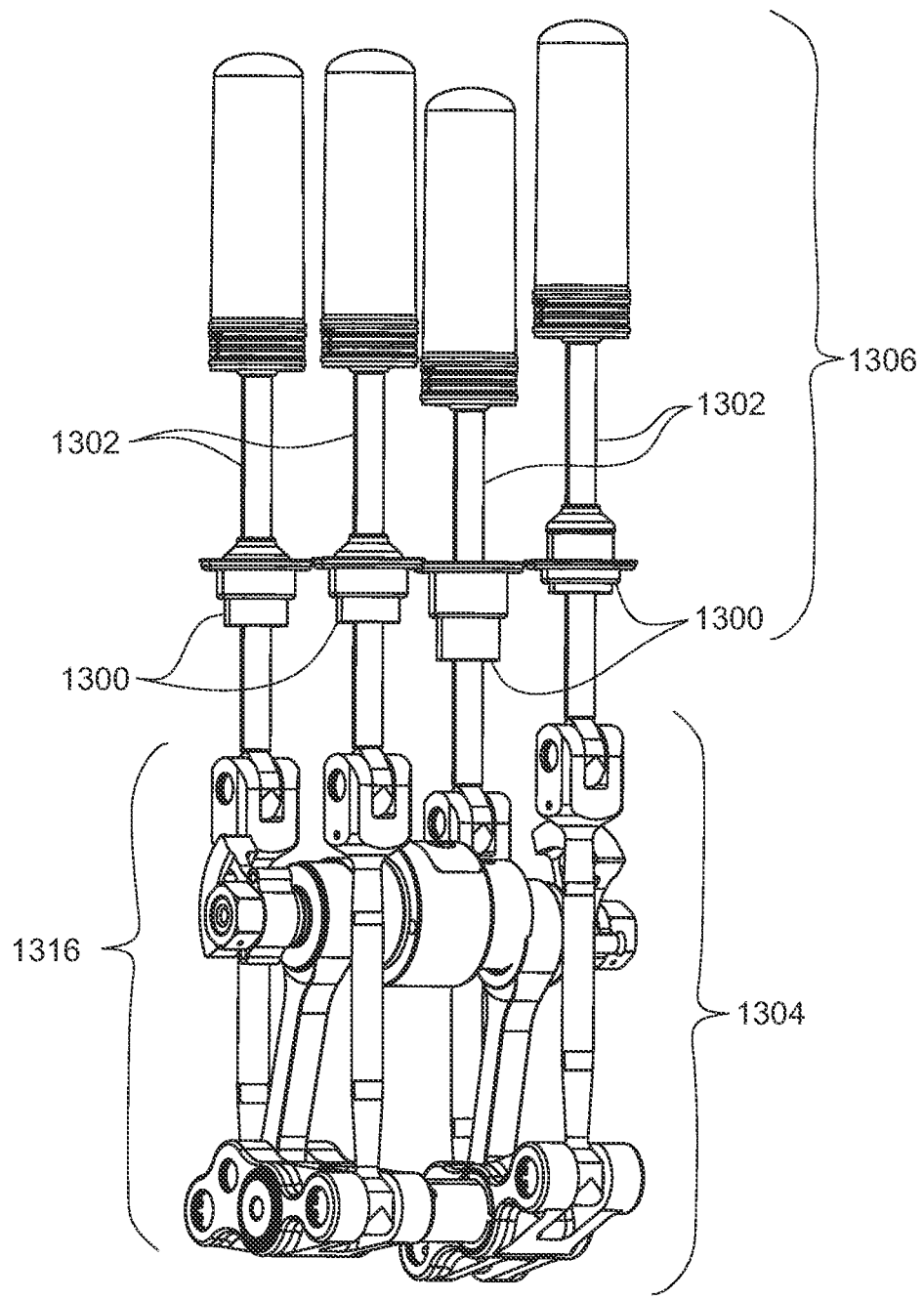
FIG. 13B shows an exploded view of a rocking beam driven engine in accordance with one embodiment.

Referring now to FIGS. 13A-15, some embodiments of the Stirling cycle machine include a fluid lubricated rocking beam drive that utilizes a rolling diaphragm 1300 positioned along the piston rod 1302 to prevent lubricating fluid from escaping the crankcase, not shown, but the components that are housed in the crankcase are represented as 1304, and entering areas of the engine that may be damaged by the lubricating fluid. It is beneficial to contain the lubricating fluid for if lubricating fluid enters the working space, not shown, but the components that are housed in the working space are represented as 1306, it would contaminate the working fluid, come into contact with the regenerator 1308, and may clog the regenerator 1308. The rolling diaphragm 1300 may be made of an elastomer material, such as rubber or rubber reinforced with woven fabric or non-woven fabric to provide rigidity. The rolling diaphragm 1300 may alternatively be made of other materials, such as fluorosilicone or nitrile with woven fabric or non-woven fabric. The rolling diaphragm 1300 may also be made of carbon nanotubes or chopped fabric, which is non-woven fabric with fibers of polyester or KEVLAR®, for example, dispersed in an elastomer. In the some embodiments, the rolling diaphragm 1300 is supported by the top seal piston 1328 and the bottom seal piston 1310. In other embodiments, the rolling diaphragm 1300 as shown in FIG. 13A is supported via notches in the top seal piston 1328.

In some embodiments, a pressure differential is placed across the rolling diaphragm 1300 such that the pressure above the seal 1300 is different from the pressure in the crankcase 1304. This pressure differential inflates seal 1300 and allows seal 1300 to act as a dynamic seal as the pressure differential ensures that rolling diaphragm maintains its form throughout operation. FIGS. 13A, and FIGS. 13C-13H illustrate how the pressure differential effects the rolling diaphragm. The pressure differential causes the rolling diaphragm 1300 to conform to the shape of the bottom seal piston 1310 as it moves with the piston rod 1302, and prevents separation of the seal 1300 from a surface of the piston 1310 during operation. Such separation may cause seal failure. The pressure differential causes the rolling diaphragm 1300 to maintain constant contact with the bottom seal piston 1310 as it moves with the piston rod 1302. This occurs because one side of the seal 1300 will always have pressure exerted on it thereby inflating the seal 1300 to conform to the surface of the bottom seal piston 1310. In some embodiments, the top seal piston 1328 'rolls over' the corners of the rolling diaphragm 1300 that are in contact with the bottom seal piston 1310, so as to further maintain the seal 1300 in contact with the bottom seal piston 1310. In the exemplary embodiment, the pressure differential is in the range of 10 to 15 PSI. The smaller pressure in the pressure differential is preferably in crankcase 1304, so that the rolling diaphragm 1300 may be inflated into the crankcase 1304. However, in other embodiments, the pressure differential may have a greater or smaller range of value.

The pressure differential may be created by various methods including, but not limited to, the use of the following: a pressurized lubrication system, a pneumatic pump, sensors, an electric pump, by oscillating the rocking beam to create a pressure rise in the crankcase 1304, by creating an electrostatic charge on the rolling diaphragm 1300, or other similar methods. In some embodiments, the pressure differential is created by pressurizing the crankcase 1304 to a pressure that is below the mean pressure of the working space 1306. In some embodiments the crankcase 1304 is pressurized to a pressure in the range of 10 to 15 PSI below the mean pressure of the working space 1306, however, in various other embodiments, the pressure differential may be smaller or greater. Further detail regarding the rolling diaphragm is included below.

Figure 13C:
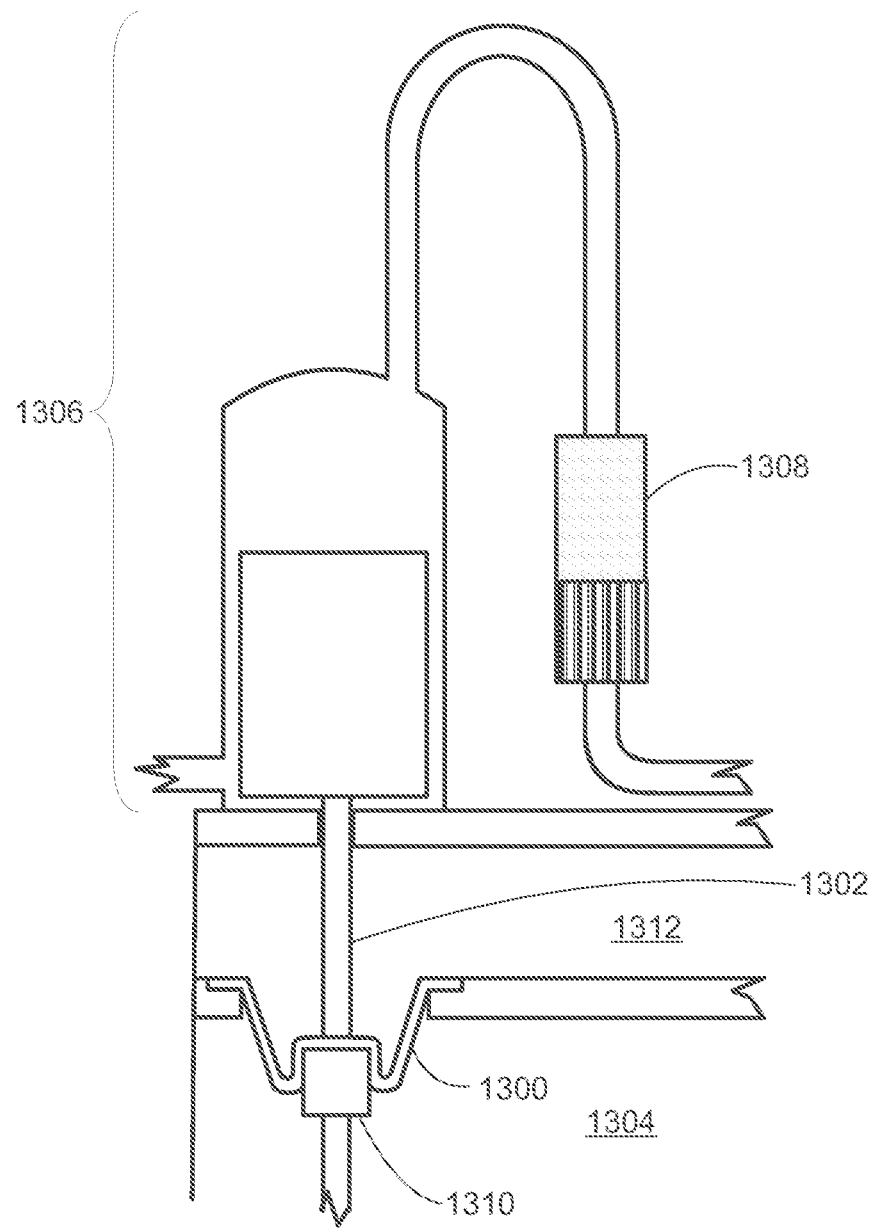
FIG. 13C shows a view of a cylinder, heater head, regenerator, and rolling diaphragm, in accordance with one embodiment.
Figure 13D:
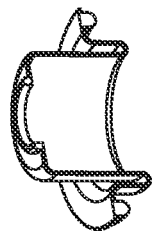
FIGS. 13D-13E show various views of a rolling diaphragm during operation, in accordance with one embodiment.
Figure 13D:
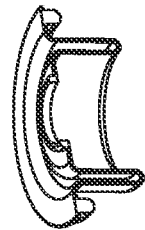
Figure 13D:
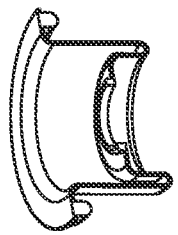
Figure 13D:
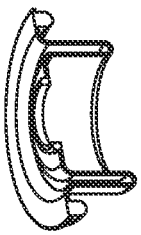
Figure 13E:
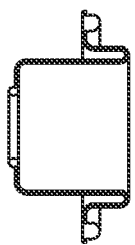
Figure 13E:
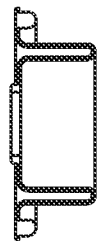
Figure 13E:
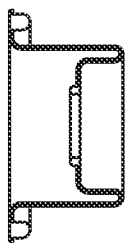
Figure 13E:
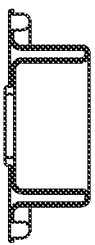
Figure 13F:
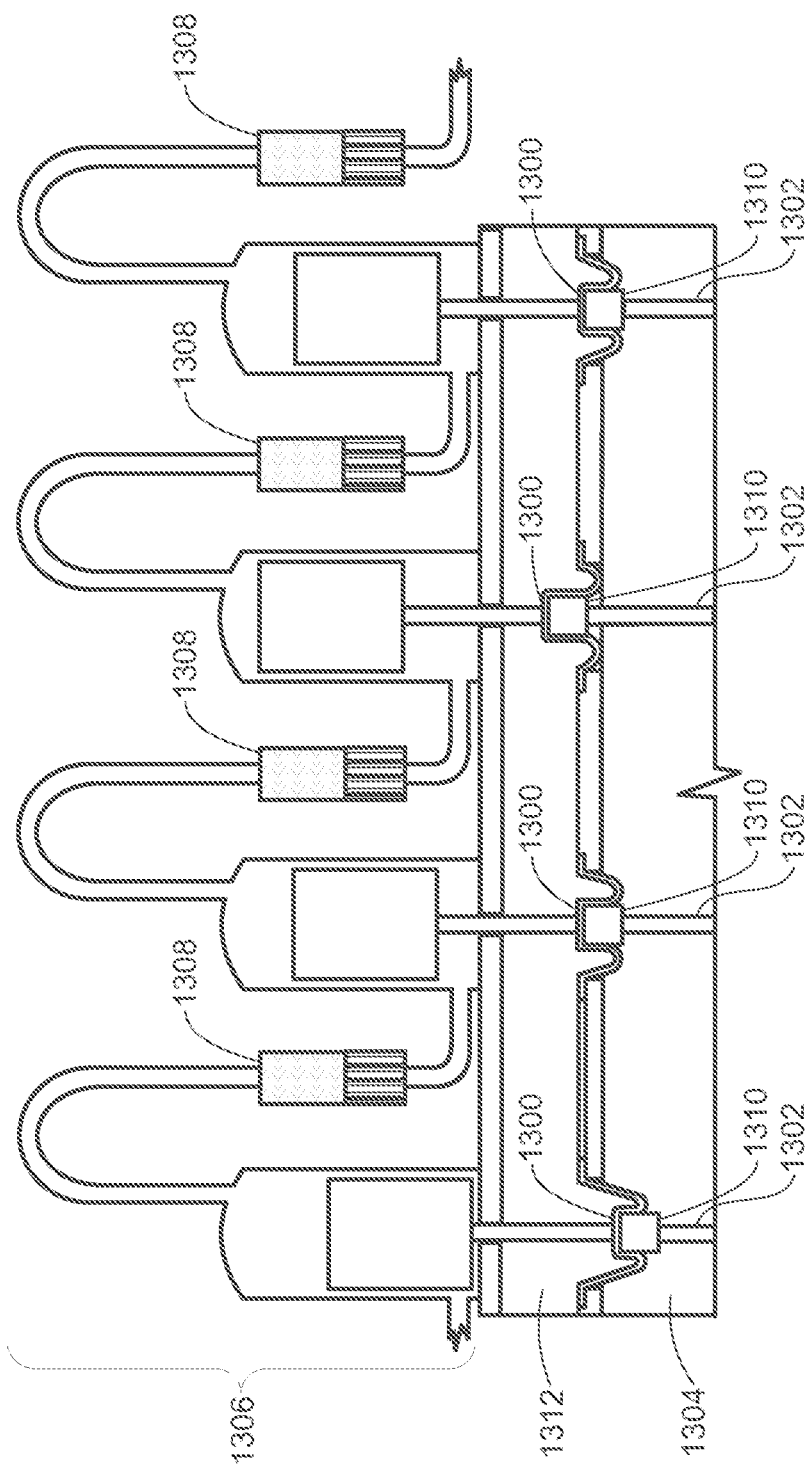
FIG. 13F shows an unwrapped schematic view of a working space and cylinders in accordance with one embodiment.
Figure 13G:
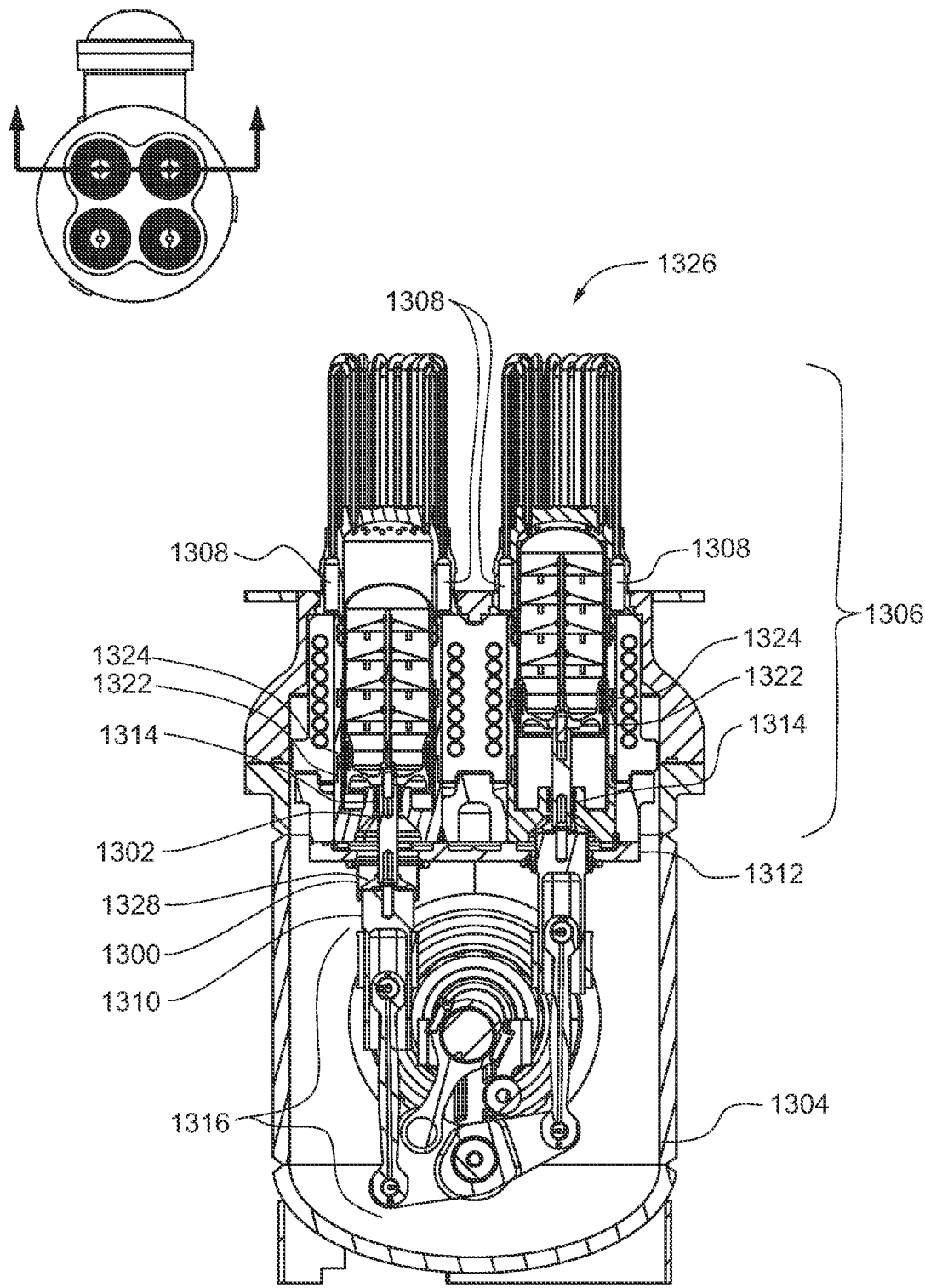
FIG. 13G shows a view of an external combustion engine in accordance with one.

Referring now to FIGS. 13C, 13G, and 13H, however, another embodiment of the Stirling machine is shown, wherein airlock space 1312 is located between working space 1306 and crankcase 1304. Airlock space 1312 maintains a constant volume and pressure necessary to create the pressure differential necessary for the function of rolling diaphragm 1300 as described above. In one embodiment, airlock 1312 is not absolutely sealed off from working space 1306, so the pressure of airlock 1312 is equal to the mean pressure of working space 1306. Thus, in some embodiments, the lack of an effective seal between the working space and the crankcase contributes to the need for an airlock space. Thus, the airlock space, in some embodiments, may be eliminated by a more efficient and effective seal.

During operation, the working space 1306 mean pressure may vary so as to cause airlock 1312 mean pressure to vary as well. One reason the pressure may tend to vary is that during operation the working space may get hotter, which in turn may increase the pressure in the working space, and consequently in the airlock as well since the airlock and working space are in fluid communication. In such a case, the pressure differential between airlock 1312 and crankcase 1304 will also vary, thereby causing unnecessary stresses in rolling diaphragms 1300 that may lead to seal failure. Therefore, some embodiments of the machine, the mean pressure within airlock 1312 is regulated so as to maintain a constant desired pressure differential between airlock 1312 and crankcase 1304, and ensuring that rolling diaphragms 1300 stay inflated and maintains their form. In some embodiments, a pressure transducer is used to monitor and manage the pressure differential between the airlock and the crankcase, and regulate the pressure accordingly so as to maintain a constant pressure differential between the airlock and the crankcase. Various embodiments of the pressure regulator that may be used are described in further detail below, and in U.S. Pat. No. 7,310,945, issued Dec. 25, 2007, to Gurski et al., which is herein incorporated by reference in its entirety.

A constant pressure differential between the airlock 1312 and crankcase 1304 may be achieved by adding or removing working fluid from airlock 1312 via a pump or a release valve. Alternatively, a constant pressure differential between airlock 1312 and crankcase 1304 may be achieved by adding or removing working fluid from crankcase 1304 via a pump or a release valve. The pump and release valve may be controlled by the pressure regulator. Working fluid may be added to airlock 1312 (or crankcase 1304) from a separate source, such as a working fluid container, or may be transferred over from crankcase 1304. Should working fluid be transferred from crankcase 1304 to airlock 1312, it may be desirable to filter the working fluid before passing it into airlock 1312 so as to prevent any lubricant from passing from crankcase 1304 into airlock 1312, and ultimately into working space 1306, as this may result in engine failure.

In some embodiments of the machine, crankcase 1304 may be charged with a fluid having different thermal properties than the working fluid. For example, where the working gas is helium or hydrogen, the crankcase may be charged with argon. Thus, the crankcase is pressurized. In some embodiments, helium is used, but in other embodiments, any inert gas, as described herein, may be used. Thus, the crankcase is a wet pressurized crankcase in the exemplary embodiment. In other embodiments where a lubricating fluid is not used, the crankcase is not wet.

In the exemplary embodiments, rolling diaphragms 1300 do not allow gas or liquid to pass through them, which allows working space 1306 to remain dry and crankcase 1304 to be wet sumped with a lubricating fluid. Allowing a wet sump crankcase 1304 increases the efficiency and life of the engine as there is less friction in rocking beam drives 1316. In some embodiments, the use of roller bearings or ball bearings in drives 1316 may also be eliminated with the use of lubricating fluid and rolling diaphragms 1300. This may further reduce engine noise and increase engine life and efficiency.

FIGS. 14A-14E show cross sections of various embodiments of the rolling diaphragm (shown as 1400, 1410, 1412, 1422 and 1424) configured to be mounted between top seal piston and bottom seal piston (shown as 1328 and 1310 in FIGS. 13A and 13H), and between a top mounting surface and a bottom mounting surface (shown as 1320 and 1318 in FIG. 13A). In some embodiments, the top mounting surface may be the surface of an airlock or working space, and the bottom mounting surface may be the surface of a crankcase.

Figure 14A:
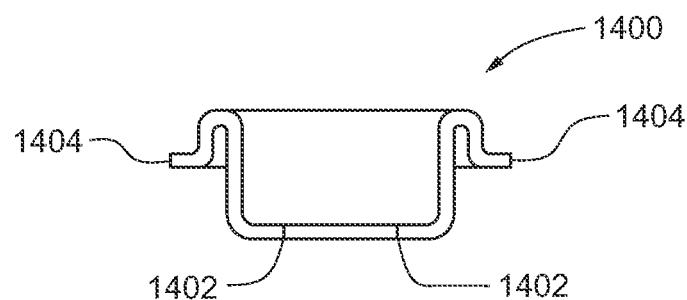
FIGS. 14A-14E show views of various embodiments of a rolling diaphragm.
Figure 14B:
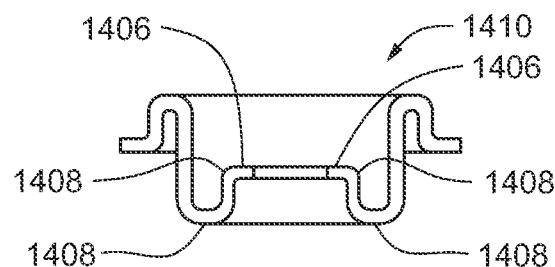
Figure 14C:
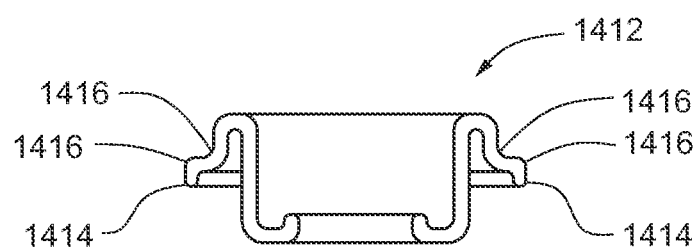

FIG. 14A shows one embodiment of the rolling diaphragm 1400, where the rolling diaphragm 1400 includes a flat inner end 1402 that may be positioned between a top seal piston and a bottom seal piston, so as to form a seal between the top seal piston and the bottom seal piston. The rolling diaphragm 1400 also includes a flat outer end 1404 that may be positioned between a top mounting surface and a bottom mounting surface, so as to form a seal between the top mounting surface and the bottom mounting surface. FIG. 14B shows another embodiment of the rolling diaphragm, wherein rolling diaphragm 1410 may include a plurality of bends 1408 leading up to flat inner end 1406 to provide for additional support and sealing contact between the top seal piston and the bottom seal piston. FIG. 14C shows another embodiment of the rolling diaphragm, wherein rolling diaphragm 1412 includes a plurality of bends 1416 leading up to flat outer end 1414 to provide for additional support and sealing contact between the top mounting surface and the bottom mounting surface.

Figure 14D:
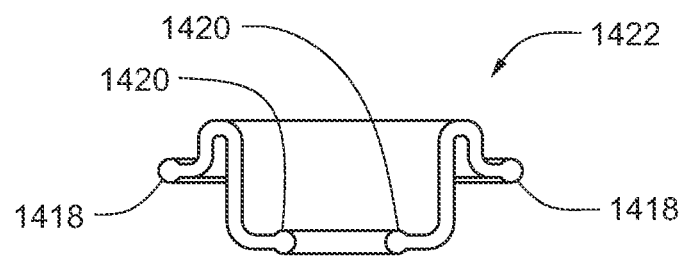
Figure 14E:
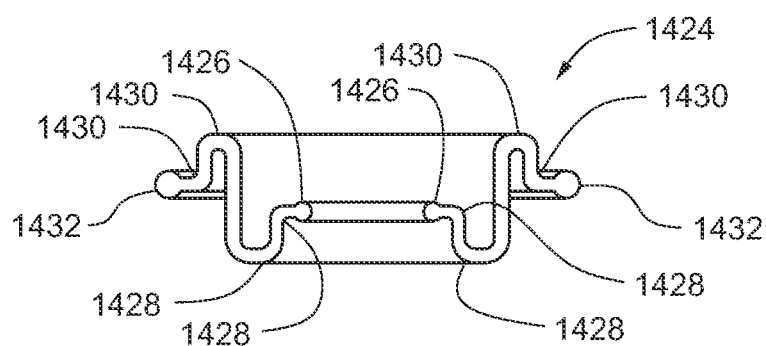

FIG. 14D shows another embodiment of the rolling diaphragm where rolling diaphragm 1422 includes a bead along an inner end 1420 thereof, so as to form an 'o-ring' type seal between a top seal piston and a bottom seal piston, and a bead along an outer end 1418 thereof, so as to form an 'o-ring' type seal between a bottom mounting surface and a top mounting surface. FIG. 14E shows another embodiment of the rolling diaphragm, wherein rolling diaphragm 1424 includes a plurality of bends 1428 leading up to beaded inner end 1426 to provide for additional support and sealing contact between the top seal piston and the bottom seal piston. Rolling diaphragm 1424 may also include a plurality of bends 1430 leading up to beaded outer end 1432 to provide for additional support and sealing contact between the top seal piston and the bottom seal piston.

Although FIGS. 14A through 14E depict various embodiments of the rolling diaphragm, it is to be understood that rolling diaphragms may be held in place by any other mechanical means known in the art.

Figure 15A:
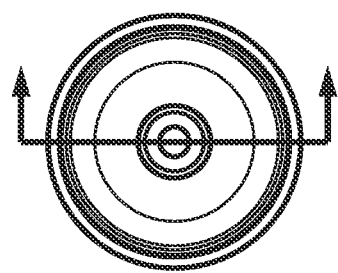
FIG. 15A shows a view of a metal bellows and accompanying piston rod and pistons in accordance with one embodiment.
Figure 15A:
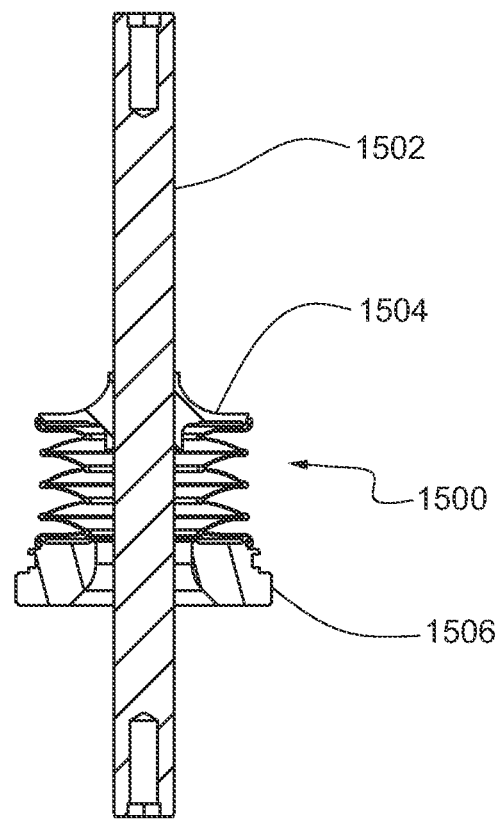
Figure 15E:
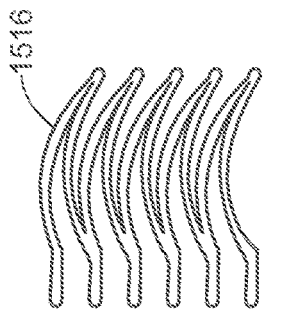
FIGS. 15E-15G show a view of metal bellows in accordance with various embodiments.
Figure 15F:
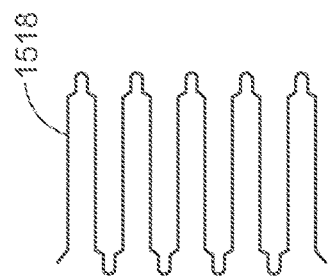
Figure 15G:
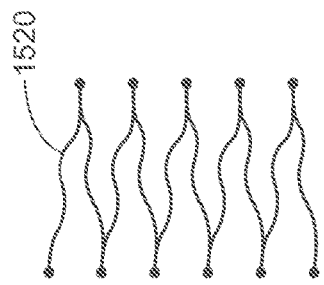
Figure 15B:
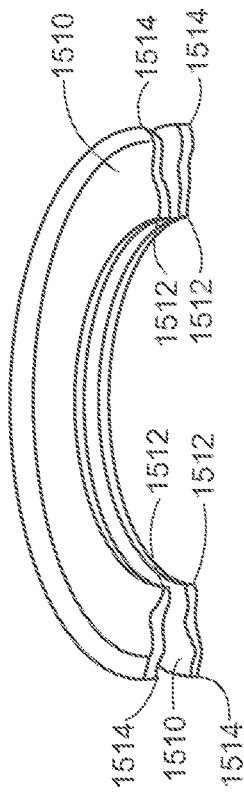
FIGS. 15B-15D show views of metal bellows diaphragms, in accordance with one embodiment.

Referring now to FIG. 15A, a cross section shows one embodiment of the rolling diaphragm embodiment. A metal bellows 1500 is positioned along a piston rod 1502 to seal off a crankcase (shown as 1304 in FIG. 13G) from a working space or airlock (shown as 1306 and 1312 in FIG. 13G). Metal bellows 1500 may be attached to a top seal piston 1504 and a stationary mounting surface 1506. Alternatively, metal bellows 1500 may be attached to a bottom seal piston (not shown), and a top stationary mounting surface. In one embodiment the bottom stationary mounting surface may be a crankcase surface or an inner airlock or working space surface, and the top stationary mounting surface may be an inner crankcase surface, or an outer airlock or working space surface. Metal bellows 1500 may be attached by welding, brazing, or any mechanical means known in the art.

Figure 15C:
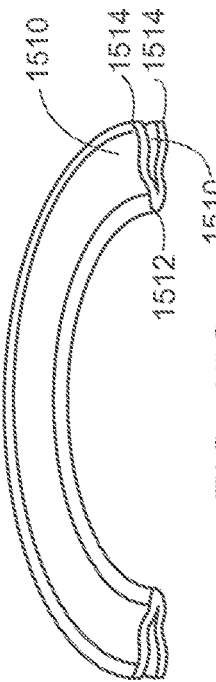
Figure 15D:
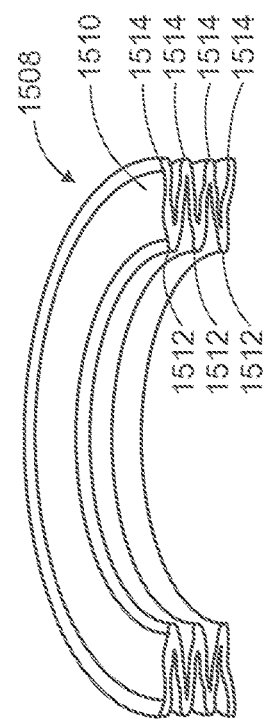

FIGS. 15B-15G depict a perspective cross sectional view of various embodiments of the metal bellows, wherein the metal bellows is a welded metal bellows 1508. In some embodiments of the metal bellows, the metal bellows is preferably a micro-welded metal bellows. In some embodiments, the welded metal bellows 1508 includes a plurality of diaphragms 1510, which are welded to each other at either an inner end 1512 or an outer end 1514, as shown in FIGS. 15C and 15D. In some embodiments, diaphragms 1510 may be crescent shaped 1516, flat 1518, rippled 1520, or any other shape known in the art.

Additionally, the metal bellows may alternatively be formed mechanically by means such as die forming, hydroforming, explosive hydroforming, hydramolding, or any other means known in the art.

The metal bellows may be made of any type of metal, including but not limited to, steel, stainless steel, stainless steel 374, AM-350 stainless steel, Inconel, Hastelloy, Haynes, titanium, or any other high-strength, corrosion-resistant material.

In one embodiment, the metal bellows used are those available from Senior Aerospace Metal Bellows Division, Sharon, MA, or American BOA, Inc., Cumming, GA Rolling Diaphragm and/or Bellows Embodiments Various embodiments of the rolling diaphragm and/or bellows, which function to seal, are described above. Further embodiments will be apparent to those of skill in the art based on the description above and the additional description below relating to the parameters of the rolling diaphragm and/or bellows.

In some embodiments, the pressure atop the rolling diaphragm or bellows, in the airlock space or airlock area (both terms are used interchangeably), is the mean-working-gas pressure for the machine, which, in some embodiments is an engine, while the pressure below the rolling diaphragm and/or bellows, in the crankcase area, is ambient/atmospheric pressure. In these embodiments, the rolling diaphragm and/or bellows is required to operate with as much as 3000 psi across it (and in some embodiments, up to 1500 psi or higher). In this case, the rolling diaphragm and/or bellows seal forms the working gas (helium, hydrogen, or otherwise) containment barrier for the machine (engine in the exemplary embodiment). Also, in these embodiments, the need for a heavy, pressure-rated, structural vessel to contain the bottom end of the engine is eliminated, since it is now required to simply contain lubricating fluid (oil is used as a lubricating fluid in the exemplary embodiment) and air at ambient pressure, like a conventional internal combustion ("IC") engine.

Figure 15H:
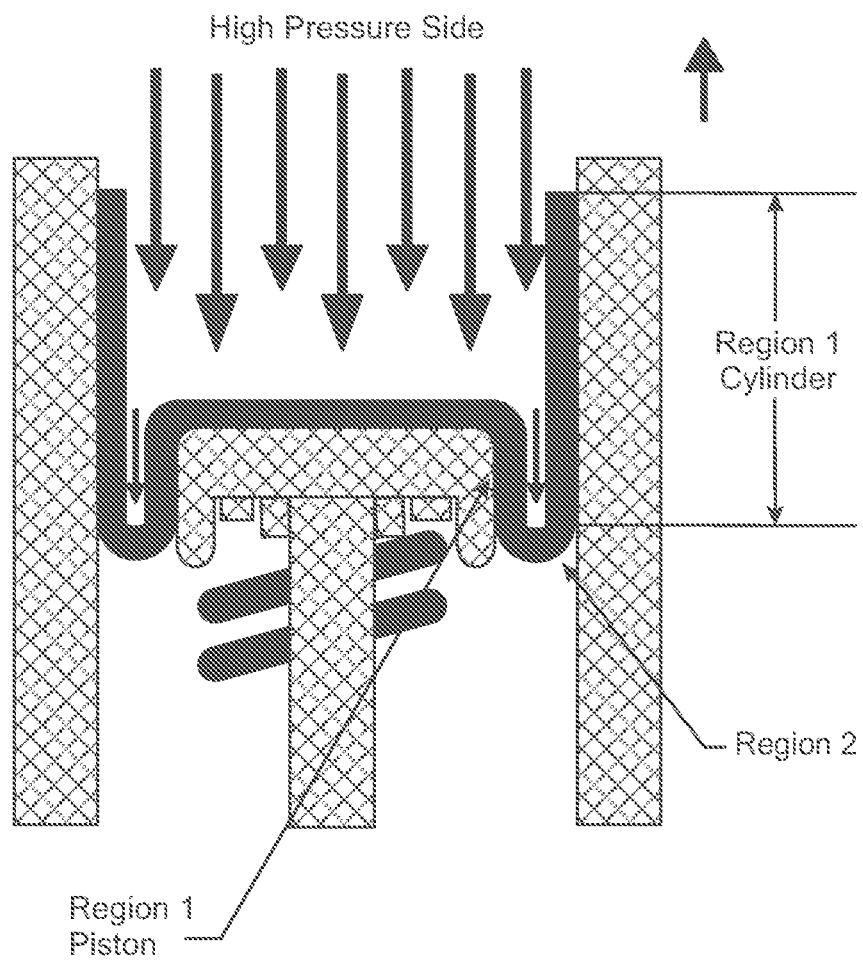
FIG. 15H shows a schematic of a rolling diaphragm identifying various load regions.
Figure 15I:
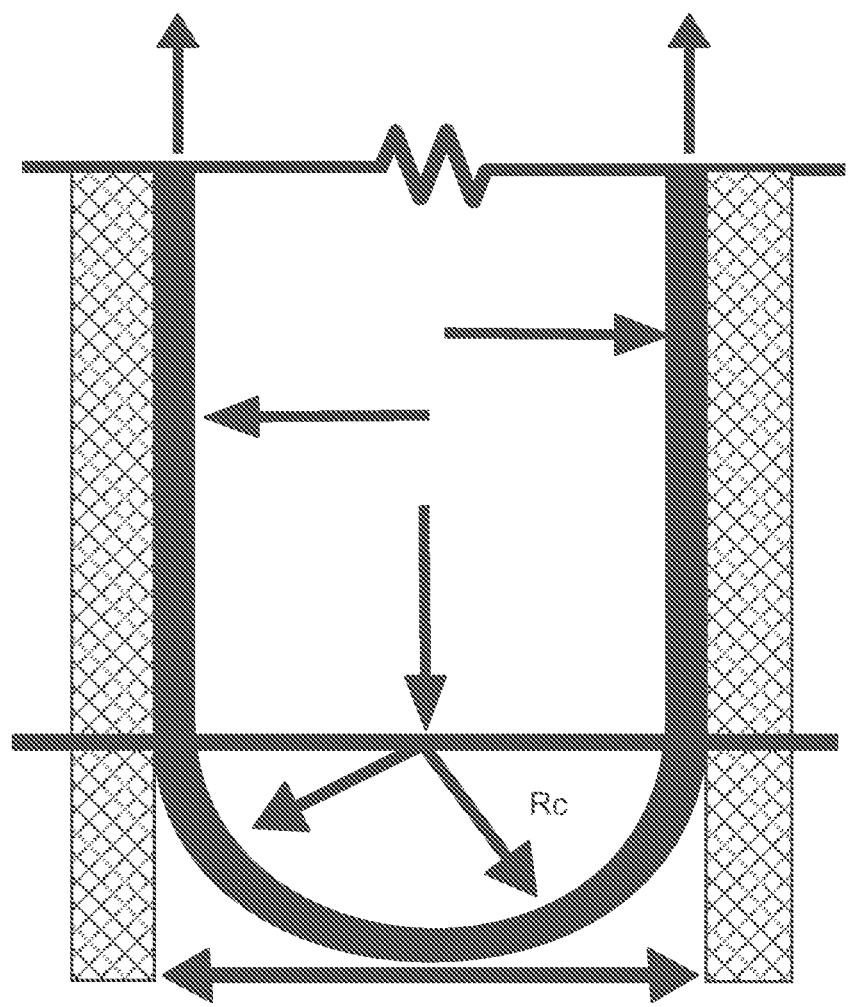
FIG. 15I shows a schematic of the rolling diaphragm identifying the convolution region.

The capability to use a rolling diaphragm and/or bellows seal with such an extreme pressure across it depends on the interaction of several parameters. Referring now to FIG. 15H, an illustration of the actual load on the rolling diaphragm or bellows material is shown. As shown, the load is a function of the pressure differential and the annular gap area for the installed rolling diaphragm or bellows seal.

Region 1 represents the portions of the rolling diaphragm and/or bellows that are in contact with the walls formed by the piston and cylinder. The load is essentially a tensile load in the axial direction, due to the pressure differential across the rolling diaphragm and/or bellows. This tensile load due to the pressure across the rolling diaphragm and/or bellows can be expressed as:

$$L_t = P_d * A_a$$

Where
  $L_t$=Tensile Load and
  $P_d$=Pressure Differential
  $A_a$=Annular Area
and $$A_a = p/4 * (D^2 - d^2)$$

Where
  D=Cylinder Bore and
  d=Piston Diameter

The tensile component of stress in the bellows material can be approximated as:

$$S_t = L_t / (p * (D+d) * tb)$$

Which reduces to:

$$S_t = P_d/4 * (D-d)/tb$$

Later, we will show the relationship of radius of convolution, $R_c$, to Cylinder bore (D) and Piston Diameter (d) to be defined as:

$$R_c = (D-d)/4$$

So, this formula for St reduces to its final form:

$$S_t = P_d * R_c / t_b$$

Where
  $t_b$=thickness of bellows material

Still referring to FIG. 15H, Region 2 represents the convolution. As the rolling diaphragm and/or bellows material turns the corner, in the convolution, the hoop stress imposed on the rolling diaphragm and/or bellows material may be calculated. For the section of the bellows forming the convolution, the hoop component of stress can be closely approximated as:

$$S_h = P_d * R_c / t_b$$

The annular gap that the rolling diaphragm and/or bellows rolls within is generally referred to as the convolution area. The rolling diaphragm and/or bellows fatigue life is generally limited by the combined stress from both the tensile (and hoop) load, due to pressure differential, as well as the fatigue due to the bending as the fabric rolls through the convolution. The radius that the fabric takes on during this 'rolling' is defined here as the radius of convolution, Rc.

$$R_c = (D-d)/4$$

The bending stress, Sb, in the rolling diaphragm and/or bellows material as it rolls through the radius of convolution, Rc, is a function of that radius, as well as the thickness of the materials in bending. For a fiber-reinforced material, the stress in the fibers themselves (during the prescribed deflection in the exemplary embodiments) is reduced as the fiber diameter decreases. The lower resultant stress for the same level of bending allows for an increased fatigue life limit. As the fiber diameter is further reduced, flexibility to decrease the radius of convolution Rc is achieved, while keeping the bending stress in the fiber under its endurance limit. At the same time, as Rc decreases, the tensile load on the fabric is reduced since there is less unsupported area in the annulus between the piston and cylinder. The smaller the fiber diameter, the smaller the minimum Rc, the smaller the annular area, which results in a higher allowable pressure differential.

For bending around a prescribed radius, the bending moment is approximated by:

$$M = E * I / R$$

Where:
  M=Bending Moment
  E=Elastic Modulus
  I=Moment of Inertia
  R=Radius of Bend Classical bending stress, $S_b$, is calculated as:

$$S_b = M * Y / I$$

Where:
  Y=Distance above neutral axis of bending

Substituting yields:

$$S_b = (E * I / R) * Y / I$$

$$S_b = E * Y / R$$

Assuming bending is about a central neutral axis:

$$Y_{max} = t_b / 2$$

$$S_b = E * t_b / (2 * R)$$

In some embodiments, rolling diaphragm and/or bellows designs for high cycle life are based on geometry where the bending stress imposed is kept about one order of magnitude less than the pressure-based loading (hoop and axial stresses). Based on the equation: Sb=E*tb/(2*R), it is clear that minimizing tb in direct proportion to Rc should not increase the bending stress. The minimum thickness for the exemplary embodiments of the rolling diaphragm and/or bellows material or membrane is directly related to the minimum fiber diameter that is used in the reinforcement of the elastomer. The smaller the fibers used, the smaller resultant Rc for a given stress level.

Another limiting component of load on the rolling diaphragm and/or bellows is the hoop stress in the convolution (which is theoretically the same in magnitude as the axial load while supported by the piston or cylinder). The governing equation for that load is as follows:

$$Sh = Pd * Rc / tb$$

Thus, if Rc is decreased in direct proportion to tb, then there is no increase of stress on the membrane in this region. However, if this ratio is reduced in a manner that decreases Rc to a greater ratio than tb then parameters must be balanced. Thus, decreasing tb with respect to Rc requires the rolling diaphragm and/or bellows to carry a heavier stress due to pressure, but makes for a reduced stress level due to bending. The pressure-based load is essentially constant, so this may be favorable—since the bending load is cyclic, therefore it is the bending load component that ultimately limits fatigue life.

For bending stress reduction, tb ideally should be at a minimum, and Rc ideally should be at a maximum. E ideally is also at a minimum. For hoop stress reduction, Rc ideally is small, and tb ideally is large.

Thus, the critical parameters for the rolling diaphragm and/or bellows membrane material are:
  E, Elastic Modulus of the membrane material;
  tb, membrane thickness (and/or fiber diameter);
  Sut, Ultimate tensile strength of the rolling diaphragm and/or bellows; and Slcf, The limiting fatigue strength of the rolling diaphragm and/or bellows.

Thus, from E, tb and Sut, the minimum acceptable Rc may be calculated. Next, using Rc, Slcf, and tb, the maximum Pd may be calculates. Rc may be adjusted to shift the bias of load (stress) components between the steady state pressure stress and the cyclic bending stress. Thus, the ideal rolling diaphragm and/or bellows material is extremely thin, extremely strong in tension, and very limber in flexion.

Thus, in some embodiments, the rolling diaphragm and/or bellows material (sometimes referred to as a "membrane"), is made from carbon fiber nanotubes. However, additional small fiber materials may also be used, including, but not limited to nanotube fibers that have been braided, nanotube untwisted yarn fibers, or any other conventional materials, including but not limited to KEVLAR, glass, polyester, synthetic fibers and any other material or fiber having a desirable diameter and/or other desired parameters as described in detail above.

Piston Seals and Piston Rod Seals

Figure 16:
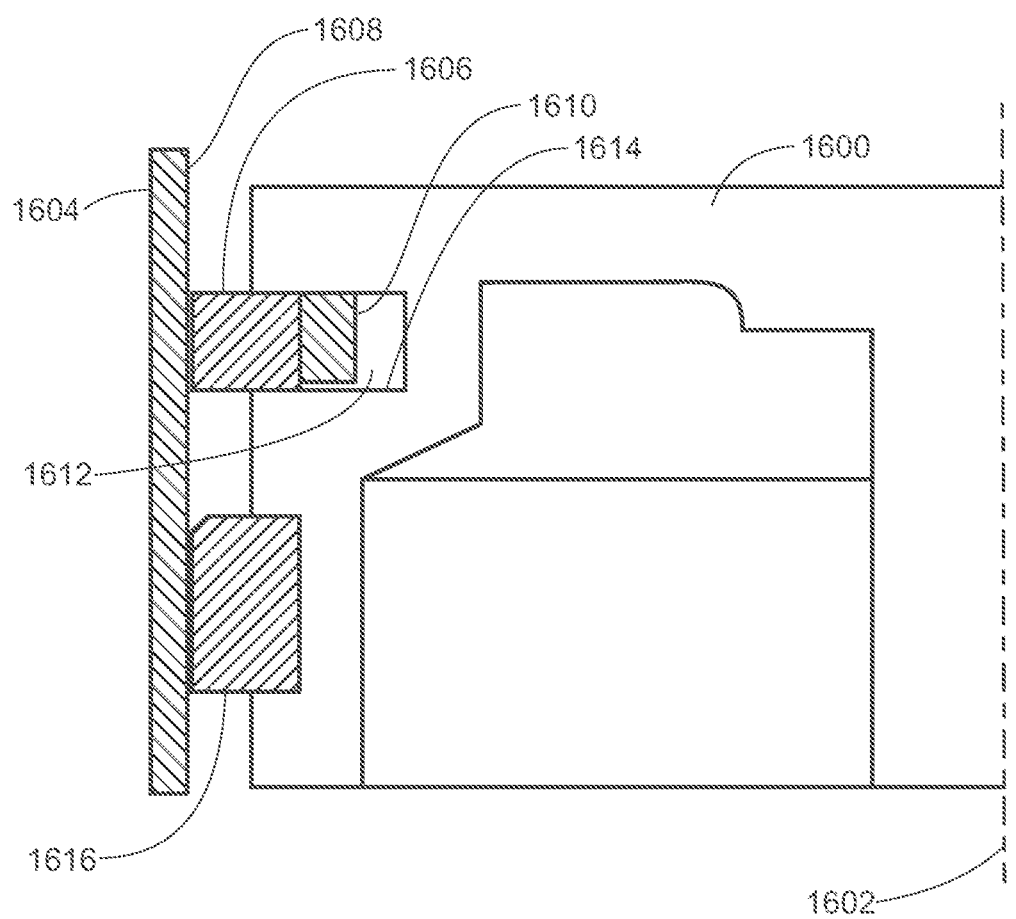
FIG. 16 shows a view of a piston and piston seal in accordance with one embodiment.

Referring now to FIG. 13G, an embodiment of the machine is shown wherein an engine 1326, such as a Stirling cycle engine, includes at least one piston rod seal 1314, a piston seal 1324, and a piston guide ring 1322, (shown as 1616 in FIG. 16). Various embodiments of the piston seal 1324 and the piston guide ring 1322 are further discussed below, and in U.S. patent application Ser. No. 10/175,502 (now abandoned), which, as mentioned before, is incorporated by reference.

FIG. 16 shows a partial cross section of the piston 1600, driven along the central axis 1602 of cylinder, or the cylinder 1604. The piston seal (shown as 1324 in FIG. 13G) may include a seal ring 1606, which provides a seal against the contact surface 1608 of the cylinder 1604. The contact surface 1608 is typically a hardened metal (preferably 58-62 RC) with a surface finish of 12 RMS or smoother. The contact surface 1608 may be metal which has been case hardened, such as 8260 hardened steel, which may be easily case hardened and may be ground and/or honed to achieve a desired finish. The piston seal may also include a backing ring 1610, which is sprung to provide a thrust force against the seal ring 1606 thereby providing sufficient contact pressure to ensure sealing around the entire outward surface of the seal ring 1606. The seal ring 1606 and the backing ring 1610 may together be referred to as a piston seal composite ring. In some embodiments, the at least one piston seal may seal off a warm portion of cylinder 1604 from a cold portion of cylinder 1604.

Figure 17:
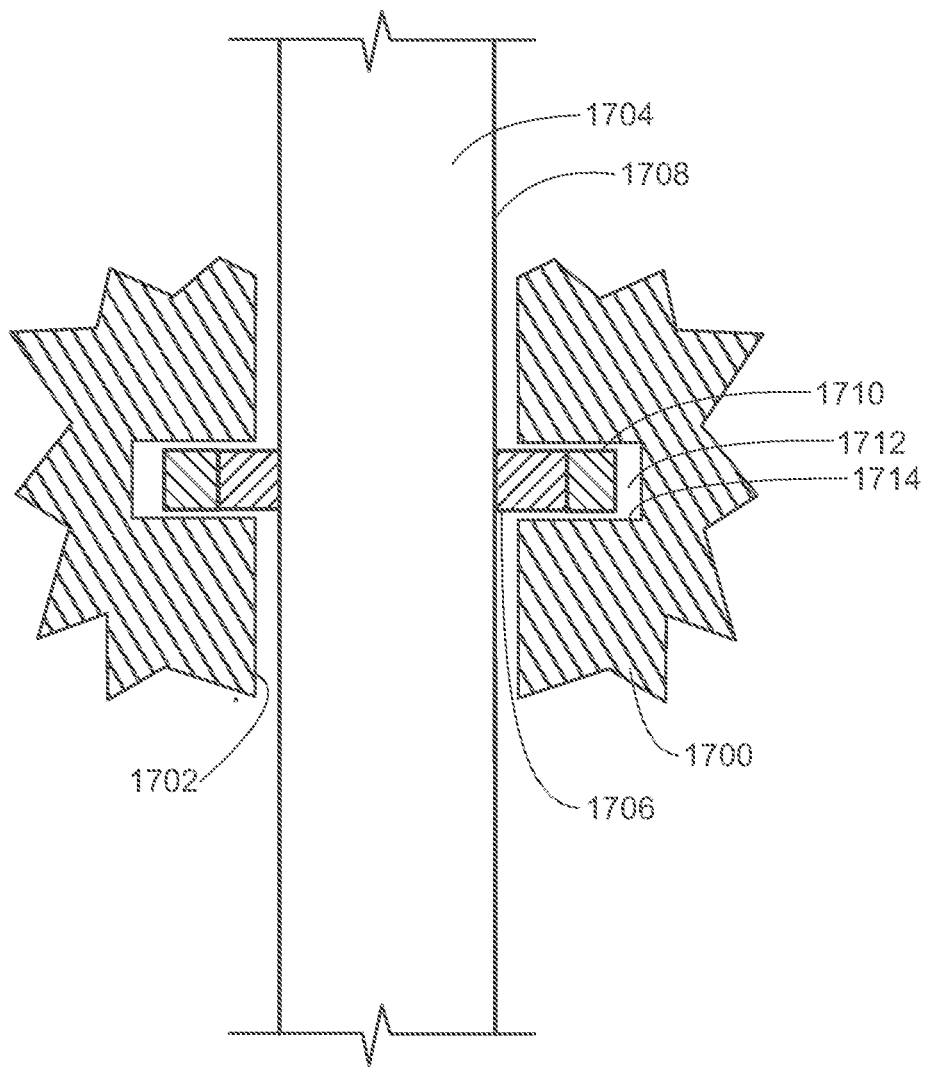
FIG. 17 shows a view of a piston rod and piston rod seal in accordance with one embodiment.

Referring now to FIG. 17, some embodiments include a piston rod seal (shown as 1314 in FIG. 13G) mounted in the piston rod cylinder wall 1700, which, in some embodiments, may include a seal ring 1706, which provides a seal against the contact surface 1708 of the piston rod 1604 (shown as 1302 in FIG. 13G). The contact surface 1708 in some embodiments is a hardened metal (preferably 58-62 RC) with a surface finish of 12 RMS or smoother. The contact surface 1708 may be metal which has been case hardened, such as 8260 hardened steel, which may be easily case hardened and may be ground and/or honed to achieve a desired finish. The piston seal may also include a backing ring 1710, which is sprung to provide a radial or hoop force against the seal ring 1706 thereby providing sufficient contact hoop stress to ensure sealing around the entire inward surface of seal ring 1706. The seal ring 1706 and the backing ring 1710 may together be referred to as a piston rod seal composite ring.

In some embodiments, the seal ring and the backing ring may be positioned on a piston rod, with the backing exerting an outward pressure on the seal ring, and the seal ring may come into contact with a piston rod cylinder wall 1702. These embodiments require a larger piston rod cylinder length than the previous embodiment. This is because the contact surface on the piston rod cylinder wall 1702 will be longer than in the previous embodiment, where the contact surface 1708 lies on the piston rod itself. In yet another embodiment, piston rod seals may be any functional seal known in the art including, but not limited to, an o-ring, a graphite clearance seal, graphite piston in a glass cylinder, or any air pot, or a spring energized lip seal. In some embodiments, anything having a close clearance may be used, in other embodiments, anything having interference, for example, a seal, is used. In the exemplary embodiment, a spring energized lip seal is used. Any spring energized lip seal may be used, including those made by BAL SEAL Engineering, Inc., Foothill Ranch, CA In some embodiments, the seal used is a BAL SEAL Part Number X558604.

The material of the seal rings 1606 and 1706 is chosen by considering a balance between the coefficient of friction of the seal rings 1606 and 1706 against the contact surfaces 1608 and 1708, respectively, and the wear on the seal rings 1606 and 1706 it engenders. In applications in which piston lubrication is not possible, such as at the high operating temperatures of a Stirling cycle engine, the use of engineering plastic rings is used. The embodiments of the composition include a nylon matrix loaded with a lubricating and wear-resistant material. Examples of such lubricating materials include PTFE/silicone, PTFE, graphite, etc. Examples of wear-resistant materials include glass fibers and carbon fibers. Examples of such engineering plastics are manufactured by LNP Engineering Plastics, Inc. of Exton, PA Backing rings 1610 and 1710 is preferably metal.

The fit between the seal rings 1606 and 1706 and the seal ring grooves 1612 and 1712, respectively, is preferably a clearance fit (about 0.002"), while the fit of the backing rings 1610 and 1710 is preferably a looser fit, of the order of about 0.005" in some embodiments. The seal rings 1606 and 1706 provide a pressure seal against the contact surfaces 1608 and 1708, respectively, and also one of the the surfaces 1614 and 1714 of the seal ring grooves 1612 and 1712, respectively, depending on the direction of the pressure difference across the rings 1606 and 1706 and the direction of the piston 1600 or the piston rod 1704 travel.

Figure 18A:
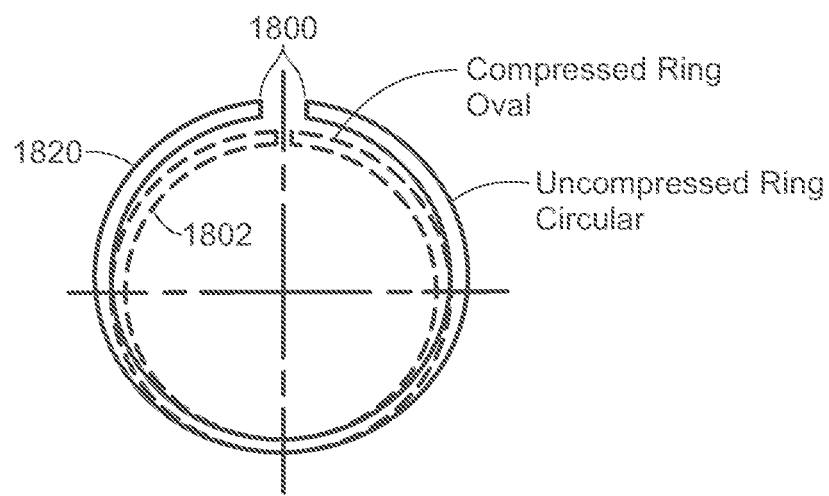
FIG. 18A shows a view of a piston seal backing ring in accordance with one embodiment.
Figure 18B:
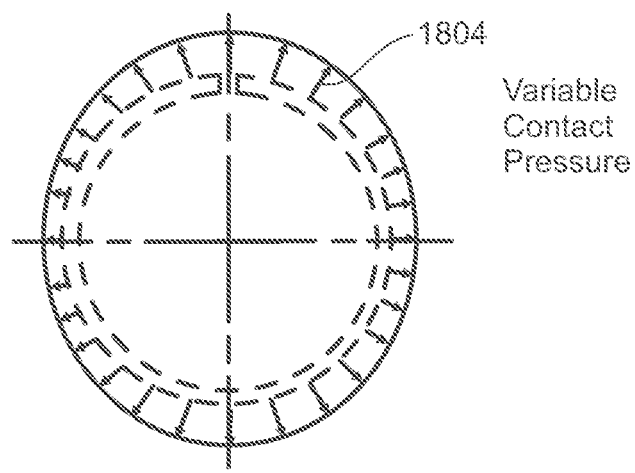
FIG. 18B shows a pressure diagram for a backing ring in accordance with one embodiment.

FIGS. 18A and 18B show that if the backing ring 1820 is essentially circularly symmetrical, but for the gap 1800, it will assume, upon compression, an oval shape, as shown by the dashed backing ring 1802. The result may be an uneven radial or hoop force (depicted by arrows 1804) exerted on the seal ring (not shown, shown as 1606 and 1706 in FIGS. 16 and 17), and thus an uneven pressure of the seal rings against the contact surfaces (not shown, shown as 1608 and 1708 in FIGS. 16 and 17) respectively, causing uneven wear of the seal rings and in some cases, failure of the seals.

Figure 18C:
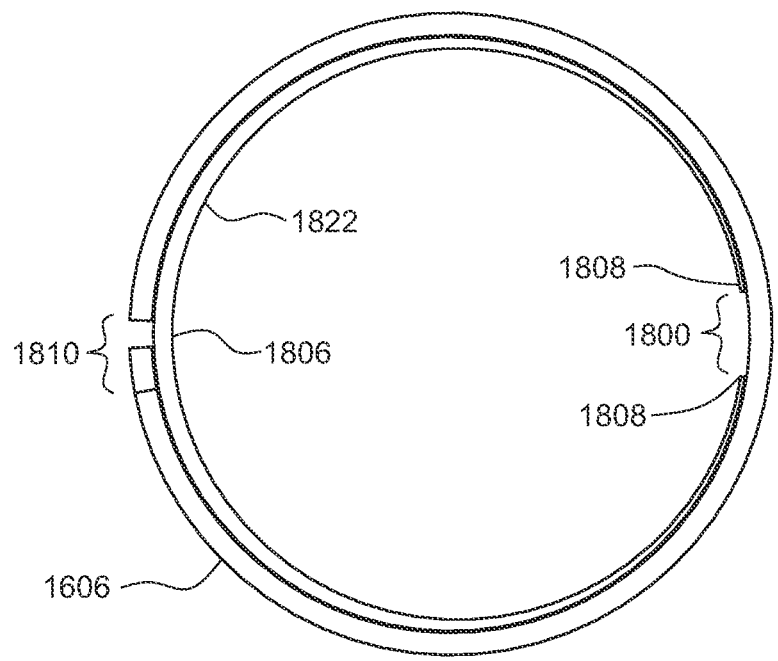
FIGS. 18C and 18D show a piston seal in accordance with one embodiment.
Figure 18D:
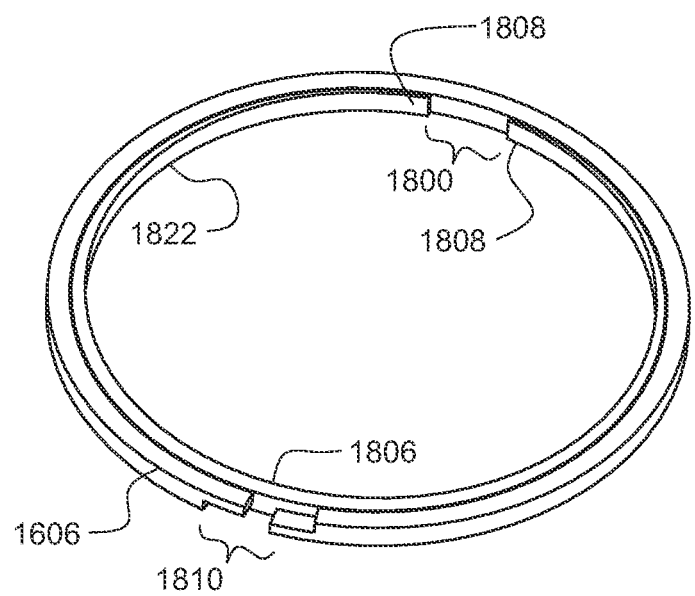

A solution to the problem of uneven radial or hoop force exerted by the piston seal backing ring 1820, in accordance with an embodiment, is a backing ring 1822 having a cross-section varying with circumferential displacement from the gap 1800, as shown in FIGS. 18C and 18D. A tapering of the width of the backing ring 1822 is shown from the position denoted by numeral 1806 to the position denoted by numeral 1808. Also shown in FIGS. 18C and 18D is a lap joint 1810 providing for circumferential closure of the seal ring 1606. As some seals will wear significantly over their lifetime, the backing ring 1822 should provide an even pressure (depicted by numeral 1904 in FIG. 19B) of a range of movement. The tapered backing ring 1822 shown in FIGS. 18C and 18D may provide this advantage.

Figure 19A:
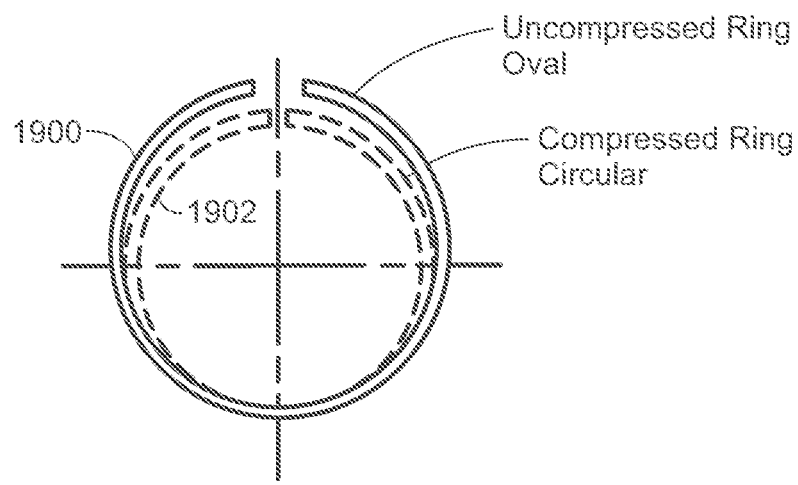
FIG. 19A shows a view of a piston seal backing ring in accordance with one embodiment.
Figure 19B:
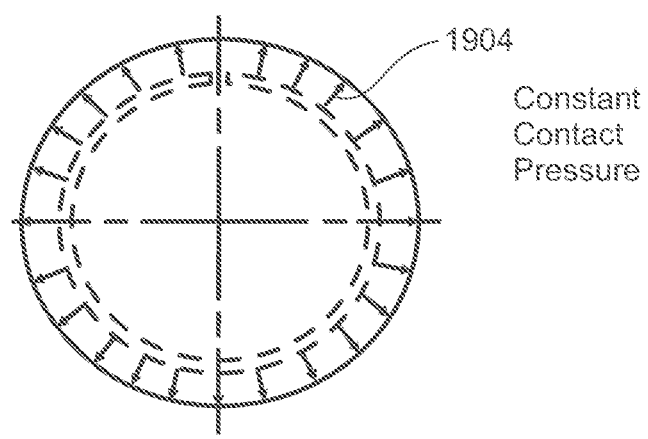
FIG. 19B shows a pressure diagram for a piston seal backing ring in accordance with one embodiment.

FIGS. 19A and 19B illustrate another solution to the problem of uneven radial or hoop force of the piston seal ring against the piston cylinder, in accordance with some embodiments. As shown in FIG. 19A, backing ring 1910 is fashioned in an oval shape, so that upon compression within the cylinder, the ring assumes the circular shape shown by dashed backing ring 1902. A constant contact pressure between the seal ring and the cylinder contact surface may thus be provided by an even radial force 1904 of backing ring 1902, as shown in FIG. 19B.

Figure 18E:
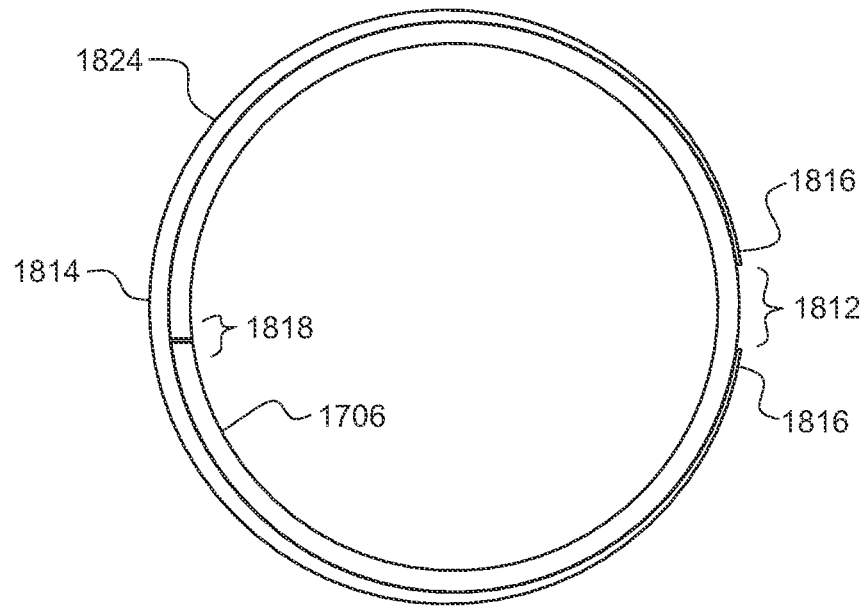
FIGS. 18E and 18F show a piston rod seal in accordance with one embodiment.
Figure 18F:
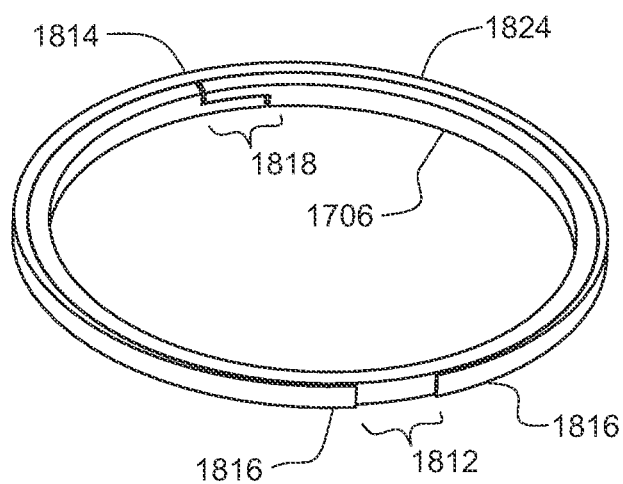

A solution to the problem of uneven radial or hoop force exerted by the piston rod seal backing ring, in accordance with some embodiments, is a backing ring 1824 having a cross-section varying with circumferential displacement from gap 1812, as shown in FIGS. 18E and 18F. A tapering of the width of backing ring 1824 is shown from the position denoted by numeral 1814 to the position denoted by numeral 1816. Also shown in FIGS. 18E and 18F is a lap joint 1818 providing for circumferential closure of seal ring 1706. As some seals will wear significantly over their lifetime, backing ring 1824 should provide an even pressure (depicted by numeral 2004 in FIG. 20B) of a range of movement. The tapered backing ring 1824 shown in FIGS. 18E and 18F may provide this advantage.

Figure 20A:
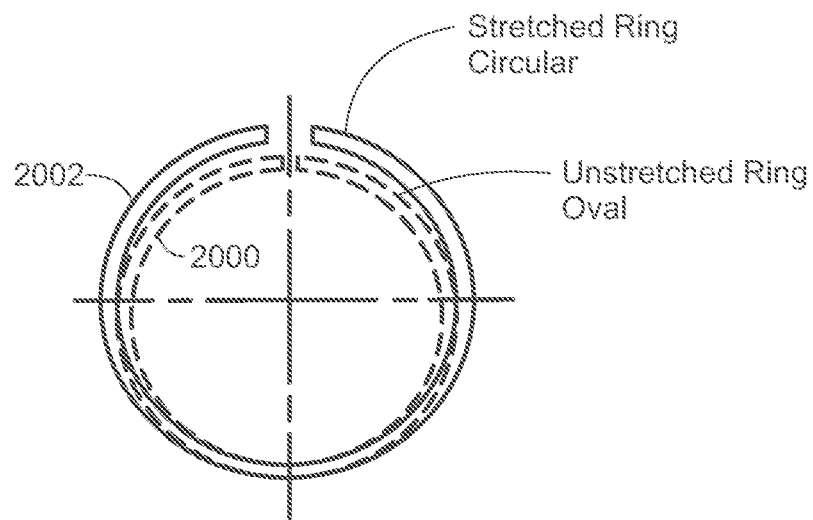
FIG. 20A shows a view of a piston rod seal backing ring in accordance with one embodiment.
Figure 20B:
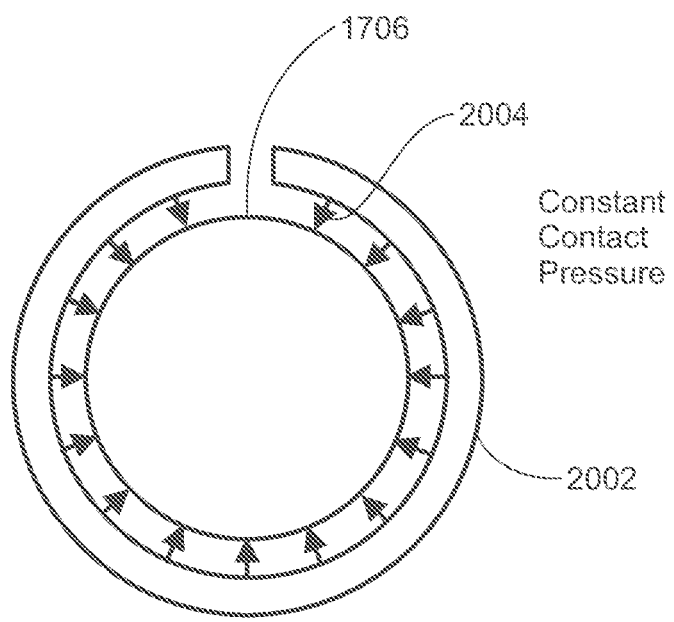
FIG. 20B shows a pressure diagram for a piston rod seal backing ring in accordance with one embodiment.

FIGS. 20A and 20B illustrate another solution to the problem of uneven radial or hoop force of the piston rod seal ring against the piston rod contact surface, in accordance with some embodiments. As shown in FIG. 20A, backing ring (shown by dashed backing ring 2000) is fashioned as an oval shape, so that upon expansion within the cylinder, the ring assumes the circular shape shown by backing ring 2002. A constant contact pressure between the seal ring 1706 and the cylinder contact surface may thus be provided by an even radial thrust force 2004 of backing ring 2002, as shown in FIG. 20B.

Figure 21:
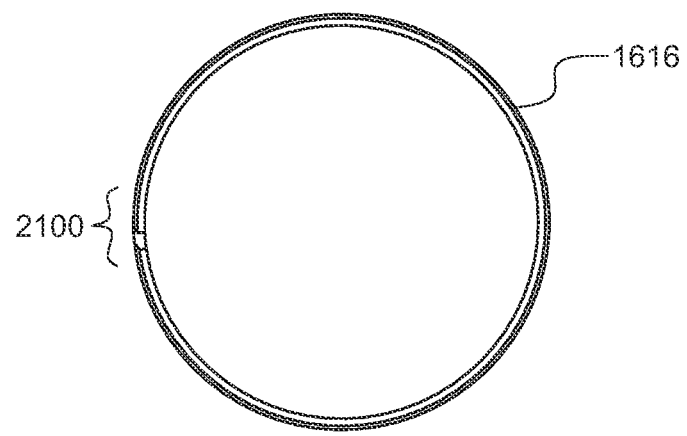
FIG. 21 shows views of a piston guide ring in accordance with one embodiment.
Figure 21:
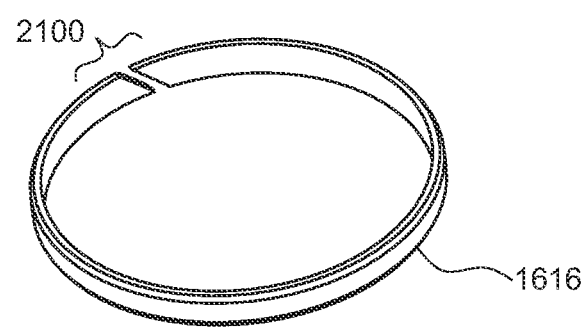

Referring again to FIG. 16, at least one guide ring 1616 may also be provided, in accordance with some embodiments, for bearing any side load on piston 1600 as it moves up and down the cylinder 1604. Guide ring 1616 is also preferably fabricated from an engineering plastic material loaded with a lubricating material. A perspective view of guide ring 1616 is shown in FIG. 21. An overlapping joint 2100 is shown and may be diagonal to the central axis of guide ring 1616.

Lubricating Fluid Pump and Lubricating Fluid Passageways

Figure 22:
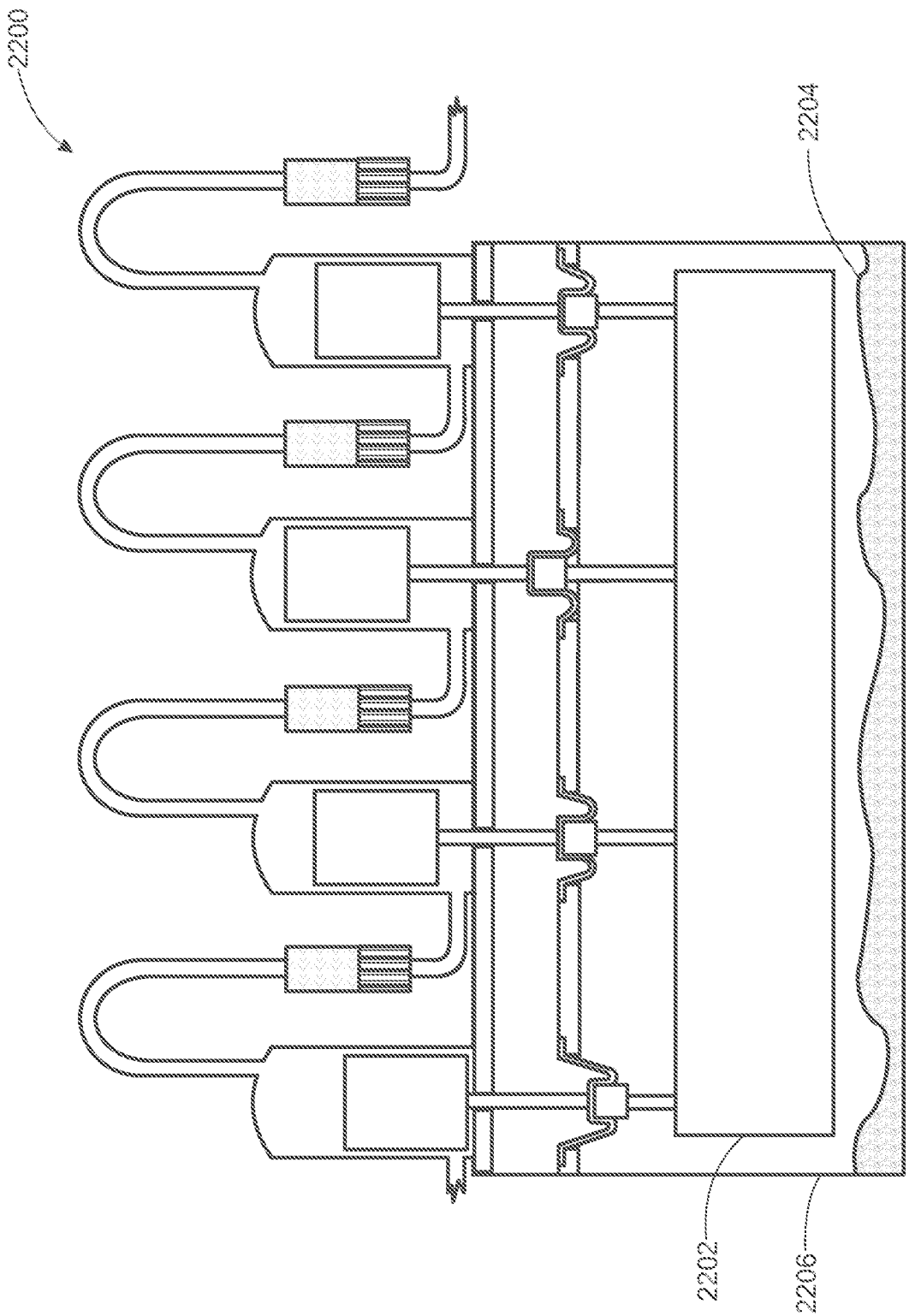
FIG. 22 shows an unwrapped schematic illustration of a working space and cylinders in accordance with one embodiment.

Referring now to FIG. 22, a representative illustration of one embodiment of the engine 2200 for the machine is shown having a rocking beam drive 2202 and lubricating fluid 2204. In some embodiments, the lubricating fluid is oil. The lubricating fluid is used to lubricate engine parts in the crankcase 2206, such as hydrodynamic pressure fed lubricated bearings. Lubricating the moving parts of the engine 2200 serves to further reduce friction between engine parts and further increase engine efficiency and engine life. In some embodiments, lubricating fluid may be placed at the bottom of the engine, also known as an oil sump, and distributed throughout the crankcase. The lubricating fluid may be distributed to the different parts of the engine 2200 by way of a lubricating fluid pump, wherein the lubricating fluid pump may collect lubricating fluid from the sump via a filtered inlet. In the exemplary embodiment, the lubricating fluid is oil and thus, the lubricating fluid pump is herein referred to as an oil pump. However, the term "oil pump" is used only to describe the exemplary embodiment and other embodiments where oil is used as a lubricating fluid, and the term shall not be construed to limit the lubricating fluid or the lubricating fluid pump.

Figure 23A:
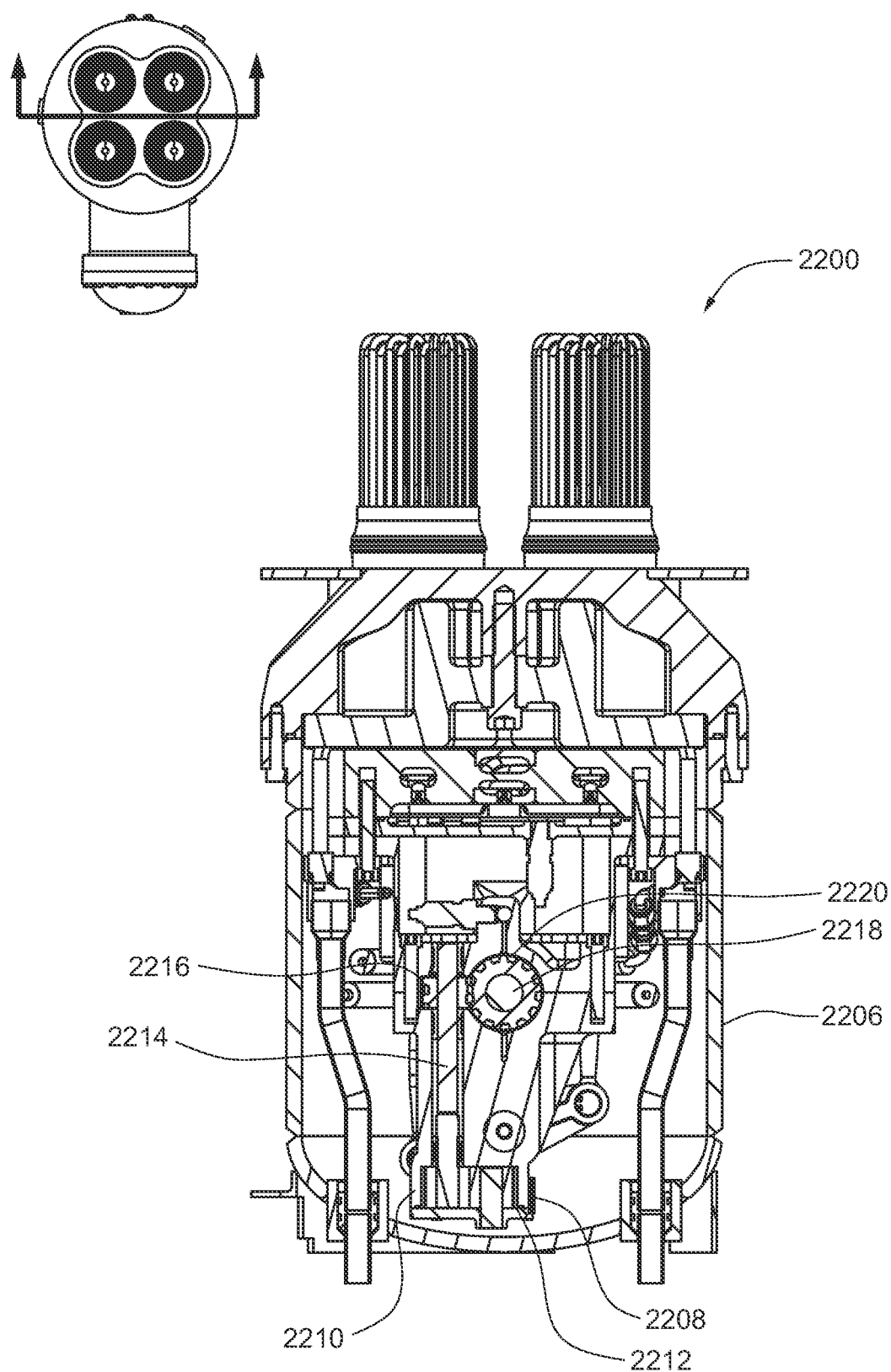
FIG. 23A shows a view of an engine in accordance with one embodiment.
Figure 23B:
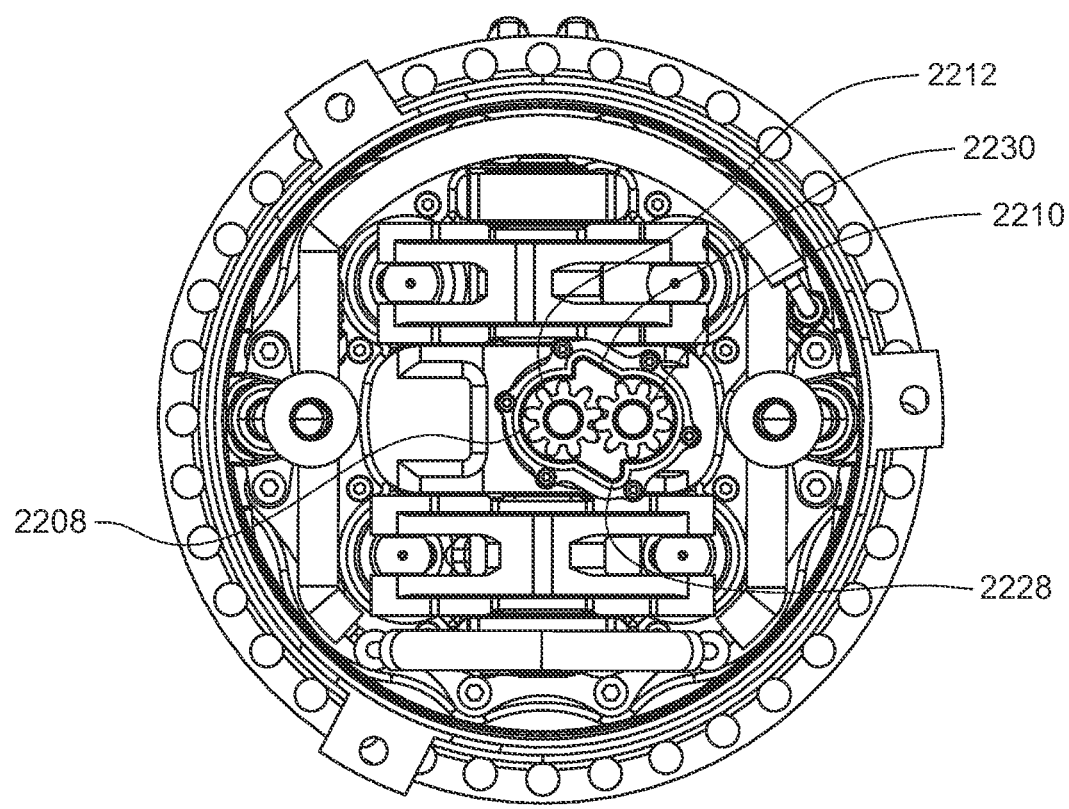
FIG. 23B shows a view of an engine in accordance with one embodiment.
Figure 24:
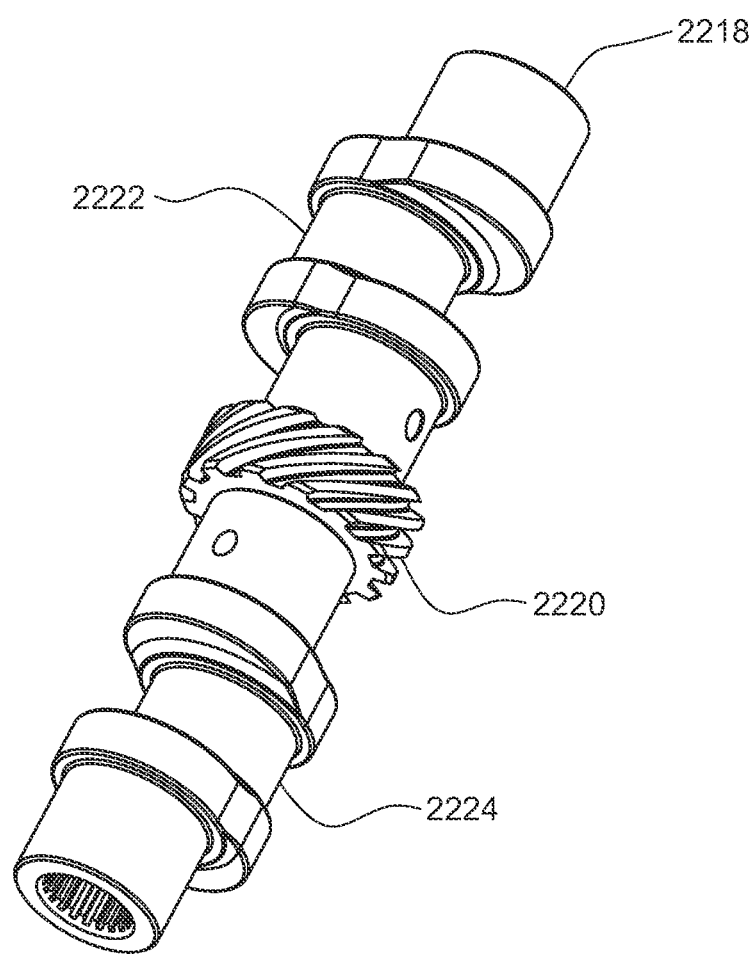
FIG. 24 shows a view of a crankshaft in accordance with one embodiment.

Referring now to FIGS. 23A and 23B, one embodiment of the engine is shown, wherein lubricating fluid is distributed to different parts of the engine 2200 that are located in the crankcase 2206 by a mechanical oil pump 2208. The oil pump 2208 may include a drive gear 2210 and an idle gear 2212. In some embodiments, the mechanical oil pump 2208 may be driven by a pump drive assembly. The pump drive assembly may include a drive shaft 2214 coupled to a drive gear 2210, wherein the drive shaft 2214 includes an intermediate gear 2216 thereon. The intermediate gear 2216 is preferably driven by a crankshaft gear 2220, wherein the crankshaft gear 2220 is coupled to the primary crankshaft 2218 of the engine 2200, as shown in FIG. 24. In this configuration, the crankshaft 2218 indirectly drives the mechanical oil pump 2208 via the crankshaft gear 2220, which drives the intermediate gear 2216 on the drive shaft 2214, which, in turn, drives the drive gear 2210 of the oil pump 2208.

The crankshaft gear 2220 may be positioned between the crankpins 2222 and 2224 of crankshaft 2218 in some embodiments, as shown in FIG. 24. In other embodiments, the crankshaft gear 2220 may be placed at an end of the crankshaft 2218, as shown in FIGS. 25A—25C.

For ease of manufacturing, the crankshaft 2218 may be composed of a plurality of pieces. In these embodiments, the crankshaft gear 2220 may be to be inserted between the crankshaft pieces during assembly of the crankshaft.

Figure 25A:
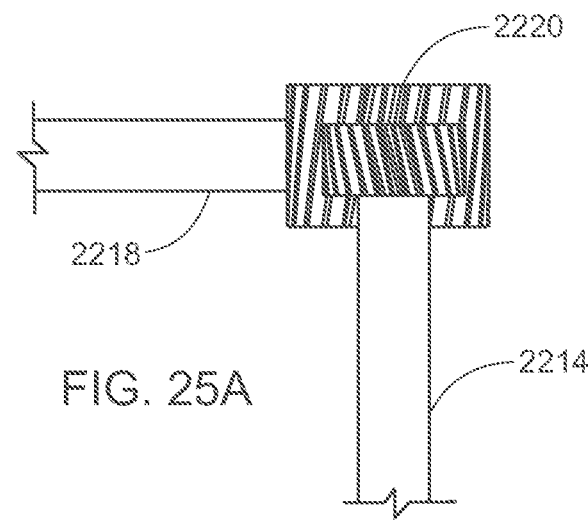
FIGS. 25A-25C show various configurations of pump drives in accordance with various embodiments.
Figure 25B:
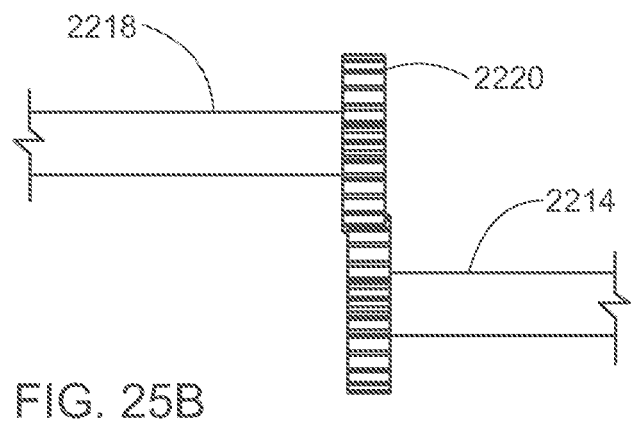

The drive shaft 2214, in some embodiments, may be positioned perpendicularly to the crankshaft 2218, as shown in FIGS. 23A and 25A. However, in some embodiments, the drive shaft 2214 may be positioned parallel to the crankshaft 2218, as shown in FIGS. 25B and 25C.

Figure 25C:
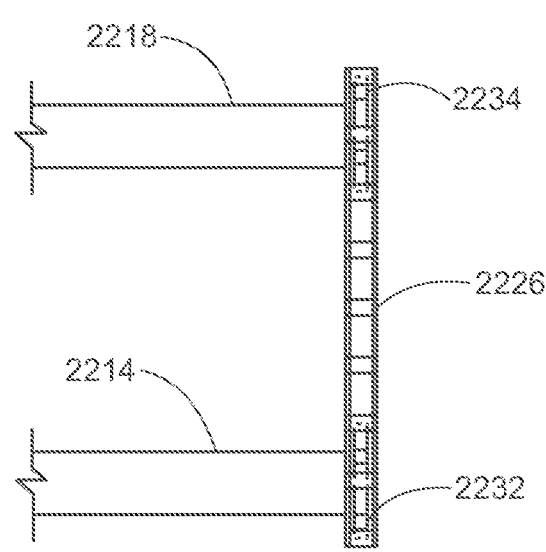
Figure 26A:
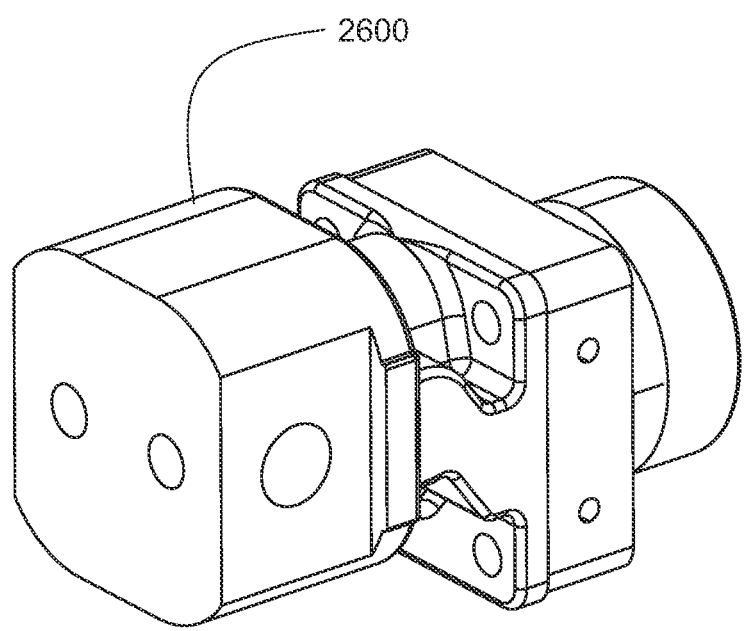
FIG. 26A show various views of an oil pump in accordance with one embodiment.
Figure 26B:
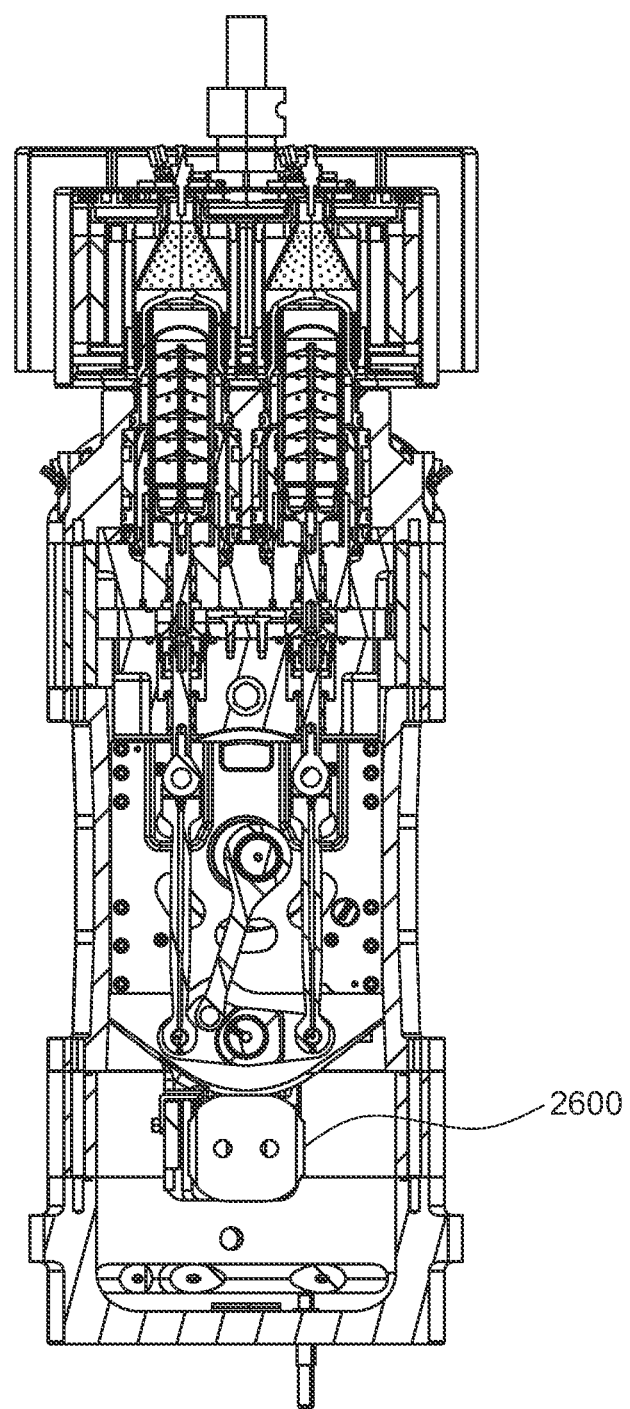
FIG. 26B shows a view of an engine in accordance with one embodiment.
Figure 26C:
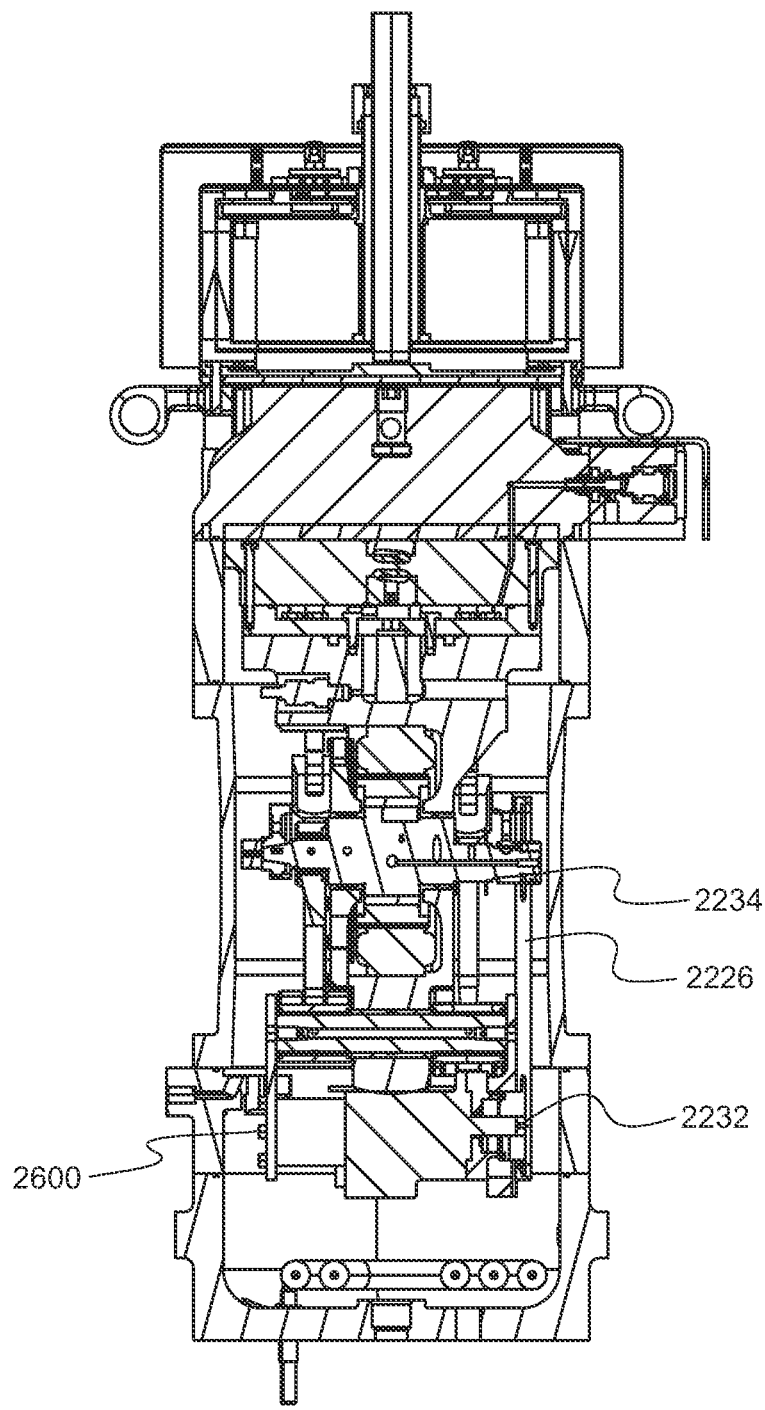
FIG. 26C shows another view of the engine depicted in FIG. 26B.
Figure 27A:
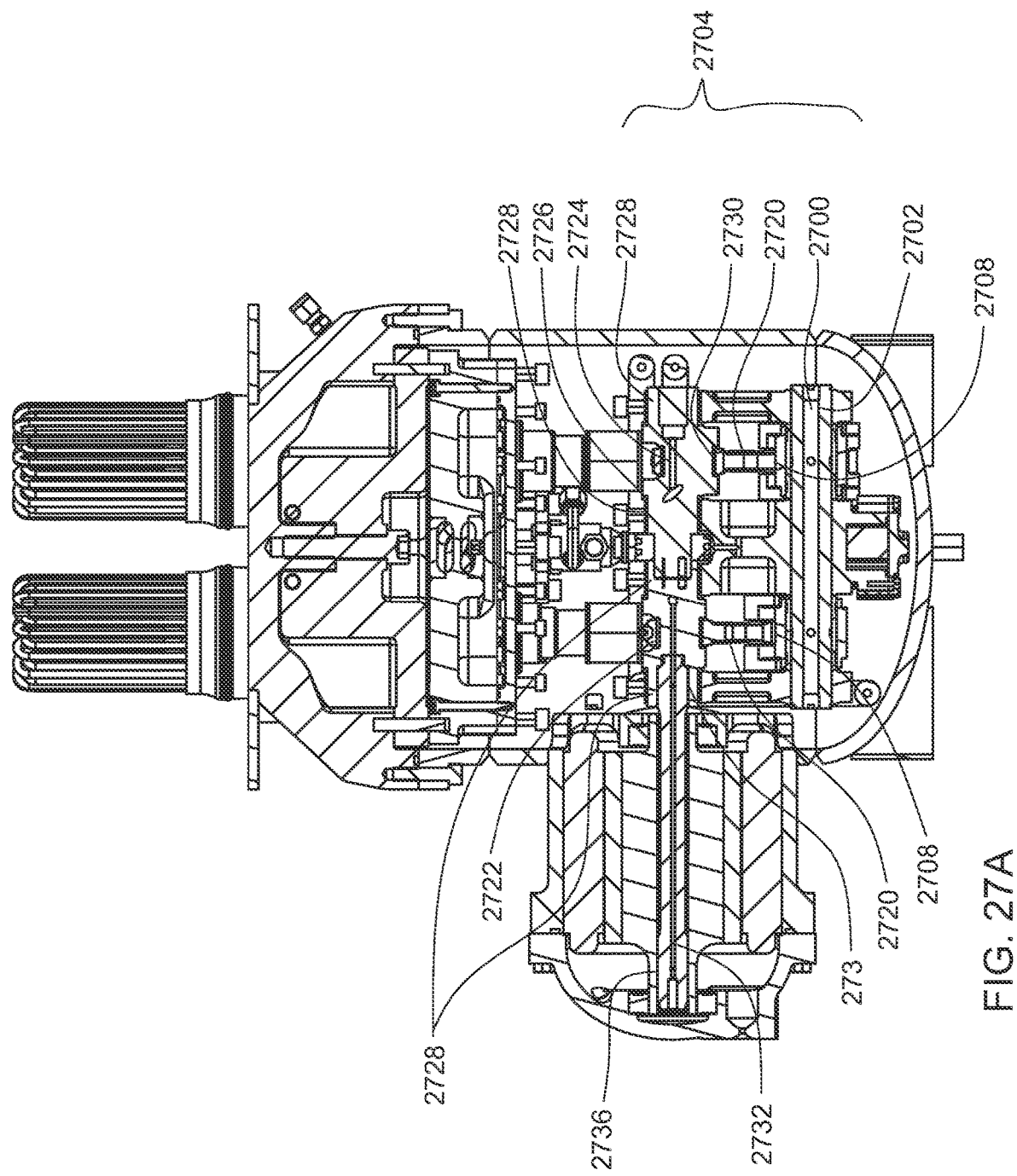
FIGS. 27A and 27B show views of an engine in accordance with one embodiment.
Figure 27B:
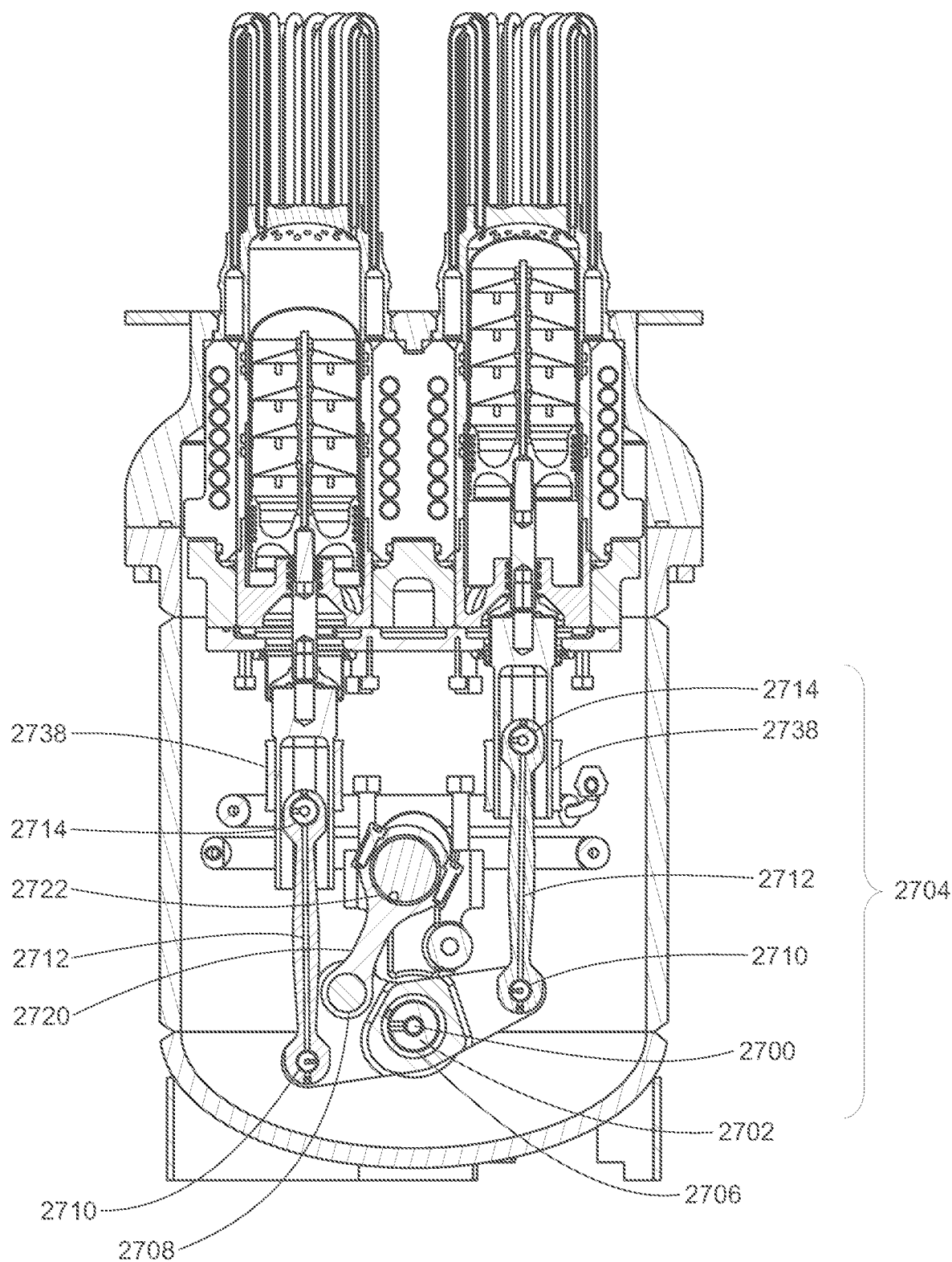
Figure 27C:
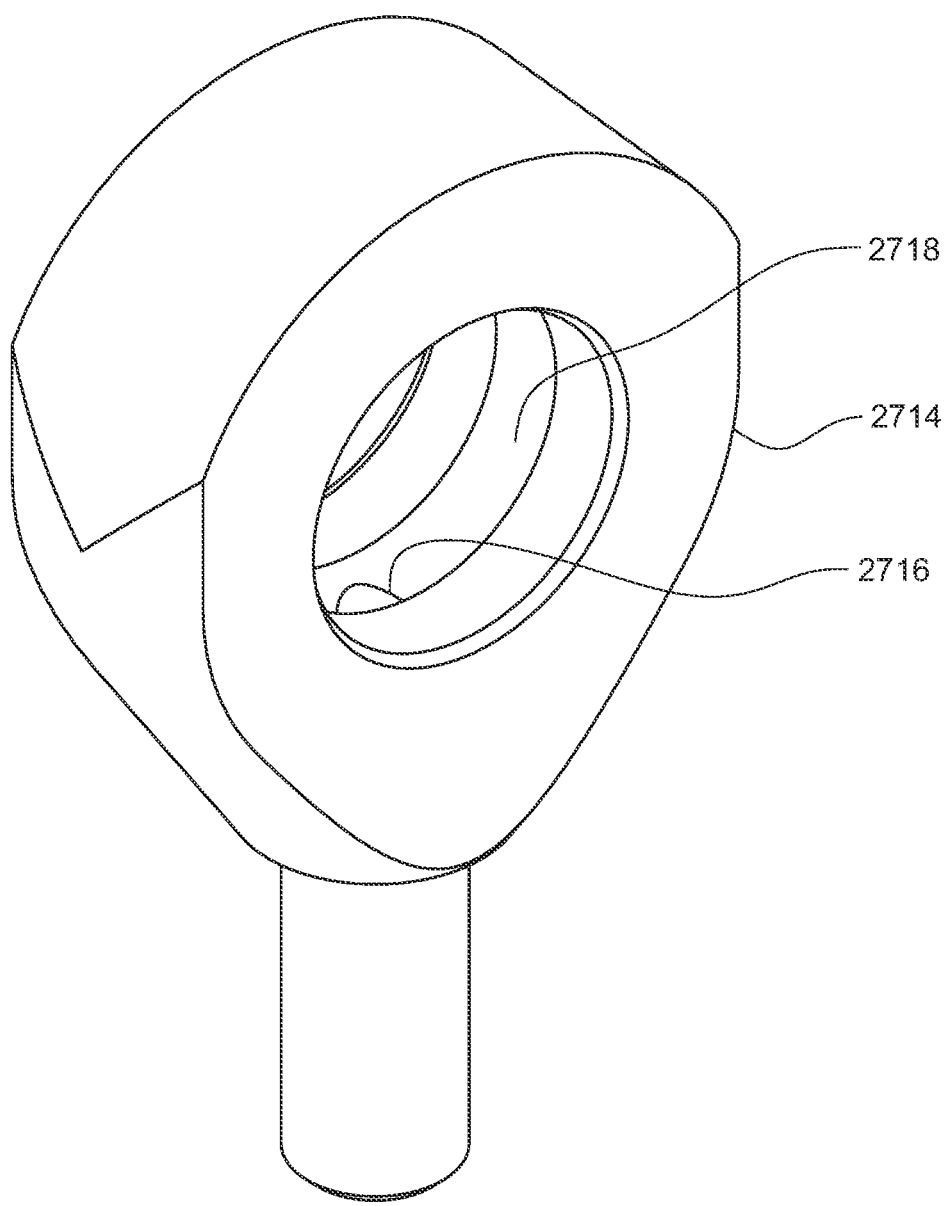
FIG. 27C shows a view of a coupling joint in accordance with one embodiment.
Figure 27D:
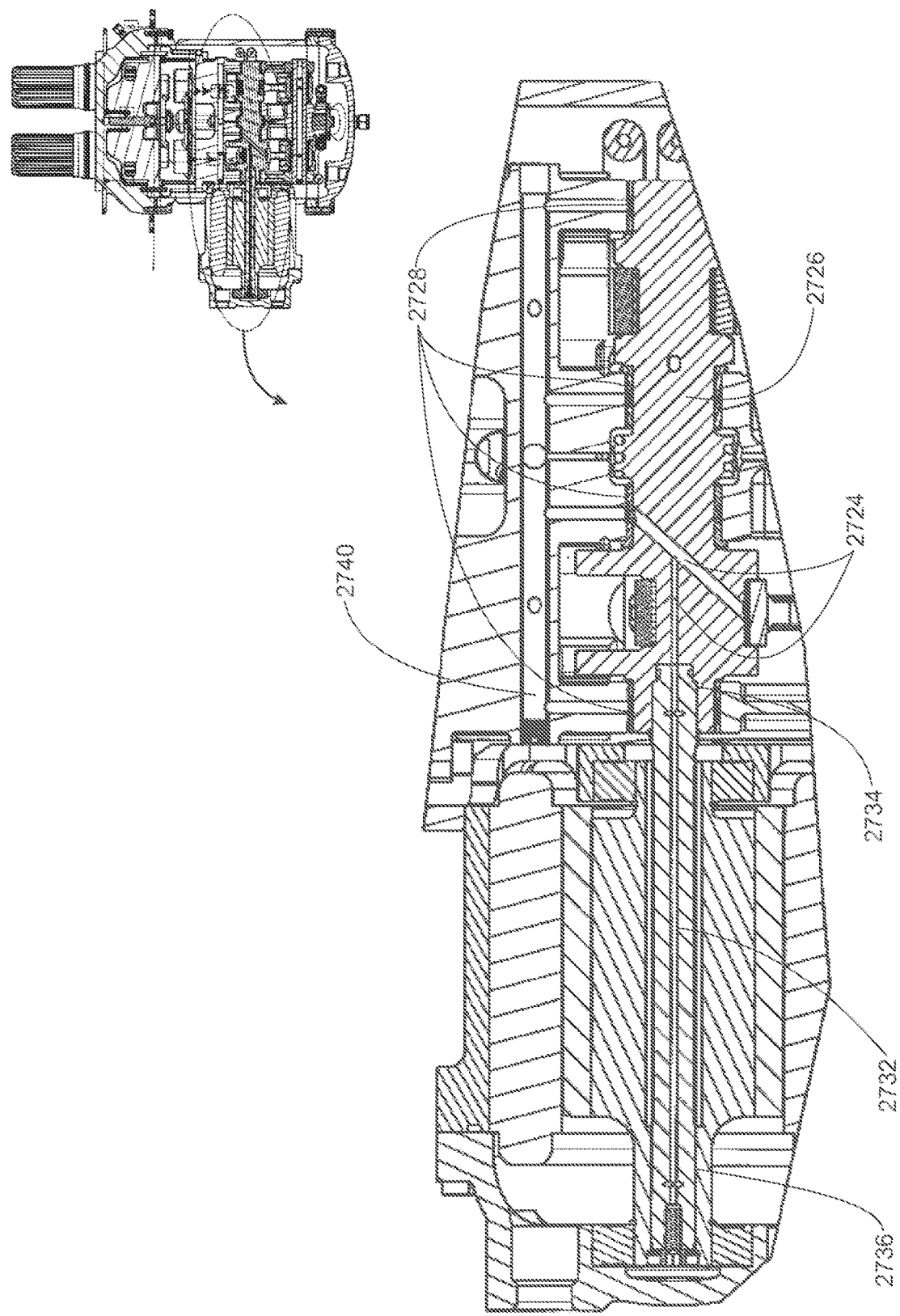
FIG. 27D shows a view of a crankshaft and spline shaft of an engine in accordance with one embodiment.

In some embodiments, the crankshaft gear 2234 and the intermediate gear 2232 may be sprockets, wherein the crankshaft gear 2234 and the intermediate gear 2232 are coupled by a chain 2226, as shown in FIGS. 25C and 26C. In such an embodiments, the chain 2226 is used to drive a chain drive pump (shown as 2600 in FIGS. 26A through 26C).

In some embodiments, the gear ratio between the crankshaft 2218 and the drive shaft 2214 remains constant throughout operation. In such an embodiment, it is important to have an appropriate gear ratio between the crankshaft and the drive shaft, such that the gear ratio balances the pump speed and the speed of the engine. This achieves a specified flow of lubricant required by a particular engine RPM (revolutions per minute) operating range.

In some embodiments, lubricating fluid is distributed to different parts of an engine by an electric pump. The electric pump eliminates the need for a pump drive assembly, which is otherwise required by a mechanical oil pump.

Referring back to FIGS. 23A and 23B, the oil pump 2208 may include an inlet 2228 to collect lubricating fluid from the sump and an outlet 2230 to deliver lubricating fluid to the various parts of the engine. In some embodiments, the rotation of the drive gear 2212 and the idle gear 2210 cause the lubricating fluid from the sump to be drawn into the oil pump through the inlet 2228 and forced out of the pump through the outlet 2230. The inlet 2228 preferably includes a filter to remove particulates that may be found in the lubricating fluid prior to its being drawn into the oil pump. In some embodiments, the inlet 2228 may be connected to the sump via a tube, pipe, or hose. In some embodiments, the inlet 2228 may be in direct fluid communication with the sump.

In some embodiments, the oil pump outlet 2230 is connected to a series of passageways in the various engine parts, through which the lubricating fluid is delivered to the various engine parts. The outlet 2230 may be integrated with the passageways so as to be in direct communication with the passageways, or may be connected to the passageways via a hose or tube, or a plurality of hoses or tubes. The series of passageways are preferably an interconnected network of passageways, so that the outlet 2230 may be connected to a single passageway inlet and still be able to deliver lubricating fluid to the engine's lubricated parts.

FIGS. 27A-27D show one embodiments, wherein the oil pump outlet (shown as 2230 in FIG. 23B) is connected to a passageway 2700 in the rocker shaft 2702 of the rocking beam drive 2704. The rocker shaft passageway 2700 delivers lubricating fluid to the rocker pivot bearings 2706, and is connected to and delivers lubricating fluid to the rocking beam passageways (not shown). The rocking beam passageways deliver lubricating fluid to the connecting wrist pin bearings 2708, the link rod bearings 2710, and the link rod passageways 2712. The link rod passageways 2712 deliver lubricating fluid to the piston rod coupling bearing 2714. The connecting rod passageway (not shown) of the connecting rod 2720 delivers lubricating fluid to a first crank pin 2722 and the crankshaft passageway 2724 of the crankshaft 2726. The crankshaft passageway 2724 delivers lubricating fluid to the crankshaft journal bearings 2728, the second crank pin bearing 2730, and the spline shaft passageway 2732. The spline shaft passageway 2732 delivers lubricating fluid to the spline shaft spline joints 2734 and 2736. The oil pump outlet (not shown, shown in FIG. 23B as 2230) in some embodiments is connected to the main feed 2740. In some embodiments, an oil pump outlet may also be connected to and provide lubricating fluid to the coupling joint linear bearings 2738. In some embodiments, an oil pump outlet may be connected to the linear bearings 2738 via a tube or hose, or plurality of tubes or hoses. Alternatively, the link rod passageways 2712 may deliver lubricating fluid to the linear bearings 2738.

Thus, the main feed 2740 delivers lubricating fluid to the journal bearings surfaces 2728. From the journal bearing surfaces 2728, the lubricating fluid is delivered to the crankshaft main passage. The crankshaft main passage delivers lubricating fluid to both the spline shaft passageway 2732 and the connecting rod bearing on the crank pin 2724.

Lubricating fluid is delivered back to the sump, preferably by flowing out of the aforementioned bearings and into the sump. In the sump, the lubricating fluid will be collected by the oil pump and redistributed throughout the engine.

Tube Heat Exchanger

Figure 28:
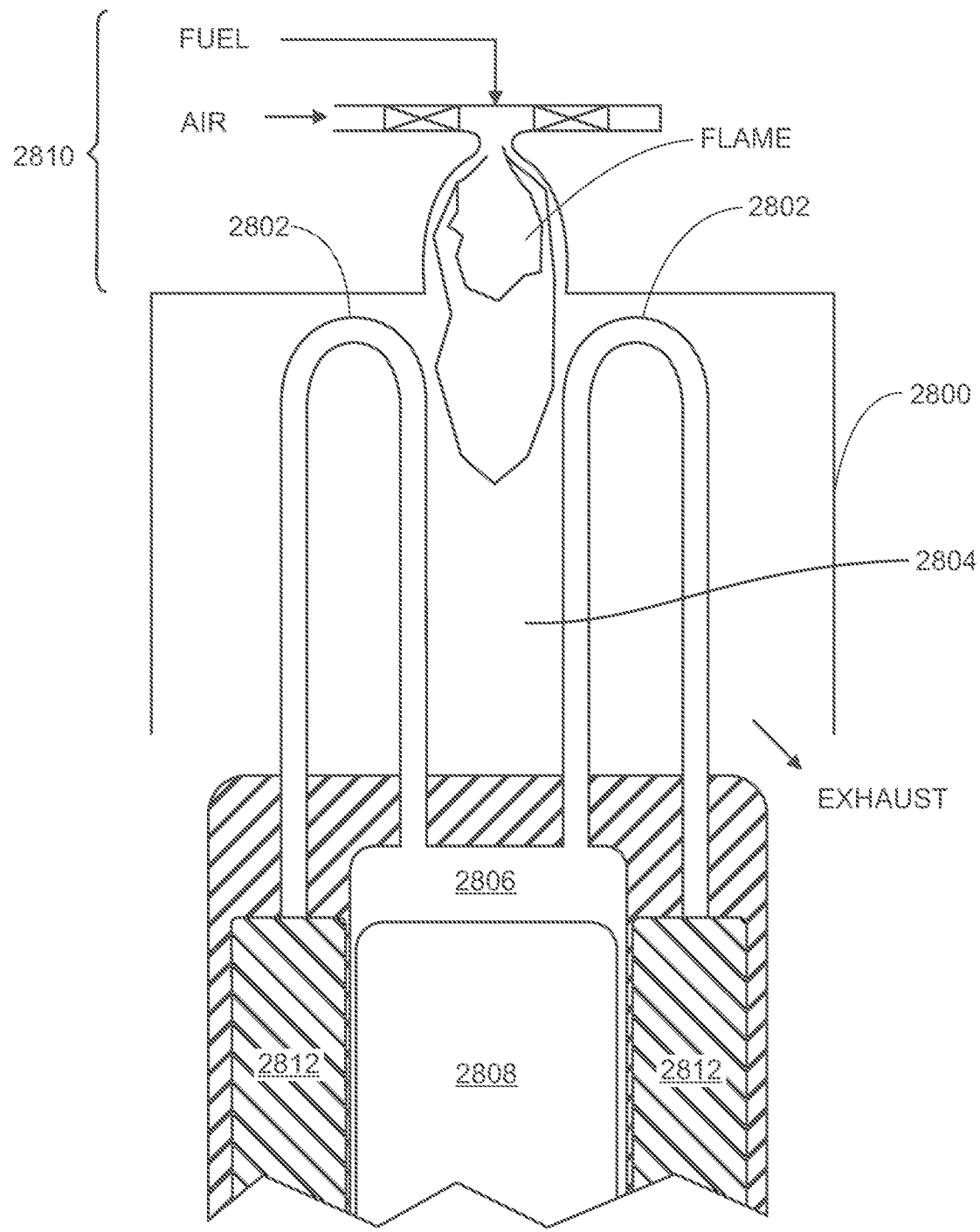
FIG. 28 shows a view of a heater exchanger and burner for an engine in accordance with one embodiment.

External combustion engines, such as, for example, Stirling cycle engines, may use tube heater heads to achieve high power. FIG. 28 is a cross-sectional view of a cylinder and tube heater head of an illustrative Stirling cycle engine. A typical configuration of a tube heater head 2800, as shown in FIG. 28, uses a cage of U-shaped heater tubes 2802 surrounding a combustion chamber 2804. A cylinder 2806 contains a working fluid, such as, for example, helium. The working fluid is displaced by the piston 2808 and driven through the heater tubes 2802. A burner 2810 combusts a combination of fuel and air to produce hot combustion gases that are used to heat the working fluid through the heater tubes 2802 by conduction. The heater tubes 2802 connect a regenerator 2812 with the cylinder 2806. The regenerator 2812 may be a matrix of material having a large ratio of surface to area volume which serves to absorb heat from the working fluid or to heat the working fluid during the cycles of the engine. Heater tubes 2802 provide a high surface area and a high heat transfer coefficient for the flow of the combustion gases past the heater tubes 2802. Various embodiments of tube heater heads are discussed below, and in U.S. Pat. Nos. 6,543,215 and 7,308,787, which are, as previously mentioned, incorporated by reference in their entireties.

Figure 29:
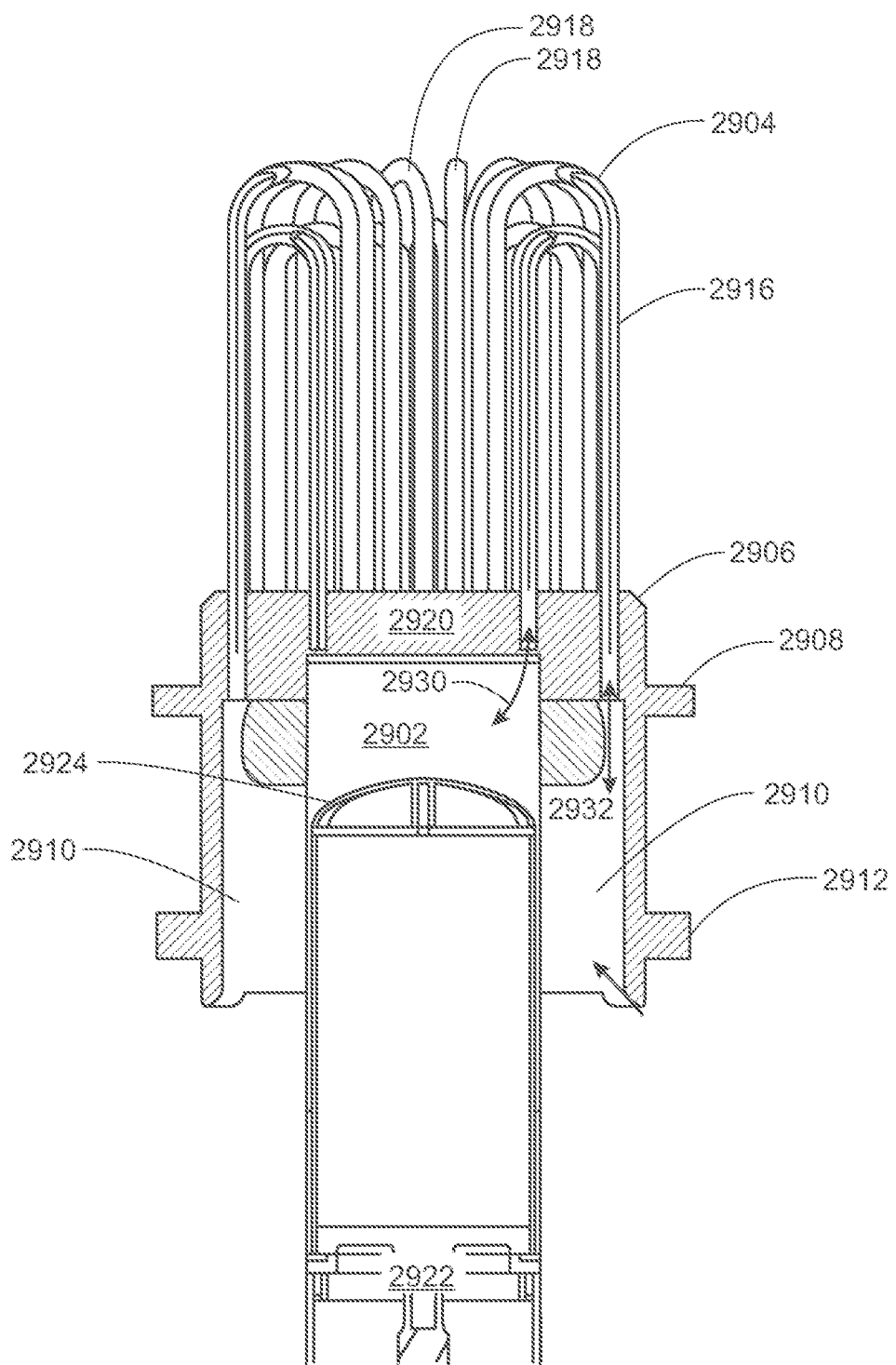
FIG. 29 shows a view of a tube heat exchanger in accordance with one embodiment.

FIG. 29 is a side view in cross section of a tube heater head and a cylinder. The heater head 2906 is substantially a cylinder having one closed end 2920 (otherwise referred to as the cylinder head) and an open end 2922. Closed end 2920 includes a plurality of U-shaped heater tubes 2904 that are disposed in a burner 3036 (shown in FIG. 30). Each U-shaped tube 2904 has an outer portion 2916 (otherwise referred to herein as an "outer heater tube") and an inner portion 2918 (otherwise referred to herein as an "inner heater tube"). The heater tubes 2904 connect the cylinder 2902 to regenerator 2910. Cylinder 2902 is disposed inside heater head 2906 and is also typically supported by the heater head 2906. A piston 2924 travels along the interior of cylinder 2902. As the piston 2924 travels toward the closed end 2920 of the heater head 2906, working fluid within the cylinder 2902 is displaced and caused to flow through the heater tubes 2924 and regenerator 2910 as illustrated by arrows 2930 and 2932 in FIG. 29. A burner flange 2908 provides an attachment surface for a burner 3036 (shown in FIG. 30) and a cooler flange 2912 provides an attachment surface for a cooler (not shown).

Figure 30:
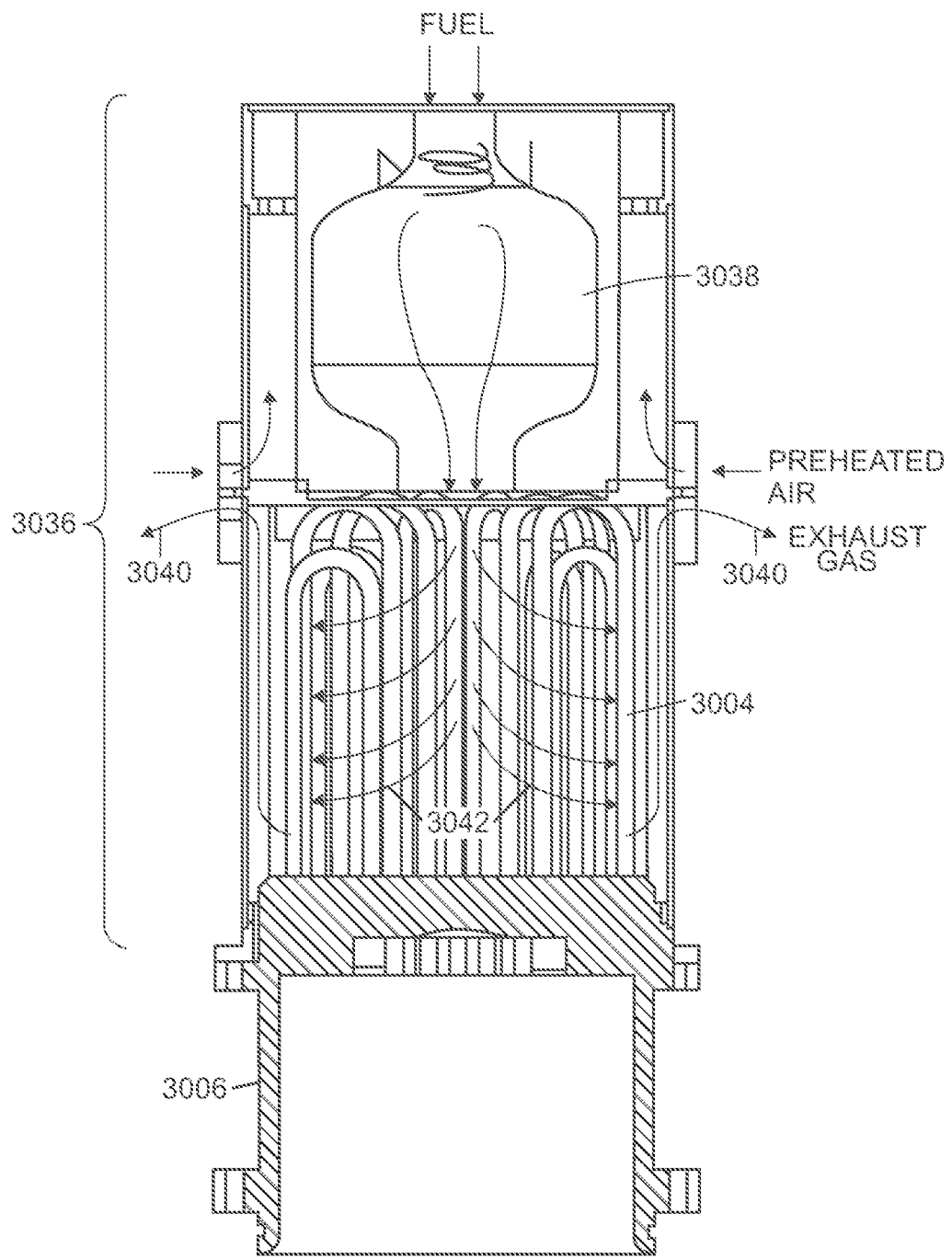
FIG. 30 shows a view of a tube heat exchanger in accordance with one embodiment.

Referring to FIG. 30, as mentioned above, the closed end of heater head 3006, including the heater tubes 3004, is disposed in a burner 3036 that includes a combustion chamber 3038. Hot combustion gases (otherwise referred to herein as "exhaust gases") in combustion chamber 3038 are in direct thermal contact with heater tubes 3004 of heater head 3006. Thermal energy is transferred by conduction from the exhaust gases to the heater tubes 3004 and from the heater tubes 3004 to the working fluid of the engine, typically helium. Other gases, such as nitrogen, for example, or mixtures of gases, may be used, with a preferable working fluid having high thermal conductivity and low viscosity. Non-combustible gases are used in various embodiments. Heat is transferred from the exhaust gases to the heater tubes 3004 as the exhaust gases flow around the surfaces of the heater tubes 3004. Arrows 3042 show the general radial direction of flow of the exhaust gases. Arrows 3040 show the direction of flow of the exhaust gas as it exits from the burner 3036. The exhaust gases exiting from the burner 3036 tend to overheat the upper part of the heater tubes 3004 (near the U-bend) because the flow of the exhaust gases is greater near the upper part of the heater tubes than at the bottom of the heater tubes (i.e., near the bottom of the burner 3036).

The overall efficiency of an external combustion engine is dependent in part on the efficiency of heat transfer between the combustion gases and the working fluid of the engine.

Returning to FIG. 29, in general, the inner heater tubes 2918 are warmer than the outer heater tubes 2916 by several hundred degrees Celsius. The burner power and thus the amount of heating provided to the working fluid is therefore limited by the inner heater tube 2918 temperatures. The maximum amount of heat will be transferred to the working gas if the inner and outer heater tubes are nearly the same temperature. Generally, embodiments, as described herein, either increase the heat transfer to the outer heater tubes or decrease the rate of heat transfer to the inner heater tubes.

Figure 31:
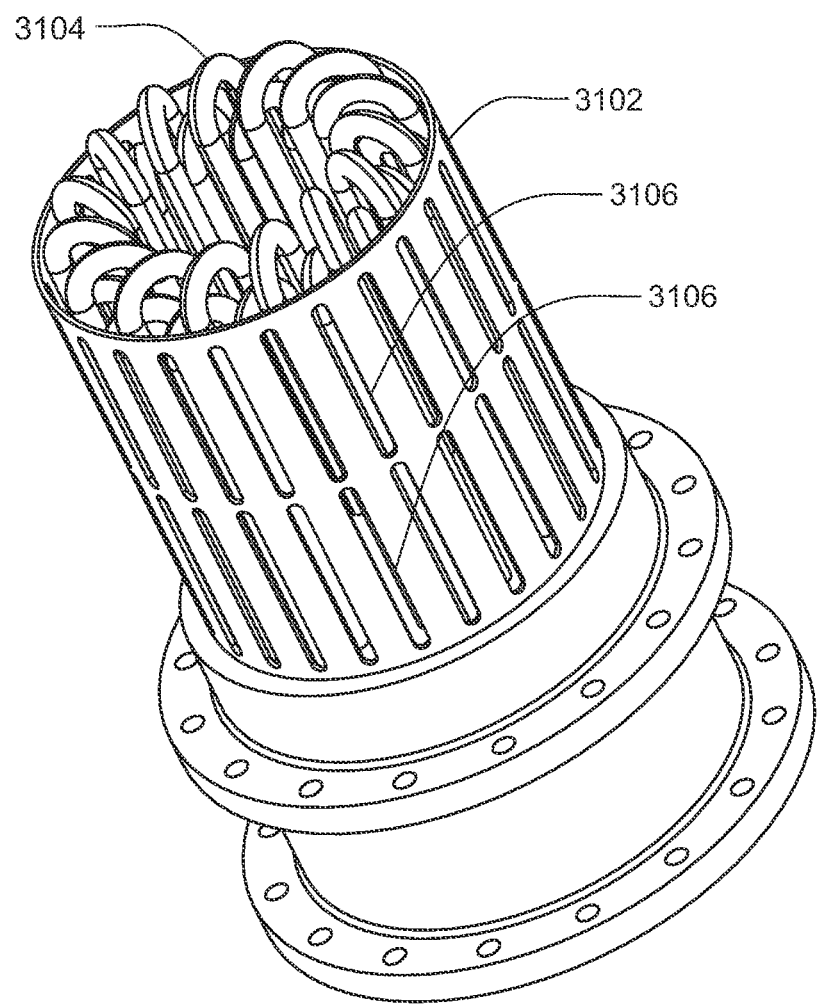
FIG. 31 shows a view of a tube heat exchanger in accordance with one embodiment.

FIG. 31 is a perspective view of an exhaust flow concentrator and a tube heater head in accordance with one embodiment. Heat transfer to a cylinder, such as a heater-tube, in cross-flow, is generally limited to only the upstream half of the tube. Heat transfer on the back side (or downstream half) of the tube, however, is nearly zero due to flow separation and recirculation. An exhaust flow concentrator 3102 may be used to improve heat transfer from the exhaust gases to the downstream side of the outer heater tubes by directing the flow of hot exhaust gases around the downstream side (i.e. the back side) of the outer heater tubes. As shown in FIG. 31, exhaust flow concentrator 3102 is a cylinder placed outside the bank of heater tubes 3104. The exhaust flow concentrator 3102 may be fabricated from heat resistant alloys, preferably high nickel alloys such as Inconel 600, Inconel 625, Stainless Steels 310 and 316 and more preferably Hastelloy X. Openings 3106 in the exhaust flow concentrator 3102 are lined up with the outer heater tubes. The openings 3106 may be any number of shapes such as a slot, round hole, oval hole, square hole etc. In FIG. 31, the openings 3106 are shown as slots. In some embodiments, the slots 3106 have a width approximately equal to the diameter of a heater tube 3104. The exhaust flow concentrator 3102 is preferably a distance from the outer heater tubes equivalent to one to two heater tube diameters.

Figure 32:
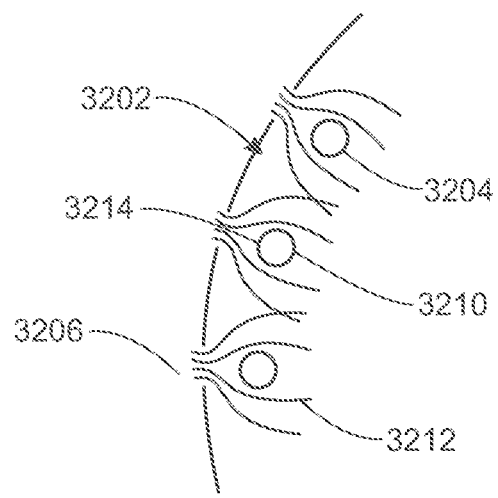
FIG. 32 shows a view of heater tubes of a heat exchanger in accordance with one embodiment.

FIG. 32 illustrates the flow of exhaust gases using the exhaust flow concentrator as shown in FIG. 31. As mentioned above, heat transfer is generally limited to the upstream side 3210 of a heater tube 3204. Using the exhaust flow concentrator 3202, the exhaust gas flow is forced through openings 3206 as shown by arrows 3212. Accordingly, as shown in FIG. 32, the exhaust flow concentrator 3202 increases the exhaust gas flow 3212 past the downstream side 3214 of the heater tubes 3204. The increased exhaust gas flow past the downstream side 3214 of the heater tubes 3204 improves the heat transfer from the exhaust gases to the downstream side 3214 of the heater tubes 3204. This in turn increases the efficiency of heat transfer to the working fluid which can increase the overall efficiency and power of the engine.

Figure 33:
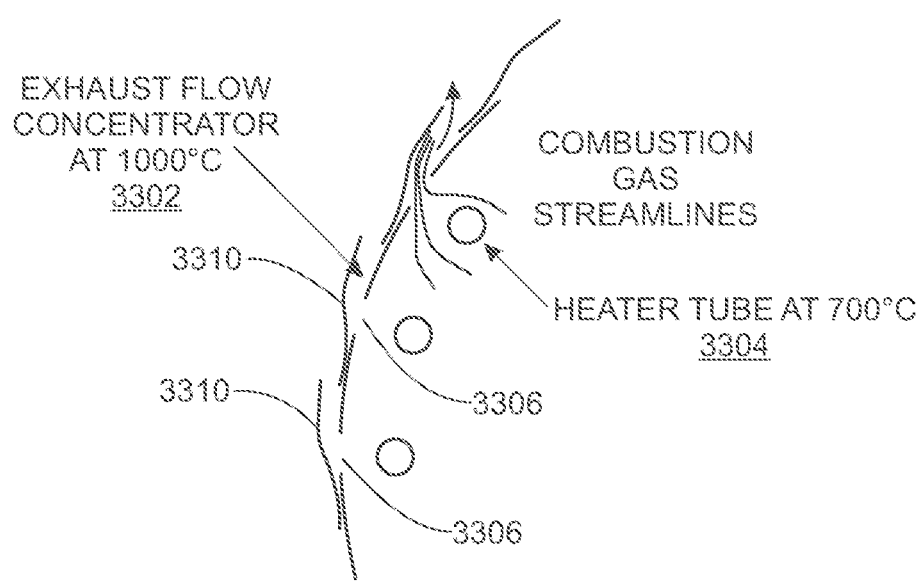
FIG. 33 shows a view of heater tubes of a heat exchanger in accordance with one embodiment.

Returning to FIG. 31, the exhaust flow concentrator 3102 may also improve the heat transfer to the downstream side of the heater tubes 3104 by radiation. Referring to FIG. 33, given enough heat transfer between the exhaust gases and the exhaust flow concentrator, the temperature of the exhaust flow concentrator 3302 will approach the temperature of the exhaust gases. In a some embodiments, the exhaust flow concentrator 3302 does not carry any load and may therefore, operate at 1000.degree. C. or higher. In contrast, the heater tubes 3304 generally operate at 700.degree. C. Due to the temperature difference, the exhaust flow concentrator 3302 may then radiate thermally to the much cooler heater tubes 3304 thereby increasing the heat transfer to the heater tubes 3304 and the working fluid of the engine. Heat transfer surfaces (or fins) 3310 may be added to the exhaust flow concentrator 3302 to increase the amount of thermal energy captured by the exhaust flow concentrator 3302 that may then be transferred to the heater tubes by radiation. Fins 3310 are coupled to the exhaust flow concentrator 3302 at positions outboard of and between the openings 3306 so that the exhaust gas flow is directed along the exhaust flow concentrator, thereby reducing the radiant thermal energy lost through each opening in the exhaust flow concentrator. The fins 3310 are preferably attached to the exhaust flow concentrator 3302 through spot welding. Alternatively, the fins 3310 may be welded or brazed to the exhaust flow concentrator 3302. The fins 3310 should be fabricated from the same material as the exhaust flow concentrator 3302 to minimize differential thermal expansion and subsequent cracking. The fins 3310 may be fabricated from heat resistant alloys, preferably high nickel alloys such as Inconel 600, Inconel 625, Stainless Steels 310 and 316 and more preferably Hastelloy X.

Figure 34:
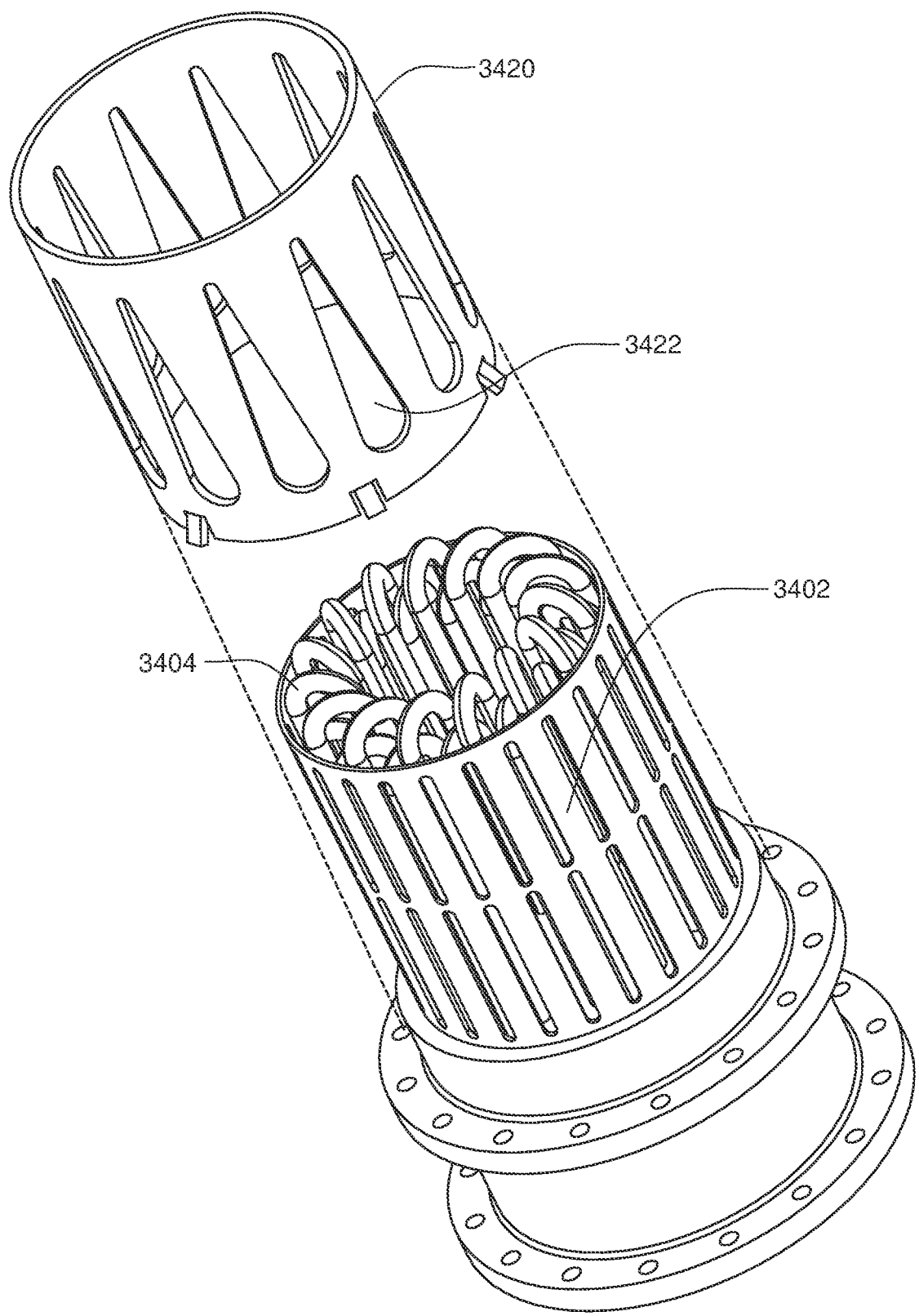
FIG. 34 shows a view of a tube heat exchanger in accordance with one embodiment.

As mentioned above with respect to FIG. 30, the radial flow of the exhaust gases from the burner is greatest closest to the exit of the burner (i.e., the upper U-bend of the heater tubes). This is due in part to the swirl induced in the flow of the exhaust gases and the sudden expansion as the exhaust gases exit the burner. The high exhaust gas flow rates at the top of the heater tubes creates hot spots at the top of the heater tubes and reduces the exhaust gas flow and heat transfer to the lower sections of the heater tubes. Local overheating (hot spots) may result in failure of the heater tubes and thereby the failure of the engine. FIG. 34 is a perspective view of an exhaust flow axial equalizer in accordance with an embodiment. The exhaust flow axial equalizer 3420 is used to improve the distribution of the exhaust gases along the longitudinal axis of the heater tubes 3404 as the exhaust gases flow radially out of the tube heater head. (The typical radial flow of the exhaust gases is shown in FIG. 30.) As shown in FIG. 34, the exhaust flow axial equalizer 3420 is a cylinder with openings 3422. As mentioned above, the openings 3422 may be any number of shapes such as a slot, round hole, oval hole, square hole etc. The exhaust flow axial equalizer 3420 may be fabricated from heat resistant alloys, preferably high nickel alloys including Inconel 600, Inconel 625, Stainless Steels 310 and 316 and more preferably Hastelloy X.

In some embodiments, the exhaust flow axial equalizer 3420 is placed outside of the heater tubes 3404 and an exhaust flow concentrator 3402. Alternatively, the exhaust flow axial equalizer 3420 may be used by itself (i.e., without an exhaust flow concentrator 3402) and placed outside of the heater tubes 3404 to improve the heat transfer from the exhaust gases to the heater tubes 3404. The openings 3422 of the exhaust flow axial equalizer 3420, as shown in FIG. 34, are shaped so that they provide a larger opening at the bottom of the heater tubes 3404. In other words, as shown in FIG. 34, the width of the openings 3422 increases from top to bottom along the longitudinal axis of the heater tubes 3404. The increased exhaust gas flow area through the openings 3422 of the exhaust flow axial equalizer 3420 near the lower portions of the heater tubes 3404 counteracts the tendency of the exhaust gas flow to concentrate near the top of the heater tubes 3404 and thereby equalizes the axial distribution of the radial exhaust gas flow along the longitudinal axis of the heater tubes 3404.

Figure 35:
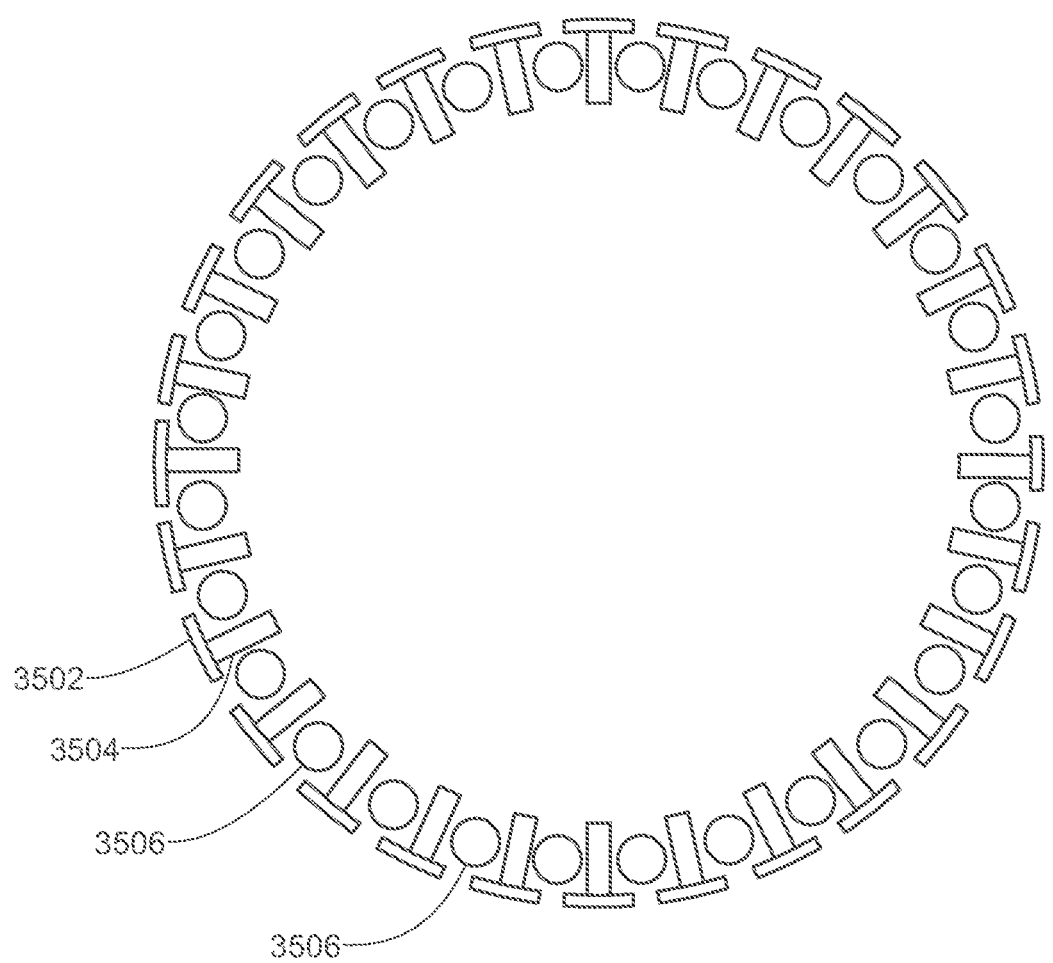
FIG. 35 shows a view of a tube heat exchanger in accordance with one embodiment.

In another embodiment, as shown in FIG. 35, spacing elements 3504 may be added to an exhaust flow concentrator 3502 to reduce the spacing between the heater tubes 3506. Alternatively, the spacing elements 3504 could be added to an exhaust flow axial equalizer 3520 (shown in FIG. 34) when it is used without the exhaust flow concentrator 3504. As shown in FIG. 35, the spacing elements 3504 are placed inboard of and between the openings. The spacers 3504 create a narrow exhaust flow channel that forces the exhaust gas to increase its speed past the sides of heater tubes 3506. The increased speed of the combustion gas thereby increases the heat transfer from the combustion gases to the heater tubes 3506. In addition, the spacing elements may also improve the heat transfer to the heater tubes 3506 by radiation.

Figure 36:
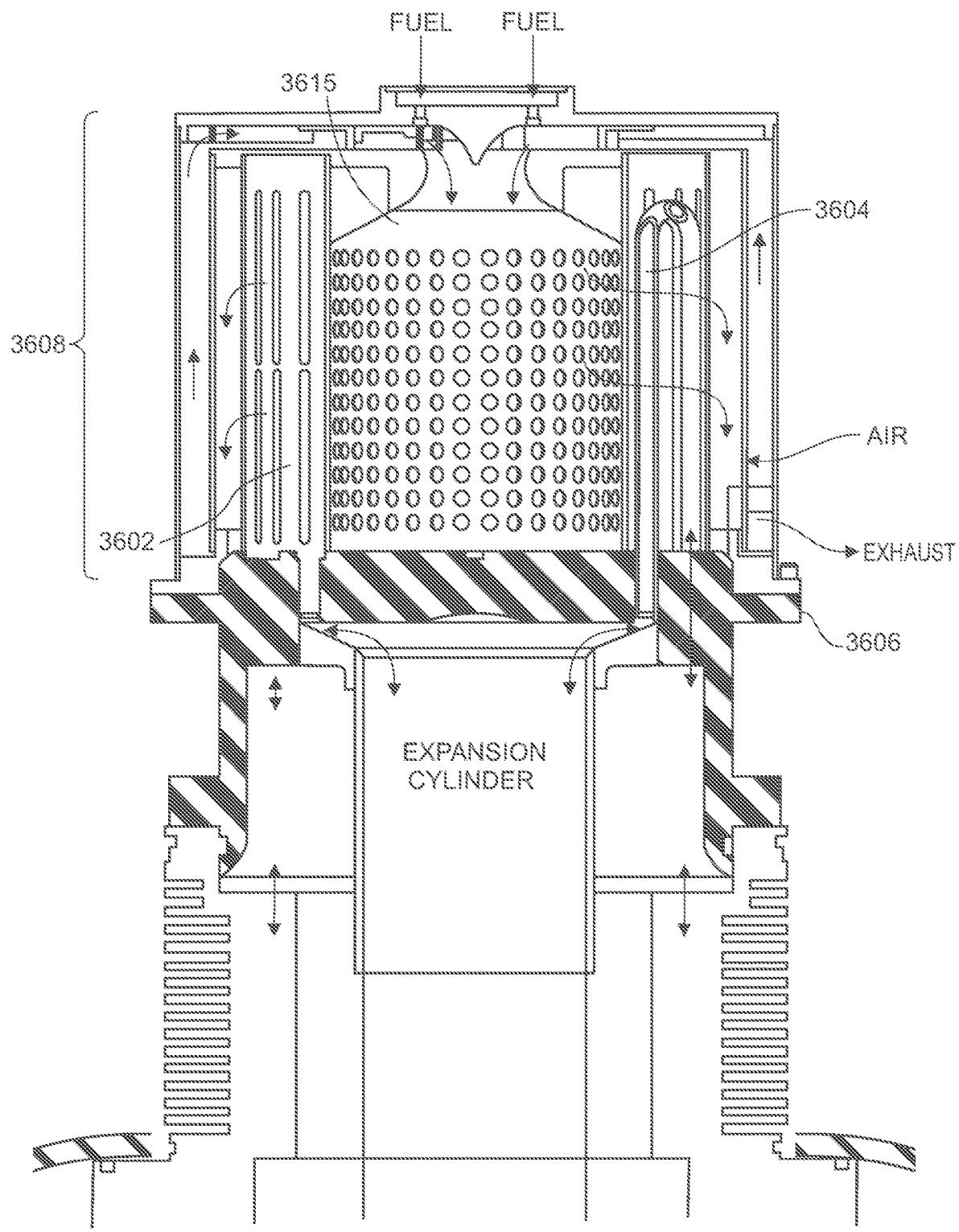
FIG. 36 shows a view of a heater head of an engine in accordance with one embodiment.

FIG. 36 is a cross-sectional side view, of a tube heater head 3606 and burner 3608 in accordance with an alternative embodiment. In this embodiment, a combustion chamber of a burner 3608 is placed inside a set of heater tubes 3604 as opposed to above the set of heater tubes 3604 as shown in FIG. 30. A perforated combustion chamber liner 3615 is placed between the combustion chamber and the heater tubes 3604. Perforated combustion chamber liner 3615 protects the inner heater tubes from direct impingement by the flames in the combustion chamber. Like the exhaust flow axial equalizer 3420, as described above with respect to FIG. 34, the perforated combustion chamber liner 3615 equalizes the radial exhaust gas flow along the longitudinal axis of the heater tubes 3604 so that the radial exhaust gas flow across the top of the heater tubes 3604 (near the U-bend) is roughly equivalent to the radial exhaust gas flow across the bottom of the heater tubes 3604. The openings in the perforated combustion chamber liner 3615 are arranged so that the combustion gases exiting the perforated combustion chamber liner 3615 pass between the inner heater tubes 3604. Diverting the combustion gases away from the upstream side of the inner heater tubes 3604 will reduce the inner heater tube temperature, which in turn allows for a higher burner power and a higher engine power. An exhaust flow concentrator 3602 may be placed outside of the heater tubes 3604. The exhaust flow concentrator 3602 is described above with respect to FIGS. 31 and 32.

Figure 37:
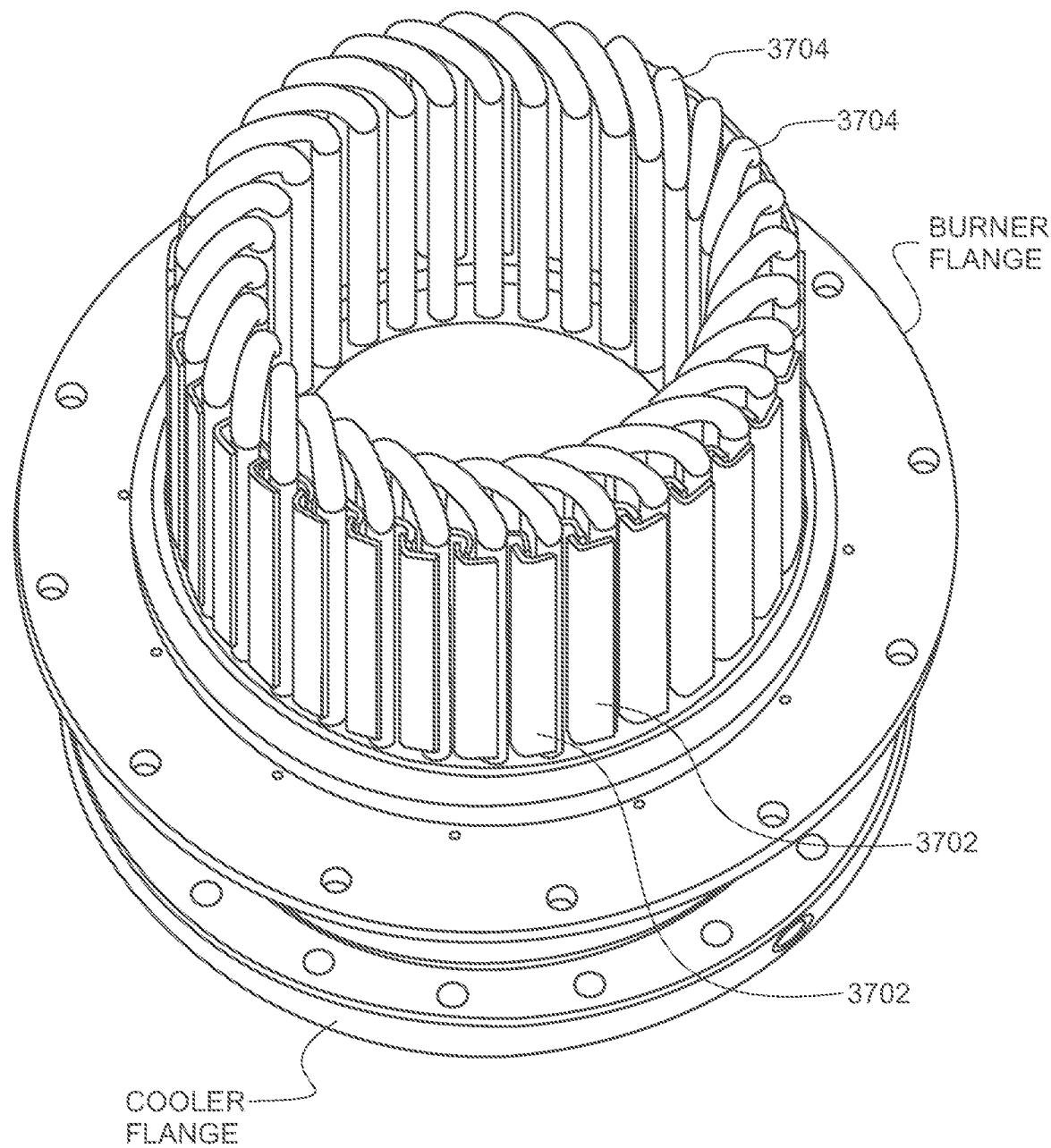
FIG. 37 shows a view of a tube heat exchanger in accordance with one embodiment.

Another method for increasing the heat transfer from the combustion gas to the heater tubes of a tube heater head so as to transfer heat, in turn, to the working fluid of the engine is shown in FIG. 37. FIG. 37 is a perspective view of a tube heater head including flow diverter fins in accordance with an embodiment. Flow diverter fins 3702 are used to direct the exhaust gas flow around the heater tubes 3704, including the downstream side of the heater tubes 3704, in order to increase the heat transfer from the exhaust gas to the heater tubes 3704. Flow diverter fin 3702 is thermally connected to a heater tube 3704 along the entire length of the flow diverter fin. Therefore, in addition to directing the flow of the exhaust gas, flow diverter fins 3702 increase the surface area for the transfer of heat by conduction to the heater tubes 3704, and thence to the working fluid.

Figure 38:
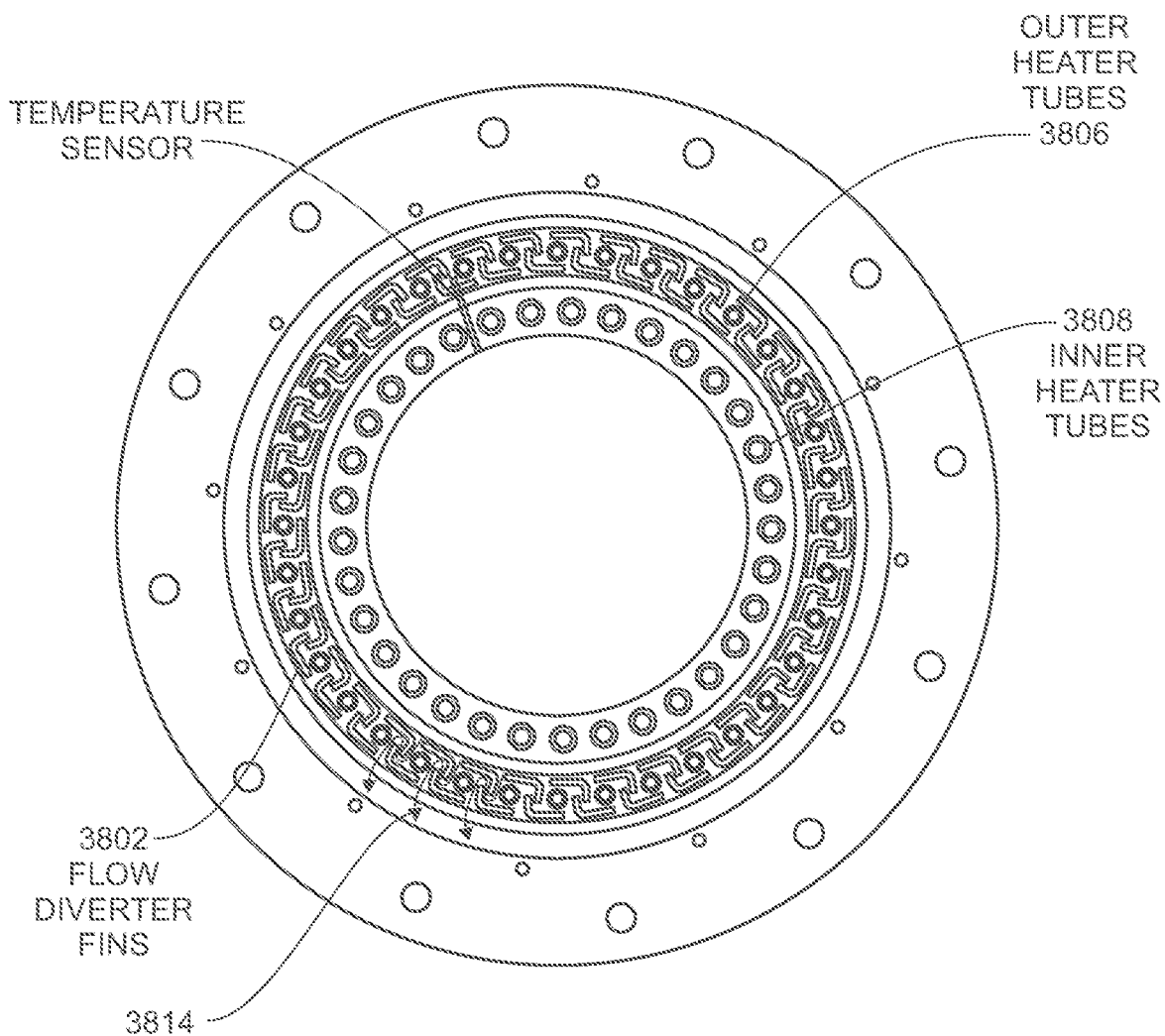
FIG. 38 shows a view of a tube heat exchanger in accordance with one embodiment.

FIG. 38 is a top view in cross-section of a tube heater head including flow diverter fins in accordance with an embodiment. Typically, the outer heater tubes 3806 have a large inter-tube spacing. Therefore, some embodiments as shown in FIG. 38, the flow diverter fins 3802 are used on the outer heater tubes 3806. In an alternative embodiment, the flow diverter fins could be placed on the inner heater tubes 3808 (also shown in FIG. 39 as 3908). As shown in FIG. 38, a pair of flow diverter fins is connected to each outer heater tube 3806. One flow diverter fin is attached to the upstream side of the heater tube and one flow diverter fin is attached to the downstream side of the heater tube. In some embodiments, the flow diverter fins 3802 are "L" shaped in cross section as shown in FIG. 38. Each flow diverter fin 3802 is brazed to an outer heater tube so that the inner (or upstream) flow diverter fin of one heater tube overlaps with the outer (or downstream) flow diverter fin of an adjacent heater tube to form a serpentine flow channel. The path of the exhaust gas flow caused by the flow diverter fins is shown by arrows 3814. The thickness of the flow diverter fins 3802 decreases the size of the exhaust gas flow channel thereby increasing the speed of the exhaust gas flow. This, in turn, results in improved heat transfer to the outer heater tubes 3806. As mentioned above, with respect to FIG. 37, the flow diverter fins 3802 also increase the surface area of the outer heater tubes 3806 for the transfer of heat by conduction to the outer heater tubes 3806.

Figure 39:
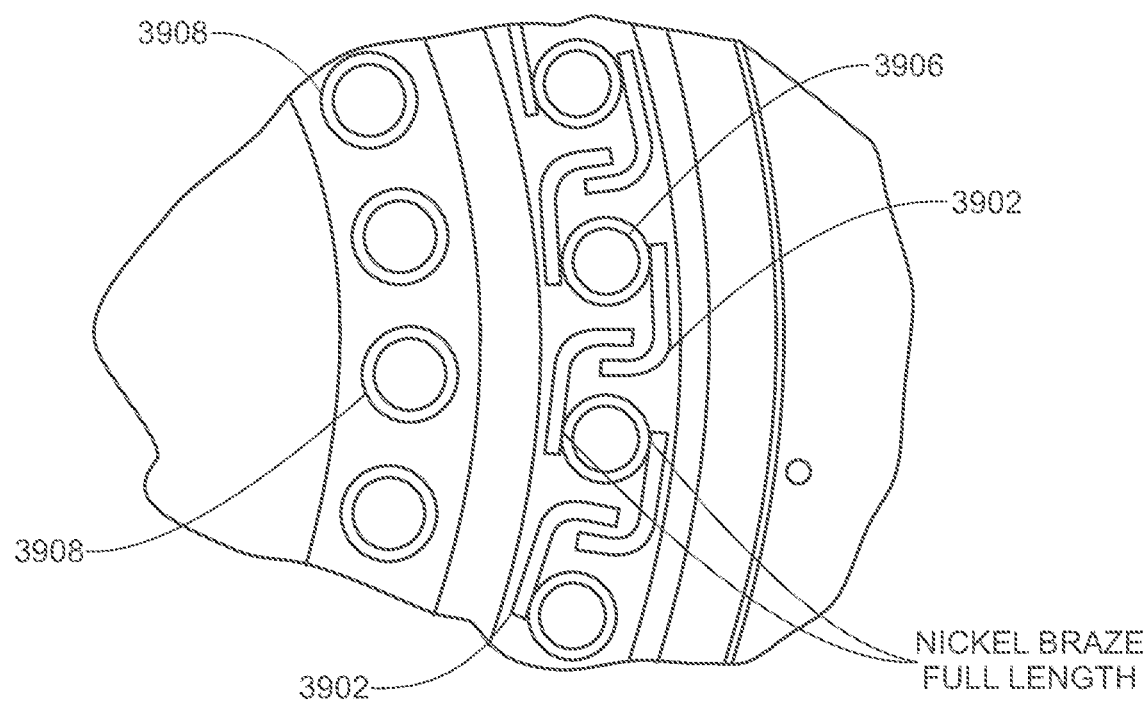
FIG. 39 shows a portion of a cross section of a tube heat exchanger in accordance with one embodiment.

FIG. 39 is a cross-sectional top view of a section of the tube heater head of FIG. 37 in accordance with an embodiment. As mentioned above, with respect to FIG. 38, a pair of flow diverter fins 3902 is brazed to each of the outer heater tubes 3906. In some embodiments, the flow diverter fins 3902 are attached to an outer heater tube 3906 using a nickel braze along the full length of the heater tube. Alternatively, the flow diverter fins could be brazed with other high temperature materials, welded or joined using other techniques known in the art that provide a mechanical and thermal bond between the flow diverter fin and the heater tube.

Figure 40:
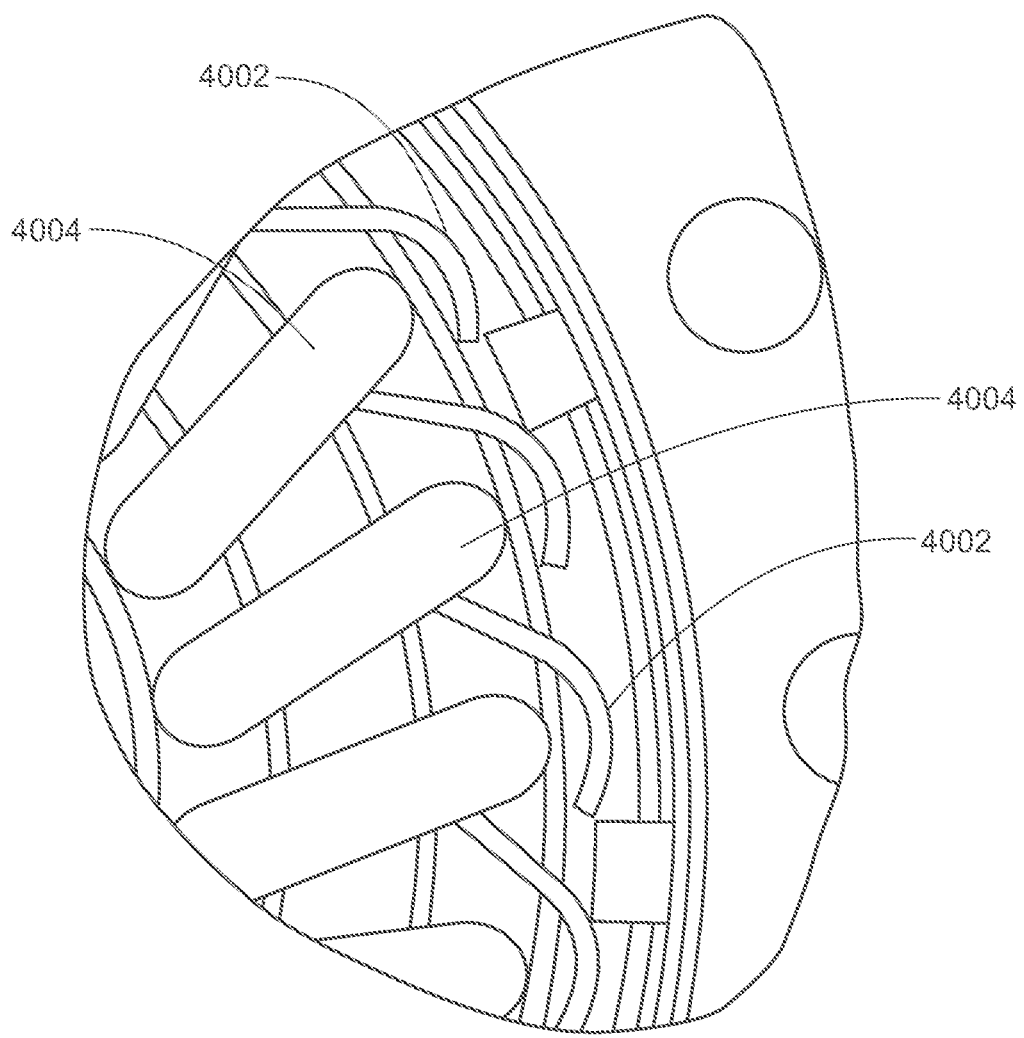
FIG. 40 shows a view of a tube heat exchanger in accordance with one embodiment.

An alternative embodiment of flow diverter fins is shown in FIG. 40. FIG. 40 is a top view of a section of a tube heater head including single flow diverter fins in accordance with an embodiment. In this embodiment, a single flow diverter fin 4002 is connected to each outer heater tube 4004. In some embodiments, the flow diverter fins 4002 are attached to an outer heater tube 4004 using a nickel braze along the full length of the heater tube. Alternatively, the flow diverter fins may be brazed with other high temperature materials, welded or joined using other techniques known in the art that provide a mechanical and thermal bond between the flow diverter fin and the heater tube. Flow diverter fins 4002 are used to direct the exhaust gas flow around the heater tubes 4004, including the downstream side of the heater tubes 4004. In order to increase the heat transfer from the exhaust gas to the heater tubes 4004, flow diverter fins 4002 are thermally connected to the heater tube 4004. Therefore, in addition to directing the flow of exhaust gas, flow diverter fins 4002 increase the surface area for the transfer of heat by conduction to the heater tubes 4004, and thence to the working fluid.

Figure 41:
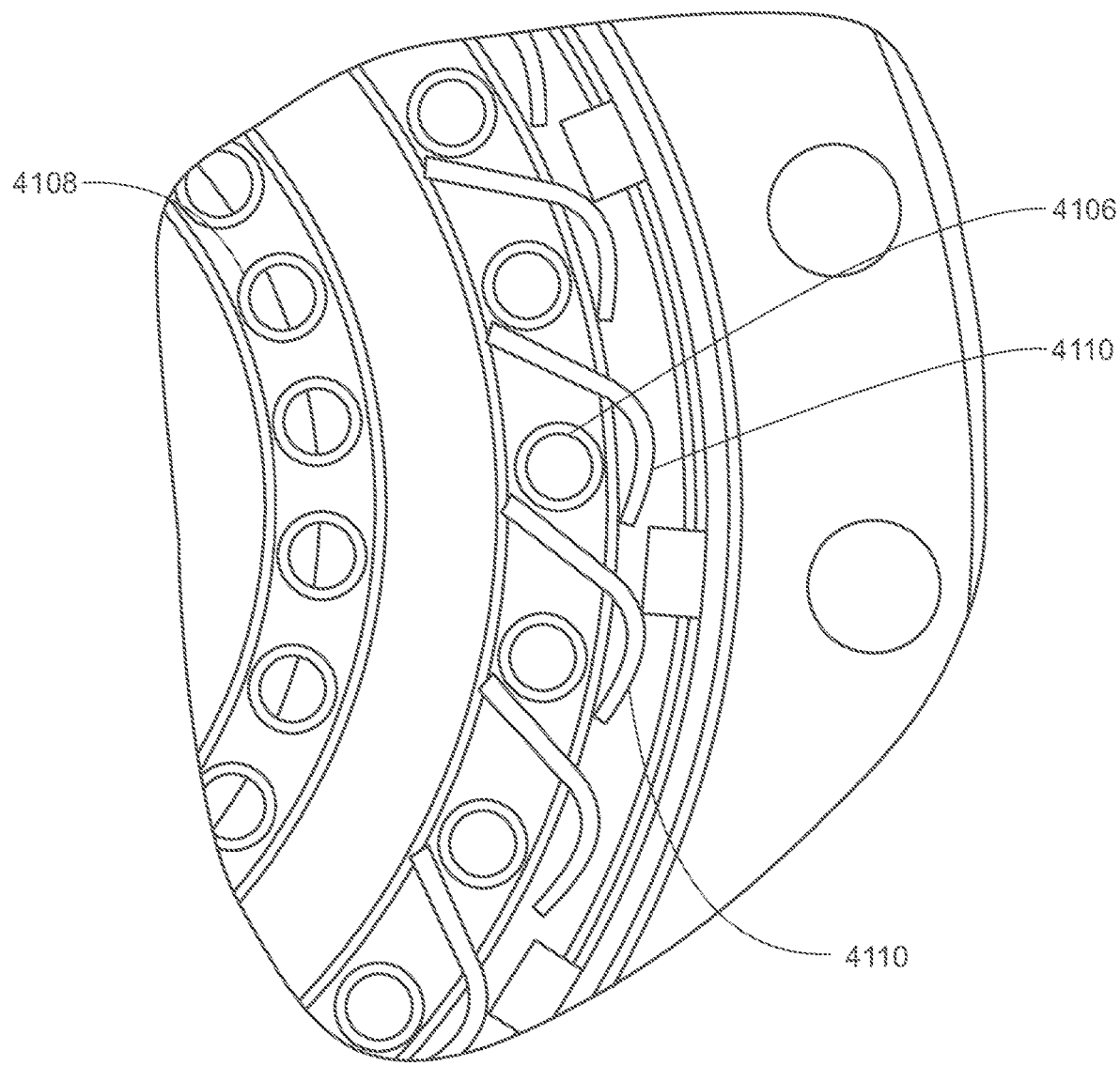
FIG. 41 shows a portion of a cross section of a tube heat exchanger in accordance with one embodiment.

FIG. 41 is a top view in cross-section of a section of a tube heater head including the single flow diverter fins as shown in FIG. 40 in accordance with an embodiment. As shown in FIG. 41, a flow diverter fin 4110 is placed on the upstream side of a heater tube 4106. The diverter fin 4110 is shaped so as to maintain a constant distance from the downstream side of the heater tube 4106 and therefore improve the transfer of heat to the heater tube 4106. In an alternative embodiment, the flow diverter fins could be placed on the inner heater tubes 4108.

Engine performance, in terms of both power and efficiency, is highest at the highest possible temperature of the working gas in the expansion volume of the engine. The maximum working gas temperature, however, is typically limited by the properties of the heater head. For an external combustion engine with a tube heater head, the maximum temperature is limited by the metallurgical properties of the heater tubes. If the heater tubes become too hot, they may soften and fail resulting in engine shut down. Alternatively, at too high of a temperature the tubes will be severely oxidized and fail. It is, therefore, important to engine performance to control the temperature of the heater tubes. A temperature sensing device, such as a thermocouple, may be used to measure the temperature of the heater tubes. The temperature sensor mounting scheme may thermally bond the sensor to the heater tube and isolate the sensor from the much hotter combustion gases. The mounting scheme should be sufficiently robust to withstand the hot oxidizing environment of the combustion-gas and impinging flame that occur near the heater tubes for the life of the heater head. One set of mounting solutions include brazing or welding thermocouples directly to the heater tubes. The thermocouples would be mounted on the part of the heater tubes exposed to the hottest combustion gas. Other possible mounting schemes permit the replacement of the temperature sensor. In one embodiment, the temperature sensor is in a thermowell thermally bonded to the heater tube. In another embodiment, the mounting scheme is a mount, such as a sleeve, that mechanically holds the temperature sensor against the heater tube.

Figure 42:
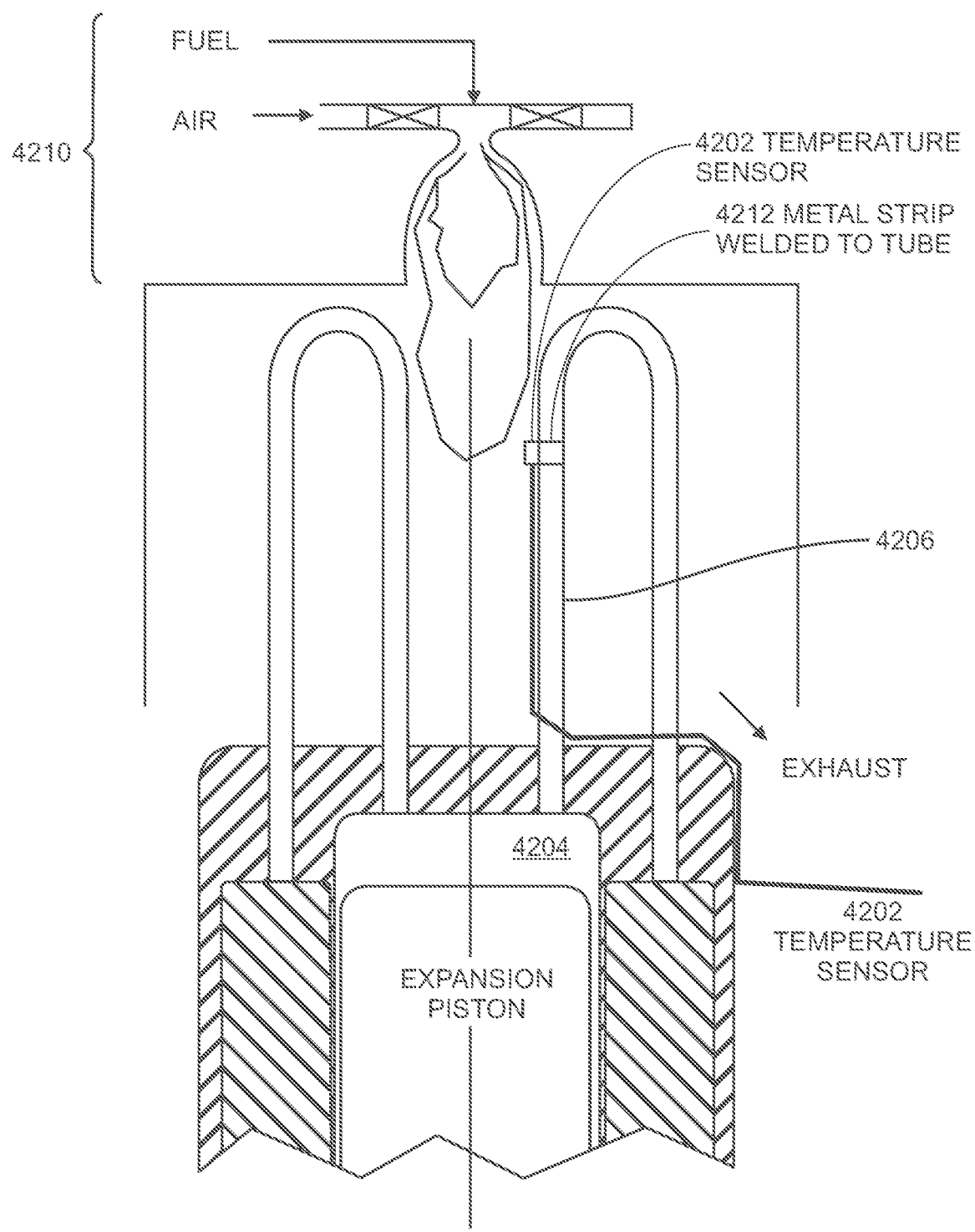
FIG. 42 shows a view of a heater head of an engine in accordance with one embodiment.

FIG. 42 is a side view in cross section of a cylinder 4204 and a burner 4210. A temperature sensor 4202 is used to monitor the temperature of the heater tubes and provide feedback to a fuel controller (not shown) of the engine in order to maintain the heater tubes at the desired temperature. In some embodiments, the heater tubes are fabricated using Inconel 625 and the desired temperature is 930.degree. C. The desired temperature will be different for other heater tube materials. The temperature sensor 4202 should be placed at the hottest, and therefore the limiting, part of the heater tubes. Generally, the hottest part of the heater tubes will be the upstream side of an inner heater tube 4206 near the top of the heater tube. FIG. 42 shows the placement of the temperature sensor 4202 on the upstream side of an inner heater tube 4206. In some embodiments, as shown in FIG. 42, the temperature sensor 4202 is clamped to the heater tube with a strip of metal 4212 that is welded to the heater tube in order to provide good thermal contact between the temperature sensor 4202 and the heater tube 4206. In one embodiment, both the heater tubes 4206 and the metal strip 4212 may be Inconel 625 or other heat resistant alloys such as Inconel 600, Stainless Steels 310 and 316 and Hastelloy X. The temperature sensor 4202 should be in good thermal contact with the heater tube, otherwise it may read too high a temperature and the engine will not produce as much power as possible. In an alternative embodiment, the temperature sensor sheath may be welded directly to the heater tube.

Figure 43A:
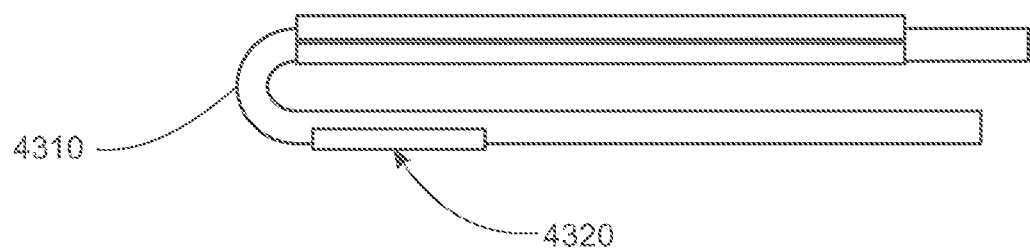
FIG. 43A shows a view of a tube heat exchanger in accordance with one embodiment.
Figure 43B:
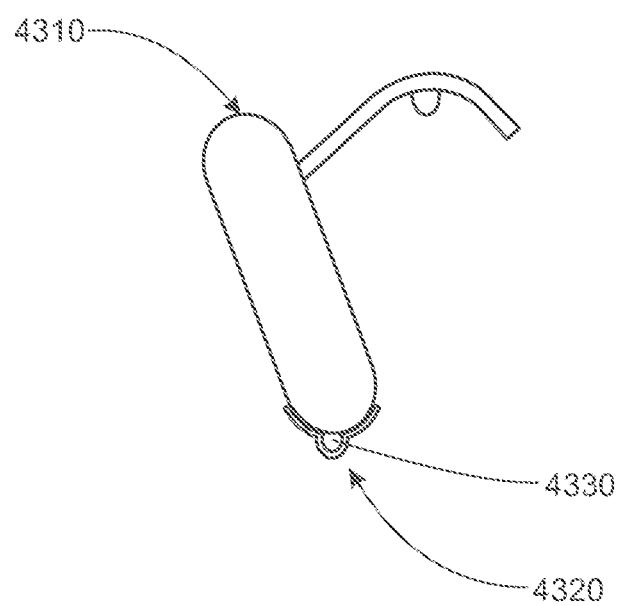
FIG. 43B shows a view of a tube heat exchanger in accordance with one embodiment.

In another embodiment, as shown in FIG. 43A-B, a temperature sensor mount 4320 is created with a formed strip or sheath of a refractory or high temperature resistant metal such as Inconel that is bonded to the exterior of the heater tube 4310. The sensor mount sheath 4320 is formed or shaped into a channel that when attached to the heater tube creates a void that accommodates a device. In a specific embodiment, the channel is V-shaped to accommodate the insertion of a thermal sensor such as a thermocouple device. The shaped channel is then bonded to the exterior of a heater tube 4310 as shown in FIG. 43A.

FIG. 43A shows a side view of the sensor mount sheath 4320 on the heater tube 4310, while FIG. 43B is a view along the axis of the sensor mount sheath 4320. The metal should be thin enough to form, yet thick enough to survive for the rated life of the heater head. In some embodiments, the metal is approximately between 0.005" and 0.020" thick. The metal may be bent such that the bend is along the length of the strip. This "V-channel" sheath 4320 is then affixed to the exterior of the heater tube by high temperature brazing. Prior to brazing, the sheath may be tack welded in several places to insure that the sheath does not move during the brazing process, as shown in FIG. 43A. Preferably, the braze compound used during brazing is typically a high nickel alloy; however, any compound which will withstand the brazing temperature will work. Alternatively the sheath may be bonded to the heater tube by electron beam or laser welding.

Now referring to FIG. 43B, a cavity 4330 is formed by affixing the sheath to the heater tube. This cavity 4330 is formed such that it may accept a device such as a thermocouple. When formed and brazed, the cavity may advantageously be sized to fit the thermocouple. Preferably, the fit is such that the thermocouple is pressed against the exterior of the heater tube. Preferably, the sheath is thermally connected to the heater tube. If the sheath is not thermally connected to the heater tube, the sheath may not be "cooled" by the working gas. The lack of cooling may cause the sheath to operate at or near the combustion gas temperatures, which are typically high enough to eventually burn through any metal. Brazing the sensor mount to the heater tube leads to a good thermal contact. Alternatively, the sensor mount sheath 4320 could be continuously welded along both sides to provide sufficient thermal connection.

Figure 44A:
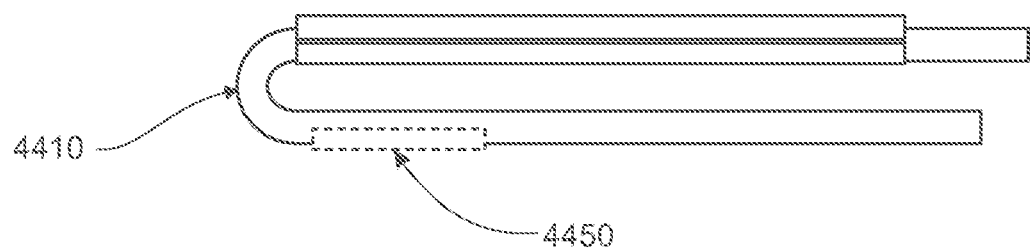
FIG. 44A shows a view of a tube heat exchanger in accordance with one embodiment.
Figure 44B:
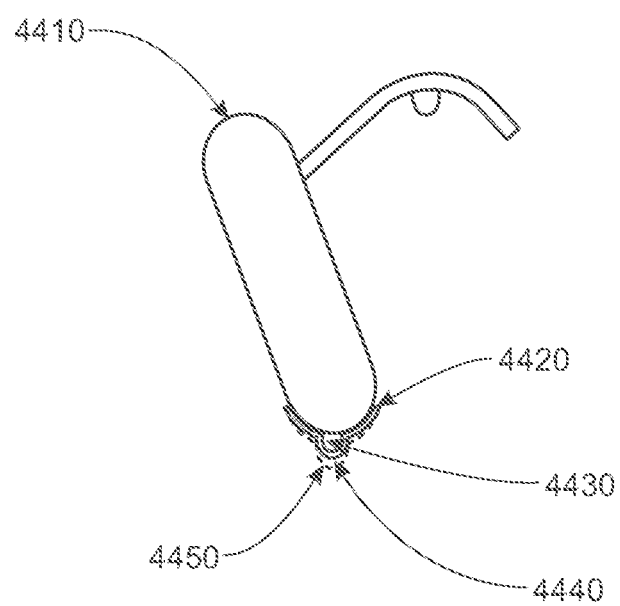
FIG. 44B shows a view of a tube heat exchanger in accordance with one embodiment.

In another embodiment, as shown in FIGS. 44A-B, a second strip of metal can be formed to create a shield 4450 over the sensor mount 4420. The shield 4420 may be used to improve the thermal connection between the temperature sensor, in cavity 4430, and the heater tube 4410. The shield insulates the sensor mount sheath 4420 from the convective heating of the hot combustion gases and thus improves the thermal connection to the heater tube. Furthermore, there is preferably an insulating space 4440 to help further insulate the temperature sensor from the hot combustion gases as shown in FIG. 44B.

Figure 45A:
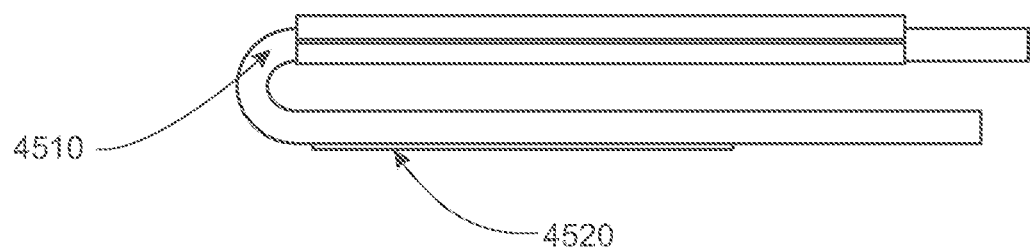
FIG. 45A shows view of a tube heat exchanger in accordance with one embodiment.
Figure 45B:
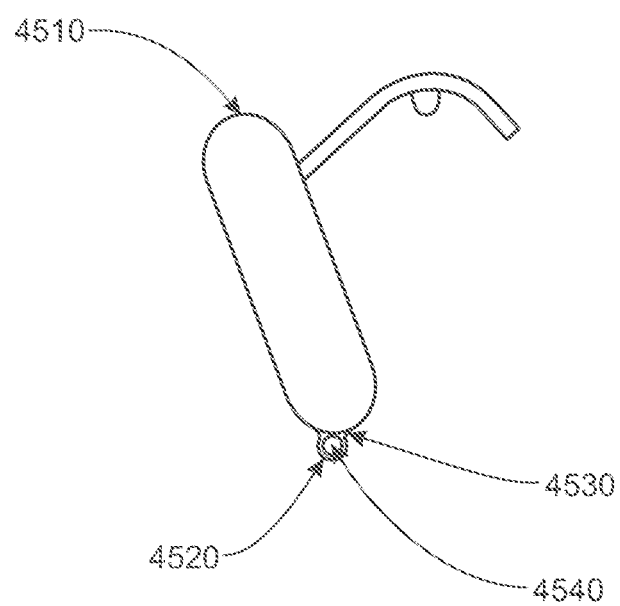
FIG. 45B shows a view of a tube heat exchanger in accordance with one embodiment.

In another specific embodiment, as shown in FIGS. 45A and 45B, the temperature sensor mount 4520 can be a small diameter tube or sleeve 4540 joined to the leading edge of the heater tube 4510. FIG. 45A shows a side view of the mount on the heater tube 4510, while FIG. 45B is a view along the axis of the tube 4540 or sleeve. The sensor tube 4540 is preferably brazed to the heater tube with a substantial braze fillet 4530. The large braze fillet 4530 will maximize the thermal bond between the heater tube and the sensor mount. In another embodiment, the tube or sleeve 4540 may have a shield. As described supra, an outer shield cover may help insulate the temperature sensor mount 4520 from convective heat transfer and improve the thermal connection to the heater tube.

In an alternative embodiment of the tube heater head, the U-shaped heater tubes may be replaced with several helical wound heater tubes. Typically, fewer helical shaped heater tubes are required to achieve similar heat transfer between the exhaust gases and the working fluid. Reducing the number of heater tubes reduces the material and fabrication costs of the heater head. In general, a helical heater tube does not require the additional fabrication steps of forming and attaching fins. In addition, a helical heater tube provides fewer joints that could fail, thus increasing the reliability of the heater head.

Figure 47:
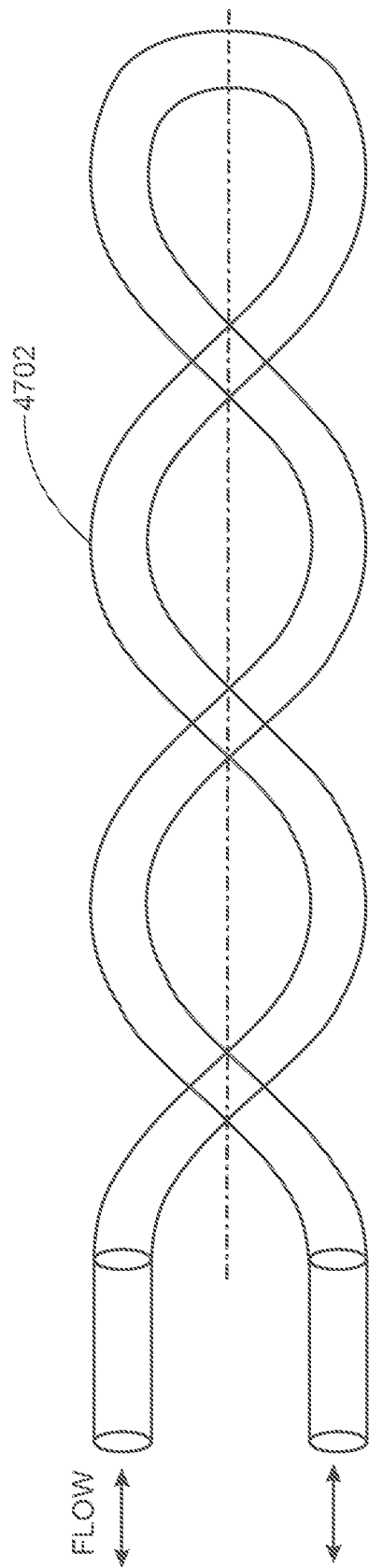
FIG. 47 shows a view of a tube heat exchanger in accordance with one embodiment.

FIGS. 46A-46D are perspective views of a helical heater tube in accordance some embodiments. The helical heater tube, 4602, as shown in FIG. 46A, may be formed from a single long piece of tubing by wrapping the tubing around a mandrel to form a tight helical coil 4604. The tube is then bent around at a right angle to create a straight return passage out of the helix 4606. The right angle may be formed before the final helical loop is formed so that the return can be clocked to the correct angle. FIGS. 46B and 46C show further views of the helical heater tube. FIG. 46D shows an alternative embodiment of the helical heater tube in which the straight return passage 4606 goes through the center of the helical coil 4604. FIG. 47 shows a helical heater tube in accordance with one embodiment. In FIG. 47, the helical heater tube 4702 is shaped as a double helix. The heater tube 4702 may be formed using a U-shaped tube wound to form a double helix.

Figure 48:
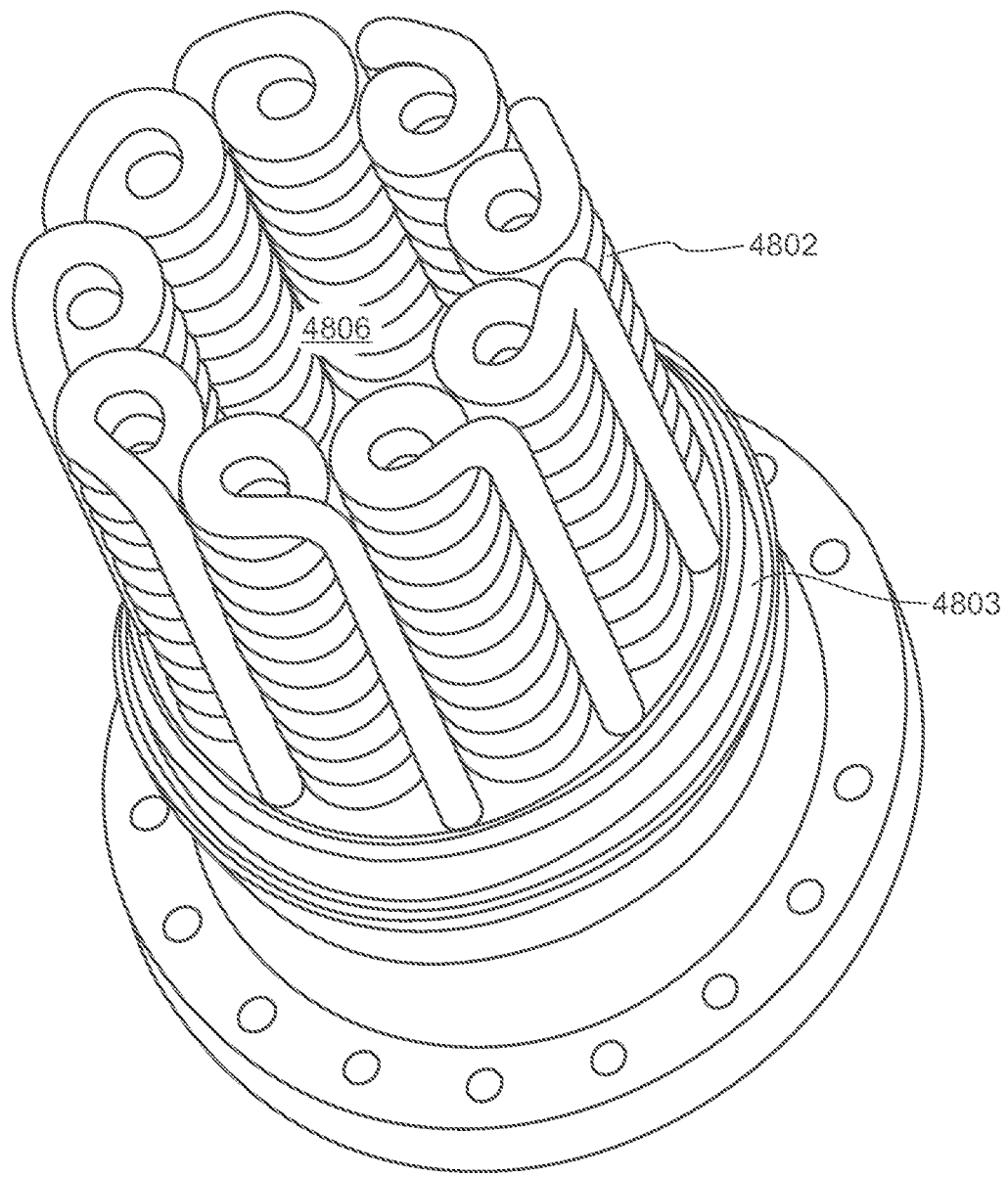
FIG. 48 shows a view of a tube heat exchanger in accordance with one embodiment.

FIG. 48 is a perspective view of a tube heater head with helical heater tubes (as shown in FIG. 46A) in accordance with one embodiment. Helical heater tubes 4802 are mounted in a circular pattern o the top of a heater head 4803 to form a combustion chamber 4806 in the center of the helical heater tubes 4802. The helical heater tubes 4802 provide a significant amount of heat exchange surface around the outside of the combustion chamber 4806.

Figure 49:
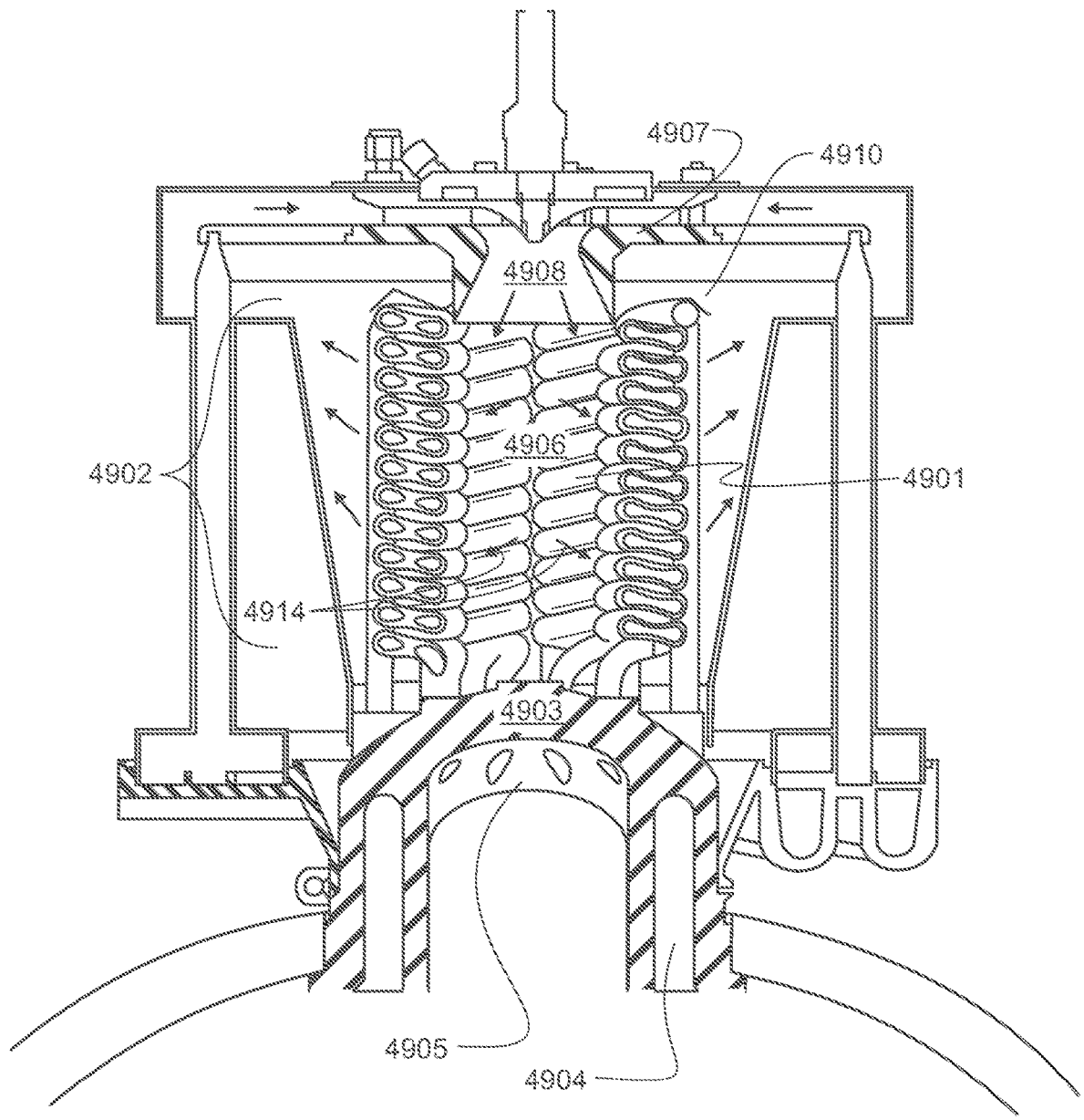
FIG. 49 shows a view of a heater head of an engine in accordance with one embodiment.

FIG. 49 is a cross sectional view of a burner and a tube heater head with helical heater tubes in accordance with some embodiments. Helical heater tubes 4902 connect the hot end of a regenerator 4904 to a cylinder 4905. The helical heater tubes 4902 are arranged to form a combustion chamber 4906 (also shown in FIG. 50 as 5006) for a burner 4907 that is mounted coaxially and above the helical heater tubes 4902. Fuel and air are mixed in a throat 4908 of the burner 4907 and combusted in the combustion chamber 4906. The hot combustion (or exhaust) gases flow, as shown by arrows 4914, across the helical heater tubes 4902, providing heat to the working fluid as it passes through the helical heater tubes 4902.

In one embodiment, the heater head 4903 (also shown in FIG. 50 as 5003) further includes a heater tube cap 4910 at the top of each helical coiled heater tubes 4902 to prevent the exhaust gas from entering the helical coil portion 4901 (also shown in FIG. 50 as 5001) of each heater tube and exiting out the top of the coil. In another embodiment, an annular shaped piece of metal covers the top of all of the helical coiled heater tubes. The heater tube cap 4910 prevents the flow of the exhaust gas along the heater head axis to the top of the helical heater tubes between the helical heater tubes. In one embodiment, the heater tube cap 4910 may be Inconel 625 or other heat resistant alloys such as Inconel 600, Stainless Steels 310 and 316 and Hastelloy X.

In another embodiment, the top of the heater head 4903 under the helical heater tubes 4902 is covered with a moldable ceramic paste. The ceramic paste insulates the heater head 4903 from impingement heating by the flames in the combustion chamber 4906 as well as from the exhaust gases. In addition, the ceramic blocks the flow of the exhaust gases along the heater head axis to the bottom of the helical heater tubes 4902 either between the helical heater tubes 4902 or inside the helical coil portion 4901 of each heater tube.

Figure 50:
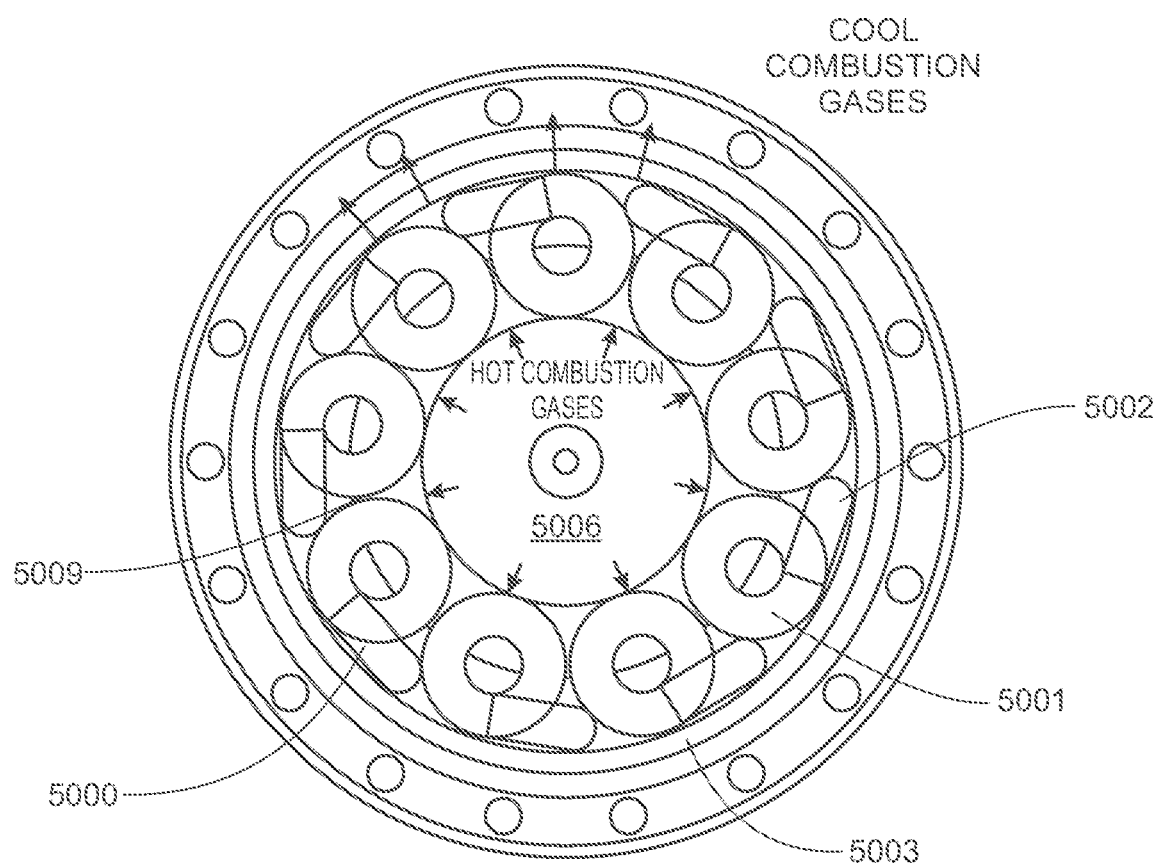
FIG. 50 shows a view of a tube heat exchanger in accordance with one embodiment.

FIG. 50 is a top view of a tube heater head with helical heater tubes in accordance with one embodiment. As shown in FIG. 50, the return or straight section 5002 of each helical heater tube 5000 is advantageously placed outboard of gap 5009 between adjacent helical heater tubes 5000. It is important to balance the flow of exhaust gases through the helical heater tubes 5000 with the flow of exhaust gases through the gaps 5009 between the helical heater tubes 5000. By placing the straight portion 5002 of the helical heater tube outboard of the gap 5009, the pressure drop for exhaust gas passing through the helical heater tubes is increased, thereby forcing more of the exhaust gas through the helical coils where the heat transfer and heat exchange area are high. Exhaust gas that does not pass between the helical heater tubes will impinge on the straight section 5002 of the helical heater tube, providing high heat transfer between the exhaust gases and the straight section. Both FIGS. 49 and 50 show the helical heater tubes placed as close together as possible to minimize the flow of exhaust gas between the helical heater tubes and thus maximize heat transfer. In one embodiment, the helical coiled heater tubes 4901 may be arranged so that the coils nest together.

Pin or Fin Heat Exchanger

Figure 51A:
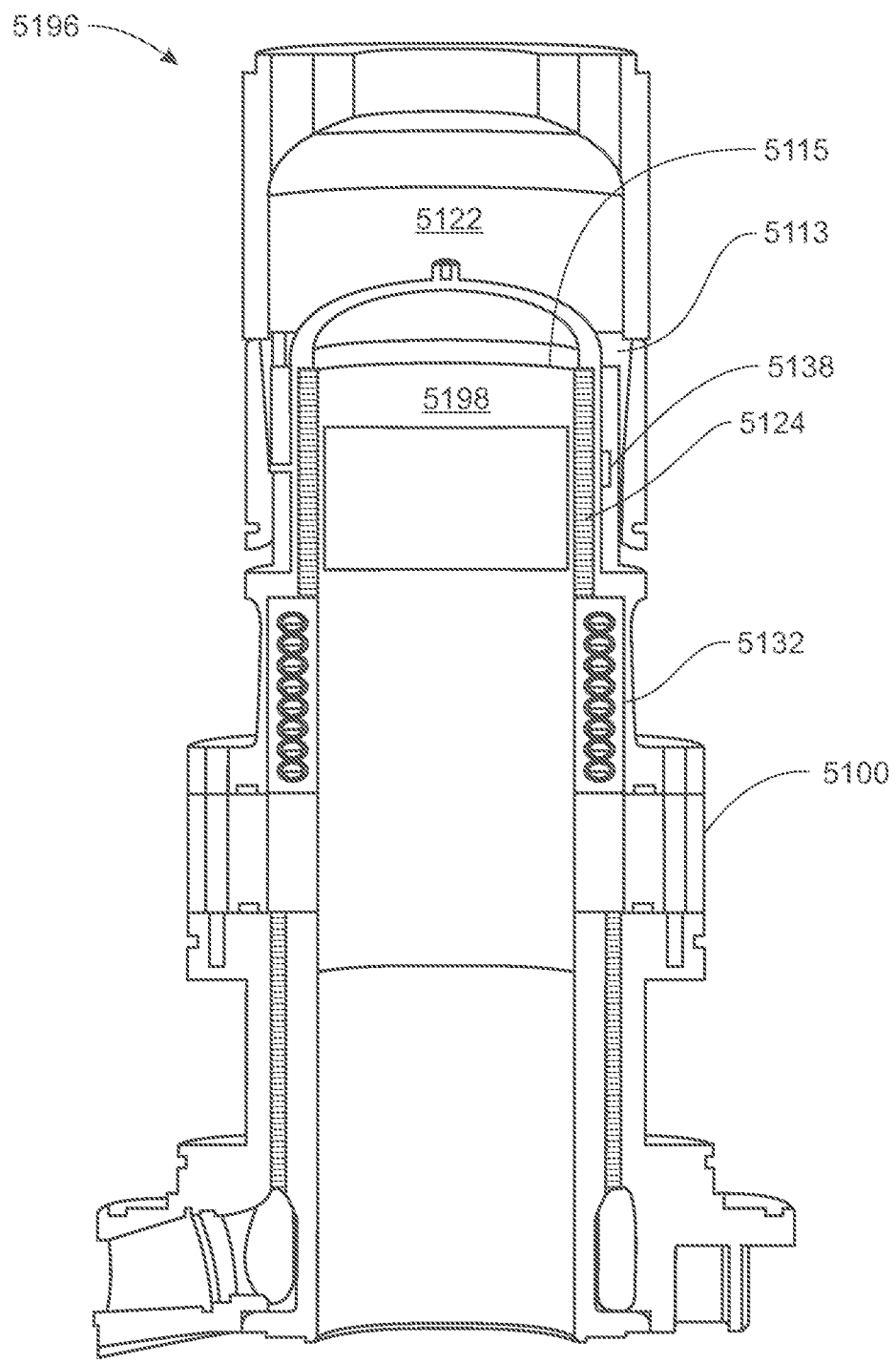
FIGS. 51A and 51B show views of heat exchangers of an engine in accordance with various embodiments.
Figure 51B:
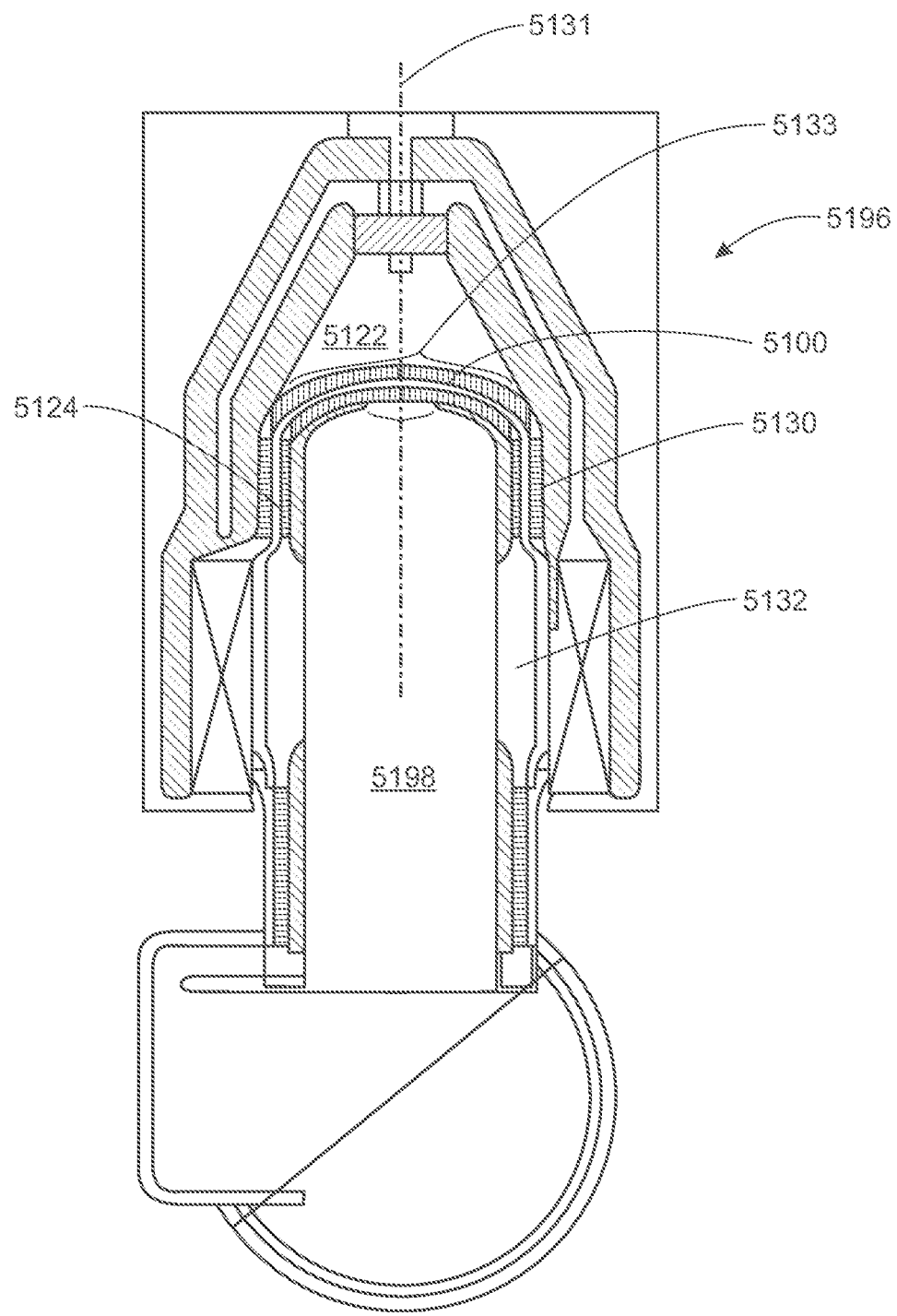

Now referring to FIGS. 51A and 51B, fins or pins may alternatively be used to increase the interfacial area between the hot fluid combustion products and the solid heater head so as to transfer heat, in turn, to the working fluid of the engine. Heater head 5100 may have heat transfer pins 5124, here shown on the interior surface of heater head 5100, in the space between the heater head and expansion cylinder liner 5115. Additionally, as shown in FIG. 51B in a cross section of Stirling cycle engine 5196 taken along a different diameter of expansion volume 5198 from that of FIG. 51A, heat transfer pins 5130 may also be disposed on the exterior surface of heater head 5100 so as to provide a large surface area for the transfer of heat by conduction to heater head 5100, and thence to the working fluid, from combustion gases flowing from combustor 5122 past the heat transfer pins. Dashed line 5131 represents the longitudinal axis of the expansion cylinder. FIG. 51B also shows heat transfer pins 5133 lining the interior and exterior surfaces of the top of heater head 5100, in accordance with one embodiment. Interior-facing heat transfer pins 5124 serve to provide a large surface area for the transfer of heat by conduction from heater head 5100 to working fluid displaced from expansion volume 5198 by the expansion piston and driven through regenerator chamber 5132. Additional embodiments of heater head 5100 are disclosed in U.S. Pat. Nos. 6,381,958, and 6,966,182, which, as previously mentioned, are incorporated by reference in their entireties.

Depending on the size of heater head 5100, hundreds or thousands of inner transfer pins 5124 and outer heat transfer pins 5130 may be desirable.

One method for manufacturing heater head 5100 with heat transfer pins 5124 and 5130 includes casting the heater head and pins (or other protuberances) as an integral unit. Casting methods for fabricating the heater head and pins as an integral unit include, for example, investment casting, sand casting, or die casting.

While the use of pin fins is known for improving heat transfer between a surface and a fluid, the integral casting of radial pin fins on the cylindrical heater head of a Stirling engine has not been practiced nor suggested in the art, despite the fact that casting the heater head and it's heat exchange surfaces in a single step is one of the most cost effective methods to produce a heater head. The difficulty encountered in integral casting of radial pin fins is discussed further below. A pin fin that could be cast as part of cylindrical wall would allow the inexpensive fabrication of a highly effective heater head and/or cooler for a Stirling engine.

Castings are made by creating negative forms of the desired part. All forms of production casting (sand, investment and injection) involves forming extended surfaces and details by injecting material into a mold and then removing the mold from the material leaving the desired negative or positive form behind. Removing the mold from the material requires that all the extended surfaces are at least parallel. In fact, good design practice requires slight draft on these extended surfaces so that they release cleanly. Forming radial pins on the outside or inside of a cylinder would require the molds to contain tens or hundreds of parts that pull apart in different directions. Such a mold would be cost prohibitive.

Figure 52A:
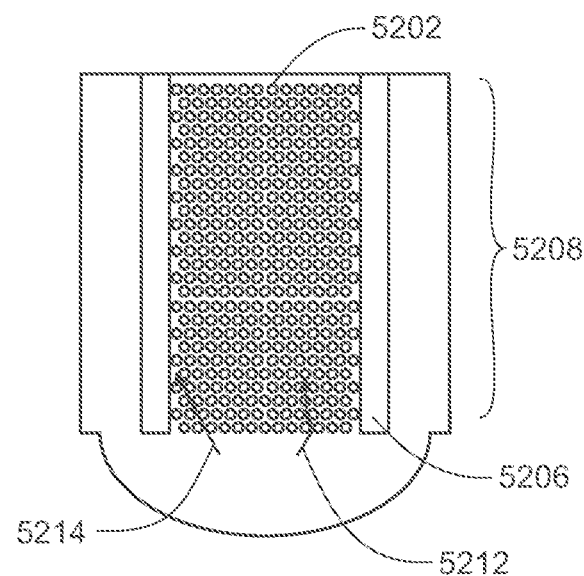
FIGS. 52A-52C show various views of a heat exchanger in accordance with one embodiment.
Figure 52B:
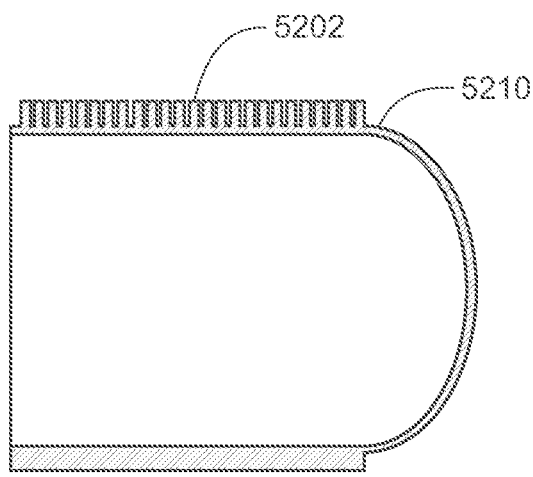
Figure 52C:
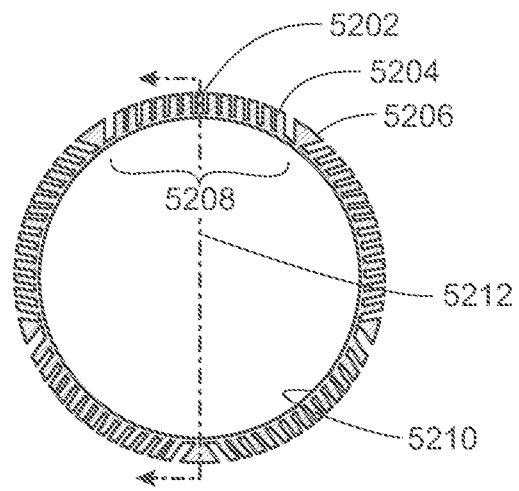
Figure 52D:
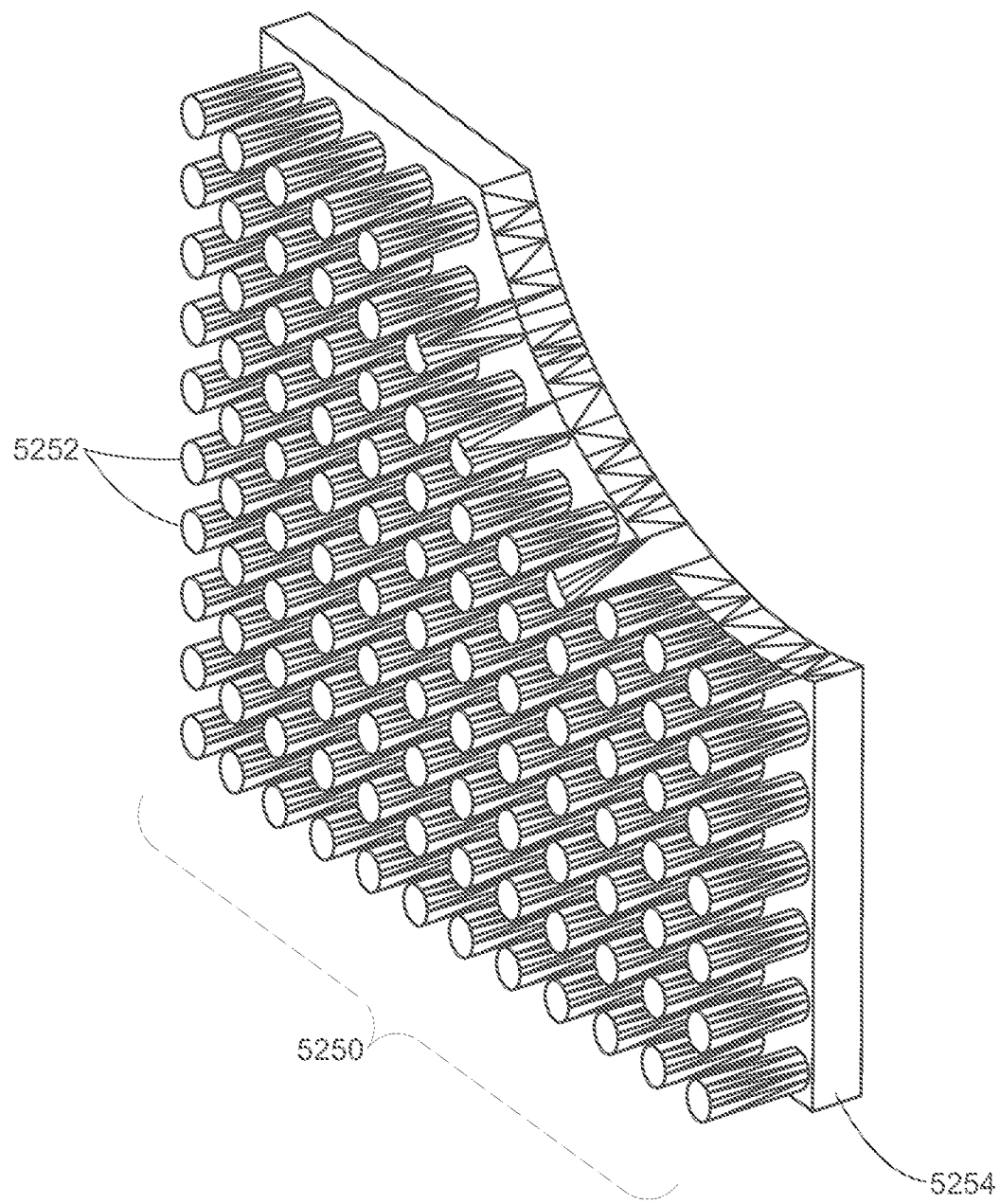
FIG. 52D shows a view of a heat exchanger in accordance with one embodiment.

In accordance various embodiments, pins or fins may be cast onto the inside and outside surface of Stirling heat exchangers using production sand, investment or metal injection casting methods. Referring to FIGS. 52A-52D and 53D, and, first, to FIG. 52A, pins 5202 are arranged into several groups 5208 of parallel pins 5202 around cylindrical wall 5210 of heater head 5100, shown in cross section parallel to the central axis in FIG. 52B and in cross section transverse to the central axis, in FIG. 52C. It should be noted that the technology herein described may advantageously be applied more generally in any other heat exchanger application. All the pins 5202 in each group 5208 are parallel to each other. Only the pins 5202 in the center of the group are truly radial. The pins on the outside of the group, such as those designated by numeral 5204 in FIGS. 52C and 53D, are angled inward from a local radius such as to be substantially parallel to a radial line 5212 toward the center of the group. In addition, the pins on the outside of the group are preferably longer, typically by a small amount, than pins closer to the center of the group. However, the heat transfer only changes only slightly from the center of the group to the outside in the embodiment depicted in FIGS. 52A-52C, and 53D in which 5 groups 5208 of parallel pins provide approximately radial pin fins around cylinder 5210.

In the casting process in accordance with some embodiments, positive or negative molds of each group of parallel fins are formed in a single piece. Several mold pieces are then assembled to form the negative form for a sand casting. In investment mold casting, the wax positive can be formed in an injection mold with only a handful of separate parts that pull apart in different directions. The resulting mold is formed at an acceptable cost, thereby making production of a pin fin heater head economically practical.

Casting of a heater head having protuberances, such as pins, extending to the interior and exterior of a part with cylindrical walls may be achieved, in accordance with various embodiments, by investment, or lost-wax, casting, as well as by sand casting, die casting, or other casting processes. The interior or exterior protuberances, or both, may be integrally cast as part of the head.

While typically more cheaply accomplished than machining or assembly of the pin arrays, casting pin arrays may still have attendant difficulties and substantial costs. Additionally, the casting process may result in a heater head that is less than fully densely populated with pins, thus increasing the fraction of gases failing to collide with the heater head surface and reducing the efficiency of heat transfer.

One embodiment of the method for populating the surfaces of heater head 5100 with heat transfer pins entails fabrication of heater 5100 and arrays of heat transfer pins in separate fabrication processes. An array 5250 (also shown in FIG. 53B as 5350) of heat transfer pins 5252 may be cast or injection molded with panel 5254 resulting in an integral backing panel structure shown in FIG. 52D. Pin arrays 5250, after casting or molding, are mounted to the inner and outer surfaces of the heater head by a high temperature braze. Thus, a more densely populated head with a resultant low rate of gas leakage past the pins may advantageously be achieved. In other embodiments, panels 5254 may be secured by various mechanical means to the heater head.

Transient liquid-phase (TLP) bonding, as described, for example, in the Aerospace Structural Metals Handbook, Code 4218, p. 6 (1999) is particularly advantageous for brazing the panels to the head, since nickel based superalloys, typically employed for fabrication of the head, is difficult to weld by conventional processes, and operates in a high stress and high temperature environment. Advantages of TLP bonding in this application are that the parts braced by TLP are effectively welded using the parent material and have nearly the same tensile strength properties as integrally cast parts. TLP bonds do not remelt at elevated temperatures, whereas typical brazes will remelt at the brazing temperature. This is of particular significance in the case of continuous operation at elevated temperatures where temperature excursions may occur, as in the present application.

The panels 5254 of pins may be attached to the interior or exterior of either the heater head or the cooler by other means. In one alternative embodiment, the panel may be mechanically attached into slots at its lateral edges. The slots are provided in dividers 5306 (described in the following discussion). In another embodiment, the panels are attached to the heater head or cooler by brazing. In yet another embodiment, the panels are attached to the heater head or cooler by sintering the panels to the cylindrical walls of the heater head or cooler.

Figure 53A:
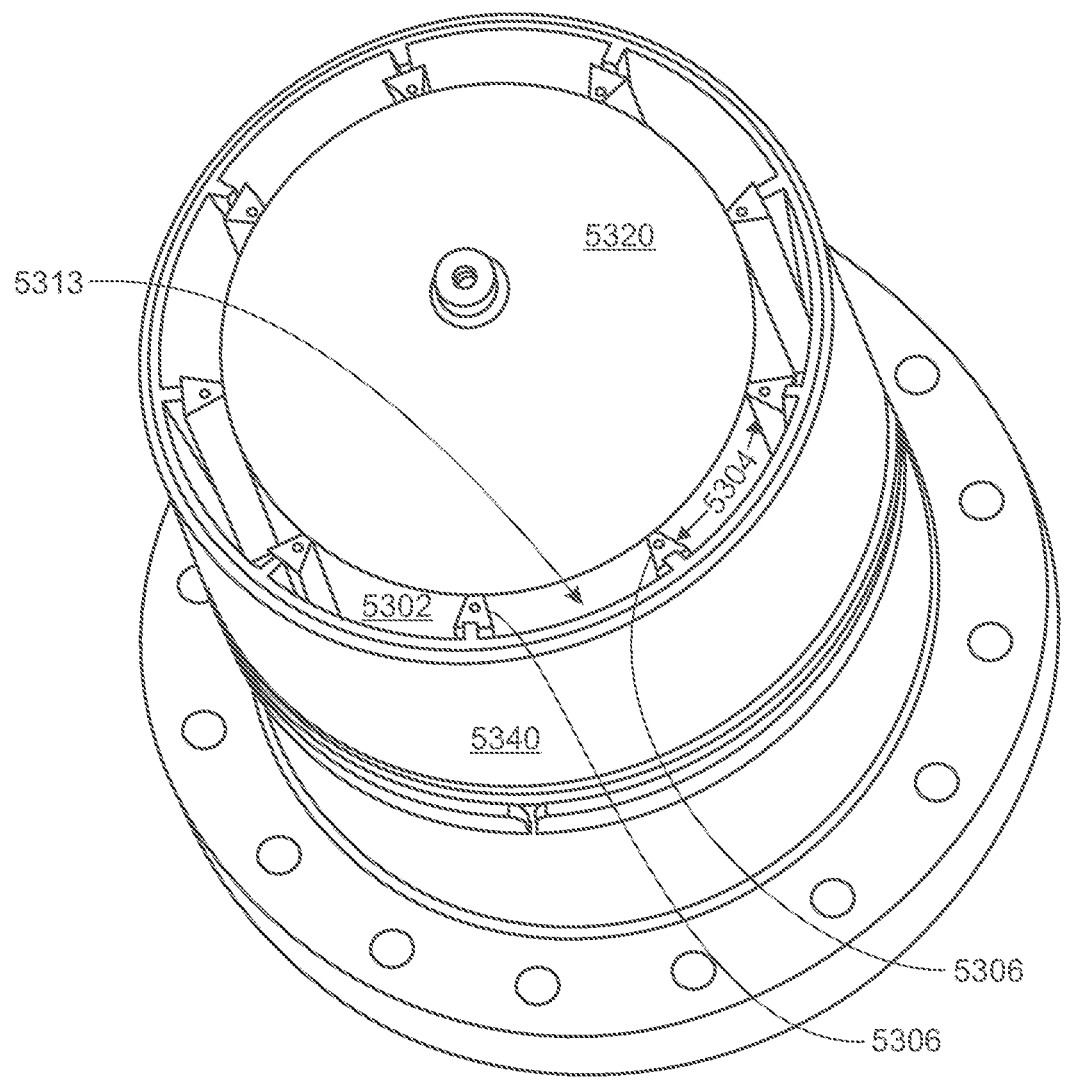
FIGS. 53A and 53B show views of a heat exchanger in accordance with one embodiment.
Figure 53B:
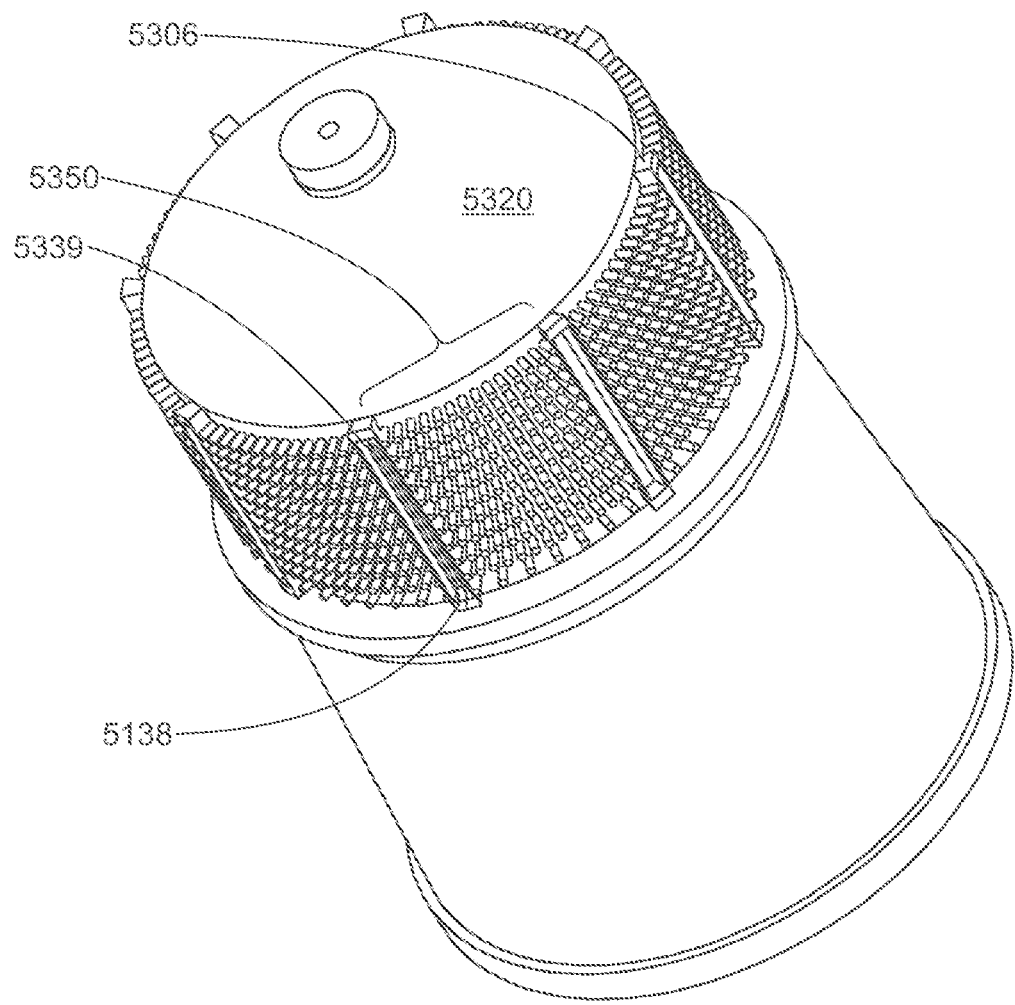

Dividers 5306, as shown in FIGS. 52C, 53A, and 53B, may advantageously improve the heat transfer rate of the pin fin panels. Additionally, they may provide a convenient location for locating temperature sensors. Lastly, the dividers may advantageously provide a convenient structure to which to attach panels of pins to the heater head, in one embodiment, and a parting line for casting operations, in accordance with a further embodiment.

Dividers 5306 may serve to improve the thermal effectiveness of the pin fin arrays in the following manner. Referring, once again, to FIG. 52A, the rate of heat transfer for a fluid flowing through staggered pin fins is significantly higher than for fluid flowing through aligned pin fins. Fluid approaching a staggered pin array 5208 would travel at a 45-degree angle to an axial path along the length of the cylinder, with the skew direction designated by numeral 5214. In order to provide for improved thermal transfer, dividers 5206, 5306 are provided, in accordance some embodiments, to force the fluid flow through the staggered array of pin fins along a path designated by numeral 5212. In addition to forcing the flow to travel axially, the dividers provide convenient interfaces and joining planes for the casting molds described above.

In certain embodiments, individual arrays 5250, each with its associated panel segment 5254, comprise arcuate fractions of the circumferential distance around the heater head. This is apparent in the top view of the heater head assembly shown in perspective in FIG. 53A. Cylinder head 5320 is shown, as is exterior surface 5302 of the heater head. Backer segments supporting arrays of heat transfer pins are not shown but are inserted, during assembly, in spaces 5304 surrounding exterior surface 5302 of the heater head. Between successive heat transfer pin array segments are trapezoidal dividers 5306 which are baffled to block the flow of exhaust gases in a downward direction through any path other than past the heat transfer pins.

In one embodiment, flow dividers 5306 include structures for mechanically retaining the panel segments 5254 during assembly, before brazing, or simply to mechanically retain the panels 5254 against heater head 5302.

In order to maximize engine power, the hottest part of the heater head is preferably at the highest temperature allowed, considering the metallurgical creep and tensile strength, stress, and appropriate factors of safety. Maintaining the hottest part of the heater head at the highest temperature requires measuring the temperature of the hottest part of the heater head. The dividers provide a convenient location and routing for temperature sensors on the heater had to any axial location along the pin fin arrays. Hot gas flow path 5313 (shown also in FIG. 51A), is defined, on the outside, by gas flow channel cover 5340. Since exhaust gases do not flow through dividers 5306, a temperature sensor, such as thermocouple 5138 (shown in FIGS. 51A and 53C) is advantageously disposed in divider 5306 in order to monitor the temperature of heater head 5100 with which the temperature sensor is in thermal contact. The position of pin arrays 5250 and temperature sensor 5138 mounted within divider 5306 is shown more clearly in the view of FIG. 53B in which the pin backer has been removed.

Figure 53C:
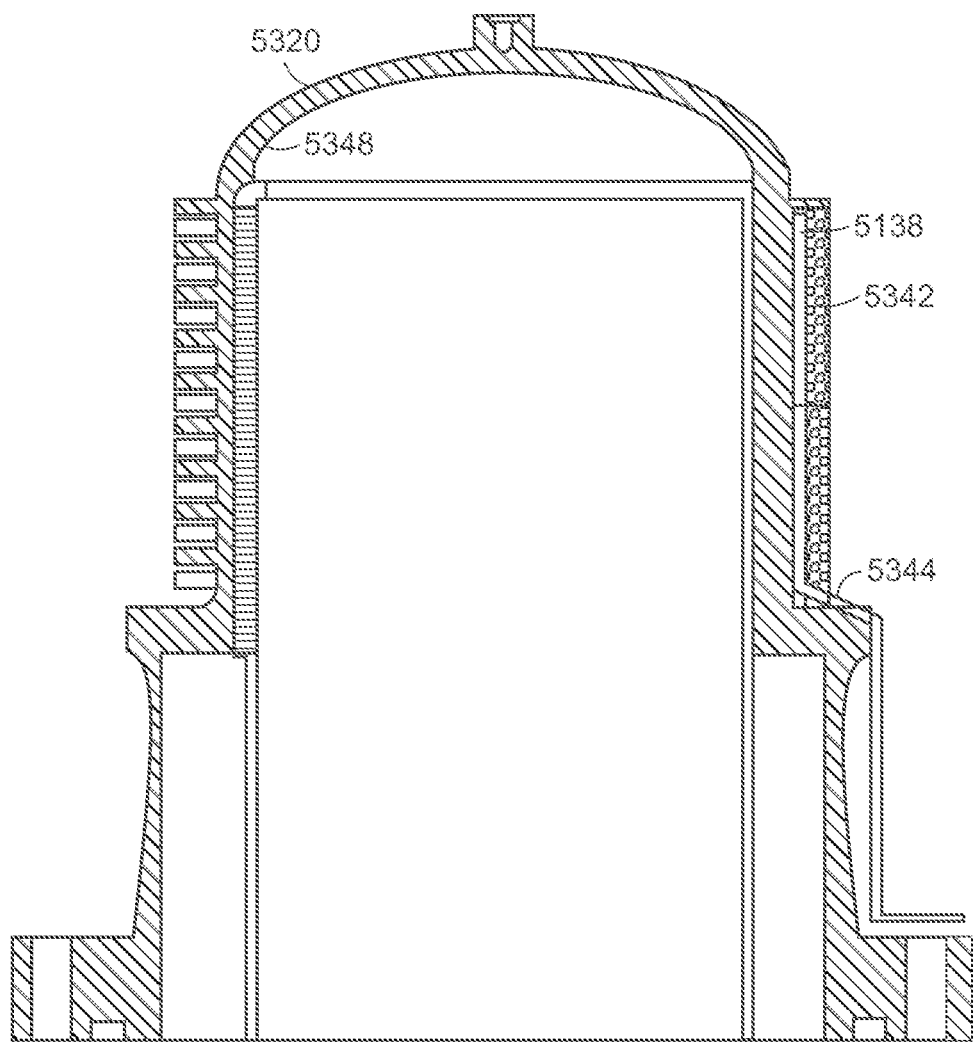
FIG. 53C shows a view of a heat exchanger of an engine in accordance with one embodiment.
Figure 53D:
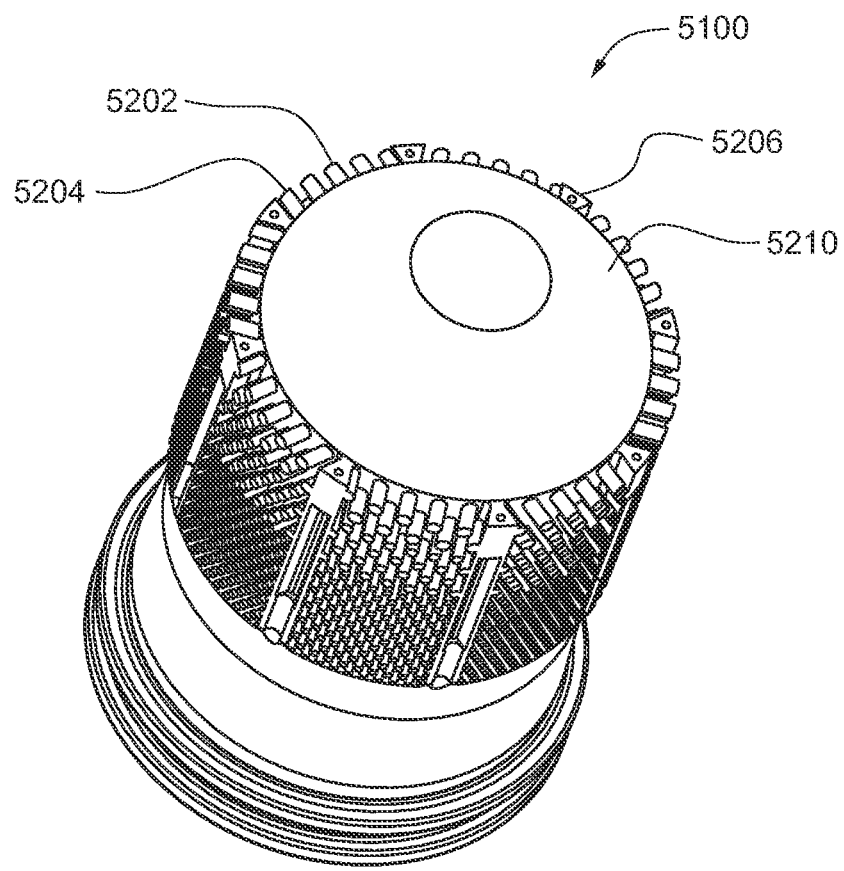
FIGS. 53D-53F show views of a heat exchanger of an engine in accordance with one embodiment.
Figure 53E:
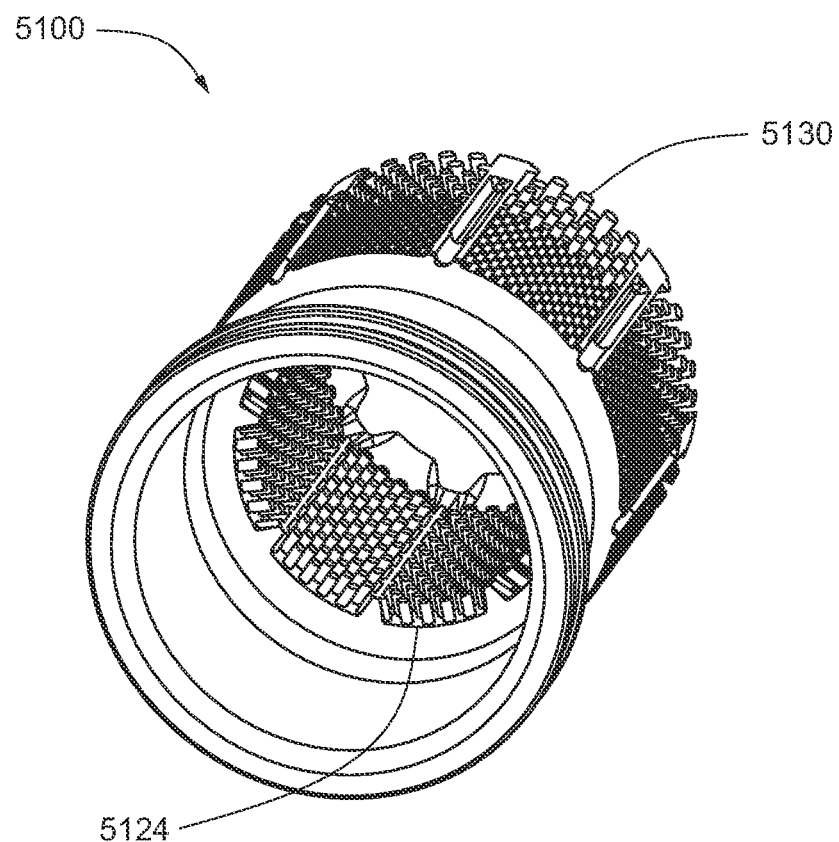
Figure 53F:
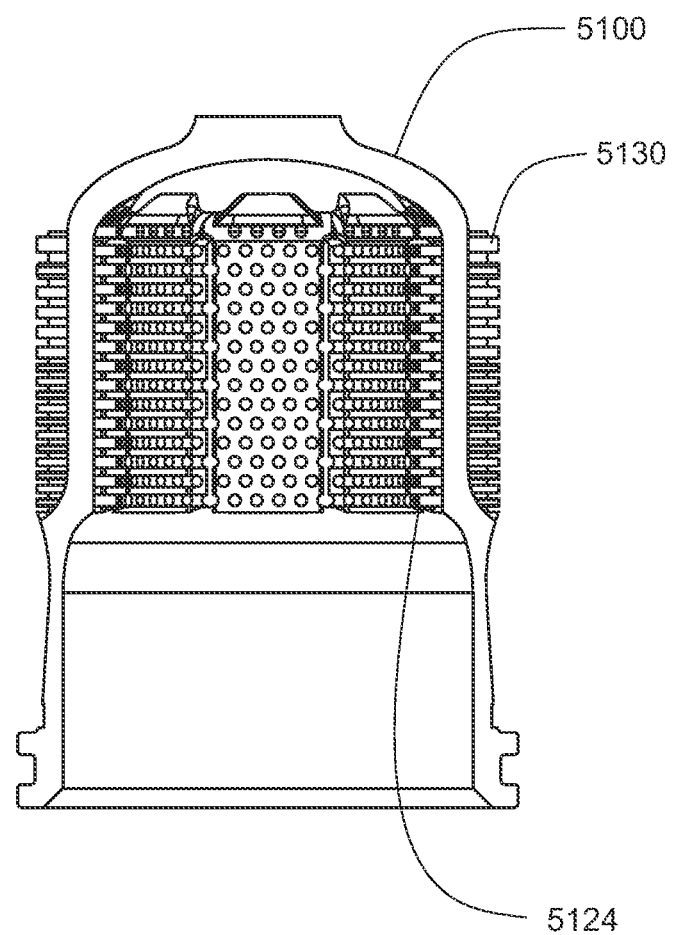

Temperature sensing device 5138 is preferably disposed within divider 5306 as depicted in FIG. 53B. More particularly, temperature sensing tip 5339 of temperature sensor 5138 is preferably located in the slot corresponding to divider 5306 as nearly as possible to cylinder head 5320 in that this area is typically the hottest part of the heater head. Alternatively, temperature sensor 5138 may be mounted directly to cylinder head 5320, however location of the sensor in the slot, as described, is used in some embodiments. Engine performance, in terms of both power and efficiency, is highest at the highest possible temperature, yet the maximum temperature is typically limited by metallurgical properties. Therefore, sensor 5138 should be placed to measure the temperature of the hottest, and therefore the limiting, part of the heater head. Additionally, temperature sensor 5138 should be insulated from combustion gases and walls of divider 5306 by ceramic insulation 5342, as shown in FIG. 53C. The ceramic can also form an adhesive bond with the walls of the divider to retain the temperature sensor in place. Electrical leads 5344 of temperature sensor 5138 should also be electrically insulated.

Although the burner is designed to have circumferential symmetry, hot spots may develop on heater head 5320. Adding to the problem, the alloys typically employed for fabrication of the heater head, on account of their high melting point, have relatively poor thermal conductivity. Once hot spots form, they are apt to endure because the gas flow outside the head is axial rather than circumferential, since dividers 5306 (shown in FIG. 53A) impede any circumferential flow. Additionally, heating may increase local gas viscosity thereby redirecting more flow to other channels. In order to even out the temperature distribution on the heater head, a layer of highly thermally conductive metal, such as copper, of thickness greater than 0.001 in. and preferably about 0.005 in. is applied to interior surface 5348 of heater head 5320, by deposition or plating, or other application method. Alternatively, a similar coating may be applied to the exterior surface, in accordance with another embodiment.

In order to keep the size of the Stirling cycle engine small, it is important to maximize the heat flux from the combustion gas through the heater head. Whereas prior art employed loops of pipe in which heat transfer to the working fluid is achieved, loops engender both low reliability (since the loops are mechanically vulnerable) and higher cost, due to the more complicated loop geometry and extra materials. The limiting constraint on the heat flux are the thermomechanical properties of the heater head material that must be able to withstand the high temperatures of the combustion chamber while maintaining the structural integrity of the pressurized head. The maximum design temperature is determined by the hottest point on the heater head which is typically at the top of the wall. Ideally, the entire heater wall hot section would be at this maximum temperature, as may be controlled, for example, by controlling the fuel flow.

As combustion gases travel past the heater head in gas flow channels 5113, 5313 (shown in FIG. 51A), the gas temperature decreases as heat is transferred from the gas to the heater head. As a result, the maximum allowed heater head temperature at the top of the gas flow channel must be set by the material used for the heater head. The material is preferably chosen from the family of high nickel alloys, commonly known as super alloys, such as Inconel 600 (having a maximum temperature $T_{max}$=800.degree. C. before softening), Inconel 625 ($T_{max}$=900.degree. C.), Inconel 754 ($T_{max}$=1080.degree. C.), or Hastelloy GMR 235 ($T_{max}$=935.degree. C.). The gas in gas channel 5113, 5313 may cool by as much as 350.degree. C. on transit through the channel, resulting in underheating of the bottom of the hot zone.

In accordance with some embodiments, the temperature profile of the heater wall is controlled by means of heat transfer geometry, as now described. One method for controlling the geometry is by means of providing a variable cross-section gas flow channel 5113, 5313 (shown in FIGS. 51A and 54A). The radial dimension (perpendicular to the wall of the heater head), and thus the cross-section of the channel, is large at the top of the heater wall, thereby allowing much of the gas to bypass the pin array at the top of the wall. The bypass allows hotter gas to reach the pin array at the bottom of the wall thereby allowing the bottom pin array to operate closer to its maximum temperature. The temperature gradient from the top of the heater to the bottom of the hot section (before regenerator volume 5132, shown in FIG. 51A) has been reduced from as much as 350.degree. C. to 100.degree. C. using a variable cross-section gas flow channel.

A second method for controlling the geometry is by varying the population density and the geometry of the pin array as a function of position along the gas flow channel. The geometry of the pins may be adjusted by varying the height/diameter (H/D) ratio of the pins. If a casting process is used to form the pin array, the range of H/D rations may be limited by the process. If pin rings are used, the range of H/D ratios may be extended.

Figure 54A:
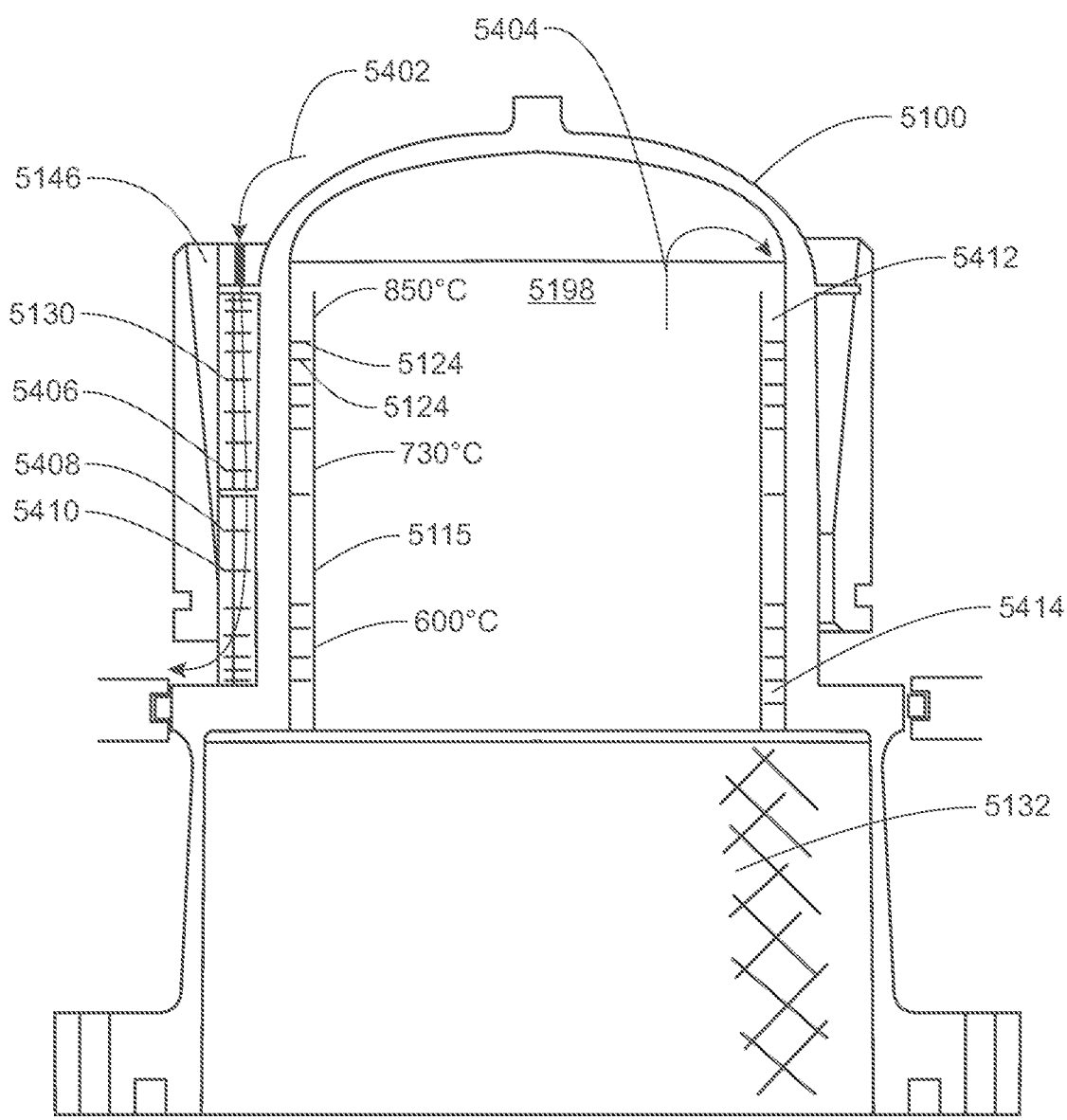
FIGS. 54A and 54B show views of a heat exchanger of an engine in accordance with one embodiment.
Figure 54B:
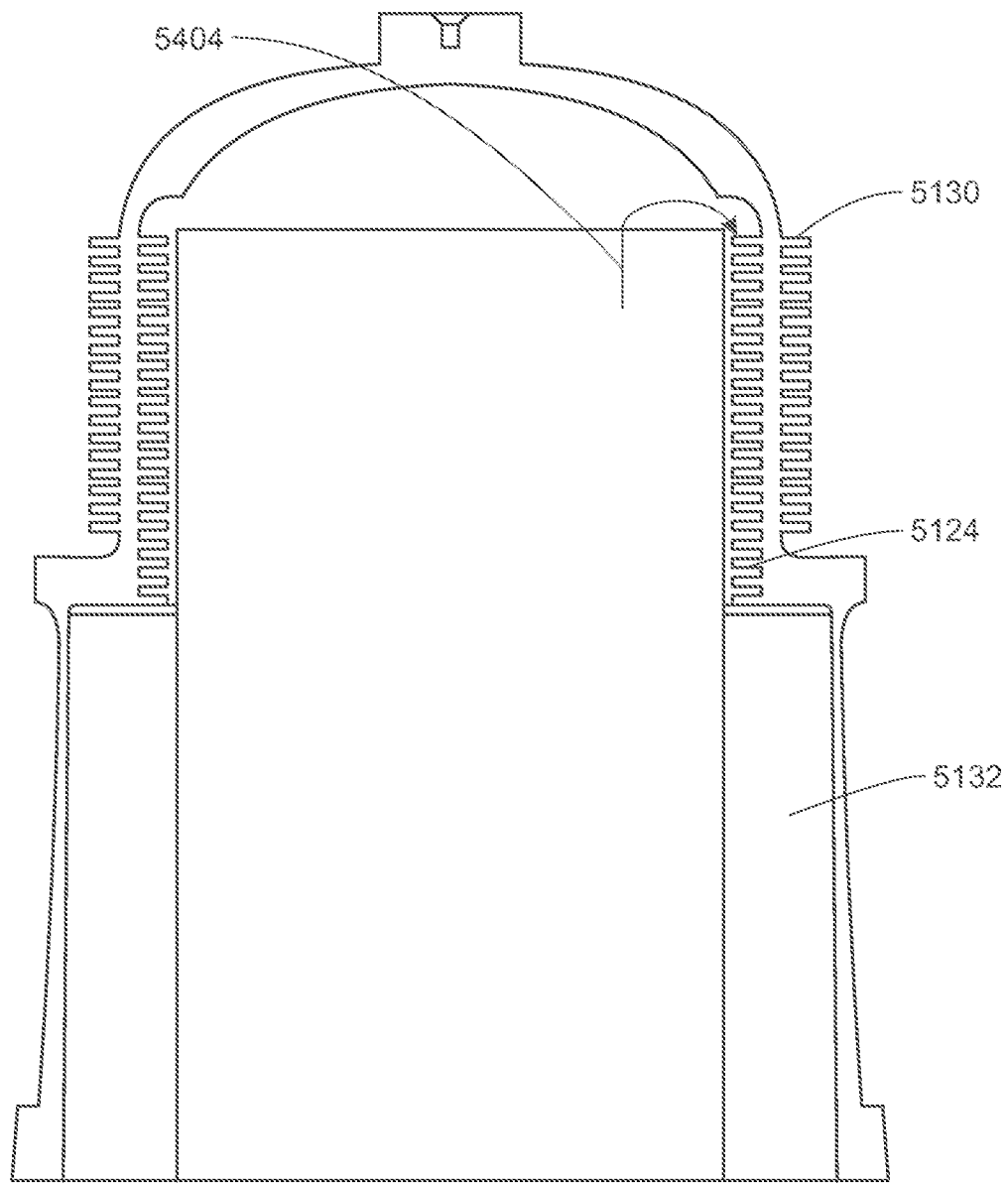

Referring now to FIGS. 53E, 53F, 54A and 54B, arrow 5402 designates the path of heated exhaust gases past heater head 5100. Outer heat transfer pins 5130 intercept the heated exhaust gases and transfer heat via heater head 5100 and inner heat transfer pins 5124 to the working fluid that is driven from expansion cylinder 5115 along path 5404. (For clarity, heat transfer pins 5130 and 5124 are shown schematically in FIG. 54A. Additional heat transfer pins 5130 and 5124 had been depicted, not to scale, in the view of FIGS. 53E, 53F, and 54B.) Successive heat transfer pins 5406, 5408, and 5410, for example, present a progressively larger cross section to the flow of exhaust gas along path 5402. Thus, while the exhaust gas has transferred some fraction of its heat prior to arrival at the lower pins, heat is extracted there with a greater conduction rate, thereby reducing the temperature gradient between the top 5412 and bottom 5414 of the path of working fluid between expansion volume 5198 and regenerator volume 5132. Typical temperatures of the surface of expansion cylinder 5115 are indicated in FIG. 54A: 850.degree. C. at the top of the cylinder, 750.degree. C. at the center of the cylinder, and 600.degree. C. at the end of the cylinder closest to the regenerator volume.

Another method for achieving more even distribution of heat from the exhaust gases to the heater head is to create a tapered divider on the outside diameter of the heater head by means of concentric tapered pin backer 5146, as shown in FIG. 54A. The cross-sectional view of FIG. 54A shows how tapered pin backer 5146 allows some of the hottest exhaust gas to bypass the pins near the top of the heater head. Pin backer 5146 creates a narrowing annular gap on the outside of the pins that progressively forces more and more of the exhaust gases into the pin heat exchanger.

Figure 55A:
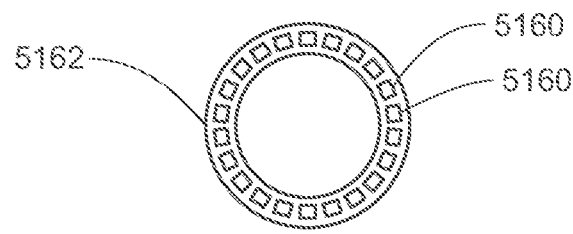
FIGS. 55A-55D show various views of a heat exchanger in accordance with one embodiment.
Figure 55B:
Figure 55C:
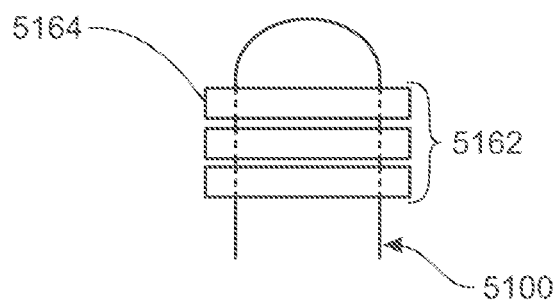
Figure 55D:
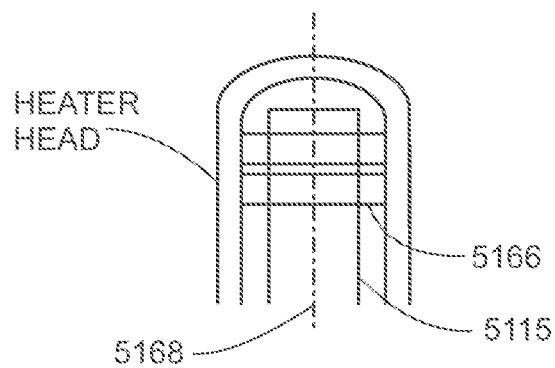

Another method for increasing the surface area of the interface between a solid such as heater head 5100 and a fluid such as combustion gases as discussed above is now described with reference to FIGS. 55A-55D. An effect analogous to that of fabricating heat transfer pins by casting or otherwise may be obtained by punching holes 5160 into a thin annular ring 5162 shown in top view in FIG. 55A and in side view in FIG. 55B. The thickness of ring 5162, which may be referred to as a 'heat transfer pin ring' is comparable to the thickness of the heat transfer pins discussed above, and is governed by the strength of the heat-conductive material at the high temperature of the combustion gases traversing holes 5160. The shape and disposition of holes 5160 within each ring is a matter of design for a particular application, indeed, holes 5160 may not be surrounded by solid material. The material of rings 5162 is preferably an oxidation-resistant metal such as Inconel 625 or Hastelloy GMR 235, though other heat-conducting materials may be used. Rings 5162 may be produced inexpensively by a metal stamping process. Rings 5162 are then mounted and brazed, or otherwise bonded, to the outer surface heater head 5100, as shown with respect to outer pin rings 5164 in FIG. 55C, and with respect to inner pin rings 5166 in FIG. 55D. Additional rings may be interspersed between the pin rings to control the vertical spacing between the pins. Expansion cylinder liner 5115 is shown in the interior of inner pin rings 5166.

Heat transfer rings 5162 may be advantageously applied to the interior of the heater head as well as to both the exterior and interior of the cooler of a thermal cycle engine. In these applications, the rings need not be oxidation resistant. Materials including copper and nickel are preferably used on the interior of the heater head, while the rings for the cooler are preferably made of one of various high thermal conductivity materials including aluminum, copper, zinc, etc.

The total cross sectional area of the heat transfer pins taken in a slice perpendicular to cylinder axis 5168 need not be constant, indeed, it is advantageously varied, as discussed in detail above, in reference to FIG. 54.

Referring to FIGS. 56A through 56C, the interior or exterior heat exchange surfaces may also be formed from various folded fin structures 5600, 5602, or 5604. The folded fin structures may be made of material similar to that of the heater head pressure dome or of high thermal conductivity materials such as copper which may provide improved fin efficiency. Fins fabricated from high melting-point materials such as that of the heater head 5100 (shown in FIG. 51A) may be continuous from the top to the bottom of the heater head. Folded fins may be fabricated from sheet metal and brazed to the interior surface of the heater head. Three folded fin configurations are shown by way of example: wavy fins 5600, lanced fins 5602, and offset fins 5604. In each case, the gas flow direction is indicated by an arrow designated by numeral 5606.

Fins formed from a dissimilar metal to that of heater head 5100 are attached in axial segments to avoid differential thermal expansion from breaking the brazed joint between the fins and the head. The offset fin configuration of FIG. 56C advantageously provides a superior heat transfer coefficient to that of plain fins.

The use of high thermal conductivity metal for the folded fins may advantageously allow the fins to be made longer, thereby improving heat transfer and reducing resistance to flow of the gas and improving engine efficiency.

Heater Head Support Ribs

The walls of the heater head must be sufficiently strong, at operating temperatures, to withstand the elevated pressure of the working gas. It is typically desirable to operate Stirling cycle engines at as high a working gas pressure as possible, thus, enabling the head to withstand higher pressures is highly advantageous. In designing the heater head, it must be borne in mind that increasing the pressure at a given operating temperature typically requires increasing the heater head wall thickness in direct proportion. On the other had, thickening the heater head wall results in a longer thermal conduction path between the exterior heat source and the working gas.

Moreover, thermal conduction increases with heat exchanger surface area, thus thermal efficiency is increased by increasing the diameter of the heater head. Stress in the wall, however, is substantially proportional to the diameter of the head, thus increasing the head diameter, at a given temperature and interior gas pressure, requires increasing the wall thickness in direct proportion.

Figure 57A:
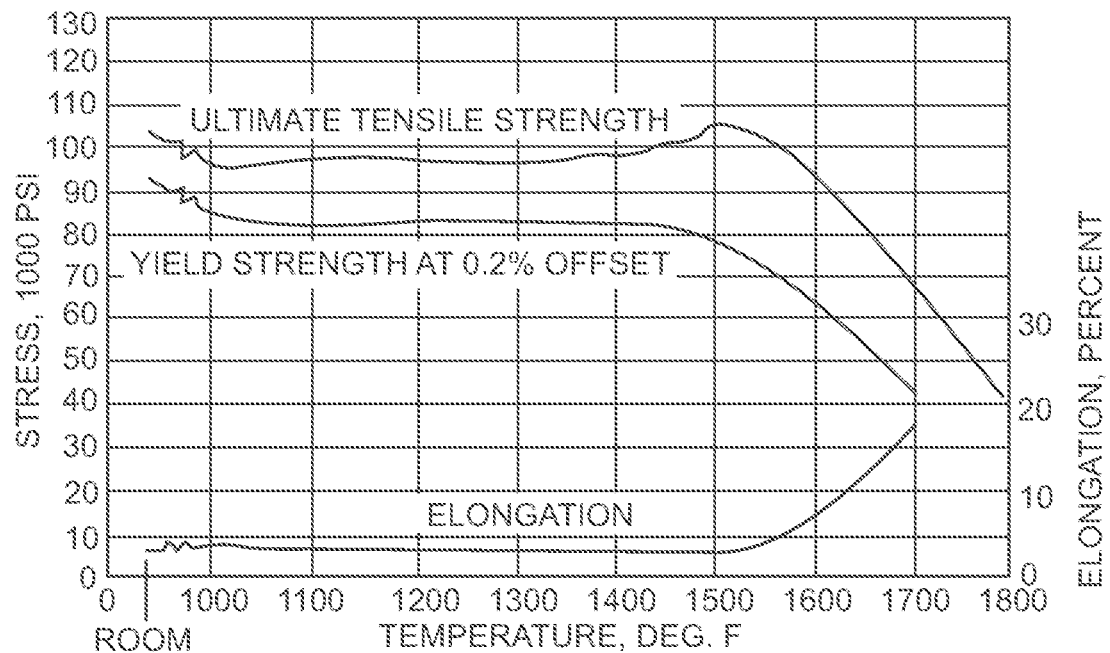
FIGS. 57A and 57B show various diagrams depicting physical properties of a heat exchanger in accordance with one embodiment.
Figure 57B:
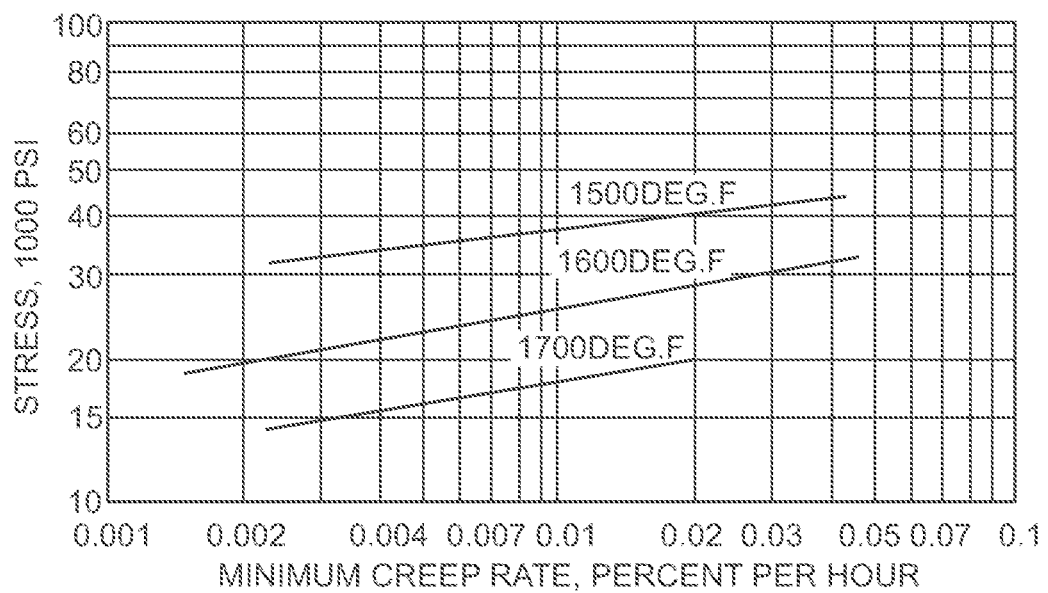

The strength considerations are tantamount at typical Stirling engine head temperatures, in fact, they drive the maximum operating temperature, since, as discussed, efficiency increases with temperature. Both creep and ultimate tensile strengths of materials tend to fall off precipitously when specified elevated temperatures are reached. Referring to FIG. 57A, the yield strength at 0.2% offset and ultimate tensile strength are shown for the GMR 235 nickel alloy in typical representation of the qualitative behavior of nickel alloys. Similarly, in FIG. 57B, it can be seen that the 0.01% per hour creep rate strength of GMR 235 falls from 40 ksi to half as the temperature rises from 1500.degree. F. to 1700.degree. F.

Figure 58:
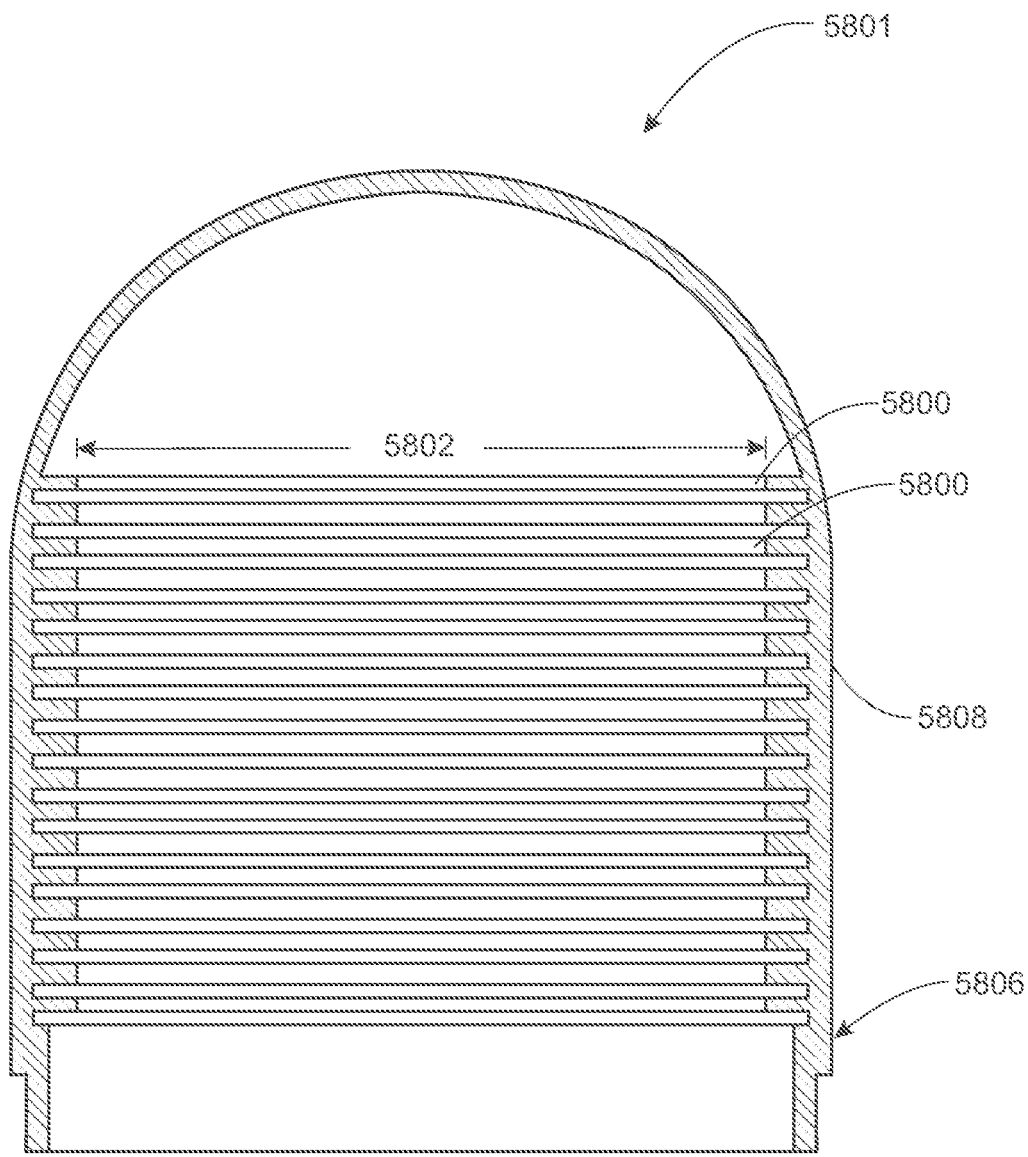
FIG. 58 shows a view of a heater head in accordance with one embodiment.

Some embodiments provide interior ribs (or hoops) 5800, such as those disclosed in U.S. Pat. Nos. 6,381,958, and 6,966,182, that enhance structural support of heater head 5801, as shown in cross-section in FIG. 58. Ribs 5800 are characterized by an interior bore 5802. The creep strength and rupture strength of heater head 5801 is thus determined predominantly by an effective thickness 5804 of the heater head and the interior bore diameter 5802. Heat conduction through the heater head is not limited by thickness 5804 since intervening segments 5806 of the head are narrower and provide enhanced heat conduction. Ribs 5800 not only relieve hoop stresses on outer wall 5808 of head 5801 but additionally provide supplemental surface area interior to the heater head and thus advantageously enhance heat transfer to the working fluid.

Further advantages of providing ribs 5800 interior to the heater head include reducing the temperature gradient across the head wall 5808 for a given rate of heat transfer, as well as allowing operation at higher hot end working temperatures. Additionally, by reducing the stress requirements on the outer wall, alternative materials to nickel based superalloys may be used, advantageously providing superior conductivity at reduced cost.

Figure 59:
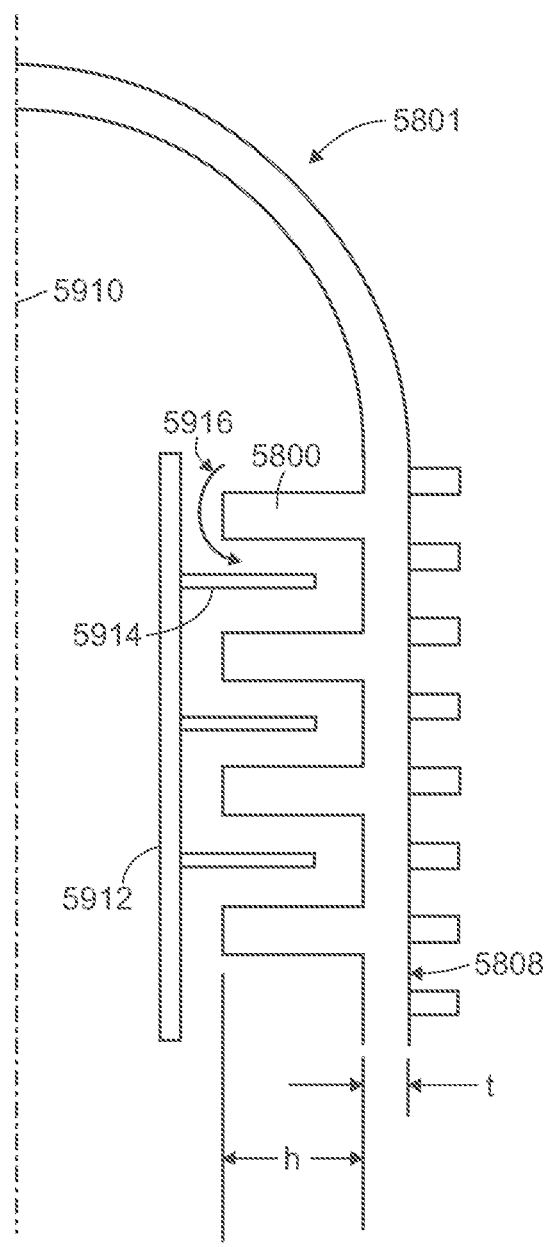
FIG. 59 shows a view of a heater head in accordance with one embodiment.

A cross section of heater head 5801 with ribs 5800 is further shown in FIG. 59. Dashed line 5910 designates the central longitudinal axis of the expansion cylinder. In accordance with various embodiments expansion cylinder hot sleeve 5912 may have transverse flow diverters 5914 for directing the flow of working gas, represented by around 5916, around circumferential ribs 5800 for enhancing heat transfer to the working gas. The additional width h of ribs 5800 contributes to the hoop strength of heater head 5101, whereas heat transfer is governed predominantly by the narrower thickness t of outer heater head wall 5808. In typical Stirling engine applications, while the heater head exterior may be run as hot as 1800.degree. F., ribs 5800 that provide structure strength typically run no hotter than 1300.degree. F.

Figure 60A:
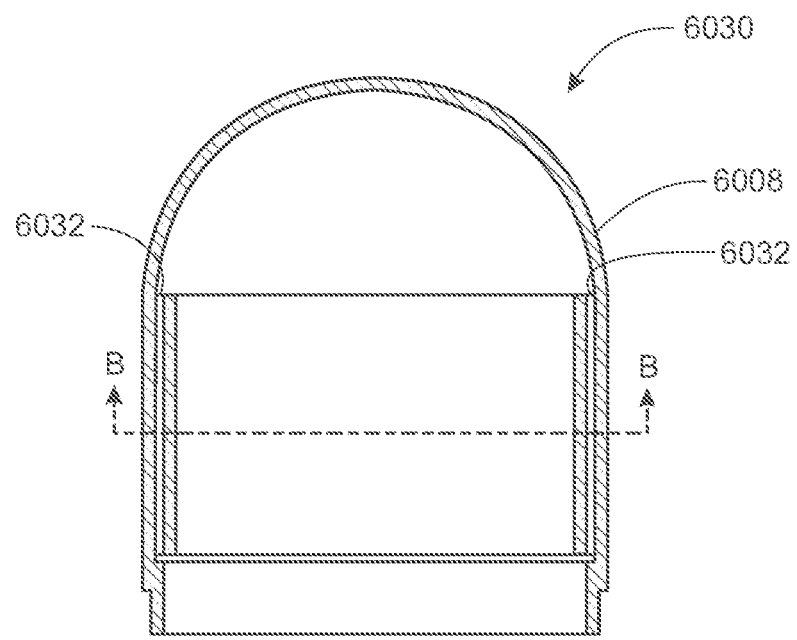
FIGS. 60A and 60B show views of a heater head in accordance with one embodiment.
Figure 60B:
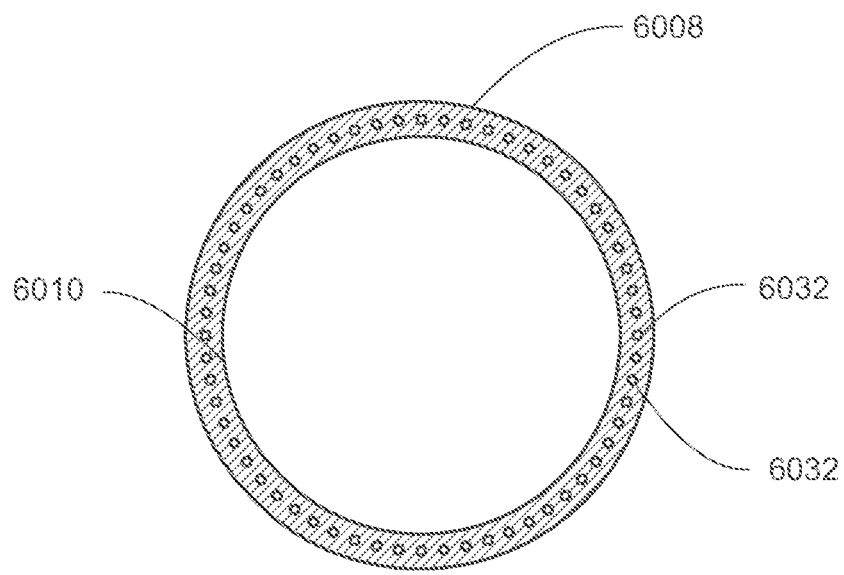

Advantages of enhanced hoop strength concurrent with enhanced thermal conductivity, as discussed above with reference to FIG. 58 may additionally be obtained in accordance with several alternate embodiments. Referring to FIGS. 60A and 60B, cross sections are shown of a heater head 6030, wherein tubular openings 6032 run parallel to heater head wall 6008. As shown in the cross sectional view of FIG. 60B, taken along line AA, tubes 6032 allow working gas to pass down the wall, enhancing heat transfer from outside the head to the working gas. Additionally, the wall 6008 may be thicker, for the same rate of heat transfer, thus providing additional strength. Moreover, the thick wall section 6010 (also shown in FIG. 61B as 6110) interior to passages 6032 remains cooler than would otherwise be the case, providing further additional strength. Heater head 6030 is preferably cast with tubular passages 6032 which may be round in cross section or of other shapes.

Figure 61A:
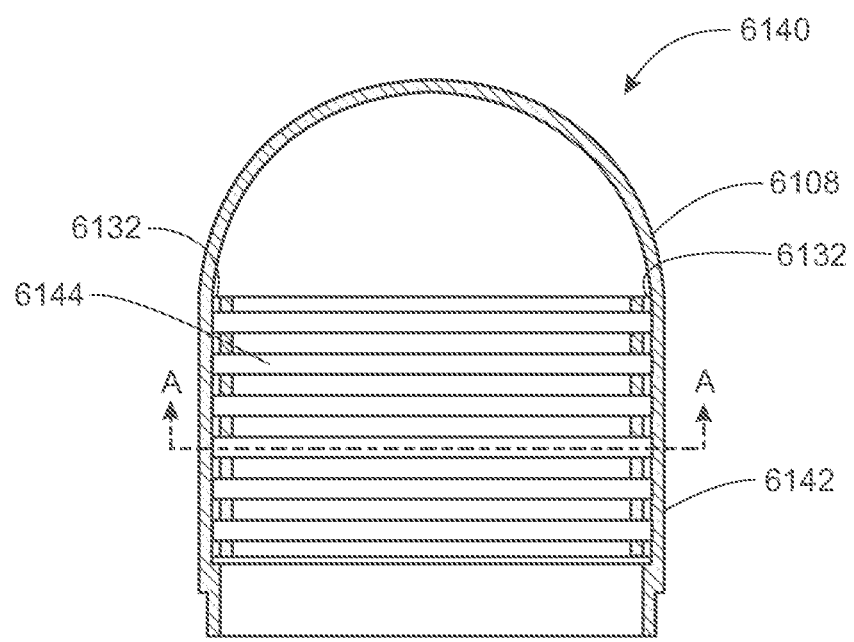
FIGS. 61A and 61B show views of a heater head in accordance with one embodiment.
Figure 61B:
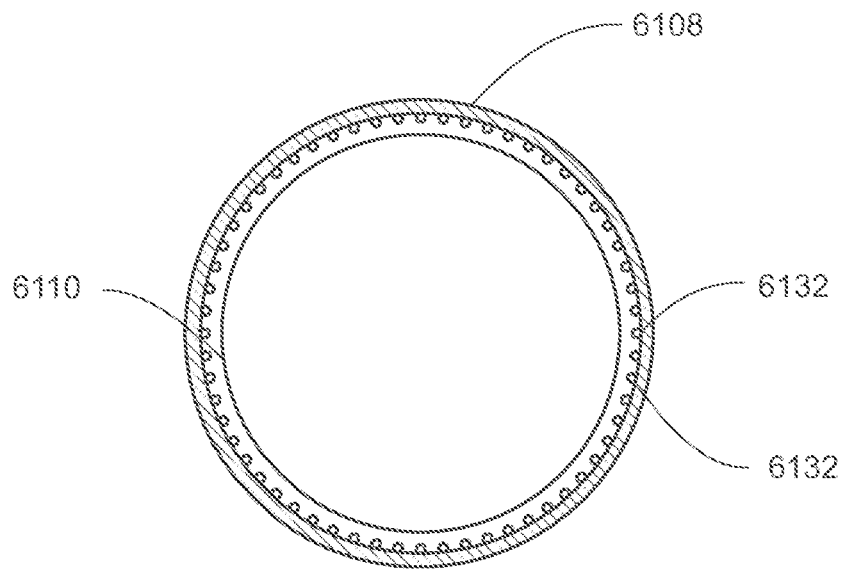

FIG. 61A shows a further heater head 6140 wherein tubular openings 6132 run parallel to heater head wall 6108 and are interrupted by openings that run out to thinner sections 6142 of the heater head wall. As shown in the cross sectional view of FIG. 62B, taken along line AA, tubes 6132 allow working gas to pass down the wall, enhancing heat transfer from outside the head to the working gas to a degree substantially enhanced over that of the straight tube design shown in FIGS. 62A and 62B. Additionally, openings 6144 provide additional area for removal of ceramic cores used in the casting process to create such long, thin holes. Increased access to the holes allows faster chemical leaching of the core in the course of the manufacturing process.

Figure 62A:
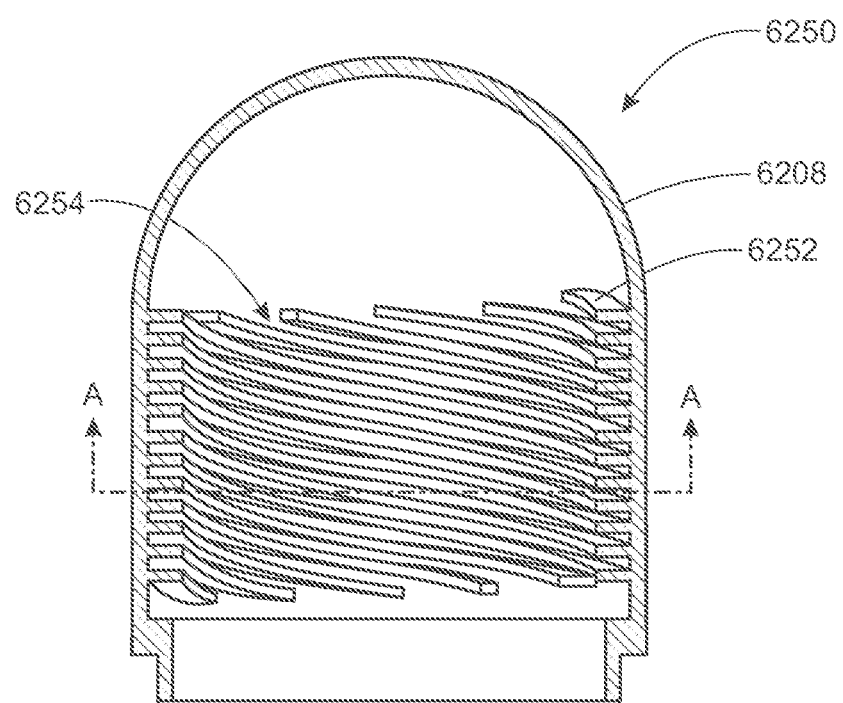
FIGS. 62A and 62B show views of a heater head in accordance with one embodiment.
Figure 62B:
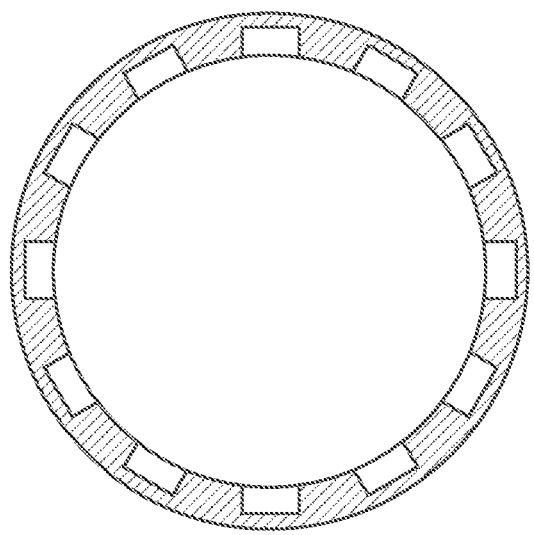

FIG. 62B shows yet another heater head 6250, wherein ribs 6252 are disposed in a helix within heater head wall 6208, thereby providing the wall with enhanced rigidity in both the circumferential and axial directions. The working gas flows through the spiral 6254 on a path between the expansion piston and the heater head, on its way to the regenerator. FIG. 62B shows a transverse cross section of the heater head of FIG. 62A taken along line AA. Various embodiments include employing a linear, or other, approximation to spiral 6254, to obtain comparable advantages of stiffening and heat transfer.

Figure 62C:
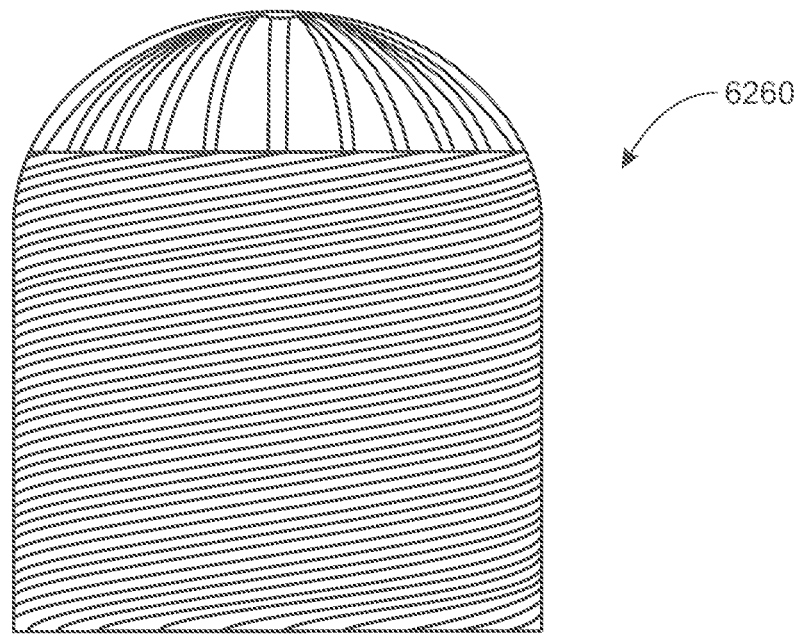
FIG. 62C shows a views of a heater head in accordance with one embodiment.
Figure 62D:
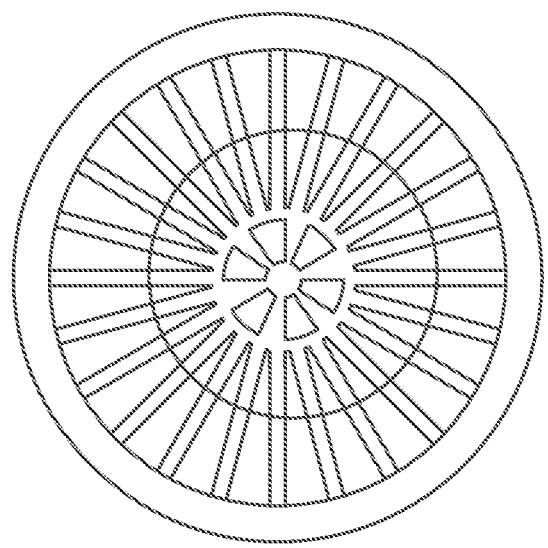
FIG. 62D shows a view of a heater head in accordance with one embodiment.
Figure 62E:
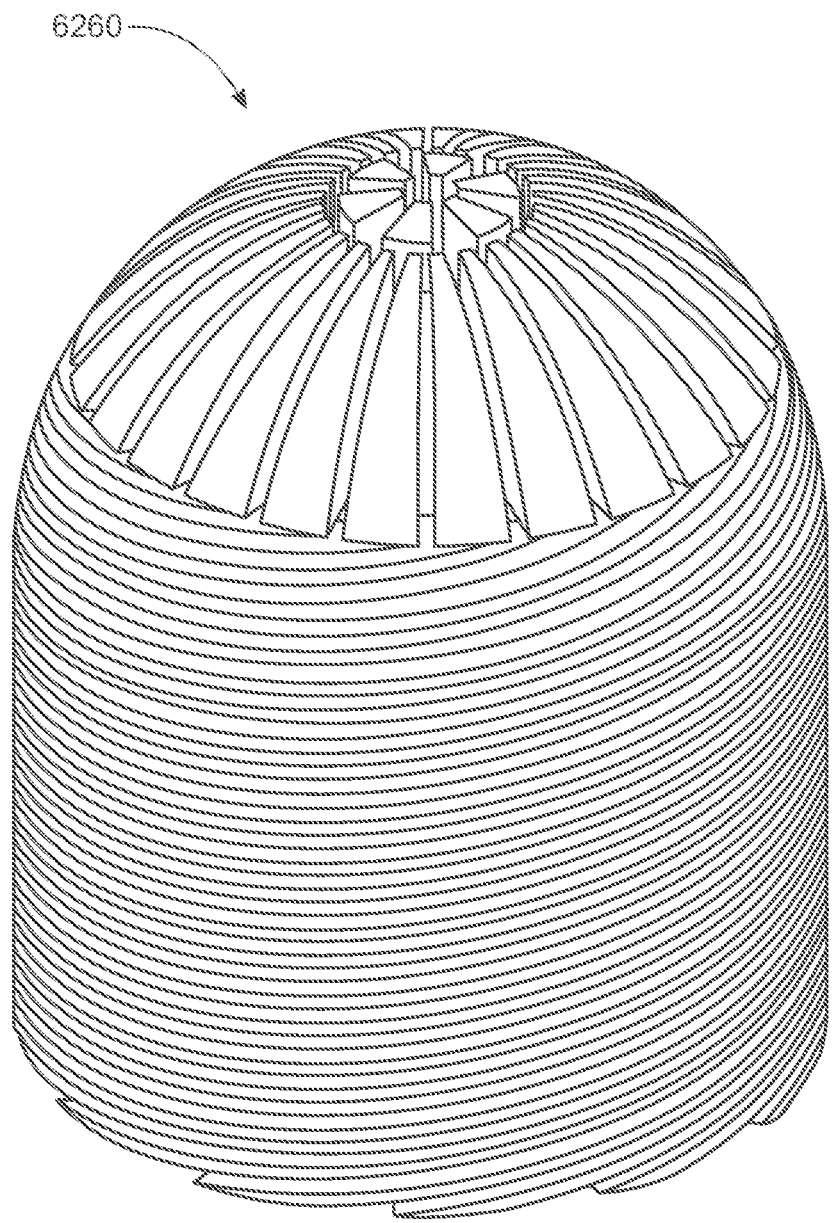
FIG. 62E shows a view of a heater head in accordance with one embodiment.

Heater head 6250 of FIGS. 62A and 62B is preferably fabricated by casting. A side view of core assembly 6260 for use in the casting process is shown in FIG. 62C. It is additionally advantageous to provide ribs for internal support of the dome of the heater head and to provide additional heat exchange on the dome, thereby cooling the inner surface of the dome. The complementary core structure of the dome is shown in FIG. 62D, and, in cross section, as viewed from the top, in FIG. 62D. A perspective view of core assembly 6260 is shown in FIG. 62E.

It is to be understood that the various heater head embodiments and methods for their manufacture described herein may be adapted to function in a multiple heater head configuration.

Regenerator

A regenerator is used in a Stirling cycle machine, as discussed above and as described in U.S. Pat. Nos. 6,591, 609, and 6,862,883, to add and remove heat from the working fluid during different phases of the Stirling cycle. The regenerator used in a Stirling cycle machine must be capable of high heat transfer rates which typically suggests a high heat transfer area and low flow resistance to the working fluid. Low flow resistance also contributes to the overall efficiency of the engine by reducing the energy required to pump the working fluid. Additionally, a regenerator must be fabricated in such a manner as to resist spalling or fragmentation because fragments may be entrained in the working fluid and transported to the compression or expansion cylinders and result in damage to the piston seals.

One regenerator design uses several hundred stacked metal screens. While exhibiting a high heat transfer surface, low flow resistance and low spalling, metal screens may suffer the disadvantage that their cutting and handling may generate small metal fragments that must be removed before assembling the regenerator. Additionally, stainless steel woven wire mesh contributes appreciably to the cost of the Stirling cycle engine.

Figure 63A:
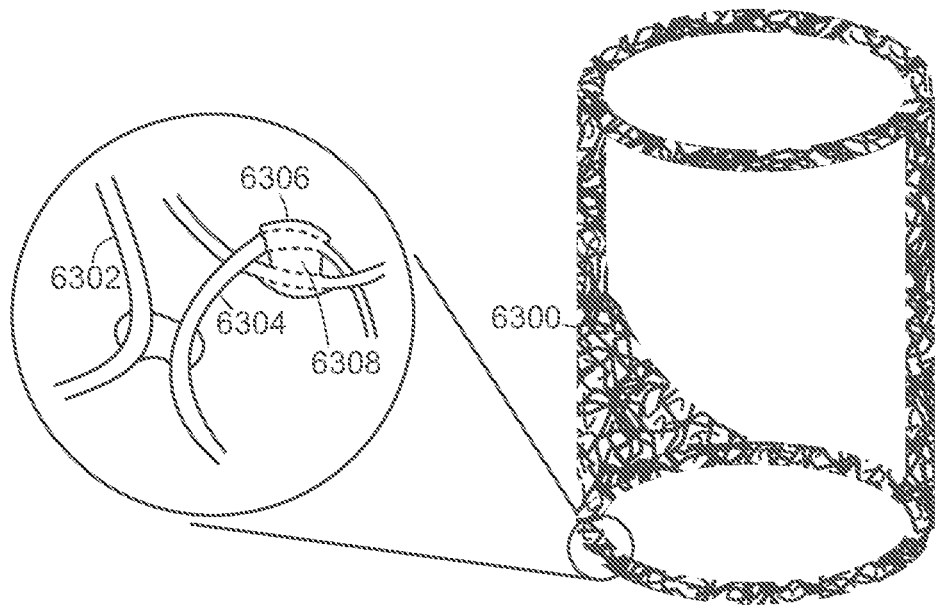
FIGS. 63A and 63B show a regenerator of a Stirling cycle engine in accordance with one embodiment.

A three dimensional random fiber network, such as stainless steel wool or ceramic fiber, for example, may be used as the regenerator, as now described with reference to FIG. 63A. Stainless steel wool regenerator 6300 advantageously provides a large surface area to volume ratio, thereby providing favorable heat transfer rates at low fluid flow friction in a compact form. Additionally, cumbersome manufacturing steps of cutting, cleaning and assembling large numbers of screens are advantageously eliminated. The low mechanical strength of steel wool and the tendency of steel wool to spall may both be overcome as now described. In some embodiments, the individual steel wires 6302 and 6304 are "cross-linked" into a unitary 3D wire matrix.

Figure 63B:
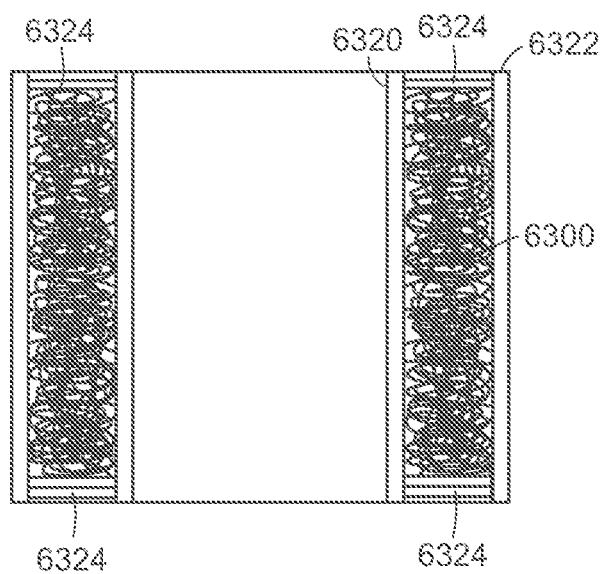

The starting material for the regenerator may be fibrilose and of random fiber form such as either steel or nickel wool. The composition of the fiber may be a glass or a ceramic or a metal such as steel, copper, or other high temperature materials. The diameter of the fiber is preferably in the range from 10 micrometers to 1 millimeter depending on the size of the regenerator and the properties of the metal. The starting material is placed into a form corresponding to the final shape of the regenerator which is depicted in cross-section in FIG. 63B. Inner canister cylindrical wall 6320, outer canister cylindrical wall 6322, and regenerator network 6300 are shown. The density of the regenerator is controlled by the amount of starting material placed in the form. The form may be porous to allow fluids to pass through the form.

In some embodiments, unsintered steel wool is employed as regenerator network 6300. Regenerator network 6300 is then retained within the regenerator canister by regenerator retaining screens 6324 or other filter, thereby comprising a "basket" which may advantageously capture steel wool fragments.

In one embodiment, applicable to starting material that is electrically conducting, the starting material is placed in a porous form and placed in an electrolyte bath. The starting material may be a metal, such as stainless steel, for example. An electrical connection is made with the starting material thereby forming an electrode. Cross-linking of the individual fibers in the starting material is accomplished by electrically depositing a second material 6306 onto the starting material. The selection of the starting material will depend on such factors as the particular deposition technique chosen and the chemical compatibility of the first and second materials, as known to one of ordinary skill in the electrochemical art. During deposition, the second material will build up on the starting material and form bridges 6308 between the individual fibers of the starting material in places where the individual fibers are in close proximity to each other. The deposition is continued until the bridges have grown to a sufficient size to hold the two individual fibers rigidly in place.

The deposition duration depends on the particular deposition process and is easily determined by one of ordinary skill in the art. After the deposition is completed, the regenerator is removed from the bath and the form and is cleaned.

In another embodiment the starting material is placed in a form that may be porous or not. The form containing the starting material is placed in a furnace and is partially sintered into a unitary piece. The selection of the sintering temperature and sintering time is easily determined by one of ordinary skill in the sintering art.

In another embodiment the starting material is placed in a porous form. The form containing the starting material is placed in a chemical bath and a second material, such as nickel, is chemically deposited to form bridges between the individual fibers.

In another embodiment the starting material is a silica glass fiber which is placed into a porous form. The glass fiber and form is dipped in a solution of tetraethylorthosilicate (TEOS) and ethanol so that the fiber is completely wetted by the solution. The fiber and form are removed from the solution and allowed to drain in a humid atmosphere. The solution will form meniscoidal shapes bridging fibers in close proximity to each other. The humidity of the atmosphere will start the hydrolysis-condensation reaction that converts the TEOS to silica forming a cross link between the two fibers. The fiber and form may be heat treated at a temperature less than 1000° C., most preferably less than 600° C., to remove the reactant products and form a silica bridge between the fibers.

In another embodiment a ceramic slurry is deposited onto a reticulated foam having the shape of the regenerator. The slurry is dried on the reticulated foam and heat treated to burn off the foam and sinter the ceramic. The ceramic may be composed of an oxide ceramic such as cordierite, alumina, or zirconia. The composition of the ceramic slurry and the heat treatment profile is easily specified by one of ordinary skill in the ceramic processing art.

Figure 64A:
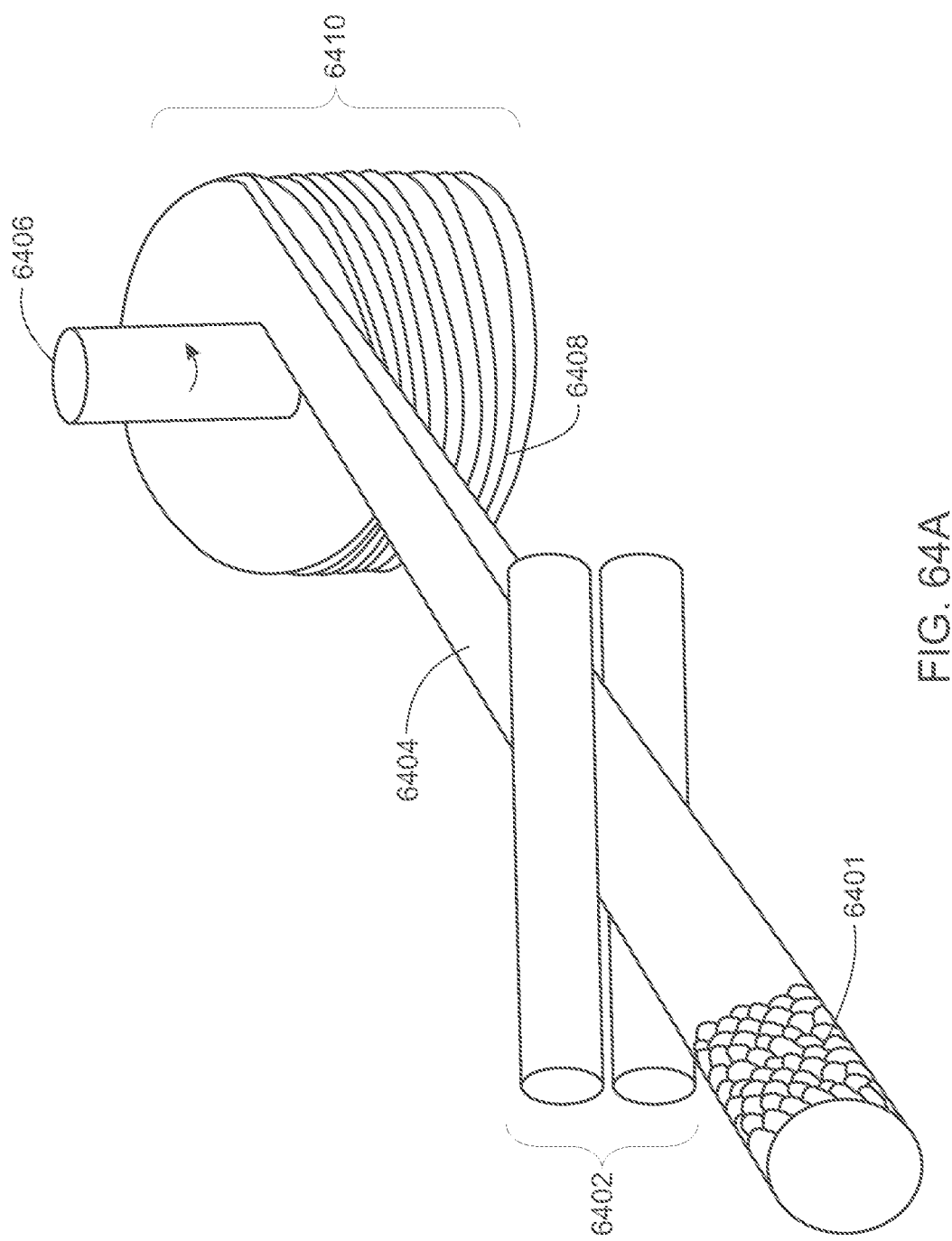
FIGS. 64A-64E show various configurations of a regenerator of a Stirling cycle engine in accordance with various embodiments.

In yet other embodiments, knit or woven wire is employed in fabrication of a regenerator as now described with reference to FIG. 64A. In accordance with these embodiments, knit or woven wire tube 6401 is flattened by rollers 6402 into tape 6404, in which form it is wound about mandrel 6406 into annular layers 6408. Stainless steel is advantageously used for knit wire tube 6401 because of its ability to withstand elevated temperature operation, and the diameter of the wire used is typically in the range of 1-2 mils, however other materials and gauges may be used in various embodiments. Alternatively, a plurality, typically 5-10, of the stainless steel wires may be loosely wound into a multi-filament thread prior to knitting into a wire tube. This process advantageously strengthens the resulting tube 6401. When mandrel 6406 is removed, annular assembly 6410 may be used as a regenerator in a thermal cycle engine.

Figure 64B:
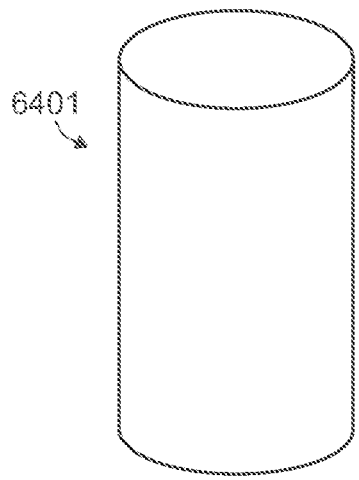
Figure 64C:
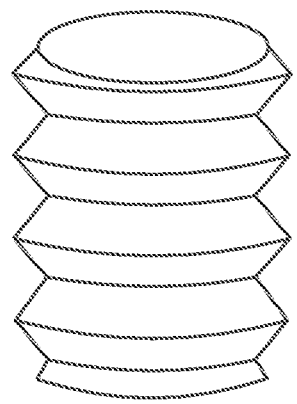
Figure 64D:
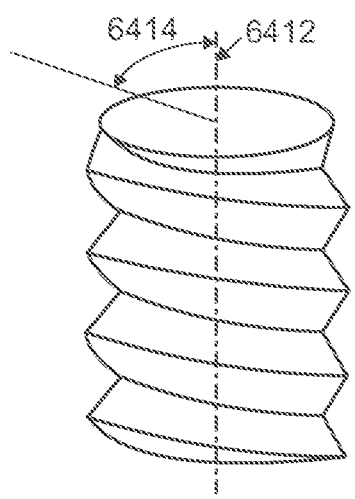
Figure 64E:
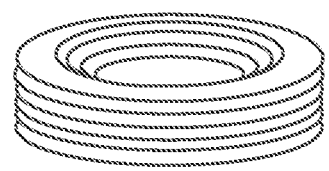

Still another embodiment is now described with reference to FIGS. 64B through 64E. Knit or woven wire tube 6401, shown in its right cylindrical form in FIG. 64B, is shown scored and partially compressed in FIG. 64C. Alternatively, the scoring may be at an angle 6414 with respect to the central axis 6412 of the tube, as shown in FIG. 64D. Tube 6401 is then axially compressed along central axis 6412 to form the bellows form 6416 shown in FIG. 64E that is then disposed as a regenerator within the regenerator volume 408 (shown in FIG. 4) of a Stirling cycle engine.

It is to be understood that the various regenerator embodiments and methods for their manufacture described herein may be adapted to function in a multiple cylinder configuration.

Coolant Penetrating Cold-End Pressure Vessel

Figure 65A:
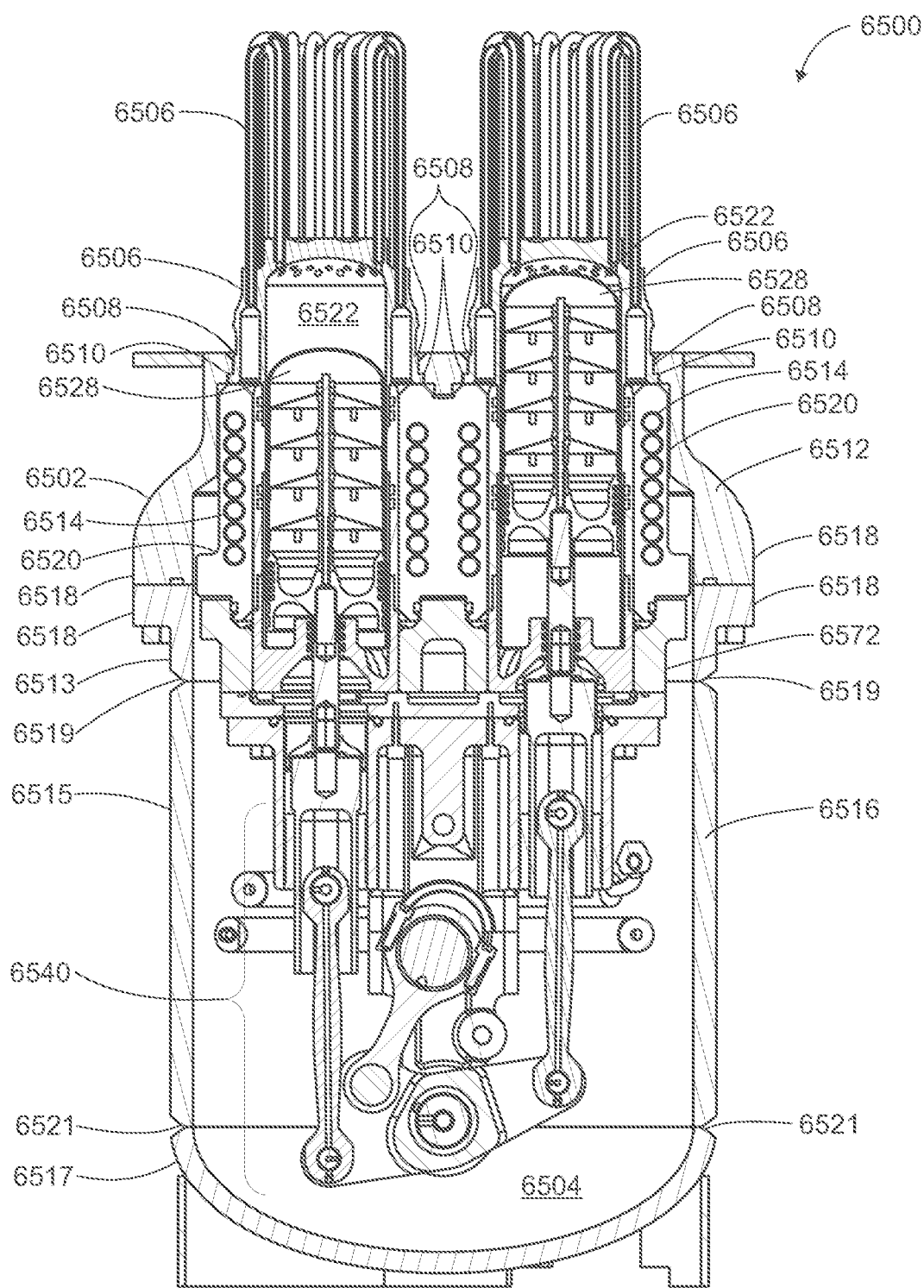
FIGS. 65A-65G show various views of an engine in accordance with several embodiments.
Figure 65B:
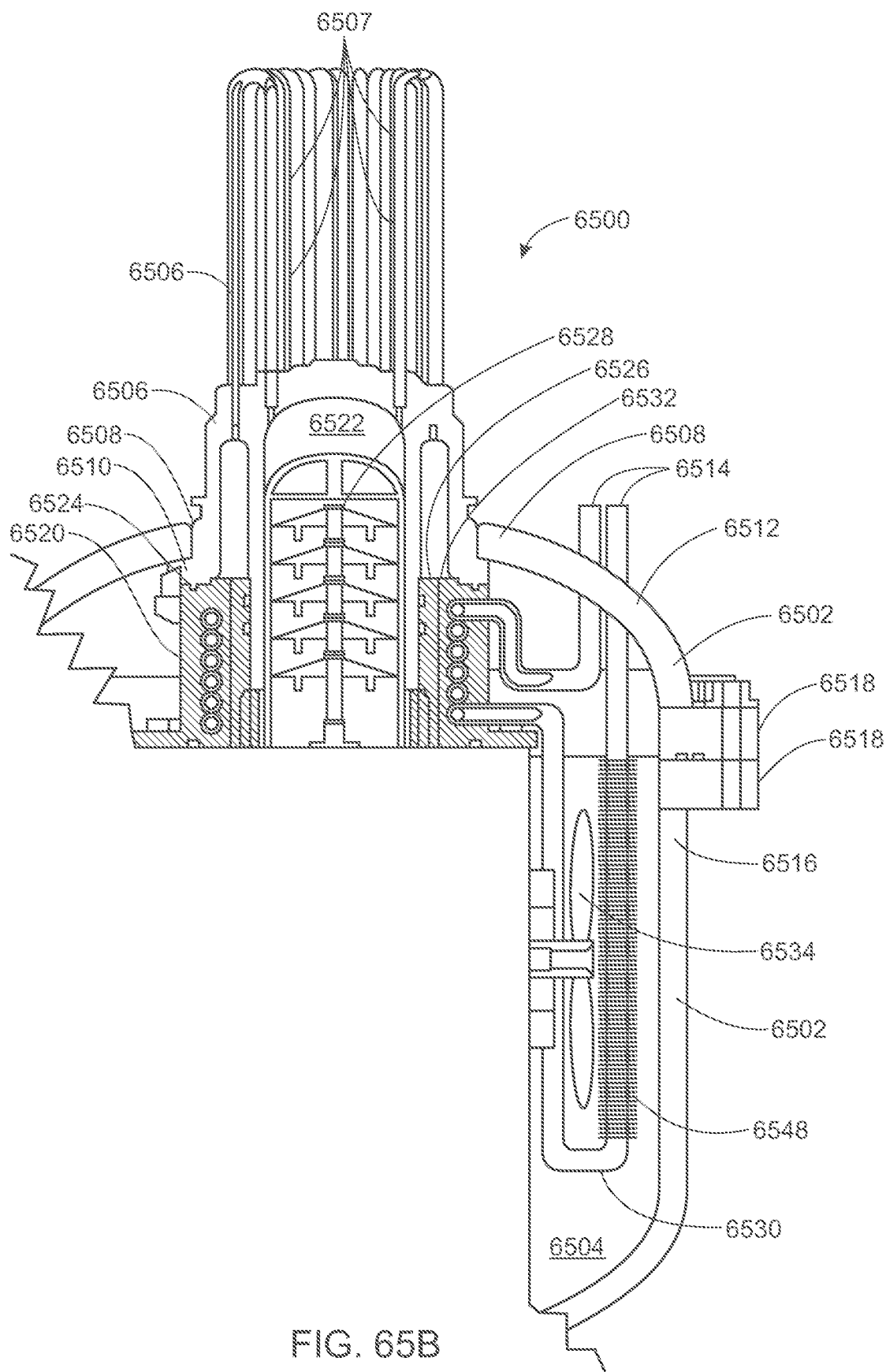
Figure 65C:
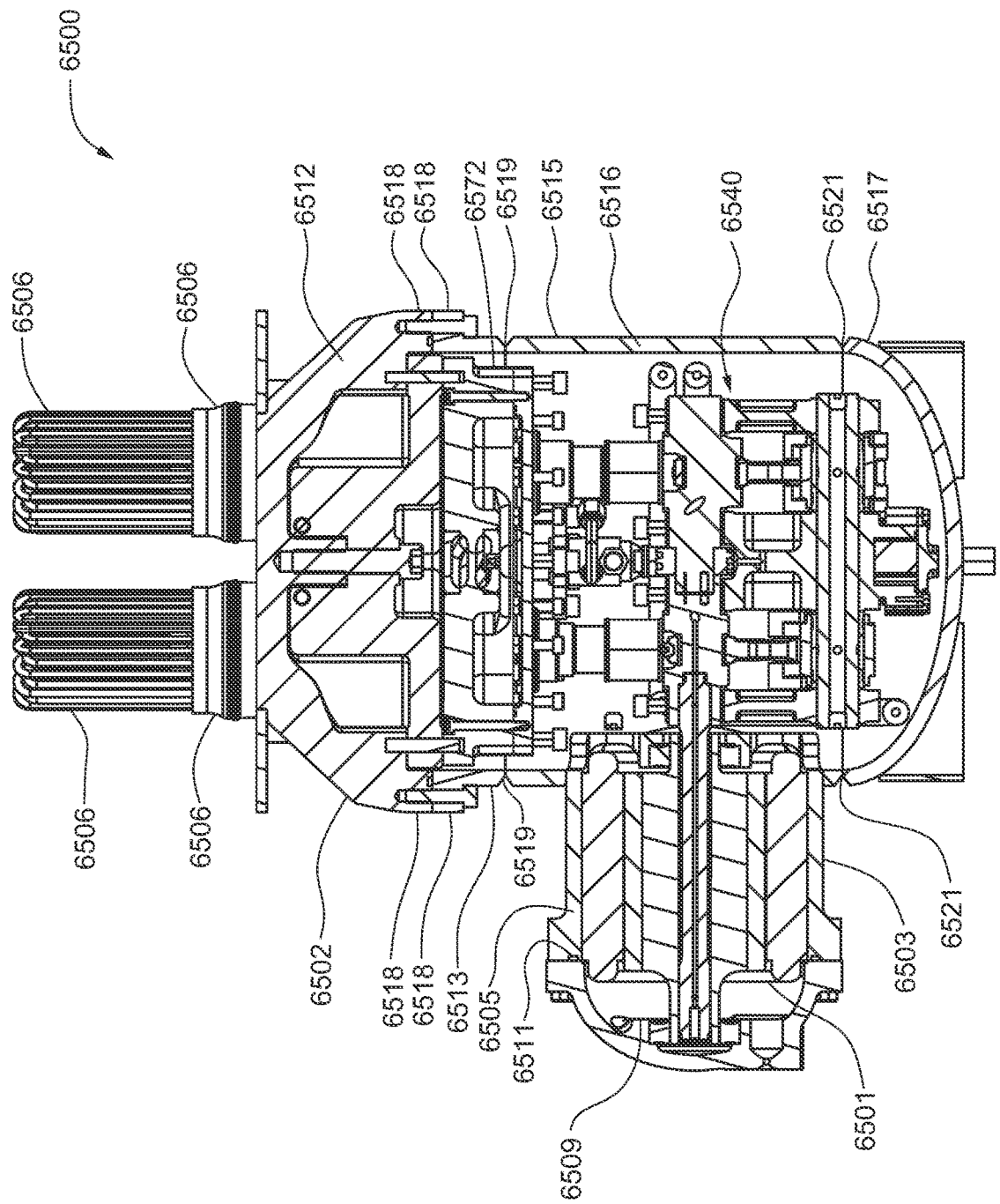

Referring now to FIGS. 65A-C, various cross-sections of an engine, such as a Stirling cycle engine, are shown in accordance with some embodiments. Engine 6500 is hermetically sealed. A crankcase 6502 serves as the cold-end pressure vessel and contains a charge gas in an interior volume 6504. Crankcase 6502 can be made arbitrarily strong without sacrificing thermal performance by using sufficiently thick steel or other structural material. A heater head 6506 serves as the hot-end pressure vessel and is preferably fabricated from a high temperature super-alloy such as Inconel 625, GMR-235, etc. Heater head 6506 is used to transfer thermal energy by conduction from an external thermal source (not shown) to the working fluid. Thermal energy may be provided from various heat sources such as solar radiation or combustion gases. For example, a burner, as previously discussed, may be used to produce hot combustion gases (shown as 6507 in FIG. 65B) that are used to heat the working fluid. An expansion area of cylinder (or warm section) 6522 is disposed inside the heater head 6506 and defines part of a working gas volume as discussed above with respect to FIG. 1. A piston 6528 is used to displace the working fluid contained in the expansion area of cylinder 6522.

In accordance with an embodiment, crankcase 6502 is welded directly to heater head 6506 at joints 6508 to create a pressure vessel that can be designed to hold any pressure without being limited, as are other designs, by the requirements of heat transfer in the cooler. In an alternative embodiment, the crankcase 6502 and heater head 6506 are either brazed or bolted together. The heater head 6506 has a flange or step 6510 that axially constrains the heater head and transfers the axial pressure force from the heater head 6506 to the crankcase 6502, thereby relieving the pressure force from the welded or brazed joints 6508. Joints 6508 serve to seal the crankcase 6502 (or cold-end pressure vessel) and bear the bending and planar stresses. In an alternative embodiment, the joints 6508 are mechanical joints with an elastomer seal. In yet another embodiment, step 6510 is replaced with an internal weld in addition to the exterior weld at joints 6508.

Crankcase 6502 is assembled in two pieces, an upper crankcase 6512 and a lower crankcase 6516. The heater head 6506 is first joined to the upper crankcase 6512. Second, a cooler 6520 is installed with a coolant tubing (shown as 6514 in FIG. 65B) passing through holes in the upper crankcase 6512. Third, the double acting pistons 6528 and drive components (designated generally as numeral 6540 in FIGS. 65A and 65C, not shown in FIG. 65B) are installed. In one embodiment, lower crankcase 6516 is assembled in three pieces, an upper section 6513, a middle section 6515, and a lower section 6517, as shown in FIGS. 65A and 65C. Middle section 6515 is may be connected to upper and lower sections 6513 and 6517 at joints 6519 and 6521, respectively, by any mechanical means known in the art, or by welding.

The lower crankcase 6516 is then joined to the upper crankcase 6512 at joints 6518. Preferably, the upper crankcase 6512 and the lower crankcase 6516 are joined by welding. Alternatively, a bolted flange may be employed (as shown in FIGS. 65B and 65C).

In some embodiments a motor/generator (shown as 6501 in FIG. 65C), such as a PM generator, may be installed into motor/generator housing (shown as 6503 in FIG. 65C), which is attached to the lower crankcase 6516, as shown in FIG. 65C. Motor/generator housing 6503 may be attached to lower crankcase 6516 by any mechanical means known in the art, or may be welded to lower crankcase 6516. Motor/ generator housing 6503 may assembled in two pieces, a front section 6505, which is attached to lower crankcase 6516, and a rear section 6509, which may be welded or bolted to front section 6505. In one embodiment a seal 6511 may be positioned between the rear section 6509 and the front section 6505 of the motor/generator housing 6503. In some embodiments rear section 6509 is removable attached to front section 6505, which serves, among other functions, to allow for easy removal and installation of motor/generator 6501 during engine 6500 assembly.

In order to allow direct coupling of the heater head 6506 to the upper crankcase 6512, the cooling function of the thermal cycle is performed by a cooler 6520 that is disposed within the crankcase 6502, thereby advantageously reducing the pressure containment requirements placed upon the cooler. By placing the cooler 6520 within crankcase 6502, the pressure across the cooler is limited to the pressure difference between the working gas in the working gas volume, and the charge gas in the interior volume 6504 of the crankcase. The difference in pressure is created by the compression and expansion of the working gas, and is typically limited to a percentage of the operating pressure. In one embodiment, the pressure difference is limited to less than 30% of the operating pressure.

Coolant tubing 6514 advantageously has a small diameter relative to the diameter of the cooler 6520. The small diameter of the coolant passages, such as provided by coolant tubing 6514, is key to achieving high heat transfer and supporting large pressure differences. The required wall thickness to withstand or support a given pressure is proportional to the tube or vessel diameter. The low stress on the tube walls allows various materials to be used for coolant tubing 6514 including, but not limited to, thin-walled stainless steel tubing or thicker-walled copper tubing.

An additional advantage of locating the cooler 6520 entirely within the crankcase 6502 (or cold-end pressure vessel) volume is that any leaks of the working gas through the cooler 6520 will only result in a reduction of engine performance. In contrast, if the cooler were to interface with the external ambient environment, a leak of the working gas through the cooler would render the engine useless due to loss of the working gas unless the mean pressure of working gas is maintained by an external source. The reduced requirement for a leak-tight cooler allows for the use of less expensive fabrication techniques including, but not limited to, powder metal and die casting.

Cooler 6520 is used to transfer thermal energy by conduction from the working gas and thereby cool the working gas. A coolant, either water or another fluid, is carried through the crankcase 6502 and the cooler 6520 by coolant tubing 6514. The feedthrough of the coolant tubing 6514 through upper crankcase 6512 may be sealed by a soldered or brazed joint for copper tubes, welding, in the case of stainless steel and steel tubing, or as otherwise known in the art.

The charge gas in the interior volume 6504 may also require cooling due to heating resulting from heat dissipated in the motor/generator windings, mechanical friction in the drive, the non-reversible compression/expansion of the charge gas, and the blow-by of hot gases from the working gas volume. Cooling the charge gas in the crankcase 6502 increases the power and efficiency of the engine as well as the longevity of bearings used in the engine.

In one embodiment, an additional length of coolant tubing (shown as 6530 in FIG. 65B) is disposed inside the crankcase 6502 to absorb heat from the charge gas in the interior volume 6504. The additional length of coolant tubing 6530 may include a set of extended heat transfer surfaces (shown as 6548 in FIG. 65B), such as fins, to provide additional heat transfer. As shown in FIG. 65B, the additional length of coolant tubing 6530 may be attached to the coolant tubing 6514 between the crankcase 6502 and the cooler 6520. In an alternative embodiment, the length of coolant tubing 6530 may be a separate tube with its own feedthrough of the crankcase 6502 that is connected to the cooling loop by hoses outside of the crankcase 6502.

In another embodiment the extended coolant tubing 6530 may be replaced with extended surfaces on the exterior surface of the cooler 6520 or the drive housing (shown as 6572 in FIGS. 65A and 65C). Alternatively, a fan (shown as 6534 in FIG. 65B) may be attached to the engine crankshaft (shown as 6542 in FIG. 65C) to circulate the charge gas in interior volume 6504. The fan 6534 may be used separately or in conjunction with the additional coolant tubing 6530 or the extended surfaces on the cooler 6520 or drive housing 6572 to directly cool the charge gas in the interior volume 6504.

Preferably, coolant tubing 6514 is a continuous tube throughout the interior volume 6504 of the crankcase and the cooler 6520. Alternatively, two pieces of tubing could be used between the crankcase and the feedthrough ports of the cooler. One tube carries coolant from outside the crankcase 6502 to the cooler 6520. A second tube returns the coolant from the cooler 6520 to the exterior of the crankcase 6502. In another embodiment, multiple pieces of tubing may be used between the crankcase 6502 and the cooler in order to add tubing with extended heat transfer surfaces inside the crankcase volume 6504 or to facilitate fabrication. The tubing joints and joints between the tubing and the cooler may be brazed, soldered, welded or mechanical joints.

Various methods may be used to join coolant tubing 6514 to cooler 6520. Any known method for joining the coolant tubing 6514 to the cooler 6520 may be used in various embodiments. In one embodiment, the coolant tubing 6514 may be attached to the wall of the cooler 6520 by brazing, soldering or gluing. Cooler 6520 is in the form of a cylinder placed around the cylinder 6522 and the annular flow path of the working gas outside of the cylinder 6522. Accordingly, the coolant tubing 6514 may be wrapped around the interior of the cooler cylinder wall and attached as mentioned above.

Figure 65D:
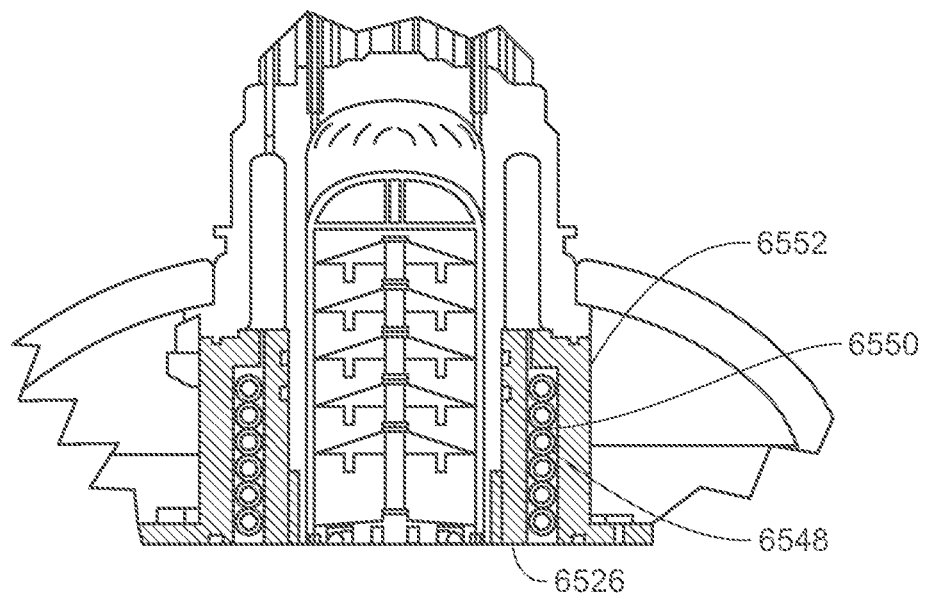
Figure 65E:
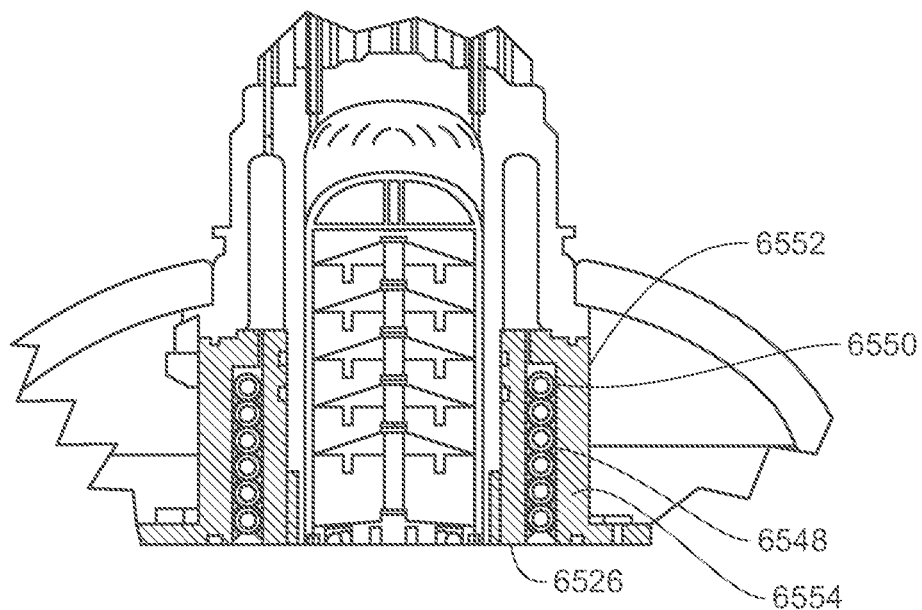

Alternative cooler configurations are presented in FIGS. 65D-65G that reduce the complexity of the cooler body fabrication. FIG. 65D shows one embodiment of a side view of a Stirling cycle engine including coolant tubing. In FIG. 65D, cooler 6552 includes a cooler working space 6550. Coolant tubing 6548 is placed within the cooler working space 6550, so that the working gas can flow over an outside surface of coolant tubing 6548. The working gas is confined to flow past the coolant tubing 6548 by the cooler body 6552 and a cooler liner 6526. The coolant tube passes into and out-of the working space 6550 through ports in either the cooler 6552 or the drive housing 6572 (shown in FIGS. 65A and 65C). The cooler casting process is simplified by having a seal around coolant lines 6548. In addition, placing the coolant line 6548 in the working space improves the heat transfer between the working fluid and the coolant fluid. The coolant tubing 6548 may be smooth or may have extended heat transfer surfaces or fins on the outside of the tubing to increase heat transfer between the working gas and the coolant tubing 6548. In another embodiment, as shown in FIG. 65E, spacing elements 6554 may be added to the cooler working space 6550 to force the working gas to flow closer to the coolant tubes 6548. The spacing elements are separate from the cooler liner 6526 and the cooler body 6552 to allow insertion of the coolant tube and spacing elements into the working space.

Figure 65F:
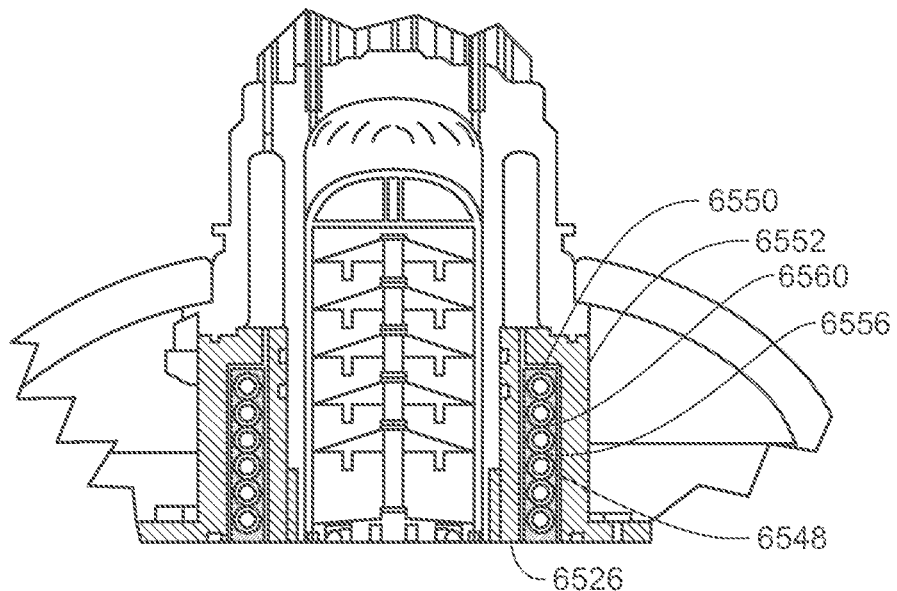
Figure 65G:
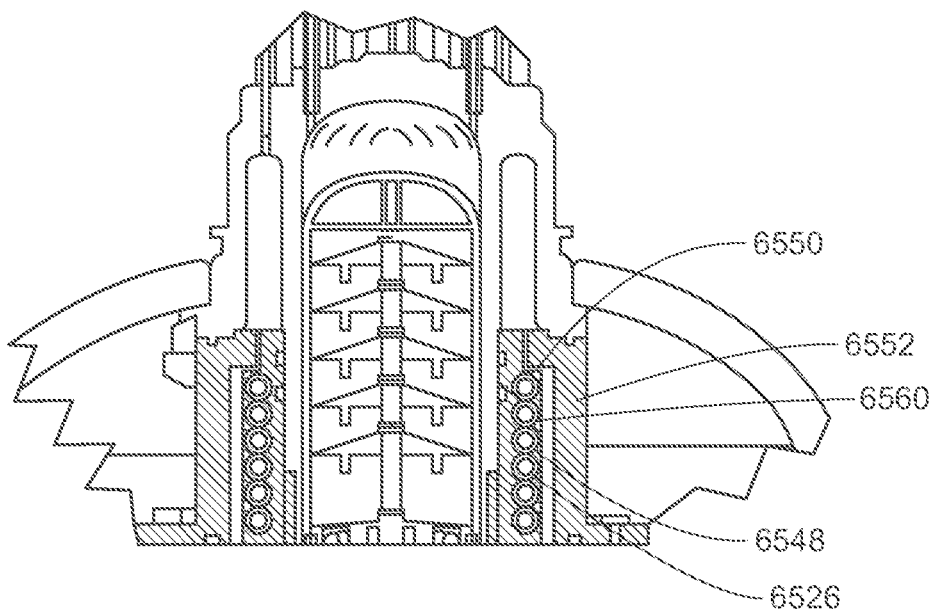

In another embodiment, as shown in FIG. 65F, coolant tubing 6548 is overcast to form an annular heat sink 6556 where the working gas can flow on both sides of the cooler body 6552. The annular heat sink 6556 may also include extended heat transfer surfaces on its inner and outer surfaces 6560. The body of the cooler 6552 constrains the working gas to flow past the extended heat exchange surfaces on heat sink 6556. The heat sink 6556 is typically a simpler part to fabricate than the cooler 6520 in FIGS. 65A and 65B. The annular heat sink 6556 provides roughly double the heat transfer area of cooler 6520 shown in FIGS. 65A and 65B. In another embodiment, as shown in FIG. 65G, the cooler liner 6526 can be cast over the coolant lines 6548. The cooler body 6552 constrains the working gas to flow past the cooler liner 6562. Cooler liner 6526 may also include extended heat exchange surfaces on a surface 6560 to increase heat transfer.

Returning to FIG. 65B, one method for joining coolant tubing 6514 to cooler 6520 is to overcast the cooler around the coolant tubing. This method is described, with reference to FIGS. 66A and 66B, and may be applied to a pressurized close-cycle machine as well as in other applications where it is advantageous to locate a cooler inside the crankcase.

Figure 66A:
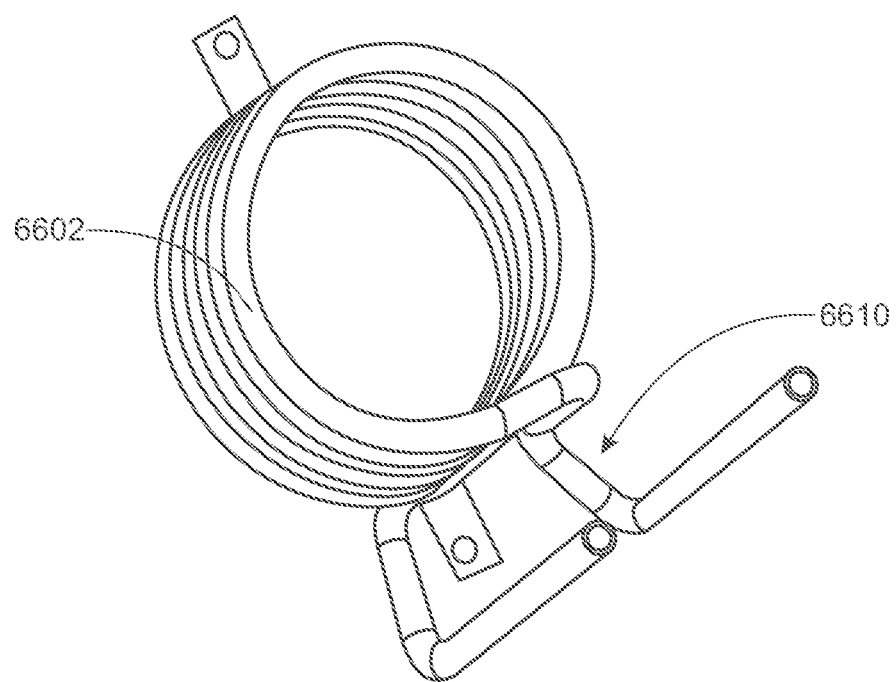
FIGS. 66A and 66B show views of a cooler for an engine in accordance with some embodiments.

Referring to FIG. 66A, a heat exchanger, for example, a cooler 6520 (shown in FIGS. 65A and 65B) may be fabricated by forming a high-temperature metal tubing 6602 into a desired shape. In one embodiment, the metal tubing 6602 is formed into a coil using copper. A lower temperature (relative to the melting temperature of the tubing) casting process is then used to overcast the tubing 6602 with a high thermal conductivity material to form a gas interface 6604 (and 6532 in FIG. 65B), seals 6606 (and 6524 in FIG. 65B) to the rest of the engine and a structure to mechanically connect the drive housing 6572 (shown in FIG. 2) to the heater head 6506 (shown in FIG. 65B). In one embodiment, the high thermal conductivity material used to overcast the tubing is aluminum. Overcasting the tubing 6602 with a high thermal conductivity metal assures a good thermal connection between the tubing and the heat transfer surfaces in contact with the working gas. A seal is created around the tubing 6602 where the tubing exits the open mold at 6610. This method of fabricating a heat exchanger advantageously provides cooling passages in cast metal parts inexpensively.

Figure 66B:
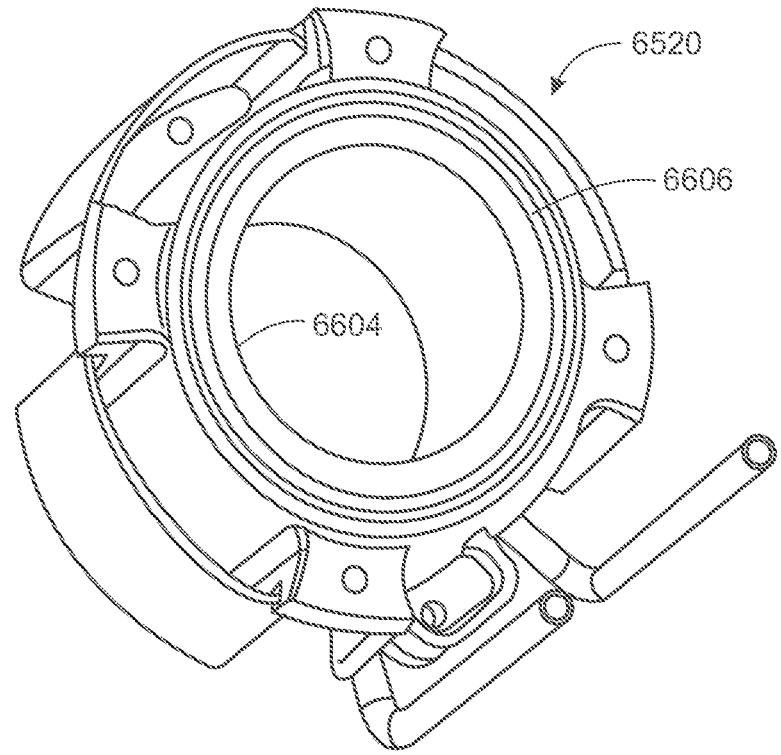

FIG. 66B is a perspective view of a cooling assembly cast over the cooling coil of FIG. 66A. The casting process can include any of the following: die casting, investment casting, or sand casting. The tubing material is chosen from materials that will not melt or collapse during the casting process. Tubing materials include, but are not limited to, copper, stainless steel, nickel, and super-alloys such as Inconel. The casting material is chosen among those that melt at a relatively low temperature compared to the tubing. Typical casting materials include aluminum and its various alloys, and zinc and its various alloys.

The heat exchanger may also include extended heat transfer surfaces to increase the interfacial area 6604 (and 6532 shown in FIG. 65B) between the hot working gas and the heat exchanger so as to improve heat transfer between the working gas and the coolant. Extended heat transfer surfaces may be created on the working gas side of the heat exchanger 6520 by machining extended surfaces on the inside surface (or gas interface) 6604. Referring to FIG. 65B, a cooler liner 6526 (shown in FIG. 65B) may be pressed into the heat exchanger to form a gas barrier on the inner diameter of the heat exchanger. The cooler liner 6526 directs the flow of the working gas past the inner surface of the cooler.

Figure 67C:
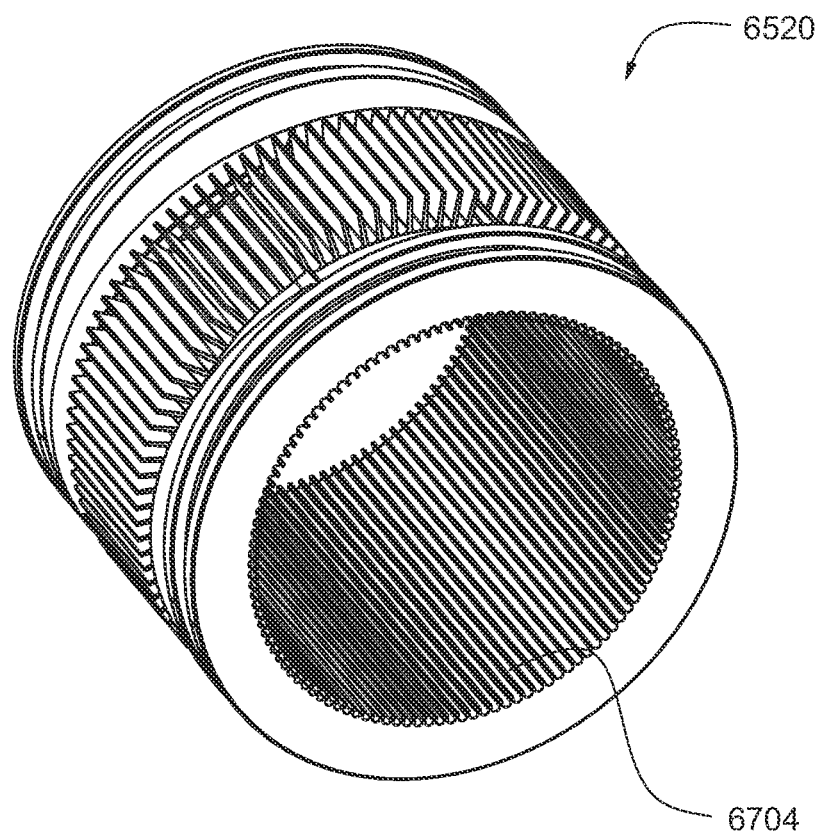
FIG. 67C shows a view of the embodiment of a cooler for an engine depicted in FIG. 67A.

The extended heat transfer surfaces can be created by any of the methods known in the art. In accordance some embodiments, longitudinal grooves 6704 are broached into the surface, as shown in detail in FIGS. 67A and 67C. Alternatively, lateral grooves 6708 (also shown in enlarged section view FIG. 67B-1) may be machined in addition to the longitudinal grooves 6704 (also shown in enlarged section view FIG. 67A-1) thereby creating aligned pins 6710 as shown in FIG. 67B. In some embodiments, grooves are cut at a helical angle to increase the heat exchange area.

In an alternative embodiment, the extended heat transfer surfaces on the gas interface 6604 (as shown in 66B) of the cooler are formed from metal foam, expanded metal or other materials with high specific surface area. For example, a cylinder of metal foam may be soldered to the inside surface of the cooler 6604. As discussed above, a cooler liner 6526 (shown in FIG. 65B) may be pressed in to form a gas barrier on the inner diameter of the metal foam. Other methods of forming and attaching heat transfer surfaces to the body of the cooler are described in U.S. Pat. No. 6,694,731, issued Feb. 24, 2004, entitled Stirling Engine Thermal System Improvements, which is herein incorporated by reference in its entirety.

Additional coolant penetrating cold-end pressure vessel embodiments are described in U.S. Pat. No. 7,325,399. It is to be understood that the various coolant penetrating cold-end pressure vessel embodiments referred to herein may be adapted to function in a multiple cylinder engine configuration.

Intake Manifold

Figure 68:
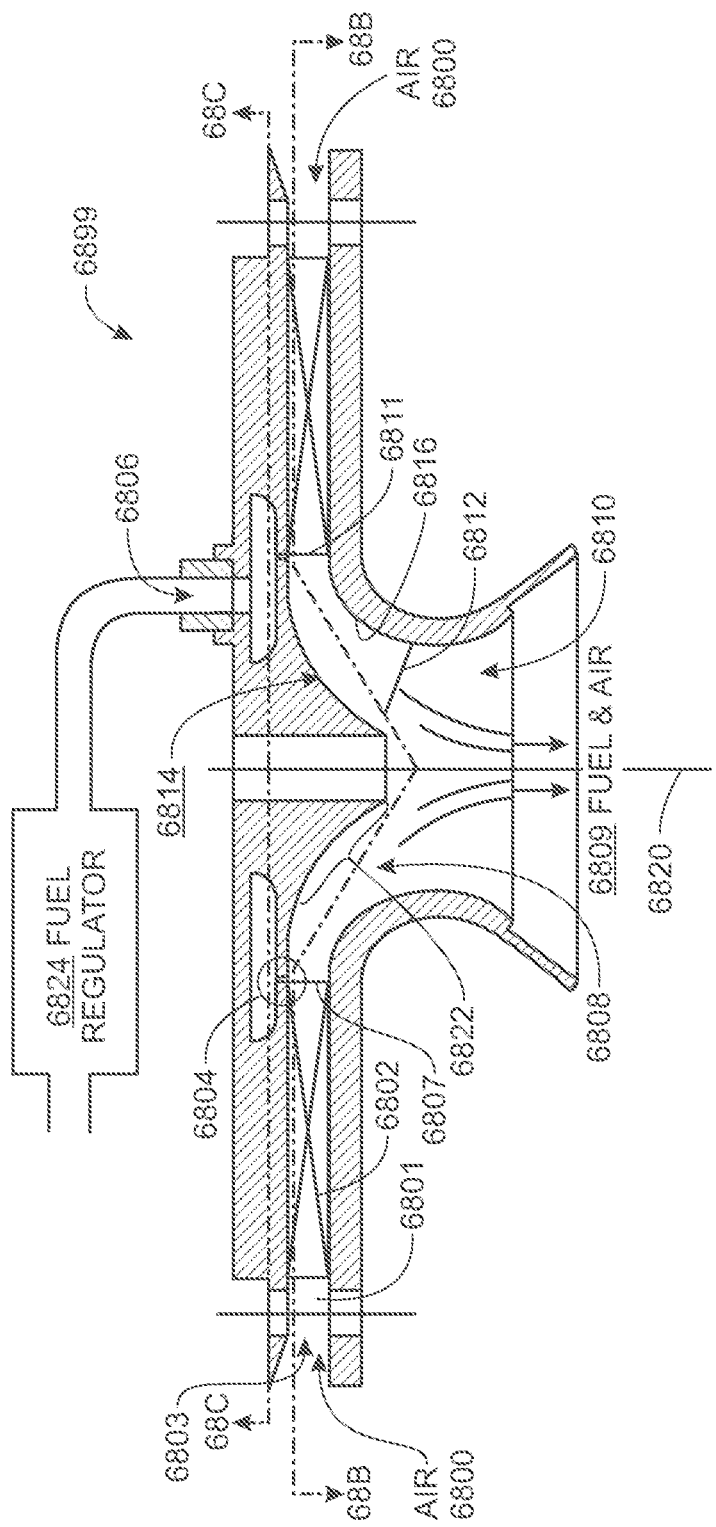
FIG. 68 shows a view of an intake manifold for an engine in accordance with one embodiment.
Figure 69A:
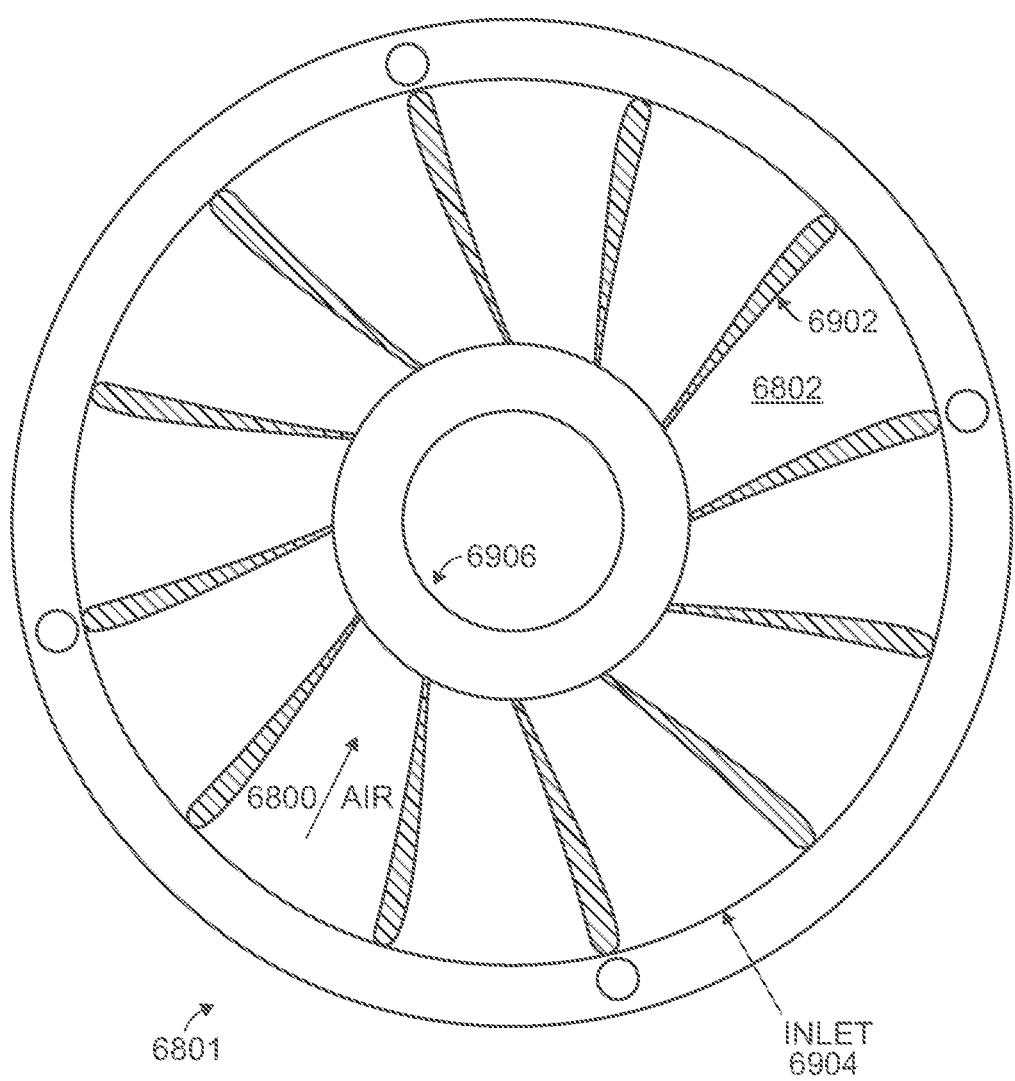
FIGS. 69A and 69B show various views of an intake manifold for an engine in accordance with one embodiment.
Figure 69B:
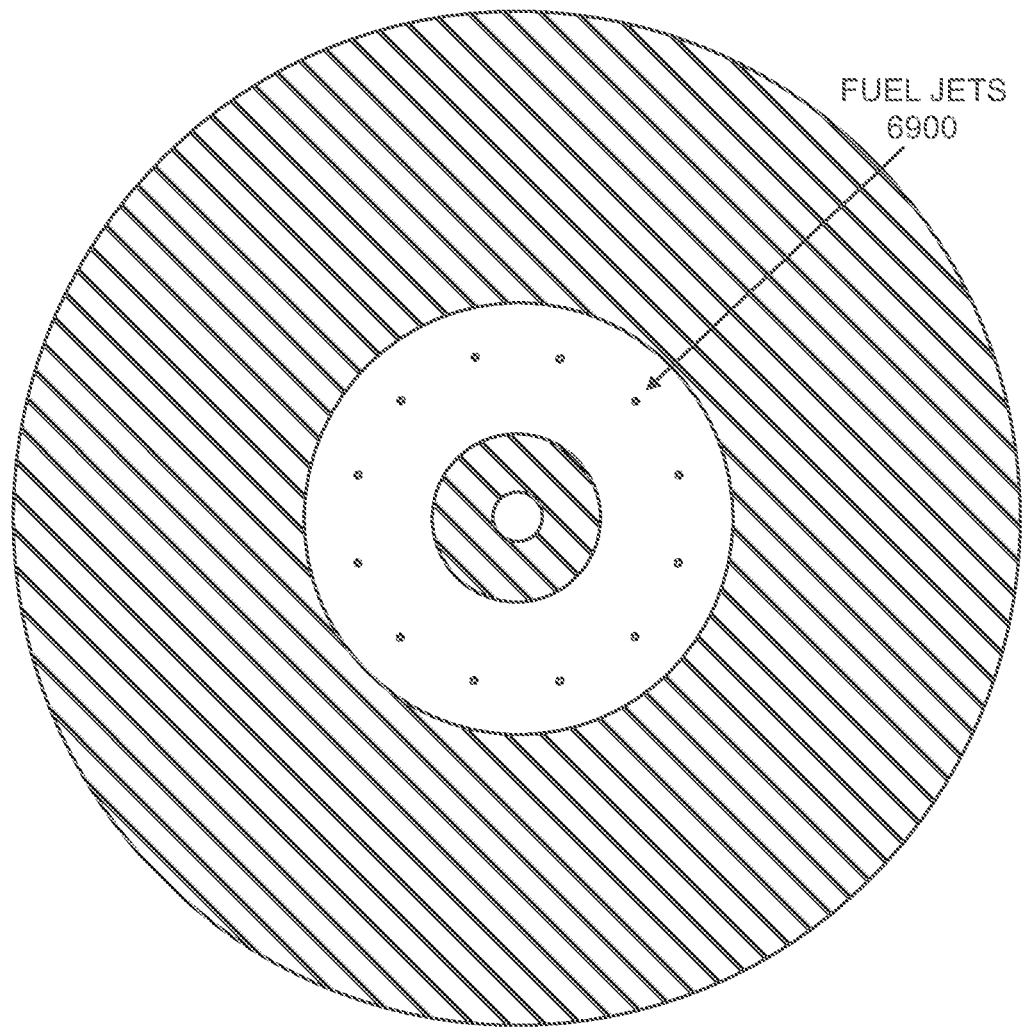

Referring now to FIGS. 68-69B, an intake manifold 6899, is shown for application to a Stirling cycle engine or other combustion application in accordance with some embodiments. Various embodiments of intake manifold 6899 are further disclosed in U.S. Pat. No. 6,381,958. In accordance with some embodiments, fuel is pre-mixed with air that may be heated above the fuel's auto-ignition temperature and a flame is prevented from forming until the fuel and air are well-mixed. FIG. 68 shows one embodiment including an intake manifold 6899 and a combustion chamber 6810. The intake manifold 6899 has an axisymmetrical conduit 6801 with an inlet 6803 for receiving air 6800. Air 6800 is pre-heated to a temperature, typically above 900 K, which may be above the auto-ignition temperature of the fuel. Conduit 6801 conveys air 6800 flowing inward radially with respect to combustion axis 6820 to a swirler 6802 disposed within the conduit 6801.

FIG. 69A shows a cross sectional view of the conduit 6801 including swirler 6802 in accordance with some embodiments. In the embodiment of FIG. 69A, swirler 6802 has several spiral-shaped vanes 6902 for directing the flow of air 6800 radially inward and imparting a rotational component on the air. The diameter of the swirler section of the conduit decreases from the inlet 6904 to the outlet 6906 of swirler 6802 as defined by the length of the swirler section conduit 6801. The decrease in diameter of swirler vanes 6902 increases the flow rate of air 6800 in substantially inverse proportion to the diameter. The flow rate is increased so that it is above the flame speed of the fuel. At outlet 6906 of swirler 6802, fuel 6806, which in a one embodiment is propane, is injected into the inwardly flowing air.

In some embodiments, fuel 6806 is injected by fuel injector 6804 through a series of nozzles 6900 as shown in FIG. 69B. More particularly, FIG. 69B shows a cross sectional view of conduit 6801 and includes the fuel jet nozzles 6900. Each of the nozzles 6900 is positioned at the exit of the swirler vanes 6902 and is centralized between two adjacent vanes. Nozzles 6900 are positioned in this way for increasing the efficiency of mixing the air and fuel. Nozzles 6900 simultaneously inject the fuel 6806 across the air flow 6800. Since the air flow is faster than the flame speed, a flame will not form at that point even though the temperature of the air and fuel mixture is above the fuel's auto-ignition temperature. In some embodiments, where propane is used, the preheat temperature, as governed by the temperature of the heater head, is approximately 900 K.

Referring again to FIG. 68, the air and fuel, now mixed, referred to hereafter as "air-fuel mixture" 6809, is transitioned in direction through a throat 6808 which has a contoured fairing 6822 and is attached to the outlet 6807 of the conduit 6801. Fuel 6806 is supplied via fuel regulator 6824.

Throat 6808 has an inner radius 6814 and an outer dimension 6816. The transition of the air-fuel mixture is from a direction which is substantially transverse and radially inward with respect to combustion axis 6820 to a direction which is substantially parallel to the combustion axis. The contour of the fairing 6822 of throat 6808 has the shape of an inverted bell such that the cross sectional area of throat 6808 with respect to the combustion axis remains constant from the inlet 6811 of the throat to outlet 6812 of the throat. The contour is smooth without steps and maintains the flow speed from the outlet of the swirler to the outlet of the throat 6808 to avoid separation and the resulting recirculation along any of the surfaces. The constant cross sectional area allows the air and fuel to continue to mix without decreasing the flow speed and causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved in practice. Thus, the parasitic power drain of the combustion air fan may be minimized.

Outlet 6812 of the throat flares outward allowing the air-fuel mixture 6809 to disperse into the chamber 6810 slowing the air-fuel mixture 6809 thereby localizing and containing the flame and causing a toroidal flame to form. The rotational momentum generated by the swirler 6802 produces a flame stabilizing ring vortex as well known in the art.

Figure 70:
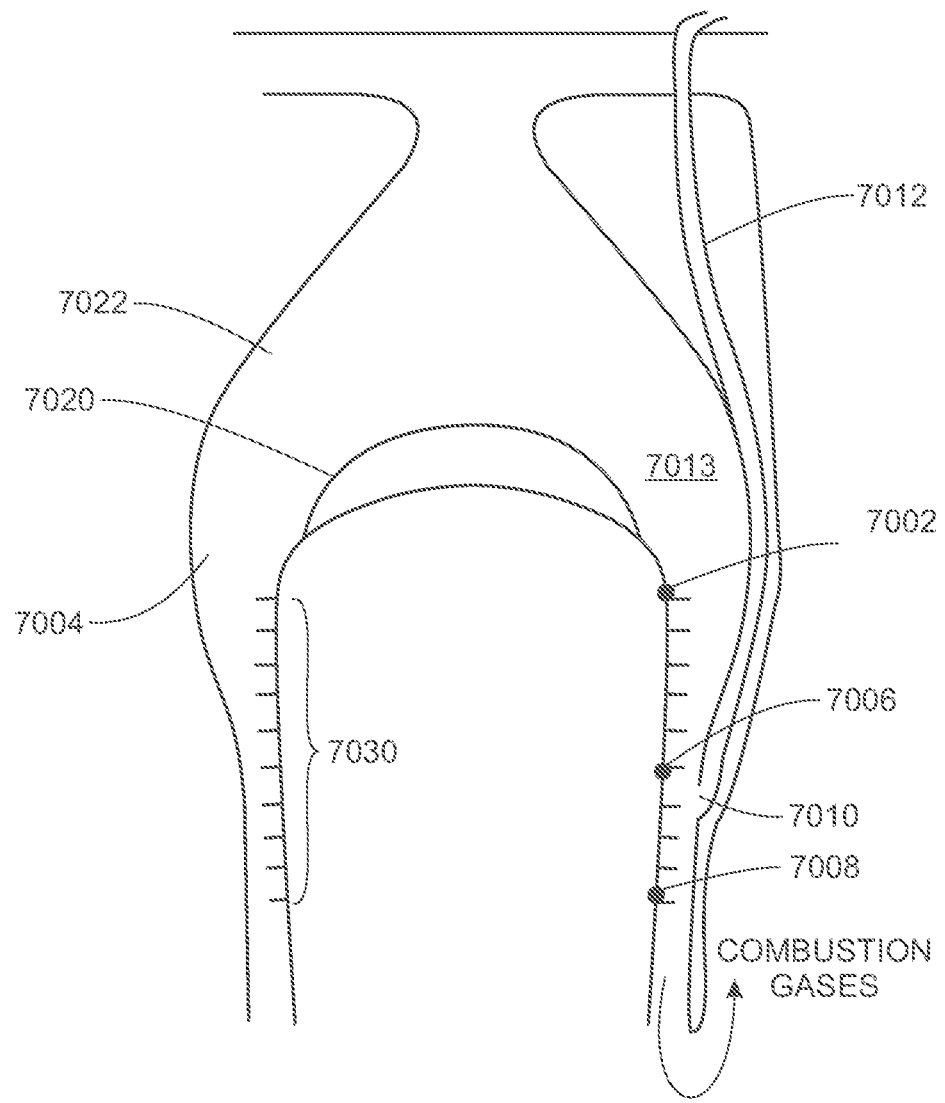
FIG. 70 shows a view of a heater head of an engine in accordance with yet another embodiment of the invention.

Referring to FIG. 70, a cross-section is shown of combustor 7022 and exhaust gas flow path 7013, as described above in reference to earlier figures. In accordance with another embodiment it is recognized that the combustion exhaust gases remain above the temperature of combustion of the fuel well beyond the region of combustor 7022, and that, since the fuel/air mixture is typically exceedingly lean, adequate oxidant remains for recombustion of the exhaust gases.

FIG. 70 further illustrates the use of a temperature sensor 7002, typically a thermocouple, to monitor the temperature of heater head 7020 at the top of external pin array 7030 and thereby to control the fuel flow such as to maintain the temperature at sensor 7002 below a temperature at which the heater head significantly loses strength. The temperature at sensor 7002 is preferably maintained approximately 50.degree. C. below the melting temperature of the heater head material.

In the configuration depicted in FIG. 70, the use of a variable-cross-section gas flow bypass channel 7004 is illustrated, as described above. The taper of the bypass channel is greatly exaggerated for clarity of depiction. Even where a bypass channel is employed, the temperature profile as a function of distance from the top of the heater head is not flat, as would be preferable. Two additional temperature sensors, 7006 and 7008, are shown at the middle and bottom, respectively, of external pin array 7030, whereby the temperature of the exhaust gas may be monitored.

In accordance some embodiments, additional fuel is added to the exhaust gases at nozzle 7010 via afterburner fuel line 7012. Nozzle 7010 may be a ring burner, circumferentially surrounding heater head 7020 and facing external pin array 7030 between the positions designated in FIG. 70 by temperature sensors 7002 and 7006. The fuel flow through afterburner fuel line 7012 may be controlled on the basis of the exhaust gas temperature measured by temperature sensor 7008. The precise position of temperature 7008 is preferably such as to measure the maximum temperature of the external pin array produced by the combustion of fuel exiting from afterburner nozzle 7010.

Figure 71A:
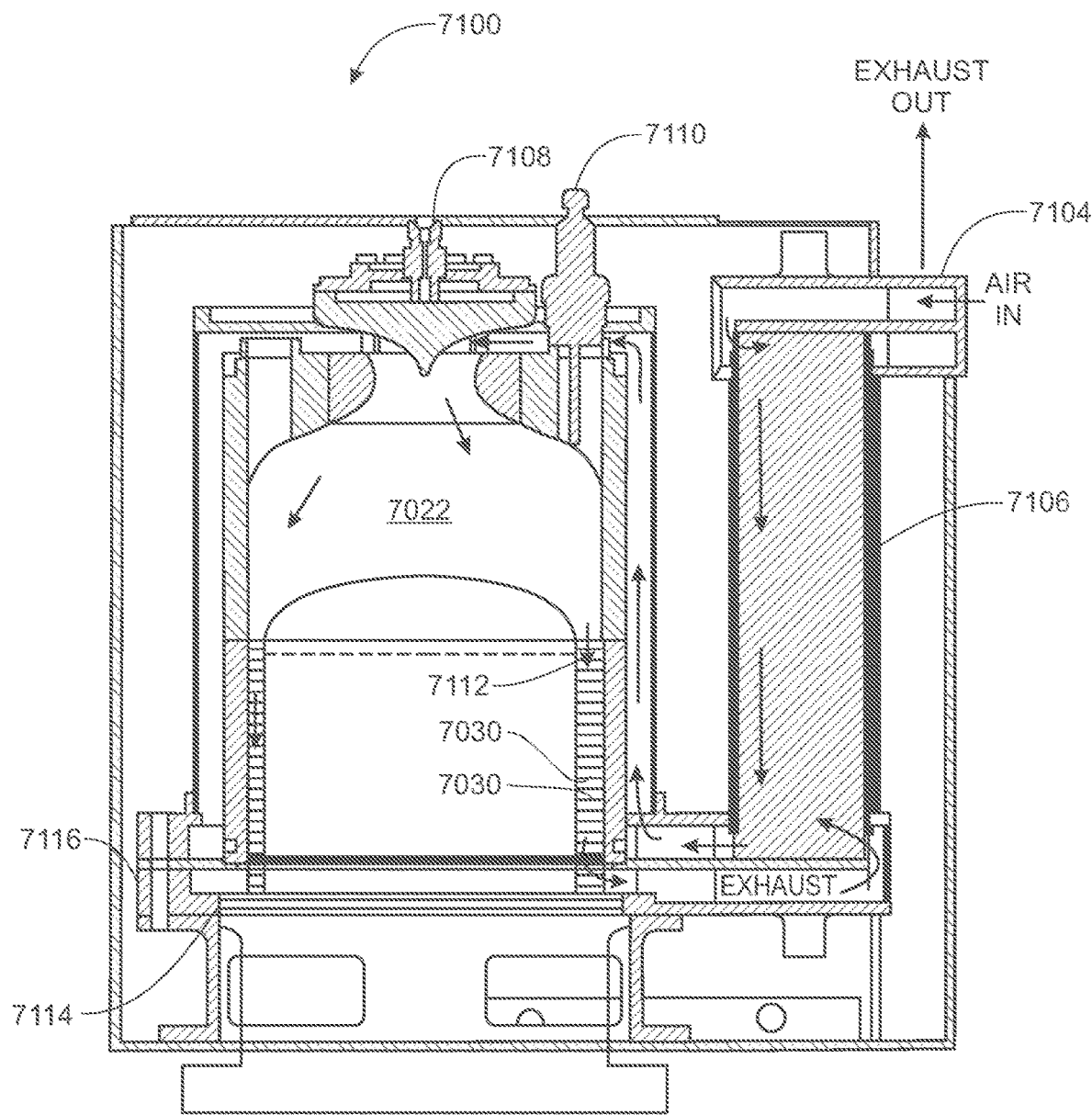
FIGS. 71A and 71B show views of a burner of an engine in accordance with one embodiment.
Figure 71B:
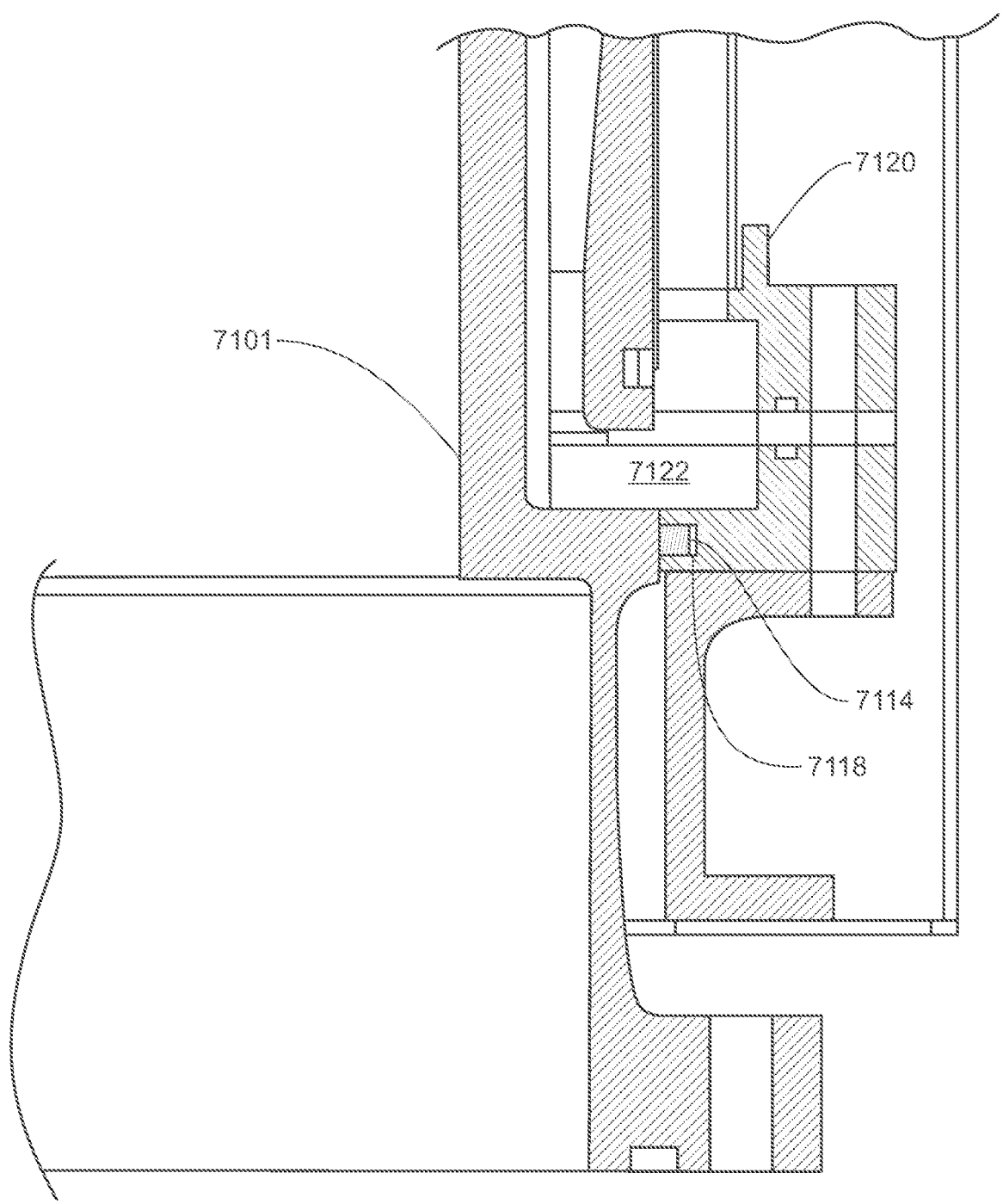

Referring to FIG. 71A, a side view is shown in cross section of a burner and heat recovery system, designated generally by numeral 7100, for a thermal cycle engine in accordance some embodiments. In the embodiment shown, heat is exchanged between hot exhaust gases, heated in combustor 7022, and air drawn in at air inlet 7104 in a heat exchanger 7106 that is external to the heater head assembly. Additionally shown is fuel inlet 7108 and igniter 7110 used to initiate ignition in the combustor. Exhaust stream 7112 traverses heat transfer pins 7030 before being channeled to heat exchanger 7106. A seal ring 7114 of copper, or other metal of sufficiently high melting temperature, forms a rod type seal on heater head flange 7116 just below the bottom row of heat transfer pins 7030. Copper ring 7114 fits tightly on heater head flange 7116 producing a labyrinth seal. The right-hand portion of the cross-sectional view of FIG. 71A, showing the region of the seal, is shown, enlarged, in FIG. 71B. Copper seal ring 7114 fits tightly on heater head 7101 and has a close fit within annular groove 7118 on the bottom surface of burner cover 7120. The configuration of ring 7114 in groove 7118 produces a labyrinth seal causing the exhaust gas, in exhaust plenum 7122 to travel a convoluted path around the back side of seal ring 7114 thereby limiting exhaust gas leakage. The tight fit of ring 7114 onto head 7101 limits exhaust gas leakage axially out of the burner.

It is to be understood that the various intake manifold embodiments described herein may be adapted to function in a multiple burner configuration.

Gaseous Fuel Burner

Definitions: As used in this section of the detailed description, the following terms shall have the meanings indicated, unless the context otherwise requires: Fuel-Air Equivalence ratio (.phi.)=Actual Fuel-Air Mass Ratio/Stoichiometric Fuel-Air Mass Ratio. The stoichiometric fuel-air mass ratio is defined as the mass ratio needed to balance the fuel+air chemical equation. The stoichiometric fuel-air mass ratio is well known for common fuels such as propane (0.0638 g fuel/g air) and calculable for gases such as biogas.

Figure 72:
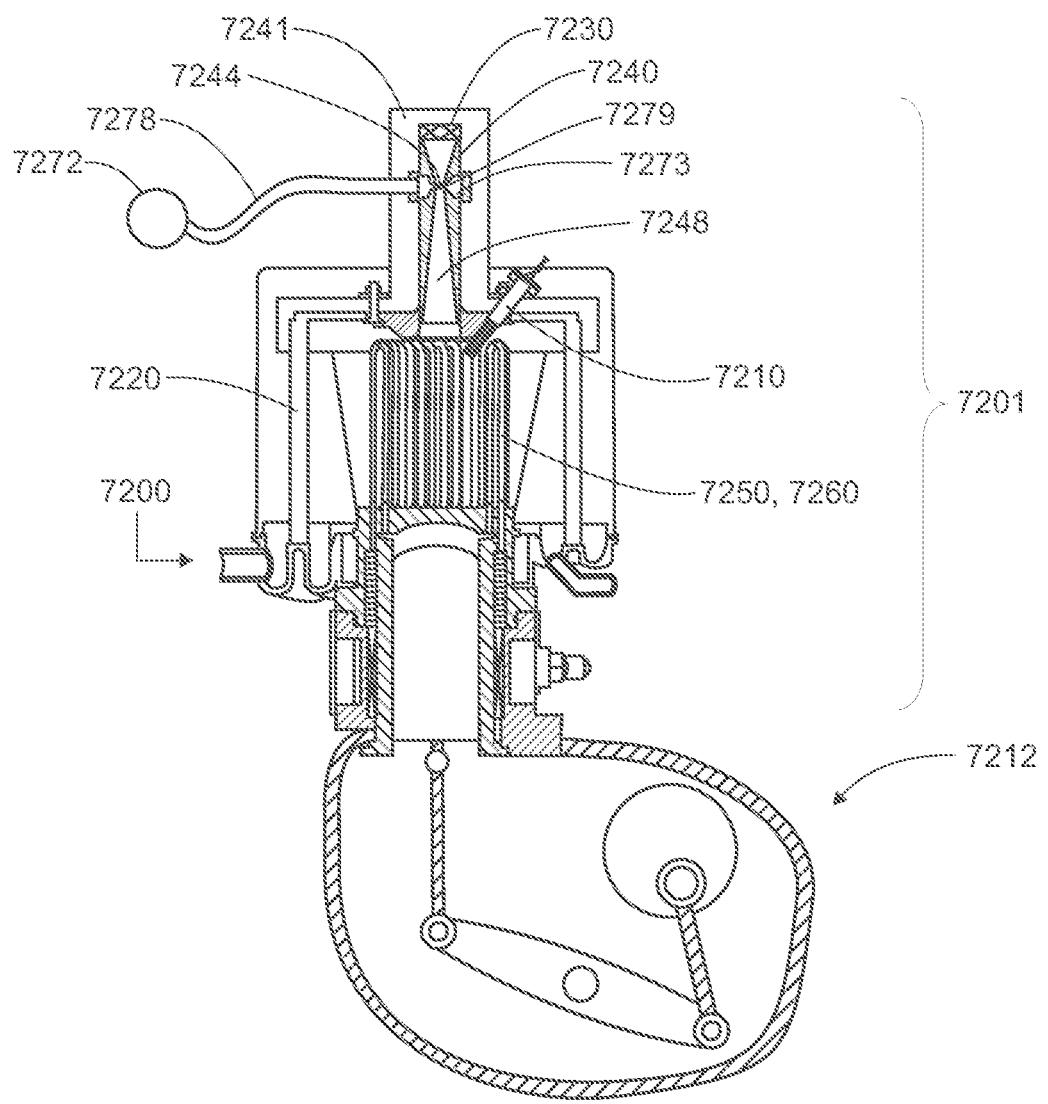
FIG. 72 is a gaseous fuel burner coupled to a Stirling cycle engine, where the ejector is a venturi, according to one embodiment.

FIG. 72 shows one embodiment of the engine 7212 embodiment having a gaseous fuel burner 7201. Various embodiments of the gaseous fuel burner 7201 are also disclosed in U.S. patent application Ser. No. 11/122,447, filed May 5, 2005, published Nov. 10, 2005, which is herein incorporated by reference in its entirety. This embodiment may be used in the context of a Stirling cycle engine, however, other embodiments of the machine are not limited to such applications. Those skilled in the art will appreciate that the present machine may have application in other systems, such as, with other types of external combustion engines.

The use of an ejector in a gaseous fuel burner advantageously can solve some of the challenges faced by the traditional gaseous fuel burners. First, using an ejector can eliminate the need for additional equipment, controls, and space, such as, a gaseous fuel pump, fuel control circuitry, and the associated components. Furthermore, using an ejector such as a venturi simplifies the fuel control system by eliminating the need for a separate fuel control scheme. Based on the corresponding rise of the vacuum with the airflow, and subsequently, an increased fuel flow, the burner power can be regulated by regulating the airflow. Accordingly, removing separate fuel control simplifies the development and implementation of automatic burner control in a gaseous fuel burner with an ejector.

Secondly, the corresponding rise of the vacuum with airflow also results in an approximately steady fuel-air ratio despite changes in temperature and airflow rates. The resulting steady fuel-air ratio simplifies the fuel control and operation of the burner, by eliminating the need for complex exhaust sensor/feedback fuel control mechanisms.

Figure 73A:
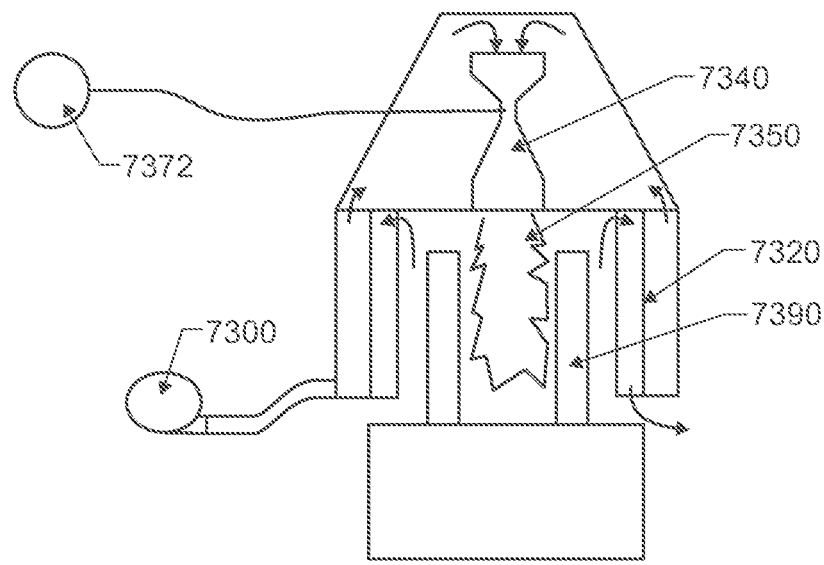
FIG. 73A is the burner of FIG. 72 showing the air and fuel flow paths.

Referring to FIG. 72, a gaseous fuel burner 7201 comprises an ejector 7240, a heat exchanger 7220, a combustion chamber 7250, and a blower 7200 (shown as 7300 in FIG. 73A). The term ejector as used here includes eductors, siphons, or any device that can use the kinetic energy of one fluid to cause the flow of another fluid. Ejectors are a reliable way of producing vacuum-based fuel flow systems with low initial cost, lack of moving parts, and simplicity of operation.

Referring again to FIG. 72, in a some embodiments, the ejector 7240 is a venturi. The venturi 7240 is positioned downstream of the outlet of the air preheater or heat exchanger 7220, in a venturi plenum 7241 and proximal to the combustion chamber 7250. A blower 7200 forces air through the venturi 7240. The flow of air through the venturi draws in a proportional amount of fuel through the fuel inlet ports 7279. The fuel inlet ports 7279 are placed at the venturi throat 7244 where the throat has the lowest pressure. The ports 7279 are sized to produce plumes of fuel across the airflow that promote good mixing within the venturi 7240. This fuel-air mixture exits the venturi 7240 and forms a swirl-stabilized flame in the combustion chamber 7250. The venturi 7240 draws in an amount of fuel that is substantially linearly proportional to the airflow regardless of airflow rates and temperature of the air entering the venturi 7240.

Figure 73B:
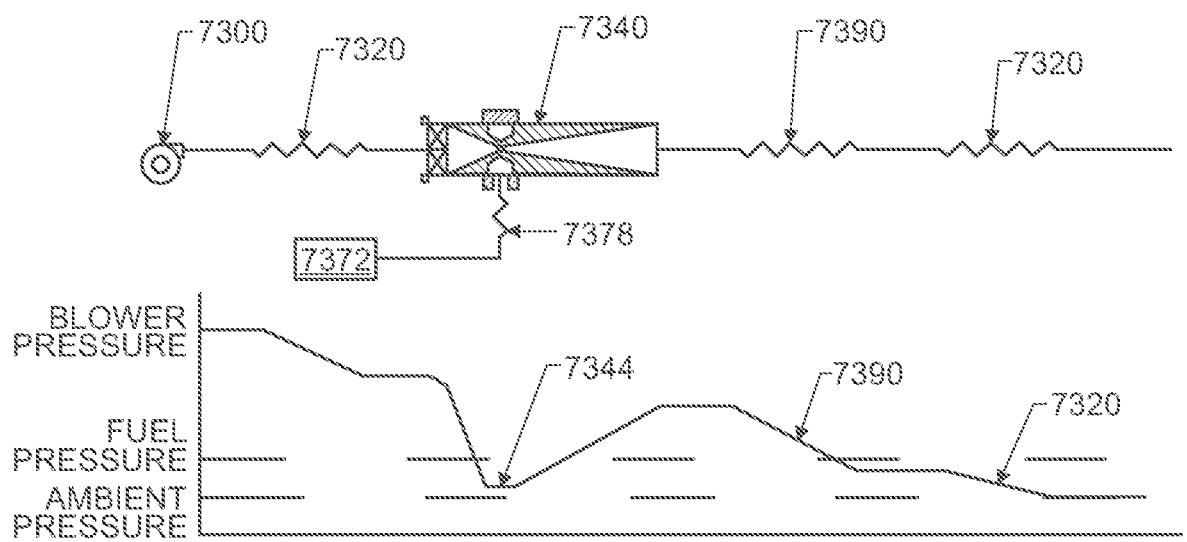
FIG. 73B is a graphical representation of the pressure across the burner.

In a some embodiments as shown in FIGS. 73A and 73B, placing the venturi 7340 between the air preheater 7320 and the combustion chamber 7350 promotes a substantially steady air-fuel ratio over a wide range of airflows and venturi temperatures. FIG. 73A is a schematic drawing of the burner including the components of the burner such as a blower 7300, a preheater 7320, a venturi 7340, and fuel supply 7372. The drawing also includes a load heat exchanger or heater head 7390 (also shown in FIGS. 76-78 as 7290). The load heat exchanger 7390 is the heat exchanger of the engine or process that absorbs the thermal power of the hot gases leaving the combustion chamber 7350 in the burner at some elevated temperature. The partially cooled burned gases then enter the exhaust side of the air preheater, where they are further cooled by incoming combustion air. FIG. 73B shows the pressure map of the same components arranged linearly. The air pressure supplied by the blower, the fuel supply pressure, and the ambient pressure are all indicated. The mass flow rate (m') of fuel into the burner is controlled by the difference between the fuel supply pressure at 7372 and the pressure in the venturi throat 7344 (shown in FIG. 72 as 7244) and the fuel temperature at the dominant restriction:

$m'_{FUEL} \varies (P_{FUEL} - P_{THROAT})^{0.5}/T_{FUEL}^{0.5}$

The pressure in the throat ($P_{THROAT}$) is set by the pressure drop through the exhaust side of the preheater 7320 plus the pressure drop through the heater head tubes 7390 minus the suction generated by the venturi throat 7344. The pressure drops 7320, 7390 and the throat suction pressure 7344 are all proportional to the airflow rate and the venturi temperature.

$P_{THROAT} \varies m'^2_{AIR} * T_{VENTURI}$

Combining these equations shows that the fuel flow will vary approximately linearly with the airflow:

$m'_{FUEL} \varies [P_{FUEL} - (m'^2_{AIR} * T_{VENTURI})]^{0.5}/T_{FUEL}^{0.5}$ Regulating the fuel pressure to near ambient pressure, the fuel flow is approximately linear with airflow.

$m'_{FUEL} \varies m'_{AIR} * (T_{VENTURI}/T_{FUEL})^{0.5}$

Thus, locating the dominant fuel restriction 7378 (shown as 7278 in FIG. 72) within the venturi plenum (shown as 7241 in FIG. 72) provides for an approximately steady fuel-air ratio over a wide range of airflow rates and venturi temperatures.

$m'_{FUEL}/m'_{AIR} \varies constant$

Figure 74:
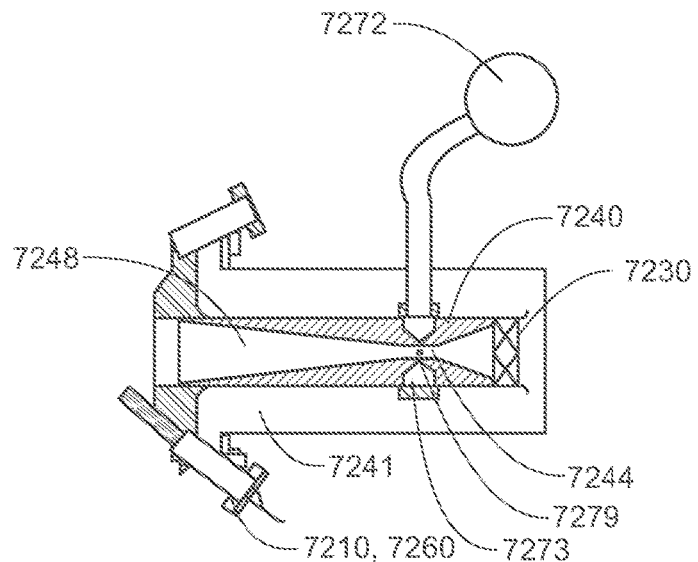
FIG. 74 shows a view of a venturi as shown in the burner of FIG. 72.

FIG. 74 shows one embodiment of the ejector such as the venturi. In this embodiment, the size of the opening of the venturi throat 7244 determines the amount of suction present at the throat 7244. In a specific embodiment, the venturi throat is approximately 0.24 inches in diameter. Referring back to FIGS. 72 and 74, fuel delivery means are coupled to the venturi 7240. The fuel delivery means may be manifolds, fuel lines or fuel tubes. The fuel delivery means may include other components such as a fuel restriction 7278, fuel inlet ports 7279 and fuel valves (not shown). Fuel supplied by a pressure regulator 7272 flows through a manifold 7273 and fuel inlet ports 7279 into the relatively lower pressure in the throat 7244. In one embodiment the fuel inlet ports 7279 provide the largest portion of the pressure drop in the fuel delivery means. Preferably, making the fuel inlet ports the largest restriction in the fuel delivery means assures that the restriction occurs at the venturi temperature and maximizes fuel-air mixing by producing the largest possible fuel plumes. Referring back to FIG. 72, the fuel and air flow into the divergent cone or diffuser 7248 of the venturi, where static pressure is recovered. In the diffuser 7248, the entrained fuel mixes with the air to form an ignitable fuel air mixture in the combustion chamber 7250. The ignitable fuel-air mixture then enters the combustion chamber 7250, where the igniter 7260 may ignite the mixture, and the tangential flow induced by a swirler 7230 creates a swirl-stabilized flame. Using an ejector 7240 to draw the gaseous fuel into the combustion chamber eliminates the need for a high-pressure gaseous fuel pump to deliver the fuel.

In one embodiment, the venturi 7240 is constructed from high temperature materials to withstand high temperatures and maintain its structural integrity. For the embodiment of FIG. 74, the dimensions of the venturi can be approximately 0.9 inches diameter inlet and outlets with an approximately 0.24 inches diameter throat. The half angles of the convergent cone and divergent cones can be 21.degree. and 7.degree. respectively and the throat can be 0.25 inches long. In this embodiment, the venturi can be constructed from Inconel 600. Alternatively, other high temperature metals could be used including, but not limited to Stainless Steels 310, 316L, 409 and 439, Hastalloy C76, Hastalloy X, Inconel 625 and other super alloys.

In one embodiment, as shown in FIG. 72, a swirler 7230 is located upstream of the venturi 7240 and advantageously creates a tangential flow of air through the venturi. As is well known in the art, the tangential flow from the swirler can create an annular vortex in the combustion chamber, which stabilizes the flame. Additionally, the swirler 7230 increases the suction pressure at the venturi throat 7244 by increasing the local air velocity over the fuel inlet ports 7279. Adding the swirler allows the venturi throat 7244 to be made larger for a given suction pressure. Furthermore, the swirling action induced by the swirler 7230 can suppress fluctuations in the combustion chamber pressure from propagating upstream to the venturi 7240. Such pressure fluctuations can temporarily slow or stop the flow of fuel gas into the venturi 7240. The swirler 7230 thereby facilitates a steady fuel-air ratio in the combustion chamber for steady airflows. The swirler 7230 may be a radial swirler.

Figure 75A:
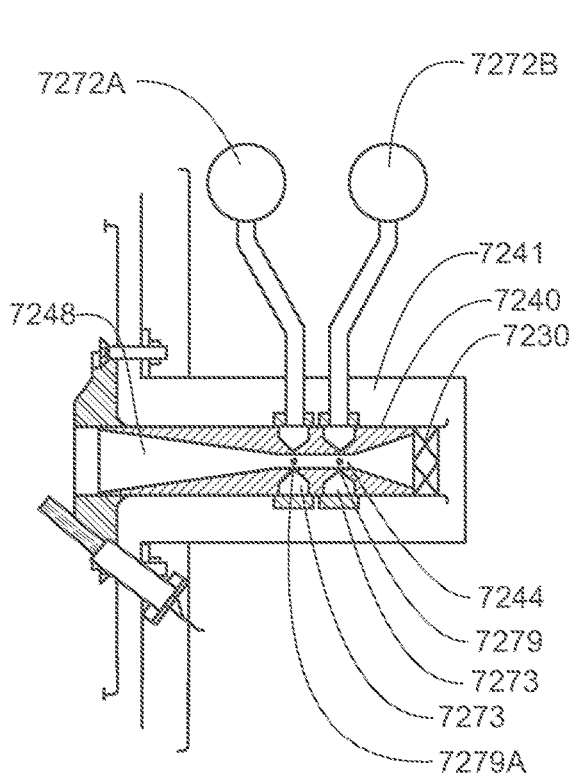
FIGS. 75A and 75B are embodiments of the venturi in FIG. 72.
Figure 75B:
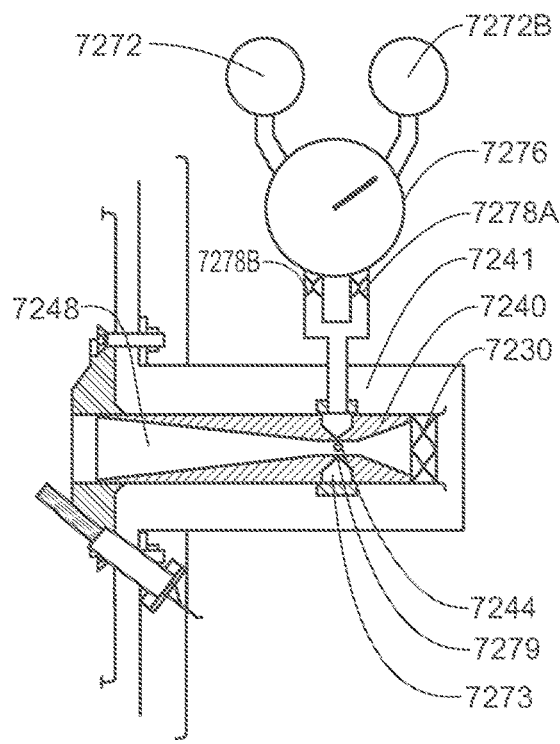
Figure 75C:
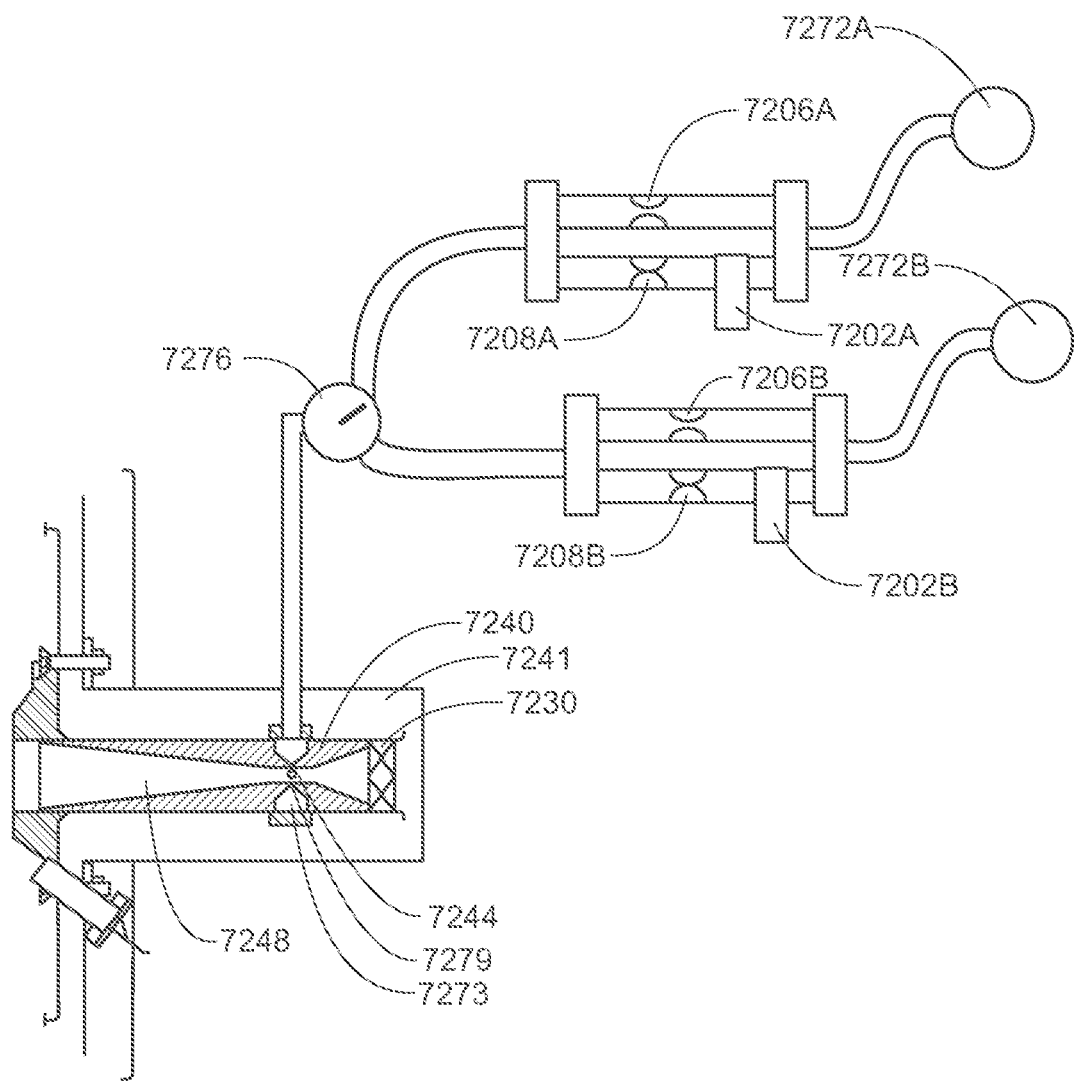
FIG. 75C shows a schematic of a multiple fuel system with multiple fuel restrictions and valves.

In other embodiments, the gaseous burner can be connected to multiple fuel sources. In this configuration, the burner may be fired, lit or ignited with a type of fuel and then run with a different type of fuel. The use of multiple fuel sources may require a fuel delivery means tuned for each fuel. FIGS. 75A, 75B, and 75C show embodiments for two fuels with significantly different energy densities such propane and natural gas. In this embodiment, the fuel delivery means for the denser propane must be approximately three times more restrictive than the fuel delivery means for the less dense natural gas or methane. In the embodiment shown in FIG. 75A, the venturi has different manifolds and fuel ports for each fuel. High-density fuels such as propane would require the more restrictive fuel inlet ports 7279, while a low-density fuel such as natural gas would require less restrictive fuel inlet ports 7279A. This configuration retains the highest resistance to fuel flow at the venturi temperature. However, the embodiment of the venturi in FIG. 75A may be more difficult to manufacture and have a higher-pressure loss drop due to the long narrow passage.

Another embodiment for a gaseous burner with multiple fuel sources is shown in FIG. 75B. In this embodiment, a fuel selector valve 7276 directs the fuel through an additional fuel restriction such as 7278A or 7278B for a dense gas or a less dense gas respectively. The multi-port valve 7276 allows any number of predefined gases to be burned by the same burner. Predefined gases such as natural gas, liquid petroleum gas (LPG) or biogas can be burned in the same burner by simply setting a selector valve to the corresponding fuel setting. Alternatively, other embodiments can have multiple settings for different qualities of biogas as the carbon dioxide fraction in biogas can vary from 50% to 20%. The fuel restrictors may be placed outside the burner as shown in FIG. 75B or alternatively they can be located in the entrances to the manifold 7273. If restrictions 7278 are placed outside of the burner, then significant part of the fuel-delivery-means pressure drop is not at the venturi temperature and thus the fuel-air ratio may vary with the venturi temperature. The burner will run initially leaner and get progressively richer as the hotter faster air flowing through the venturi exerts a stronger vacuum on the fuel. In addition, moving a significant part of the pressure drop from the fuel ports 7279, the fuel will not penetrate as far into the air stream. Nevertheless, locating multiple restrictors 7278 for different gases may make the fabrication of the part easier.

An alternative embodiment, that provides significant flexibility in the fuel-air ratio control and fuel gas usages, is shown in FIG. 75C. In this embodiment, the two fuel sources, 7272A and 7272B are regulated to their individual pressure and flows though separate fuel delivery means adjusted for each fuel. Each fuel delivery means includes two or more restrictions in parallel 7206A and 7208A, and 7206B and 7208B with one or more valves 7202A, and 7202B, respectively, to vary the pressure drop of the fuel delivery means. The valves may be manually or automatically actuated. Fuel selector 7276 connects fuel delivery means to the venturi, while closing the other fuel off.

The multiple restrictions 7206A and 7208A, and 7206B and 7208B and the valves 7202A and 7202B allow the pressure drop of the fuel delivery means to be adjusted during burner warm-up. Thus the fuel-air ratio can be roughly maintained as the suction pressure increases with increasing venturi temperature. The multiple restrictions can also adjust for changing fuel gas density. A changing fuel gas density may occur when the gaseous fuel burner is connected to biogas digester, wherein the biogas digester is the source of fuel. In a biogas digester embodiment, the carbon dioxide ($CO_2$) content and therefore the energy density can vary weekly. In this embodiment, if the $CO_2$ content increases, the pressure-drop through the fuel delivery means must be reduced to allow higher flows of the less energy dense fuel gas. In addition, the multiple restrictions can improve the ignition of the fuel gas by providing a richer fuel-air mixture for lighting. The richer mixture is provided by opening additional valves 7202A or 7202B, which also reduces the pressure-drop of the fuel delivery means. Once the burner is lit, the valve 7202A or 7202B may be closed to produce a leaner flame. As described supra, once the burner is lit, the burner may be run on a different fuel. A fuel selector may be used to switch the fuel types. Alternatively, an embodiment with a multiple fuel selector facilitates varying the fuel-air ratio during the operation of the burner.

Now referring to FIGS. 75B and 75C, the fuel selector 7276 may enable the burner to be lit on one fuel and run on a different type of fuel. This can be important if one fuel is too weak to ignite, but will burn in a warmed up burner. In one example, the burner may be lit on a higher density fuel such as propane. Once the burner is warmed up, the fuel selector 7276 is moved to draw in a low-density biogas.

Figure 76:
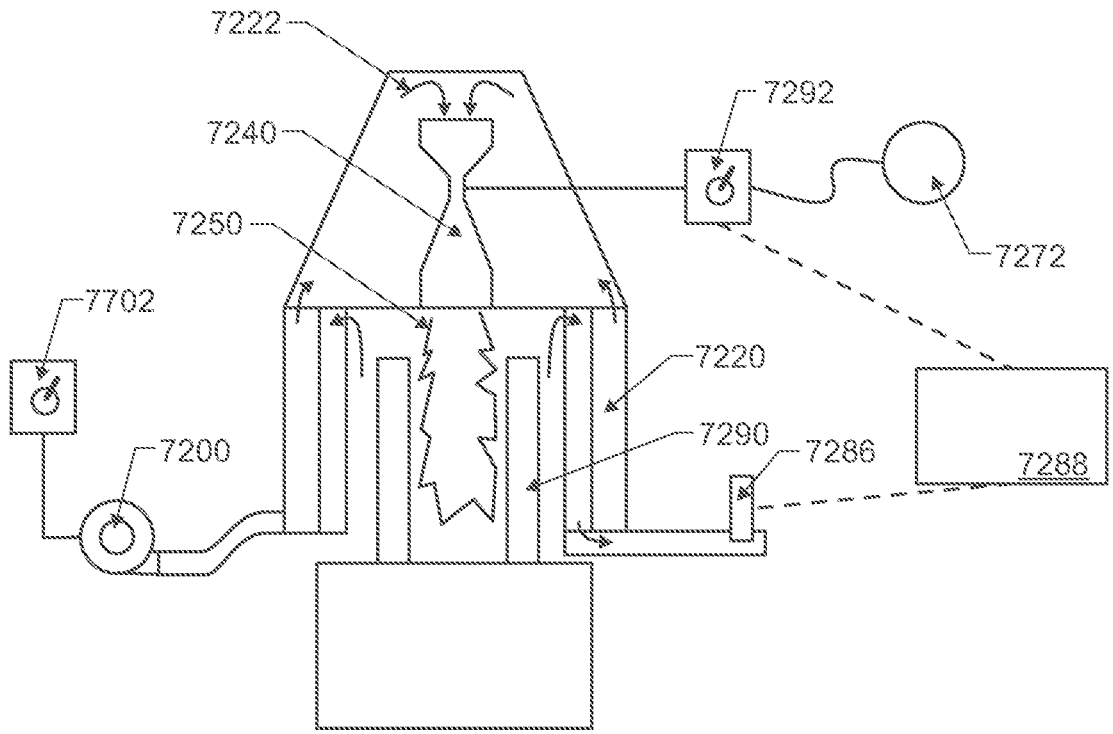
FIG. 76 shows a schematic of an embodiment of the burner with automated fuel control for variable fuel properties.

FIG. 76 depicts an embodiment where an automated controller 7288 adjusts a variable restriction 7292 such as a variable flow valve in the fuel delivery means to hold the exhaust oxygen constant as measured by a wide-range lambda sensor or UEGO 7286. In this embodiment, the automated scheme allows any fuel from biogas to propane to be connected to the burner and the control system can compensate for the changing fuel density. In this embodiment, the automated controller can restrict the fuel path for dense fuels such as propane and open up the fuel path for low-density fuels such as methane and biogas. Ignition would be accomplished by starting the variable restrictor 7292 in the fully open position, which will produce the richest mixture then closing it until the fuel-air mixture is ignited. After ignition, the controller can control the fuel flow to achieve the desired exhaust oxygen level. It is also envisioned that such an embodiment would allow the fuel air ratio to be adjusted during warm-up to optimize efficiency and burner stability.

Figure 77:
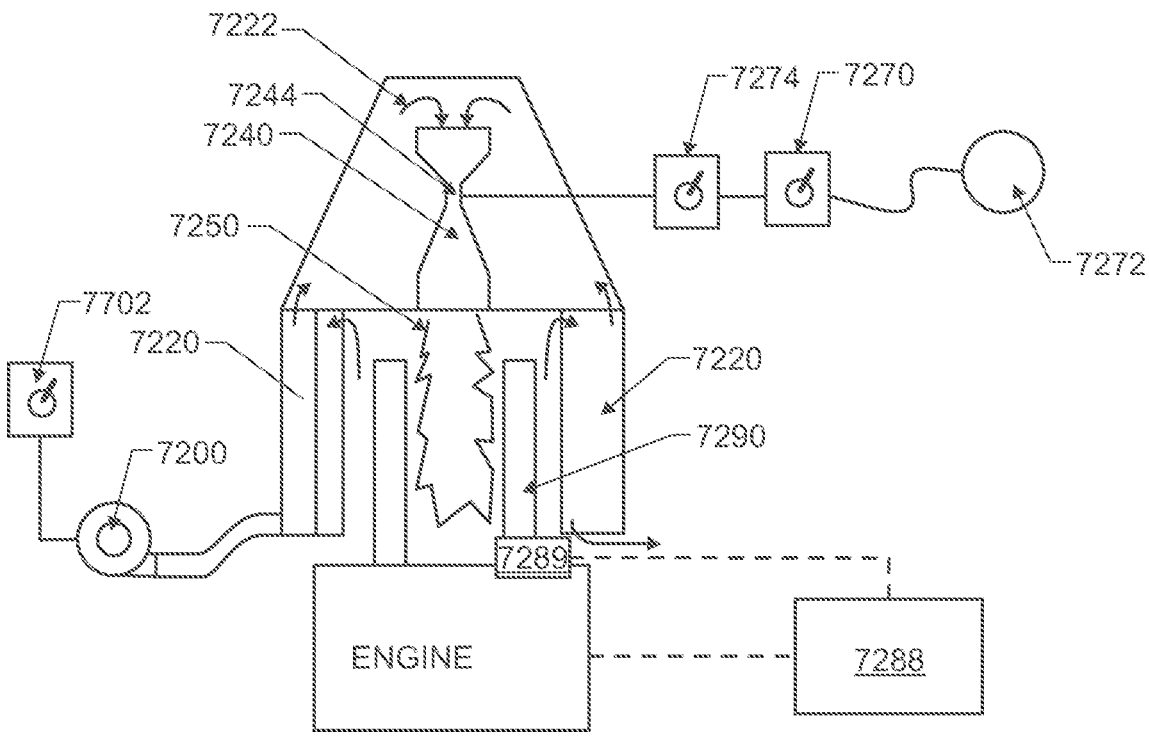

In another embodiment as shown in FIG. 77, the gaseous fuel burner is a high efficiency burner for an external combustion engine such as a Stirling cycle engine. The burner includes manual controls to control the burner. The manual controls include a ball valve 7270 to manually select a fuel type, a trim valve 7274 to adjust the fuel-air ratio and a rheostat 7702 to control the blower speed, and subsequently the airflow. The preheated air 7222 in the venturi 7240 draws in the fuel from a fuel source 7272. The fuel then mixes with the preheated air to create a fuel-air mixture. The fuel-air mixture flows into the combustion chamber 7250 where it burns. In this embodiment a microprocessor/controller 7288 holds the heater head temperature constant as measured by the temperature sensor 7289 by varying the engine speed. Furthermore, the blower-speed determines the burner power output and thus the engine power output. In an alternative embodiment, the fuel trim valve 7274 is not included.

Figure 78:
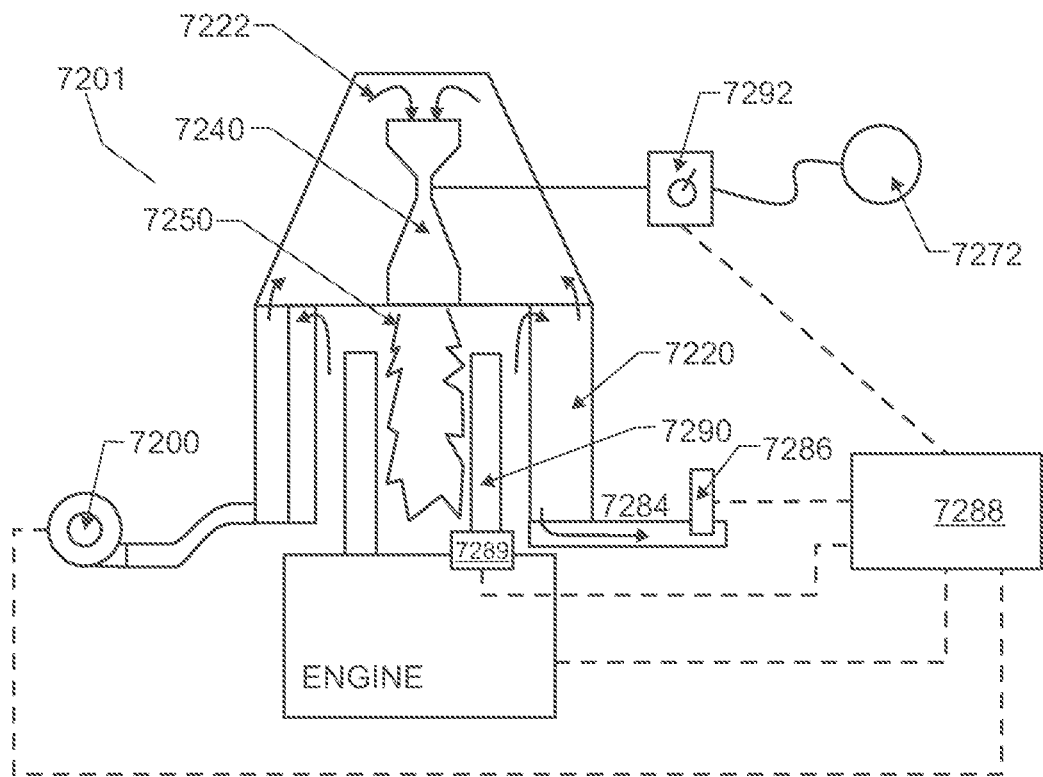

Referring now to FIG. 78 the gaseous fuel burner 7201 is a high efficiency burner for an external combustion engine such as a Stirling cycle engine. In this embodiment, the burner includes an oxygen sensor 7286 located in the exhaust stream 7284 and a microprocessor/controller 7288 to automatically restrict the fuel flow with the variable restrictor 7292. Additionally, the burner includes a blower controller (shown as 7702 in FIG. 77). The blower controller 7702 can be adjusted by the microprocessor/controller 7288 to match the Stirling engine power output with the load. In this embodiment, the burner temperature is held constant by varying the engine speed and the engine power output is automatically adjusted by setting the blower speed. Accordingly, in this embodiment, the burner can burn most gaseous fuels, including fuels without constant properties such as biogas.

Figure 79:
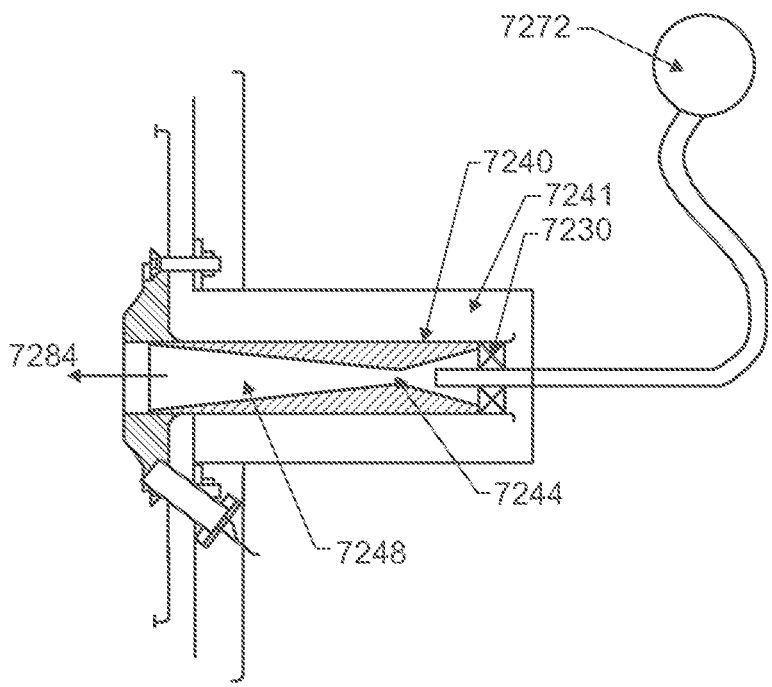

In another embodiment as shown in FIG. 79, fuel is delivered directly into the venturi at a point proximal to the venturi throat 7244. This embodiment includes a swirler 7230 to accommodate the fuel delivery means such as a fuel line or fuel tube. The swirler 7230 is preferably an axial swirler positioned in the venturi 7240 and upstream of the venturi throat 7244. In operation, the delivered fuel is entrained with the motive air to form the fuel-air mixture. The exemplary manual or automatic control mechanisms are adaptable to this alternate fuel delivery embodiment.

Referring back to FIG. 74, the gaseous fuel burner further comprises an igniter 7260 and a flame-monitoring device 7210. Preferably, the igniter 7260 is an excitable hot surface igniter that may reach temperatures greater than 1150.degree. C. Alternatively, the igniter 7260 may be a ceramic hot surface igniter or an excitable glow pin.

With continuing reference to FIG. 74, other embodiments include a flame-monitoring device 7210. The flame-monitoring device 7210 provides a signal in the presence of a flame. For the safe operation of the any burner, it is important that the fuel be shut-off in the event of a flameout. The monitoring device for flame sensing is the flame rectification method using a control circuit and a flame rod.

Flame rectification, well known in the art, is one flame sensing approach for the small, high efficiency gas burners. The device uses a single flame rod to detect the flame. The flame rod is relatively smaller than the grounded heater head and it is positioned within the combustion flame. In this flame rectification embodiment, the control unit electronics are manufactured by Kidde-Fenwal, Inc., and the flame rod is commercially available from International Ceramics and Heating Systems Preferably, the flame-monitoring device uses the hot surface igniter as the flame rod. Alternatively, the flame-monitoring device may be either remote from the hot surface igniter, or packaged with the igniter as a single unit.

Alternatively, an optical sensor may be used to detect the presence of a flame. A preferred sensor is an ultraviolet sensor with a clear view of the flame brush through an ultraviolet transparent glass and a sight tube.

It is to be understood that the various fuel burner embodiments described herein may be adapted to function in a multiple burner configuration.

Fuel Pump

In accordance with some embodiments, a fuel flow to a pressurized combustion chamber of an engine, such as a Stirling engine, may be metered by varying the operating parameters of a fuel pump. Various embodiments of the fuel pump are described below and in U.S. Pat. No. 7,111,460, issued Sep. 26, 2006, to Jensen et al., and U.S. patent application Ser. No. 11/534,979, filed Sep. 25, 2006, published Feb. 8, 2007, which are herein incorporated by reference in their entireties. Desired performance may be achieved without the throttle plates or valves or other restrictive devices that are normally used to meter the fuel flow to the combustion chamber.

Figure 80:
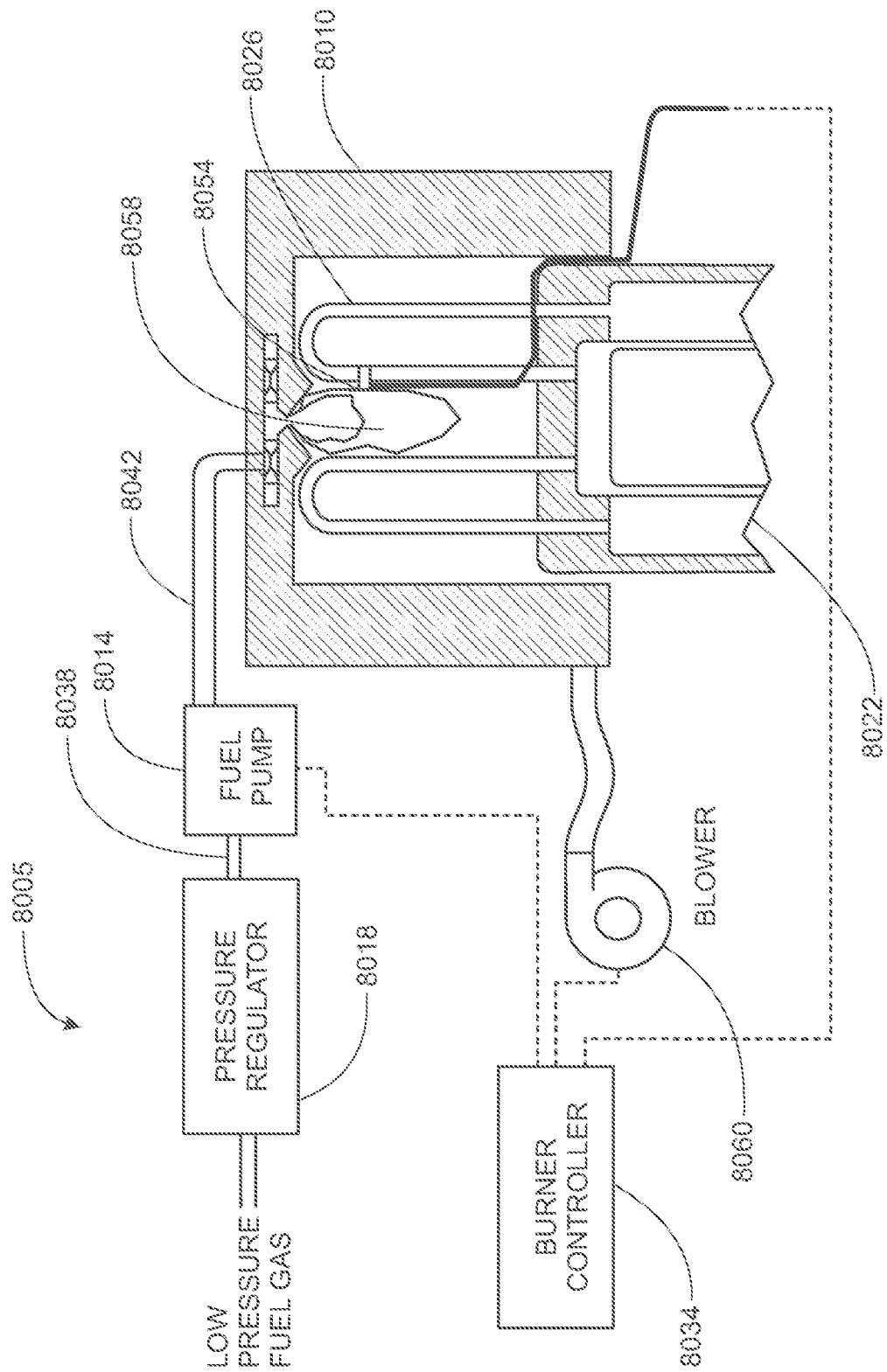

FIG. 80 shows a metering pump system providing gaseous fuel to a pressurized combustion chamber 8058 of an engine 8022 according to one embodiment. A gas train, labeled generally as 8005, includes a fuel pump 8014, interconnecting lines 8038, 8042 and may include a pressure regulator 8018. The fuel pump 8014 raises the fuel pressure in line 8038 to a higher pressure in line 8042. The gas train delivers fuel from the gas supply to the burner 8010, where it is mixed with air and burned in a combustion chamber 8058. The fuel pump is controlled by a controller 8034 that modulates the fuel flow rate by varying one or more parameters of an electrical signal sent to the fuel pump 8014. The controller may also regulate a blower 8060 that provides air to the combustion chamber 8058 and may receive signals from sensors that report engine-operating parameters.

In some embodiments the delivered fuel pressure in line 8038 is 6 to 13 inches water column for liquefied petroleum gas. Natural gas may be supplied in line 8038 at even lower pressures of 3 to 8 inches water column. Alternatively, pressure regulator 8018 can supply the fuel at lower pressures, even negative pressures. Typical fuel pressures in line 8042 may range from 0.5 to 5 PSIG.

Figure 81:
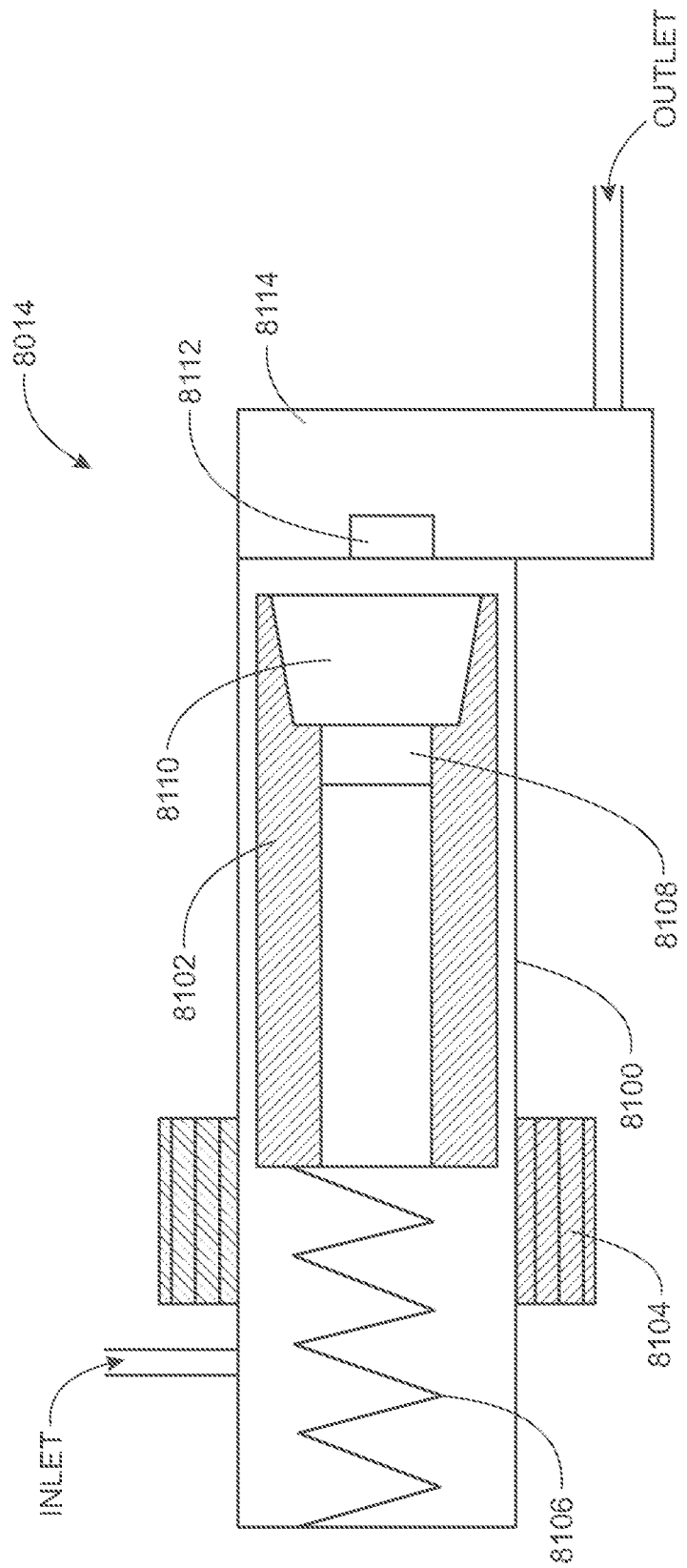

In some embodiments, fuel pump 8014 is a linear piston pump. A linear piston pump is shown in FIG. 81. The pump includes a cylinder 8100, a piston 8102, a winding 8104, a spring 8106 and check valves 8108, 8112. When an electrical signal is applied to winding 8104, the winding pulls the ferrous metal piston 8102 to the left, compressing the spring 8106. Check valve 8108 in the piston allows fuel to flow into compression volume 8110. When the electrical signal is turned off and the electromagnetic force on the piston begins to decrease, the piston 8102 is forced to the right by the spring 8106. Gas is forced out check valve 8112 into the receiver volume 8114 at a higher pressure.

Figure 82:
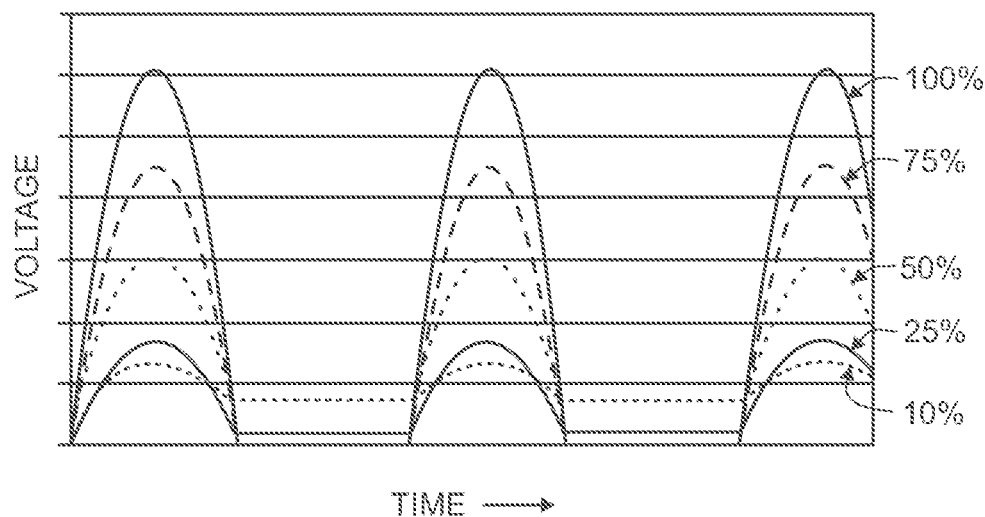

The flow rate of the pump can be modulated by varying the stroke of the piston 8102. In one embodiment the signal from the controller to the pump is a half-wave alternating current ("AC") signal, as shown in FIG. 82. Circuitry to produce this signal is well known in the art. The piston stroke and, thus, the flow rate increases as the amplitude of the AC signal increases. In some embodiments, low amplitude signals are biased slightly higher to improve repeatability and linearity of flow versus the driving signal. The force applied to the piston 8102 by the windings 8104 is inversely proportional to the distance from the windings to the piston. At low signal levels, the piston does not get very close to the windings and small changes in the friction and inertia of the piston will produce significant changes in the resulting piston stroke and flow. A bias voltage is applied to bring the resting-position of the piston closer to the windings, so that small changes in the controller signal that drives the piston dominate the frictional forces and the inertia of the piston. For example, the bias voltage added to the signal is highest at the lowest driving signal (10% signal in FIG. 82) and may drop to zero before the drive signal reaches 50%. The bias is reduced at higher flow levels to take advantage of the full pump stroke.

Figure 83:
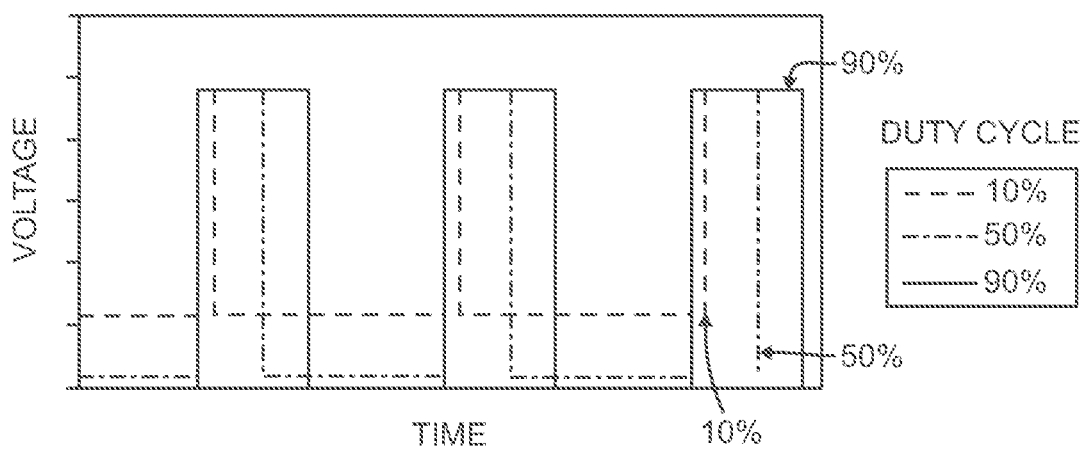

In another embodiment, the controller signal that drives the pump is a pulse-width-modulated ("PWM") direct current ("DC") voltage signal. FIG. 83 shows an exemplary DC waveform that may be used to drive the pump. Circuitry to generate the PWM DC signal in FIG. 83 is well known in the art. Three different drive signals are plotted versus time. These signal modulations correspond to 10%, 50% and 90% duty cycles, which are shown for purposes of illustration and not for limitation. Applying the rectangular wave voltages of FIG. 83 to the windings 8104 of FIG. 81 will cause the piston 8102 to move to the left and compress the spring 8106. The stroke and, therefore, the flow will be roughly proportional to the voltage times the duration of the signal. The lower signals, 10% and 50%, include bias voltages between signal pulses. As in the case of the AC drive signal, the bias voltage moves the piston closer to the windings to provide greater piston response to small changes in the signal and overcome the frictional and inertia forces of the piston. This bias voltage may be varied with the duration of the drive signal. The bias voltage is highest at the minimum drive signal duration and may drop to zero before the drive voltage pulse duty cycle reaches 50%.

Other embodiments may use different controller signal waveforms to drive the piston. In another embodiment, the piston pump of FIG. 81 can be driven without the bias voltages shown in FIGS. 82 and 83.

In another embodiment both the frequency and the duration of the PWM DC controller signal modulating the pump can be varied to linearize the flow through the pump with changes in the driving signal.

Figure 84:
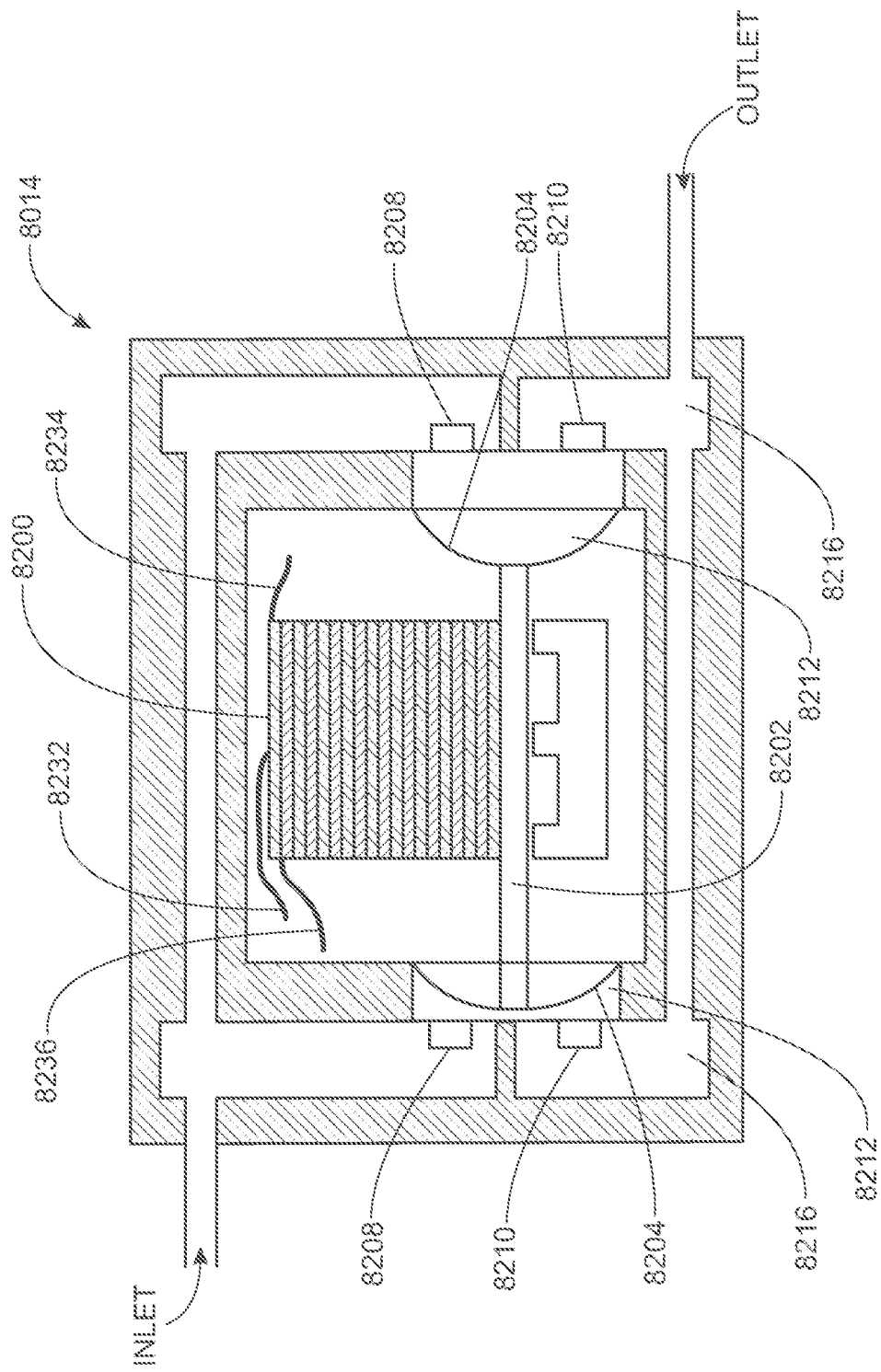

In further embodiments, pump 8014 is a diaphragm pump as shown in FIG. 84. In the diaphragm pump, one or more solenoidal coils 8200 drive the shaft of the pump 8202 back and forth. The shaft 8202 deflects two diaphragms 8204 that alternatively pull gas into the chambers 8212 and then expel it. The two wire coil is driven with an AC signal connected to wires (8234, 8236) that drives the piston 8202 back and forth by reversing the flow of current through the coil 8200. The solenoid has a permanent magnet so that a reversing magnetic field can drive the solenoid in opposite directions. The pumping force on the two chambers 8212 is phased 180 degrees apart so that as one chamber is filled, the companion chamber is emptied. Check valves 8208 upstream of the pumping chambers 8212 allow gas flow in, while the downstream valves 8210 allow flow out of the chambers and into the receiver volume 8216. The solenoidal coil 8200 can be driven with a full wave AC signal. In similar fashion to the piston pump, varying the amplitude of the AC signal will vary the stroke and, therefore, the fuel flow through the diaphragm pump.

In another embodiment, the electrical coil 8200 in the diaphragm pump 8014 of FIG. 84 can be center-tapped by adding a third wire 8232 to the center of the coil 8200. Wires (8234 and 8236) connect to each end of the coil. This three wire connection allows the piston 8202 to be driven back and forth with a DC source. The DC source connects to the center wire 8232 and the other connecting wires (8234 and 8236) are alternately connected to ground or a negative voltage, causing current to flow in one half-coil or the other.

Figure 85:
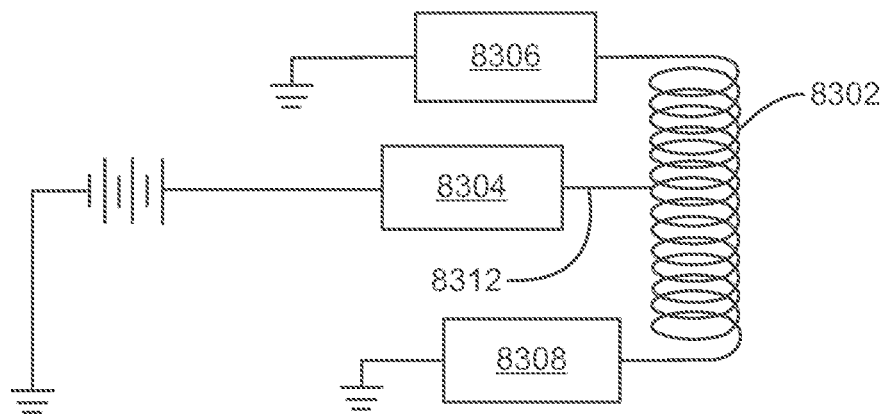
Figure 86A:
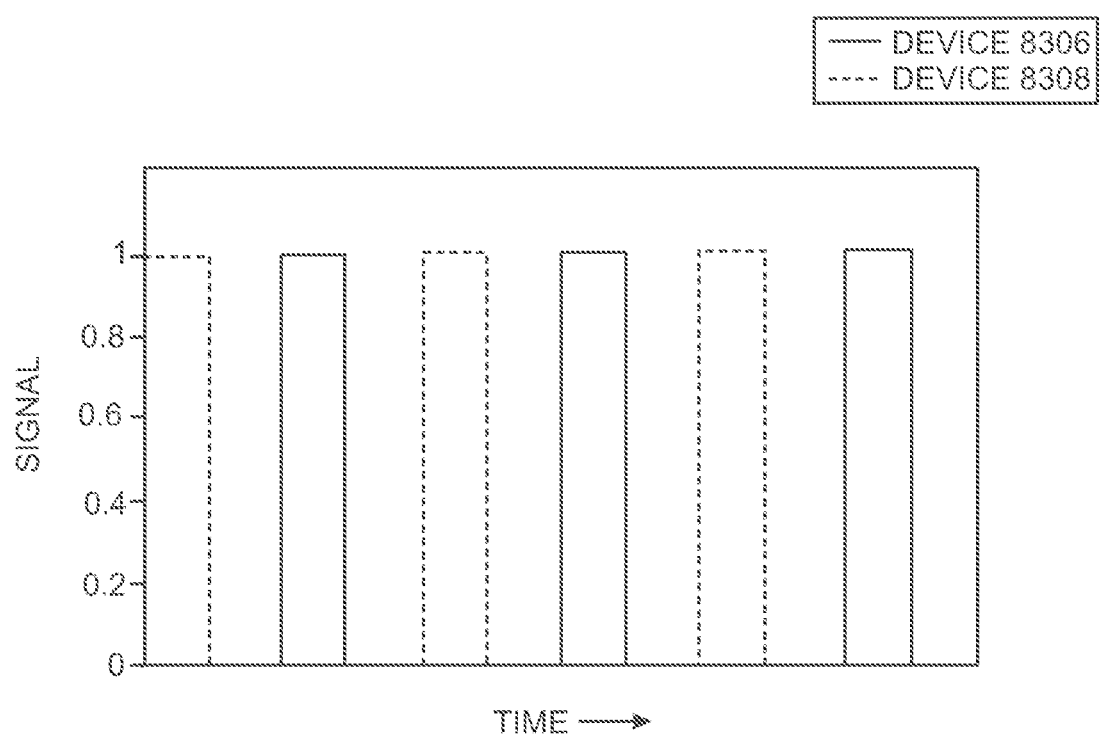

A three-wire coil 8302 and devices (8304, 8306, 8308) to control the DC current flow to the coil are shown schematically in FIG. 85. The coil may be used to drive a diaphragm pump solenoid, as in FIG. 85. Devices (8304, 8306, 8308) may be relays, field effect transistors ("FET"), bipolar transistors or other similar devices. The controller can vary the flow of fuel through the diaphragm pump by varying the amplitude of applied DC voltage signal 8312 using device 8304. Devices 8306, 8308 can be driven as shown in FIG. 86A, where first one device is closed, then opened and then the other device is closed and then opened. The vertical axis of the figure corresponds to a normalized driving voltage, where a signal equal to "1" means a device is closed (i.e., shorted). Control strategies using PWM signals, as illustrated in FIG. 83, albeit without the bias described previously for the piston pump and with suitable phasing, can be applied to each of devices 8306, 8308 in FIG. 85.

Figure 86B:
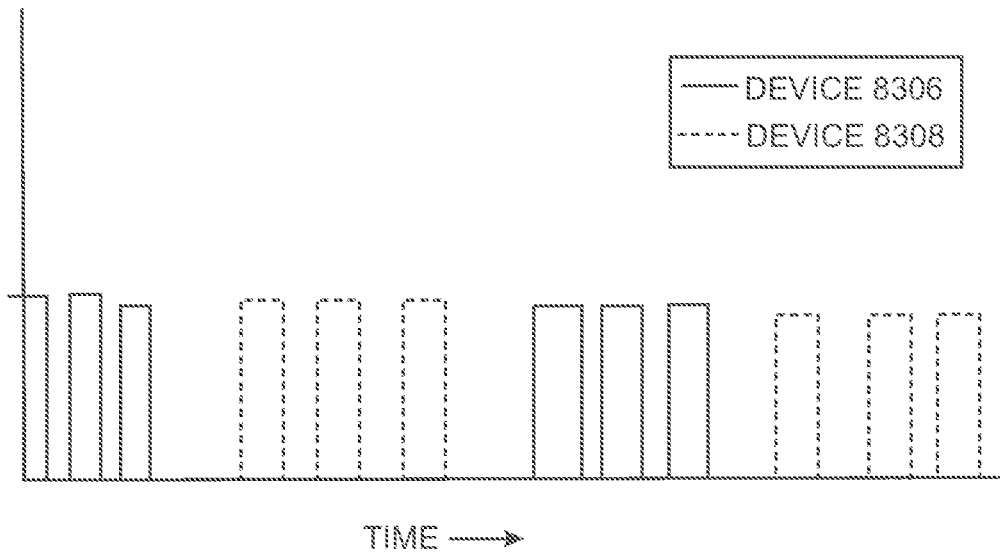

In another embodiment the amplitude and frequency of the diaphragm pump stroke of FIG. 84 can be controlled using the three devices (8302, 8304, 8306) shown in FIG. 85. The amplitude of the pump stroke is controlled by the average voltage at wire 8312. This voltage can be modulated by fast pulse-width-modulating device 8304. The stroke frequency may be controlled as before by devices 8306 and 8308. Alternatively, device 8304 can be eliminated and switches 8306 and 8308 can be pulse-width modulated at a high frequency during their "on" state, as illustrated in FIG. 86B. In other embodiments the center-tapped coil can be replaced by a full bridge or a half-bridge, as known to those skilled in the art.

Figure 87A:
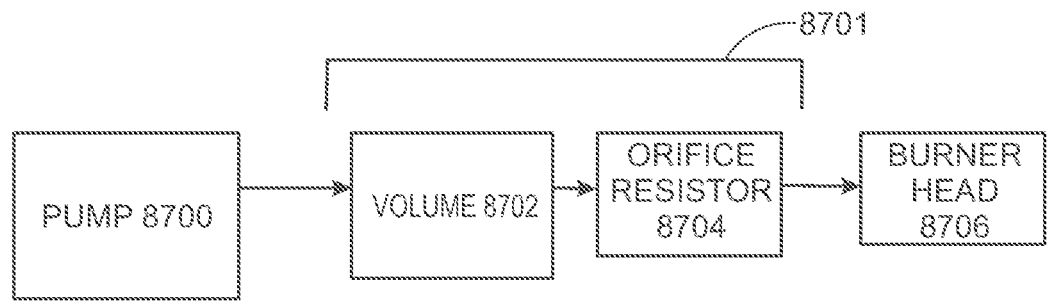

In other embodiments for use in applications where a constant flow of fuel is important, a filter 8701 may be added between pump 8700 and burner head 8706, where the fuel is mixed with the combustion air, as shown in FIG. 87A. One embodiment of the filter 8701 is an RC filter comprising a capacitance (volume) 8702 and an orifice 8704. The volume and orifice are sized to allow the required fuel flow and reduce fluctuations in flow to a desired level. Mathematical techniques that are well known in the art may be used to determine these filter parameters.

Figure 87B:
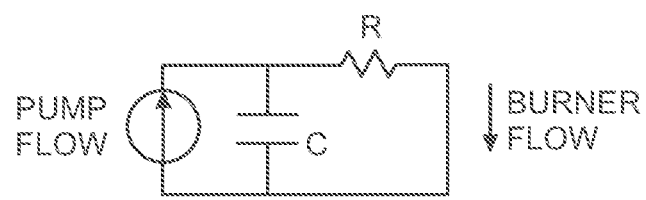

An acoustic filter using a volume and an orifice restrictor has the electrical circuit analog shown in FIG. 87B. The analog of gas flow is electrical current, the analog of gas pressure is electrical voltage, the analog of volume is electrical capacitance, the analog of flow resistance is electrical resistance and the analog of gas inertia is electrical inductance. The orifice restrictor does not translate directly into this model because the orifice flow resistance is proportional to the gas flow squared (non-linear) instead of being proportional to the gas flow as the model suggests. The model can be used through the process of linearization of flow resistance for small signals. The pump gas flow ripple is attenuated by the factor of $1/(1+2.pi.fRC)$. Where "f" is the frequency component of the gas flow entering the filter from the pump. Due to the orifice restrictor non-linear characteristics, the acoustic filter has a lower attenuation at low flow causing a high burner flow ripple as a percentage of average flow. The higher ripple can cause flame instability and higher emissions of pollutants. This non-linearity also causes a high resistance to average gas flow at the higher flow rates reducing the pump maximum flow capability.

Figure 87C:
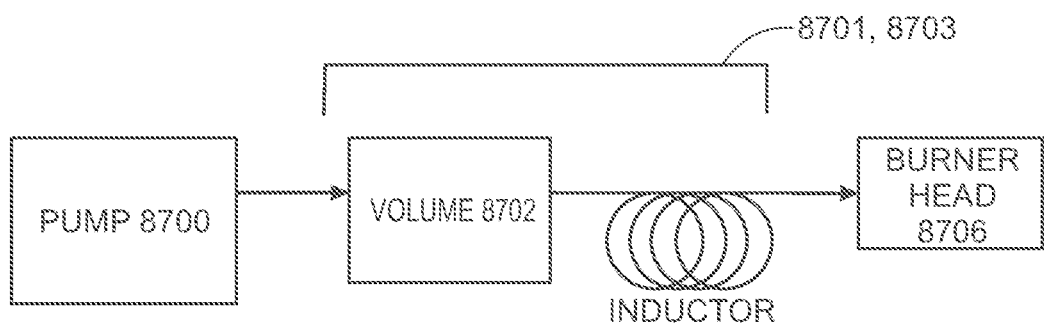
Figure 87D:
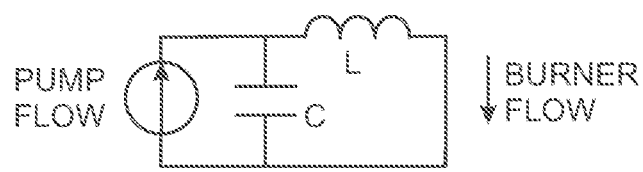
Figure 88:
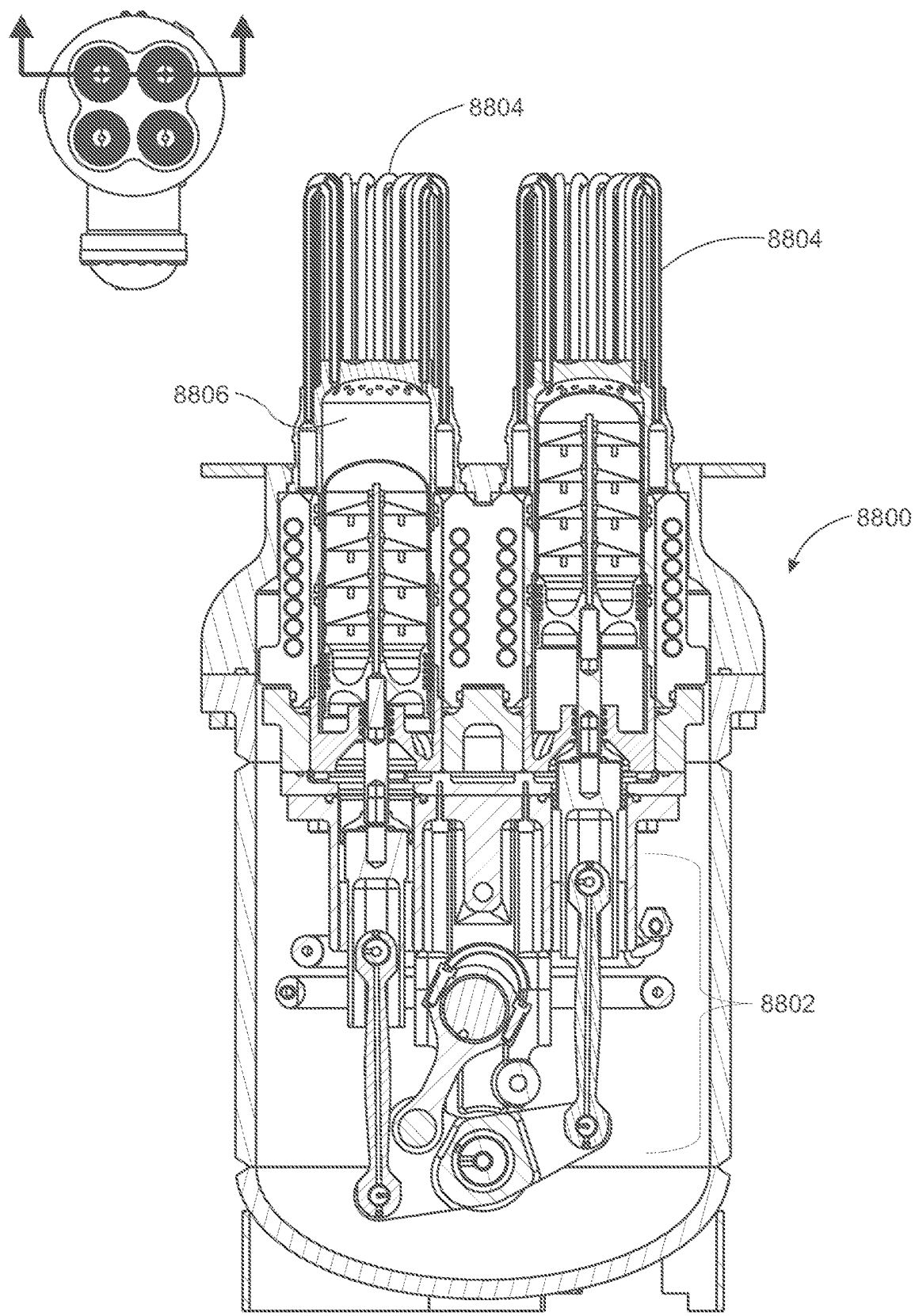

The addition of a long thin tube 8703 to the acoustic filter provides ripple attenuation through the gas mass acceleration, as shown in FIG. 87C. The diagram for the electrical analog is shown in FIG. 87D. The pump gas flow ripple is attenuated by the factor of 1/[1+(LC)(2.pi.f).sup.2]. Since L and C are not a function of flow, the filter attenuation is not affected by the flow rate and does not have the disadvantages of the filter of FIG. 87A. Attenuation of the ripple also increases the pump's flow rate.

Referring again to FIG. 80, in another embodiment, controller 8034 modulates the output of the fuel pump 8014 to control the temperature of the heater tubes 8026 of the engine. The temperature of the heater tube 8026 may be measured with a temperature sensor 8054, such as a thermocouple, that is attached to a heater tube 8026. When the engine increases speed, the engine draws more thermal energy from the heater tubes 8026. The tubes cool and the thermocouple 8054 reports this temperature drop to the controller 8034, which in turn increases the fuel flow until the measured temperature is restored to a specified level. Any of the devices and methods for metering the fuel through the fuel pump, as described above, may be employed in this embodiment of the machine. Various fuel pump types including rotary vane pumps, piezoelectric pumps, crank driven piston pumps, etc., may be employed. In other embodiments, various operating parameters of a system, of which the pressurized chamber is a part, may be controlled by controlling the fuel pump to meter the fuel flow to the chamber. For example, the speed of an internal combustion engine or the power output of an engine may be determined by the controller. Alternatively, a fuel/air mixture ratio to a burner may be maintained by the controller.

It is to be understood that the various fuel pump embodiments described herein may be adapted to function in a multiple burner configuration.

Single Burner Multiple Piston Engine

Referring now to FIGS. 88, 89A-89C, various embodiments is shown wherein an engine 8800, such as a Stirling cycle engine, having a rocking beam drive 8802 (also shown as 810 and 812 in FIG. 8) and a plurality of pistons (also shown in FIG. 8 as 802, 804, 806, and 808), includes a single burner (shown as 8900 in FIGS. 89A and 89B) to heat heater heads 8804 of the pistons. Heater heads 8804 may be one of the various embodiments disclosed in the preceding section, including, but not limited to, tube heater heads, as designated by numeral 8902 in FIG. 89A (also shown as 9116 in FIGS. 91C and 91D), or pin or fin heater heads, as designated by numeral 8904 in FIG. 89C (and also shown as 5100 in FIGS. 53D through 53F). FIG. 89B included a pin heater head 8904 having a heater head lining 8926 fitted around the heater head 8904. Burner 8900 may be one of any of the various embodiments disclosed in the preceding sections and in U.S. Pat. No. 6,971,235, issued Dec. 6, 2005, to Langenfeld et al., which is herein incorporated by reference in its entirety.

In one embodiment a combustion chamber 8906 is positioned above the heater heads 8900, as shown in FIGS. 89A-89C. A prechamber 8901 may connect the combustion chamber 8906 to a burner head 8903 via a prechamber nozzle 8908, wherein prechamber nozzle 502 may be a simple nozzle, a swirler nozzle, or a pressure swirl nozzle. The burner head 8903 may house a UV window 8910 for flame detection, a fuel injector 8912, which may be an air-assist fuel injector such as a Delevan siphon nozzle, and a hot surface igniter 8914. Also connected to the burner head 8903 are a first inlet 8916 and a second inlet 8918. One of these inlets may be a liquid fuel inlet, and the other inlet may be an atomizing inlet.

The prechamber 8901 is a centrally located fuel preparation stage located upstream from the combustion chamber 8906. The prechamber 8901 is where the fuel is ignited to form a diffusion flame. In one embodiment where liquid fuel is used, the liquid fuel passes through the first inlet 8916. Atomizer passes through the second inlet 8918 to atomize the liquid fuel and mix with the liquid fuel in the prechamber 8901. As the atomizer and liquid fuel enter the prechamber 8901 via fuel injector 8912, it is ignited by the hot surface igniter 8914. Air may also pass through an intake 8920 and be preheated by a preheater 8922 before it travels into the prechamber 8901, where it will mix with the atomizer and the liquid fuel. Once the mixture is preheated and formed into a diffusion flame, it travels through the prechamber nozzle 8908 into the combustion chamber 8906 to form a PPV (premixed prevaporized) flame. When the diffusion flame leaves the prechamber 8901, evaporation may occur in the prechamber 8901 which may allow the diffusion flame to be relit more easily, should it get flamed out or burned out.

Once the flame is in the combustion chamber 8901, the heat from the flame is used to heat the heater heads 8804. The heated gas from the combustion chamber 8901 evenly flows over the surface of each of the heater heads 8804, wherein heater heads 8804 transfer the heat contained in the heated gas to a working fluid contained in the working space (shown as 8806 in FIG. 88) of the engine (shown as 8800 in FIG. 88). The combustion chamber 8901 may have apertures 8924 in its surface to further assist in distributing the PPV flame evenly across each of the heater heads 8804.

As described above in the current and preceding sections, the heater heads 8804 may be a pin heater head, a folded fin heater head, or may be heater tubes. In an embodiment using a pin or fin heater head, the heater head may include a heater head lining 8926 as shown in FIG. 89B (and also shown as 5340 in FIG. 53A). The heater head lining 8926 may be a sleeve that is fitted around the heater head 8904 or it may be a sleeve that is heated and expanded and then fit around the heater head such that when the sleeve cools it contracts and creates a snug fit around the heater head. The heater head lining 8926 ensures uniform flow of the heated gas. Uniform flow prevents uneven temperature distribution around the heater heads 8804 and ensures thermal efficiency, as discussed in detail in the preceding sections. Resultant exhaust from the burner may exit the burner through an exhaust 8928.

Because the burner may reach very high temperatures, the metal sued to form the burner may expand. Expansion of certain burner surfaces 8930 may interfere with the efficiency of the engine or may damage the heater heads 8804. In an alternative embodiment a compliant member may be positioned between the heater heads 8804, or, should it be used, the heater head lining 8926 and the burner surface 8930. The compliant member acts as a buffer against the expanding metal burner surface 8930 so that the burner surface 8930 does not expand into the heater heads 8804.

In an alternative embodiment a gaseous fuel, such as propane may be used. In such an embodiment the burner may include a burner head 8903 and a combustion chamber 8906. The burner head 8903 may house the UV window 8910 for flame detection, a fuel injector 8912, which may be an air-assist fuel injector such as a Delevan siphon nozzle, and a hot surface igniter 8914. The gaseous fuel may enter the combustion chamber 8906 via the fuel injector 8912. Upon exiting the fuel injector 8912, the gaseous fuel would be ignited by the hot surface igniter 8914, thereby creating a flame inside the combustion chamber 8906. Combustion of gaseous fuels is described in detail in the preceding sections.

In yet another embodiment burner 8900 may use both gaseous and liquid fuels. Similar to the exemplary embodiment described earlier, and various other embodiments described in preceding sections, the burner 8900 would include a combustion chamber 8906, a prechamber 8901, and a burner head 8903. The combustion chamber 8906 may be positioned above the heater heads 8804. A prechamber 8901 may connect the combustion chamber 8906 to a burner head 8903 via a prechamber nozzle 8908, wherein prechamber nozzle 8908 may be a simple nozzle, a swirler nozzle, or a pressure swirl nozzle. The burner head 8903 may house a UV window 8910 for flame detection, a fuel injector 8912, which may be an air-assist fuel injector such as a Delevan siphon nozzle, and a hot surface igniter 8914. Also connected to the burner head 8903 are a first inlet 8916 and a second inlet 8918. One of these inlets may be a liquid fuel inlet and the other inlet may be an atomizing inlet. A switch may be positioned between the first inlet 8916 and the second inlet 8918 so that when gaseous fuel is used, the gaseous fuel would flow through the second inlet 8918, instead of the atomizer as described above. When liquid fuel is used, the switch would be configured such that liquid fuel would flow through the first inlet 8916 and atomizer would flow through the second inlet 8918.

In a further embodiment of the burner, a blower may be coupled to burner 8900.

Multiple Burner Multiple Piston Engine

Referring now to FIGS. 90 through 91B, another embodiment is shown wherein each heater head 9002 of engine 9000 may be heated by an individual burner 9004, as shown in FIG. 90. Heater heads 9002 may be any of the various embodiments described in the preceding sections, including, but not limited to, tube heater heads, as designated by numeral 9116 in FIGS. 91B-91D, or pin or fin heater heads, as designated by numeral 9118 in FIG. 91A (and also shown as 5100 in FIGS. 53D through 53F). Burner 9004 may be any one of the various embodiments disclosed in the preceding sections and in U.S. Pat. No. 6,971,235.

Each burner 9004 includes a burner head 9100. Similar to previous disclosed burner embodiments, the burner head 9100 has an igniter 9101, a fuel injector 9108, and a UV window (shown as 9107 in FIG. 91B) for flame detection. Fuel passes through a first inlet 9106, where it is heated by the igniter 9101 and formed into a flame. Preheated air, heated by the preheater 9102, may be mixed with the fuel in the combustion chamber 9103. The heated fuel mixture forms a flame inside the combustion chamber 9103 and heats the heater head 9002. Any exhaust from the burner may exit the burner via an exhaust 9105. In an alternative embodiment of the burner, an atomizer may be combined with the fuel via a second inlet 9110. In another embodiment of the burner, a blower may be incorporated to maintain an average air ration amongst the individual burners 9004.

Yet another embodiment may include a prechamber 9111, as shown in FIG. 91B. In this embodiment, the burner may include a combustion chamber 9103, a prechamber 9111, and a burner head 9100. Combustion chambers 9103 may be positioned above the heater heads 9002. A prechamber 9111 may connect the combustion chamber 9103 to a burner head 9100 via a prechamber nozzle 9112, such as a simple nozzle, a swirler nozzle, or a pressure swirl nozzle. The burner head 9100 may house the UV window 9107 for flame detection, a fuel injection 9108, which may be an air-assist fuel injector such as a Delevan siphon nozzle, and a hot surface igniter 9101. Also connected to the burner head 9100 are a first inlet 9106 and a second inlet 9110. One of these inlets may be a liquid fuel inlet and the other inlet may be an atomizing inlet.

The prechamber 9111 is a centrally located fuel preparation stage located upstream from the combustion chamber 9103. The prechamber 9111 is where the fuel is ignited to form a diffusion flame. In one embodiment, where liquid fuel is used, the liquid fuel passes through the first inlet 9106. Atomizer passes through the second inlet 9110 to atomize the liquid fuel and mix with the liquid fuel in the prechamber 9111. As the atomizer and liquid fuel enter the prechamber 9111 via fuel injector 9108, it is ignited by the hot surface igniter 9101. Air may also pass through an intake and be preheated by a preheater 9102 before it travels into the prechamber 9111, where it will mix with the atomizer and the liquid fuel. Once the mixture is preheated and formed into a diffusion flame, it travels through the prechamber nozzle 9112 into the combustion chamber 9103 to form a PPV (premixed prevaporized) flame. When the diffusion flame leaves the prechamber 9111, evaporation may occur in the prechamber 9111 which may allow the diffusion flame to be relit more easily, should it get flamed out or burned out.

Once the flame is in the combustion chamber 9103, the heat from the flame is used to heat the heater heads 9002. The heated gas from the combustion chamber 9103 evenly flows over the surface of each of the heater heads 9002, wherein heater heads 9002 transfer the heat contained in the heated gas to a working fluid contained in the working space of the engine (shown as 9000 in FIG. 90). The combustion chamber 9103 may have apertures (shown as 9114 in FIG. 91A) in its surface to further assist in distributing the PPV flame evenly across each of the heater heads 8804.

The principles of the present invention may be applied to all types of engines, include Stirling engines, and may be applied to other piston machines utilizing cylinders such as internal combustion engines, compressors, and refrigerators. However, the present invention may not be limited to the double-acting four-cylinder Stirling engine.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A rocking beam drive mechanism for a machine comprising:
   a rigid structure having;
      a crankcase, the crankcase housing a rocking beam and housing a first portion of at least one coupling assembly;
      the crankcase having a lubricating pump;
      a cylinder housing for housing at least one cylinder, and a second portion of the at least one coupling assembly;
   a crankshaft, fixed in relation to the rigid structure;
   the rocking beam having a rocker pivot, the rocker pivot is fixed in place by a rocking beam shaft and is positioned at a midpoint within the rocking beam;
   the rocking beam shaft is fixed in place in relation to the crankshaft;
   at least one piston, the piston at least partially housed within the cylinder housing whereby the piston is capable of substantially linearly reciprocating within the respective cylinder;
   the at least one coupling assembly having a proximal end and a distal end, the proximal end being connected to the piston and the distal end being connected to the rocking beam by an end pivot, whereby linear motion of the piston is converted to rotary motion of the rocking beam; and
a seal sealably connected to a piston rod wherein the seal is a rolling diaphragm, the rolling diaphragm comprising a non-woven fabric;
an airlock located between the crankcase and the cylinder housing, the airlock disposed above the rolling diaphragm and the crankcase disposed below the rolling diaphragm; and
a pressure regulator maintaining a constant pressure differential between the airlock and the crankcase.

2. The rocking beam drive mechanism of claim 1 wherein the rocking beam is coupled to the crankshaft by way of a connecting rod and whereby a rotary motion of the rocking beam is transferred to the crankshaft.

3. The rocking beam drive mechanism of any one of claim 1 wherein the cylinder further comprising a closed end and an open end, wherein the open end further comprising a linear bearing connected to the cylinder, the linear bearing having an opening to accommodate the coupling assembly.

4. The rocking beam drive mechanism of claim 3 wherein the coupling assembly further comprising:
the piston rod; and
a link rod, the piston rod and link rod coupled together by a coupling means, the coupling means being located beneath the linear bearing.

5. The rocking beam drive mechanism of claim 4 wherein the coupling means is a flexible joint.

6. The rocking beam drive mechanism of claim 4 wherein the coupling means is a roller bearing.

7. The rocking beam drive mechanism of claim 4 wherein the coupling means is a flexure.

8. The rocking beam drive mechanism of claim 4 wherein the coupling means is a journal bearing joint.

9. A Stirling cycle machine comprising:
at least one rocking drive mechanism comprising:
a rigid structure;
a crankshaft, fixed in relation to the rigid structure;
a rocking beam having a rocker pivot, the rocker pivot is fixed in place by a rocking beam shaft and is positioned at a midpoint within the rocking beam;
the rocking beam shaft is fixed in place in relation to the crankshaft;
at least one cylinder;
at least one piston, the piston housed within a respective cylinder whereby the piston is capable of substantially linearly reciprocating within the respective cylinder; and
at least one coupling assembly having a proximal end and a distal end, the proximal end being connected to the piston and the distal end being connected to the rocking beam by an end pivot, whereby linear motion of the piston is converted to a rotary motion of the rocking beam;
a crankcase housing the rocking beam and housing a first portion of the coupling assembly;
the crankshaft coupled to the rocking beam by way of a connecting rod, whereby the rotary motion of the rocking beam is transferred to the crankshaft;
a cylinder housing holding the at least one cylinder, the at least one piston and a second portion of the coupling assembly; and
a seal for sealing the cylinder housing from the crankcase, wherein the seal is a rolling diaphragm the rolling diaphragm comprising a non-woven fabric;
an airlock located between the crankcase and the cylinder housing, the airlock disposed above the rolling diaphragm and the crankcase disposed below the rolling diaphragm; and
a pressure regulator maintaining a constant pressure differential between the airlock and the crankcase.

10. The Stirling cycle machine of claim 9 wherein the coupling assembly further comprising:
a piston rod; and
a link rod, the piston rod and link rod coupled together by a coupling means.

11. The Stirling cycle machine of claim 9 further comprising a lubricating fluid pump in the crankcase.

12. The Stirling cycle machine of any one of claim 11 wherein the lubricating fluid pump is a mechanical lubricating fluid pump driven by a pump drive assembly, the pump drive assembly being connected to and driven by the crankshaft.

13. The Stirling cycle machine of any one of claim 11 wherein the lubricating fluid pump is an electric lubricating fluid pump.

14. The Stirling cycle machine of any one of claim 9 further comprising a motor connected to the crankshaft.

15. The Stirling cycle machine of any one of claim 9 further comprising a generator connected to the crankshaft.

16. A Stirling cycle machine comprising:
at least two rocking drive mechanisms comprising:
a rigid structure;
a crankshaft, fixed in relation to the rigid structure;
a rocking beam having a rocker pivot, the rocker pivot is fixed in place by a rocking beam shaft and is positioned at a midpoint within the rocking beam;
the rocking beam shaft is fixed in place in relation to the crankshaft;
two cylinders;
two pistons, the pistons each housed within a respective cylinder whereby the pistons are capable of substantially linearly reciprocating within the respective cylinder; and
two coupling assemblies having a proximal end and a distal end, the proximal end being connected to the piston and the distal end being connected to the rocking beam by an end pivot, whereby linear motion of the piston is converted to a rotary motion of the rocking beam;
a crankcase housing the rocking beam and housing a first portion of the coupling assemblies;
the crankshaft coupled to the rocking beam by way of a connecting rod, whereby the rotary motion of the rocking beam is transferred to the crankshaft;
a lubricating fluid pump in the crankcase for pumping lubricating fluid to lubricate the crankshaft and the rocking beam and the first portion of the coupling assemblies;
a cylinder housing holding the cylinders, the pistons and a second portion of the coupling assemblies; and
a rolling diaphragm for sealing the cylinder housing from the crankcase the rolling diaphragm comprising a non-woven fabric;
an airlock located between the crankcase and the cylinder housing, the airlock disposed above the rolling diaphragm and the crankcase disposed below the rolling diaphragm; and
a pressure regulator maintaining a constant pressure differential between the airlock and the crankcase.

17. The Stirling cycle machine of claim 16 wherein the coupling assemblies further comprising:

a piston rod; and a link rod, the piston rod and link rod coupled together by a coupling means.

18. The Stirling cycle machine of claim 17 wherein the coupling means is a flexible joint.

19. The Stirling cycle machine of any one of claim 17 wherein the coupling means is a roller bearing.

* * * * *